US009886941B2

(12) United States Patent
Baym et al.

(10) Patent No.: US 9,886,941 B2
(45) Date of Patent: Feb. 6, 2018

(54) PORTABLE ELECTRONIC DEVICE DIRECTED AUDIO TARGETED USER SYSTEM AND METHOD

(71) Applicant: Elwha LLC, Bellevue, WA (US)

(72) Inventors: Michael H. Baym, Cambridge, MA (US); William David Duncan, Mill Creek, WA (US); Roderick A. Hyde, Redmond, WA (US); Edward K. Y. Jung, Bellevue, WA (US); Richard T. Lord, Gig Harbor, WA (US); Robert W. Lord, Seattle, WA (US); Nathan P. Myhrvold, Medina, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 342 days.

(21) Appl. No.: 14/163,546

(22) Filed: Jan. 24, 2014

(65) Prior Publication Data
US 2014/0269208 A1 Sep. 18, 2014

Related U.S. Application Data

(63) Continuation-in-part of application No. 13/844,525, filed on Mar. 15, 2013, now abandoned, and a
(Continued)

(51) Int. Cl.
*H04R 25/00* (2006.01)
*H04R 1/20* (2006.01)
(Continued)

(52) U.S. Cl.
CPC ............. *G10K 11/26* (2013.01); *H04B 11/00* (2013.01); *H04R 2217/03* (2013.01)

(58) Field of Classification Search
CPC .... G06F 1/1684; G10K 11/26; G10K 11/178; G01S 15/42; H04M 1/03; H04M 1/6016;
(Continued)

(56) References Cited

U.S. PATENT DOCUMENTS 4,823,908 A 4/1989 Tanaka et al.
6,011,470 A 1/2000 Schulte et al.
(Continued)

FOREIGN PATENT DOCUMENTS

DE 10004029 A1 8/2001
JP 02253800 A 10/1990
(Continued)

OTHER PUBLICATIONS

PCT International Search Report; International App. No. PCT/US2014/028899; dated Jul. 17, 2014; pp. 1-6.

*Primary Examiner* — Khai N Nguyen

(57) ABSTRACT

A computationally implemented system and method that is designed to, but is not limited to: electronically conditioning one or more information signals accessed at least in part through one or more portions of a portable electronic device to be transmitted from one or more portable electronic device emitters through one or more modulated acoustic ultrasonic signals; and electronically governing for output of one or more beams of said one or more modulated acoustic ultrasonic signals for demodulation of said one or more modulated acoustic ultrasonic signals into one or more acoustic audio signals containing said one or more information signals at a first location spaced away from said portable electronic device and spaced away from a second location. In addition to the foregoing, other method aspects are described in the claims, drawings, and text forming a part of the present disclosure.

43 Claims, 90 Drawing Sheets

Related U.S. Application Data continuation of application No. 13/844,615, filed on Mar. 15, 2013, now abandoned, and a continuation-in-part of application No. 13/844,678, filed on Mar. 15, 2013, now abandoned, and a continuation-in-part of application No. 13/844,732, filed on Mar. 15, 2013, now abandoned, and a continuation-in-part of application No. 13/920,280, filed on Jun. 18, 2013, and a continuation of application No. 13/920,296, filed on Jun. 18, 2013, and a continuation-in-part of application No. 13/920,305, filed on Jun. 18, 2013, and a continuation-in-part of application No. 13/920,312, filed on Jun. 18, 2013, and a continuation-in-part of application No. 14/163,496, filed on Jan. 24, 2014, and a continuation-in-part of application No. 14/163,818, filed on Jan. 24, 2014.

(51) Int. Cl.
  *G10K 11/26* (2006.01)
  *H04B 11/00* (2006.01)

(58) Field of Classification Search
  CPC ......... H04M 1/72519; H04M 2250/12; H04R 1/403; H04R 17/00; H04R 2201/401; H04R 2203/12; H04R 2217/03; H04R 2499/11; H04R 2499/15; H04R 3/00; H04R 3/12; H04R 5/02; H04R 5/04
  USPC ........ 367/118, 138, 197; 381/71.1, 334, 387
  See application file for complete search history.

(56) References Cited

U.S. PATENT DOCUMENTS

| | | | |
|---|---|---|---|
| 6,044,257 A | 3/2000 | Boling et al. | |
| 6,384,414 B1* | 5/2002 | Fisher | G01J 5/08 250/339.05 |
| 6,434,239 B1 | 8/2002 | DeLuca | |
| 6,445,804 B1 | 9/2002 | Hirayanagi | |
| 6,807,281 B1 | 10/2004 | Sasaki et al. | |
| 7,424,118 B2 | 9/2008 | Mori et al. | |
| 7,801,315 B2 | 9/2010 | Watanabe et al. | |
| 7,907,740 B2 | 3/2011 | Matsuzawa | |
| 8,009,838 B2 | 8/2011 | Lee et al. | |
| 8,199,960 B2 | 6/2012 | Eaton | |
| 8,208,970 B2 | 6/2012 | Cheung et al. | |
| 8,243,944 B2 | 8/2012 | Almagro | |
| 8,306,244 B2 | 11/2012 | Okamura et al. | |
| 8,311,233 B2 | 11/2012 | Kinghorn | |
| 8,358,321 B1 | 1/2013 | Weidner | |
| 8,582,789 B2 | 11/2013 | Cheung et al. | |
| 8,681,951 B1 | 3/2014 | Lavian et al. | |
| 8,879,766 B1 | 11/2014 | Zhang | |
| 8,891,783 B2 | 11/2014 | Tan et al. | |
| 8,903,104 B2 | 12/2014 | Norris | |
| 9,078,055 B2 | 7/2015 | Nguyen et al. | |
| 9,129,515 B2 | 9/2015 | Xiang et al. | |
| 9,197,974 B1 | 11/2015 | Clark et al. | |
| 9,197,977 B2 | 11/2015 | Mahabub et al. | |
| 9,226,053 B2 | 12/2015 | Okamura et al. | |
| 9,251,428 B2 | 2/2016 | Rozumyanskiy et al. | |
| 9,354,310 B2 | 5/2016 | Visser et al. | |
| 2002/0178390 A1 | 11/2002 | Lee | |
| 2003/0091200 A1 | 5/2003 | Pompei | |
| 2004/0032399 A1* | 2/2004 | Sekiguchi | G06F 3/03545 345/173 |
| 2004/0114770 A1 | 6/2004 | Pompei | |
| 2004/0114772 A1 | 6/2004 | Zlotnick | |
| 2004/0170086 A1 | 9/2004 | Mayer et al. | |
| 2004/0202339 A1 | 10/2004 | O'Brien, Jr. et al. | |
| 2004/0204168 A1 | 10/2004 | Laurila | |
| 2004/0208324 A1 | 10/2004 | Cheung et al. | |
| 2004/0208325 A1 | 10/2004 | Cheung et al. | |
| 2004/0209654 A1 | 10/2004 | Cheung et al. | |
| 2004/0234080 A1 | 11/2004 | Hernandez et al. | |
| 2004/0264707 A1 | 12/2004 | Yang et al. | |
| 2005/0009583 A1 | 1/2005 | Cheung et al. | |
| 2005/0152562 A1 | 7/2005 | Holmi et al. | |
| 2005/0195985 A1 | 9/2005 | Croft, III et al. | |
| 2005/0207568 A1 | 9/2005 | Wu | |
| 2005/0244016 A1 | 11/2005 | Norris et al. | |
| 2005/0261589 A1 | 11/2005 | Daft et al. | |
| 2006/0210090 A1 | 9/2006 | Shennib | |
| 2006/0291667 A1 | 12/2006 | Watanabe et al. | |
| 2007/0140505 A1 | 6/2007 | Tribble et al. | |
| 2007/0154036 A1 | 7/2007 | Matsuzawa | |
| 2007/0169555 A1 | 7/2007 | Gao et al. | |
| 2007/0172076 A1* | 7/2007 | Mori | H04R 3/12 381/77 |
| 2007/0183618 A1 | 8/2007 | Ishii et al. | |
| 2007/0286433 A1 | 12/2007 | Yoshino | |
| 2007/0287516 A1* | 12/2007 | Cheung | H04S 1/00 455/575.6 |
| 2008/0063214 A1 | 3/2008 | Spencer et al. | |
| 2008/0159571 A1 | 7/2008 | Hooley | |
| 2008/0226087 A1 | 9/2008 | Kinghorn | |
| 2008/0279410 A1* | 11/2008 | Cheung | H04S 1/00 381/381 |
| 2008/0285777 A1 | 11/2008 | Pompei | |
| 2009/0046864 A1 | 2/2009 | Mahabub et al. | |
| 2009/0089717 A1 | 4/2009 | Cho et al. | |
| 2009/0105586 A1 | 4/2009 | Daft et al. | |
| 2009/0214049 A1 | 8/2009 | Lee et al. | |
| 2009/0298430 A1 | 12/2009 | Cheung et al. | |
| 2010/0036926 A1 | 2/2010 | Ahart et al. | |
| 2010/0135504 A1 | 6/2010 | Almagro | |
| 2010/0172511 A1 | 7/2010 | Togawa et al. | |
| 2010/0239101 A1 | 9/2010 | Okamura et al. | |
| 2010/0284525 A1* | 11/2010 | Sander | H04R 1/1091 379/93.06 |
| 2011/0015880 A1 | 1/2011 | Kajitani et al. | |
| 2011/0103614 A1 | 5/2011 | Cheung et al. | |
| 2011/0129101 A1 | 6/2011 | Hooley | |
| 2011/0172793 A1* | 7/2011 | Richards | H04R 3/04 700/94 |
| 2011/0182445 A1 | 7/2011 | Atsmon et al. | |
| 2011/0188672 A1 | 8/2011 | Tada et al. | |
| 2011/0202302 A1* | 8/2011 | Park | G01S 13/886 702/127 |
| 2011/0211035 A1 | 9/2011 | Ota et al. | |
| 2011/0303014 A1 | 12/2011 | Kajitani | |
| 2012/0128196 A1 | 5/2012 | Watanabe et al. | |
| 2012/0148053 A1 | 6/2012 | Tan et al. | |
| 2012/0224456 A1* | 9/2012 | Visser | G01S 3/8006 367/127 |
| 2012/0243708 A1 | 9/2012 | Tsutsui et al. | |
| 2012/0268563 A1 | 10/2012 | Chou et al. | |
| 2012/0321112 A1 | 12/2012 | Schubert et al. | |
| 2013/0035582 A1* | 2/2013 | Radulescu | A61N 7/02 600/411 |
| 2013/0058503 A1 | 3/2013 | Kato et al. | |
| 2013/0066636 A1 | 3/2013 | Singhal | |
| 2013/0077803 A1 | 3/2013 | Konno et al. | |
| 2013/0094331 A1 | 4/2013 | Watanabe et al. | |
| 2013/0121516 A1* | 5/2013 | Lamb | H04S 3/00 381/307 |
| 2013/0202130 A1 | 8/2013 | Zurek et al. | |
| 2013/0294637 A1 | 11/2013 | Kitatani et al. | |
| 2013/0321625 A1 | 12/2013 | Yanagihara et al. | |
| 2014/0044286 A1 | 2/2014 | Coles et al. | |
| 2014/0079242 A1 | 3/2014 | Nguyen et al. | |
| 2014/0133665 A1 | 5/2014 | Xiang et al. | |
| 2014/0141836 A1 | 5/2014 | Rozumyanskiy et al. | |
| 2014/0205134 A1 | 7/2014 | Yagihashi et al. | |
| 2014/0254820 A1* | 9/2014 | Gardenfors | H04R 3/005 381/80 |
| 2014/0269207 A1 | 9/2014 | Baym et al. | |
| 2014/0269208 A1 | 9/2014 | Baym et al. | |
| 2014/0269212 A1* | 9/2014 | Xiang | G08C 23/02 367/197 |
| 2014/0307898 A1 | 10/2014 | Norris | |

(56) References Cited

U.S. PATENT DOCUMENTS

| | | |
|---|---|---|
| 2014/0369538 A1 | 12/2014 | Norris et al. |
| 2015/0003624 A1 | 1/2015 | Sato |
| 2016/0044402 A1 | 2/2016 | Okamura et al. |

FOREIGN PATENT DOCUMENTS

| | | | |
|---|---|---|---|
| JP | 2007-159042 A | 6/2007 | |
| JP | 2007-189627 A | 7/2007 | |
| JP | 2011-010224 A | 1/2011 | |
| JP | 2012-134589 A | 7/2012 | |
| WO | WO 2011007685 A1 * | 1/2011 | ............... G01S 5/30 |
| WO | WO 2011/117903 A2 | 9/2011 | |
| WO | WO 2012/091185 | 7/2012 | |
| WO | WO 2012/105183 A1 | 8/2012 | |

* cited by examiner

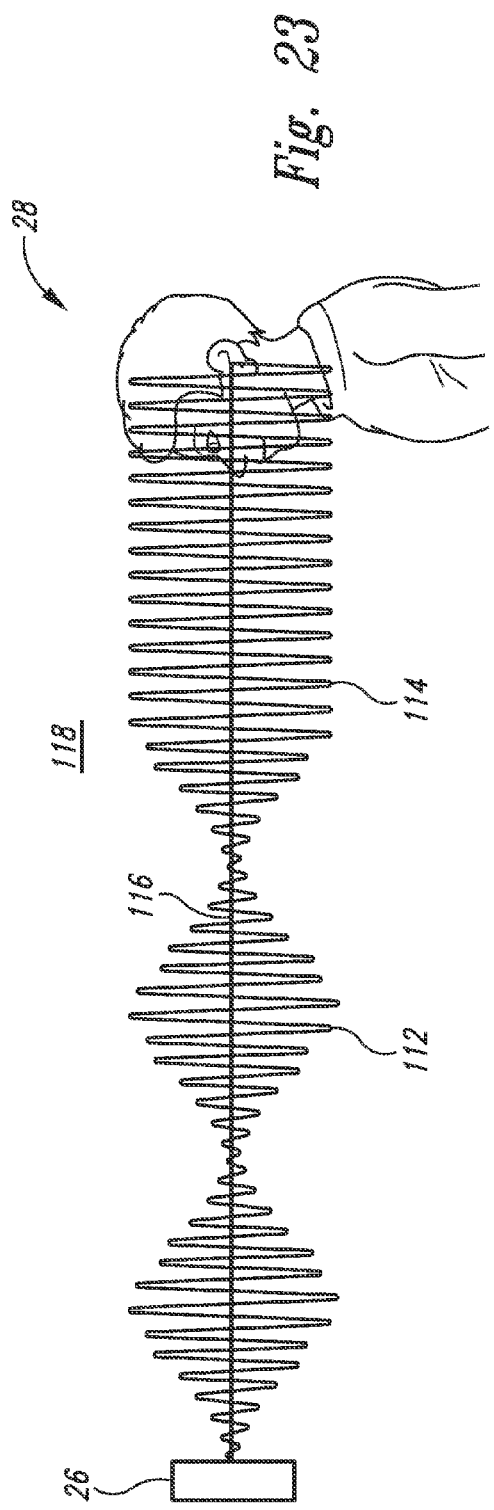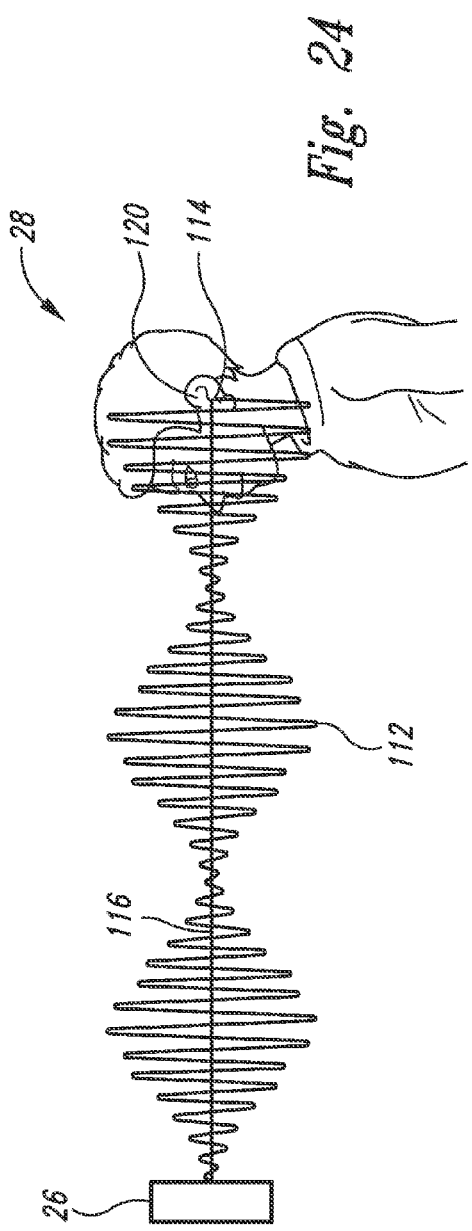

*Fig. 26* s100 control and information processing subsystem

| s102 microprocessor component | s104 central processing unit (CPU) component | s106 digital signal processor (DSP) component | s108 application specific integrated circuit (ASIC) component | s110 field programmable gate array (FPGA) component |
| --- | --- | --- | --- | --- |
| s112 multiprocessor component | s114 optical processing component | s116 logic component | s118 remote processor component | s120 multi-core array component |
| s122 server processor component | s124 database engine component | s126 search engine component | s128 image recognition component | s130 audio recognition component |
| s132 spectrum analysis component | s134 lexigraphy engine component | s136 operating system component | s138 voice recognition component | s140 network processor component |

Fig. 27 s200 information storage subsystem

| s202 random access memory (RAM) component | s204 dynamic random access memory (DRAM) component | s206 other volatile memory component | s208 persistent memory component | s210 read only memory (ROM) component |
| s212 electrically erasable programmable read only memory | s214 compact disk (CD) component | s216 digital versatile disk (DVD) component | s218 flash memory component | s220 other nonvolatile memory component |
| s222 hard drive component | s224 disk farm component | s226 disk cluster component | s228 remote backup component | s230 server component |
| s232 digital tape component | s234 optical storage component | s236 Blu Ray disk component | s238 computer readable signal bearing medium | s240 removable media component |

Fig. 29

| s400 sensing subsystem | | | |
|---|---|---|---|
| s402 electromagnetic sensing component | s404 antenna component | s406 photo detecting component | |
| | s414 radio freq ID (RFID) sensing component | | s408 micro-electro-mech sys (MEMS) detecting component |
| s412 temperature sensing component | | s416 chemical sensing component | s418 optical sensing component |
| s422 gas sensing component | s424 liquid sensing component | s426 solid sensing component | s428 climate sensing component |
| | s434 pressure sensing component | s436 pattern sensing component | s438 color sensing component |
| s432 motion sensing component | | | |
| | | | s410 weight sensing component |
| | | | s420 sound sensing component |
| | | | s430 vibration sensing component |
| | | | s440 encryption sensing component |

*Fig. 30* s500 electronic communication subsystem

| s502 network cable component | s504 optical network component | s506 waveguide network component | s508 internet network component | s510 wireless network component |
| s512 wired network component | s514 cellular network component | s516 wide area network component | s518 local area network component | s520 encrypted communication component |
| s522 transceiver component | s524 infrared network component | s526 transmitter component | s528 receiver component | s530 long-range communication component |
| s532 short-range communication component | s534 RFID communication component | s536 encrypted communication component | s538 SMS communication component | s540 tablet communication component |

Fig. 31

| s600 power subsystem | | | |
|---|---|---|---|
| s602 electrical component | s604 hydrocarbon fuel component | s606 hydrogen fuel component | s608 solid fuel component | s610 liquid fuel component |
| s612 gaseous fuel component | s614 battery component | s616 electrical generator component | s618 dry cell battery component | s620 hybrid fuel component |
| s622 rechargeable component | s624 thermoelectric component | s626 piezoelectric component | s628 capacitor component | s630 power cell component |
| s632 steam generation component | s634 solar cell component | s636 solar reflector component | s638 thermonuclear component | s640 co-generation component |

Fig. 33

10 portable electronic device directed audio

| e1120 conditioning handheld mobile elec circ arrange | e1121 conditioning cell phone elec circ arrange | e1122 conditioning portable laptop elec circ arrange | e1123 conditioning PDA elec circ arrange | e1124 conditioning smart phon elec circ arrange |
| e1125 conditioning security personnel elec circ arrange | e1126 conditioning athletic sports elec circ arrange | e1127 conditioning wearable media elec circ arrange | e1128 conditioning wristwatch elec circ arrange | e1129 conditioning two-way radio elec circ arrange |
| e1130 conditioning beams elec circ arrange | e1131 conditioning steered beams elec circ arrange | e1132 conditioning phased array elec circ arrange | e1133 conditioning audio elec circ arrange | e1134 conditioning absolute position elec circ arrange |
| e1135 conditioning relative position elec circ arrange | e1136 conditioning quality characterization target locations elec | e1137 conditioning ultrasonic transducers elec circ arrange | e1138 conditioning reference elec circ arrange | e1139 conditioning more acoustic ultrasonic elec circ arrange |

Fig. 35

10 portable electronic device directed audio

| e12 electronically governing elec circ arrange | e1201 governing thermal imaging elec circ arrange | e1202 governing visual imaging elec circ arrange | e1203 governing acoustic imaging elec circ arrange | e1204 governing sensed acoustic elec circ arrange |
|---|---|---|---|---|
| e1205 governing adjacent elec circ arrange | e1206 governing Doppler frequency elec circ arrange | e1207 governing digitally coded elec circ arrange | e1208 governing ranging elec circ arrange | e1209 governing visual tracking elec circ arrange |
| e1210 governing thermal tracking elec circ arrange | e1211 governing greatest intensity elec circ arrange | e1212 governing thermal tracking elec circ arrange | e1213 governing signal amplitude elec circ arrange | e1214 governing target location elec circ arrange |
| e1215 governing audio microphone elec circ arrange | e1216 governing ultrasonic microphone elec circ arrange | e1217 governing acoustic digital elec circ arrange | e1218 governing acoustic noise elec circ arrange | e1219 governing ultrasonic signals elec circ arrange |

*Fig. 36*

10 portable electronic device directed audio

| e1220 governing vectoring elec circ arrange | e1221 governing atmospheric interaction elec circ arrange | e1222 governing human tissue elec circ arrange | e1223 governing signals interfering elec circ arrange | e1224 governing transducers to focus elec circ arrange |
| --- | --- | --- | --- | --- |
| e1225 governing interference elec circ arrange | e1226 governing nonlinear atmospheric elec circ arrange | e1227 governing nonlinear tissue elec circ arrange | e1228 governing nonlinear non-tissue elec circ arrange | e1229 governing nonlinear personal elec circ arrange |
| e1230 governing ears of a target elec circ arrange | e1231 governing digitally coded elec circ arrange | e1232 governing signals tailored elec circ arrange | e1233 governing feedback sensing elec circ arrange | e1234 governing binaural acoustic elec circ arrange |
| e1235 governing stereophonic acoustic elec circ arrange | e1236 governing monophonic acoustic elec circ arrange | e1237 governing phase cancellation elec circ arrange | e1238 governing phase-shifting elec circ arrange | e1239 governing emitted greater elec circ arrange |

Fig. 37

10 portable electronic device directed audio

| e1240 governing information designated elec circ arrange | e1241 governing information containing elec circ arrange | e1242 governing psychologically influential elec circ arrange | e1243 governing verbal oratory elec circ arrange | e1244 governing music selections elec circ arrange |
| e1245 governing location away elec circ arrange | e1246 governing vicinity ears elec circ arrange | e1247 governing vicinity individual elec circ arrange | e1248 governing near individuals elec circ arrange | e1249 governing passive receiver elec circ arrange |
| e1250 governing moving member elec circ arrange | e1251 governing listener's head elec circ arrange | e1252 governing sensed accelerometer elec circ arrange | e1253 governing six feet elec circ arrange | e1254 governing twelve feet elec circ arrange |
| e1255 governing three feet elec circ arrange | e1256 governing emitter arrangements elec circ arrange | e1257 governing handheld mobile elec circ arrange | e1258 governing cell phone elec circ arrange | e1259 governing laptop computer elec circ arrange |

*Fig. 38*

10 portable electronic device directed audio

| e1260 governing PDA elec circ arrange | e1261 governing smart phone elec circ arrange | e1262 governing security personnel elec circ arrange | e1263 governing sports equipment elec circ arrange | e1264 governing wearable media elec circ arrange |
|---|---|---|---|---|
| e1265 governing wristwatch elec circ arrange | e1266 governing two-way radio elec circ arrange | e1267 governing targeting area elec circ arrange | e1268 governing transducer placement elec circ arrange | e1269 governing amplitude size elec circ arrange |
| e1270 governing ears of a target elec circ arrange | e1271 governing digitally coded elec circ arrange | e1272 governing keyboard area elec circ arrange | e1273 governing dimensional sizing elec circ arrange | e1274 governing wavelengths of the lowest elec circ arrange |
| e1275 governing placement in body elec circ arrange | e1276 governing localized areas elec circ arrange | e1277 governing collective speakers elec circ arrange | e1278 governing multiple arrays elec circ arrange | |

*Fig. 40* s200 information storage subsystem

| i1120 conditioning handheld mobile instructions | i1121 conditioning cell phone instructions | i1122 conditioning portable laptop instructions | i1123 conditioning PDA instructions | i1124 conditioning smart phon instructions |
| --- | --- | --- | --- | --- |
| i1125 conditioning security personnel instructions | i1126 conditioning athletic sports instructions | i1127 conditioning wearable media instructions | i1128 conditioning wristwatch instructions | i1129 conditioning two-way radio instructions |
| i1130 conditioning beams instructions | i1131 conditioning steered beams instructions | i1132 conditioning phased array instructions | i1133 conditioning audio instructions | i1134 conditioning absolute position instructions |
| i1135 conditioning relative position instructions | i1136 conditioning quality characterization target locations | i1137 conditioning ultrasonic transducers instructions | i1138 conditioning reference instructions | i1139 conditioning more acoustic ultrasonic instructions |

*Fig. 44* s200 information storage subsystem

- i1240 governing information designated instructions
- i1241 governing information containing instructions
- i1242 governing psychologically influential instructions
- i1243 governing verbal oratory instructions
- i1244 governing music selections instructions
- i1245 governing location away instructions
- i1246 governing vicinity ears instructions
- i1247 governing vicinity individual instructions
- i1248 governing near individuals instructions
- i1249 governing passive receiver instructions
- i1250 governing moving member instructions
- i1251 governing listener's head instructions
- i1252 governing sensed accelerometer instructions
- i1253 governing six feet instructions
- i1254 governing twelve feet instructions
- i1255 governing three feet instructions
- i1256 governing emitter arrangements instructions
- i1257 governing handheld mobile instructions
- i1258 governing cell phone instructions
- i1259 governing laptop computer instructions

Fig. 45 s200 information storage subsystem

| i1260 governing PDA instructions | i1261 governing smart phone instructions | i1262 governing security personnel instructions | i1263 governing sports equipment instructions | i1264 governing wearable media instructions |
|---|---|---|---|---|
| i1265 governing wristwatch instructions | i1266 governing two-way radio instructions | i1267 governing targeting area instructions | i1268 governing transducer placement instructions | i1269 governing amplitude size instructions |
| i1270 governing along vicinity instructions | i1271 governing display screen instructions | i1272 governing keyboard area instructions | i1273 governing dimensional sizing instructions | i1274 governing wavelengths of the lowest instructions |
| i1275 governing placement in body instructions | i1276 governing localized areas instructions | i1277 governing collective speakers instructions | i1278 governing multiple arrays instructions | |

Fig. 49

| 10 portable electronic device directed audio | | | |
|---|---|---|---|
| m12 electronically governing module | m1201 governing thermal imaging module | m1202 governing visual imaging module | |
| m1205 governing adjacent module | m1206 governing Doppler frequency module | m1207 governing digitally coded module | m1203 governing acoustic imaging module |
| m1210 governing thermal tracking module | m1211 governing greatest intensity module | m1212 governing thermal tracking module | m1208 governing ranging module |
| m1215 governing audio microphone module | m1216 governing ultrasonic microphone module | m1217 governing acoustic digital module | m1213 governing signal amplitude module |
| | | m1218 governing acoustic noise module | m1214 governing target location module |
| | | | m1219 governing ultrasonic signals module |
| | | | m1204 governing sensed acoustic module |
| | | | m1209 governing visual tracking module |

*Fig. 51*

10 portable electronic device directed audio

| m1240 governing information designated module | m1241 governing information containing module | m1242 governing psychologically influential module | m1243 governing verbal oratory module | m1244 governing music selections module |

| m1245 governing location away module | m1246 governing vicinity ears module | m1247 governing vicinity individual module | m1248 governing near individuals module | m1249 governing passive receiver module |

| m1250 governing moving member module | m1251 governing listener's head module | m1252 governing sensed accelerometer module | m1253 governing six feet module | m1254 governing twelve feet module |

| m1255 governing three feet module | m1256 governing emitter arrangements module | m1257 governing handheld mobile module | m1258 governing cell phone module | m1259 governing laptop computer module |

Fig. 52

10 portable electronic device directed audio

| m1260 governing PDA module | m1261 governing smart phone module | m1262 governing security personnel module | m1263 governing sports equipment module | m1264 governing wearable media module |
| --- | --- | --- | --- | --- |
| m1265 governing wristwatch module | m1266 governing two-way radio module | m1267 governing targeting area module | m1268 governing transducer placement module | m1269 governing amplitude size module |
| m1270 governing ears of a target module | m1271 governing digitally coded module | m1272 governing keyboard area module | m1273 governing dimensional sizing module | m1274 governing wavelengths of the lowest module |
| m1275 governing placement in body module | m1276 governing localized areas module | m1277 governing collective speakers module | m1278 governing multiple arrays module | |

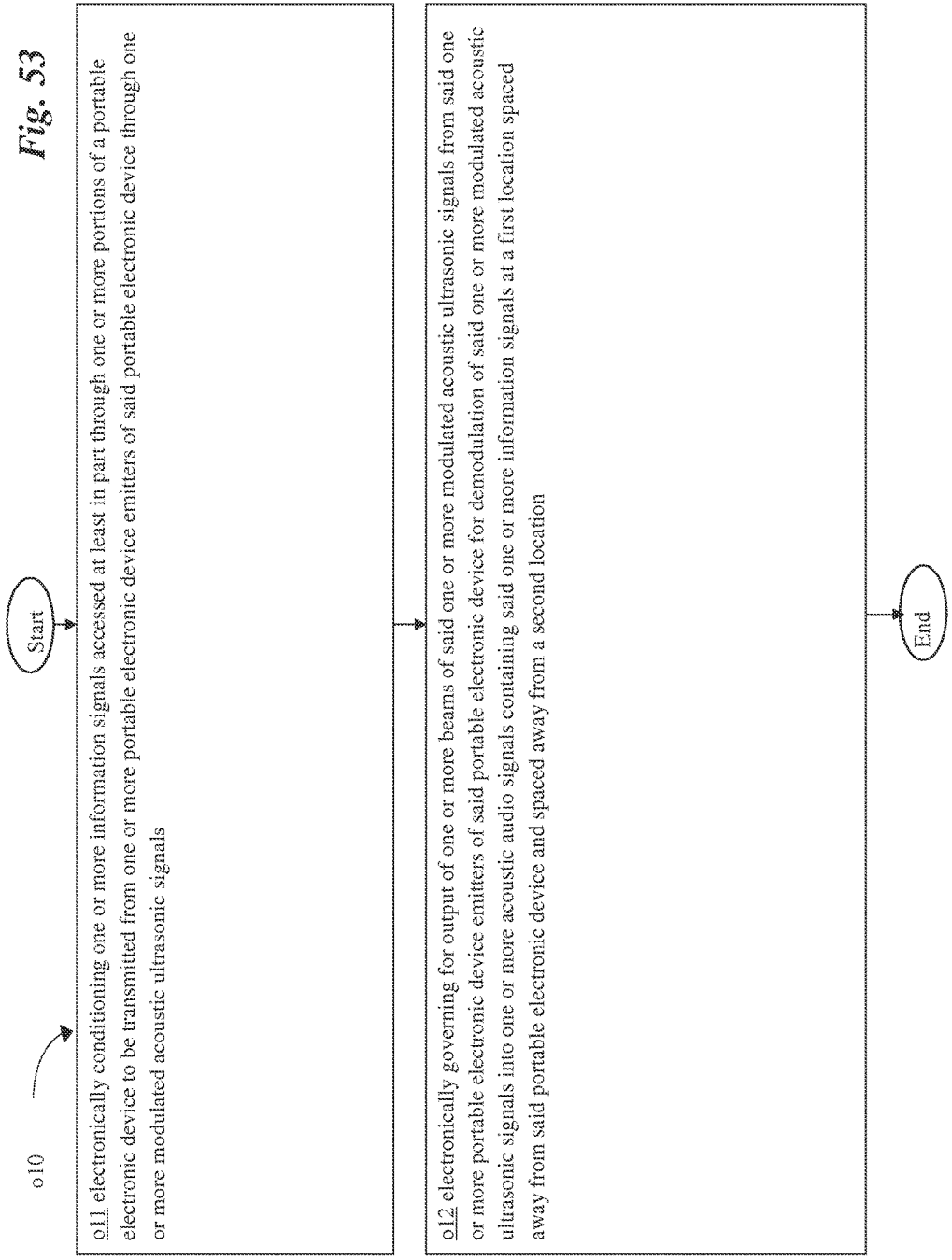

*Fig. 54* o11 electronically conditioning one or more information signals accessed at least in part through one or more portions of a portable electronic device to be transmitted from one or more portable electronic device emitters of said portable electronic device through one or more modulated acoustic ultrasonic signals o1101 electronically conditioning one or more information signals the accessed at least in part through one or more portions of a portable electronic device to be transmitted from one or more portable electronic device emitters of said portable electronic device through one or more modulated acoustic ultrasonic signals through one or more data storage portions of said portable electronic device o1102 electronically conditioning one or more information signals the accessed at least in part through one or more portions of a portable electronic device to be transmitted from one or more portable electronic device emitters of said portable electronic device through one or more modulated acoustic ultrasonic signals via one or more wireless communication portions of said portable electronic device o1103 electronically conditioning one or more information signals the accessed at least in part through one or more portions of a portable electronic device to be transmitted from one or more portable electronic device emitters of said portable electronic device through one or more modulated acoustic ultrasonic signals through one or more microphone portions of said portable electronic device

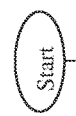

*Fig. 57* o11 electronically conditioning one or more information signals accessed at least in part through one or more portions of a portable electronic device to be transmitted from one or more portable electronic device emitters of said portable electronic device through one or more modulated acoustic ultrasonic signals o1110 electronically conditioning one or more information signals the accessed at least in part through one or more portions of a portable electronic device to be transmitted from one or more portable electronic device emitters of said portable electronic device through one or more modulated acoustic ultrasonic signals via one or more text recognition portions of said portable electronic device o1111 electronically conditioning one or more information signals the accessed at least in part through one or more portions of a portable electronic device to be transmitted from one or more portable electronic device emitters of said portable electronic device through one or more modulated acoustic ultrasonic signals through one or more monitor alarm system portions of said portable electronic device o1112 electronically conditioning the one or more information signals accessed at least in part through one or more portions of a portable electronic device to be transmitted from one or more portable electronic device emitters of said portable electronic device through one or more modulated acoustic ultrasonic signals including narrative speeches

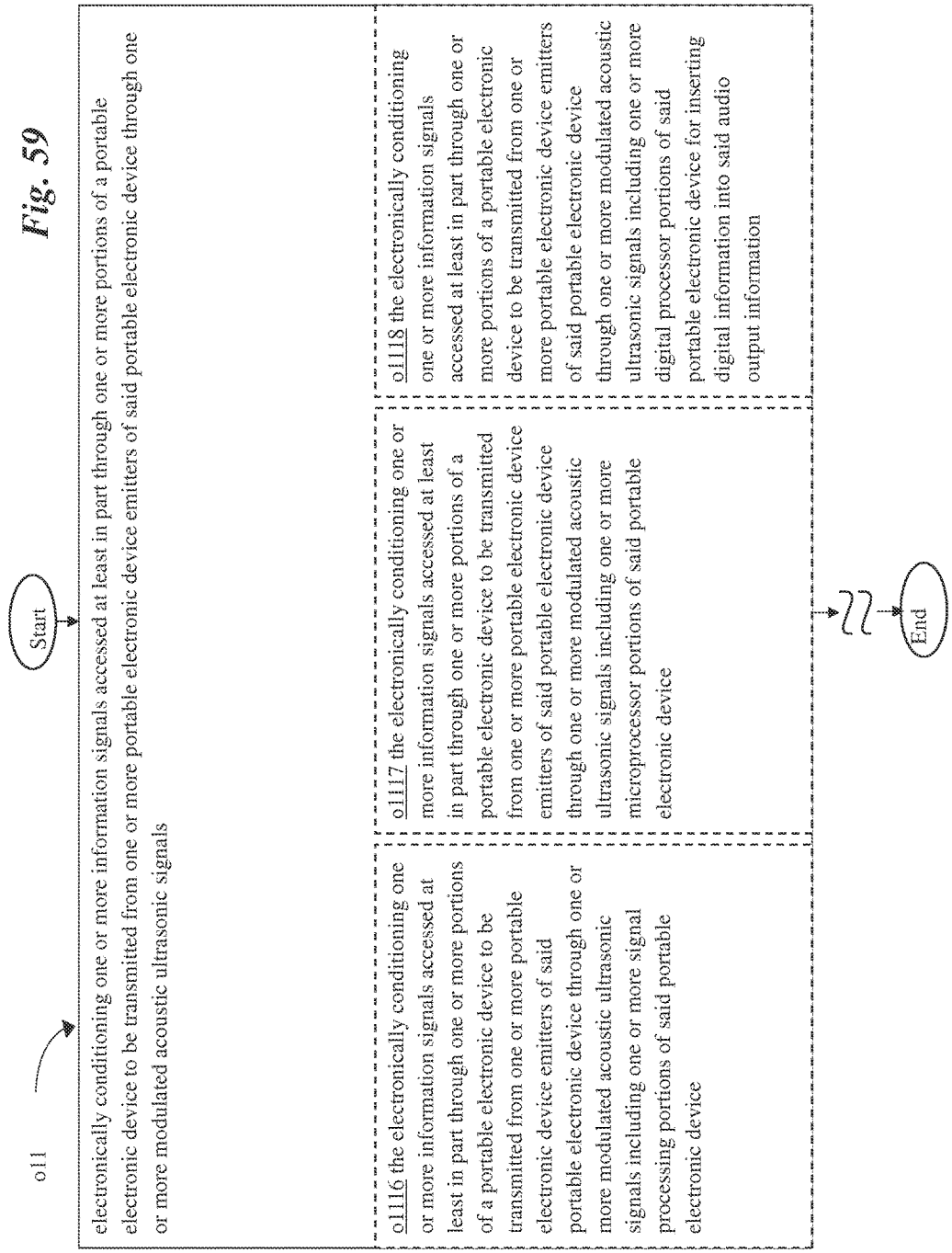

Fig. 60 o11 → electronically conditioning one or more information signals accessed at least in part through one or more portions of a portable electronic device to be transmitted from one or more portable electronic device emitters of said portable electronic device through one or more modulated acoustic ultrasonic signals o1119 electronically conditioning one or more information signals accessed at least in part through one or more portions of a portable electronic device to be transmitted from one or more portable electronic device emitters the of said portable electronic device through one or more modulated acoustic ultrasonic signals as one or more electronic tablet computer systems o1120 electronically conditioning one or more information signals accessed at least in part through one or more portions of a portable electronic device to be transmitted from one or more portable electronic device emitters the of said portable electronic device through one or more modulated acoustic ultrasonic signals as one or more electronic handheld mobile device systems o1121 electronically conditioning one or more information signals accessed at least in part through one or more portions of a portable electronic device to be transmitted from one or more portable electronic device emitters the of said portable electronic device through one or more modulated acoustic ultrasonic signals as one or more electronic cell phone systems Start → ... → End

*Fig. 64* o11 electronically conditioning one or more information signals accessed at least in part through one or more portions of a portable electronic device to be transmitted from one or more portable electronic device emitters of said portable electronic device through one or more modulated acoustic ultrasonic signals o1131 electronically conditioning one or more information signals accessed at least in part through one or more portions of a portable electronic device the to be transmitted from one or more portable electronic device emitters of said portable electronic device through one or more modulated acoustic ultrasonic signals via one or more steered beams of acoustic ultrasonic signals o1132 electronically conditioning one or more information signals accessed at least in part through one or more portions of a portable electronic device the to be transmitted from one or more portable electronic device emitters of said portable electronic device through one or more modulated acoustic ultrasonic signals by phased array steering of one or more acoustic ultrasonic signals o1133 electronically conditioning one or more information signals accessed at least in part through one or more portions of a portable electronic device the to be transmitted from one or more portable electronic device emitters of said portable electronic device through one or more modulated acoustic ultrasonic signals as one or more acoustic ultrasonic signals modulated via one or more audio signals

Fig. 69 o12 electronically governing for output of one or more beams of said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location Start o1204 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting according sensed acoustic environment adjacent one or more target listeners o1205 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting acoustic ultrasonic signal components according to sensed presence of others adjacent to one or more targeted listeners o1206 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting to compensate for Doppler frequency shifting duet to movement of said portable electronic device End

Fig. 70 o12 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location Start o1207 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including embedding one or more digitally coded acoustic audio signals in one or more acoustic ultrasonic signals o1208 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting one or more acoustic ultrasonic signals for ranging one or more target listeners o1209 electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including adjusting acoustic ultrasonic signal amplitude based on visual tracking of one or more target listeners End

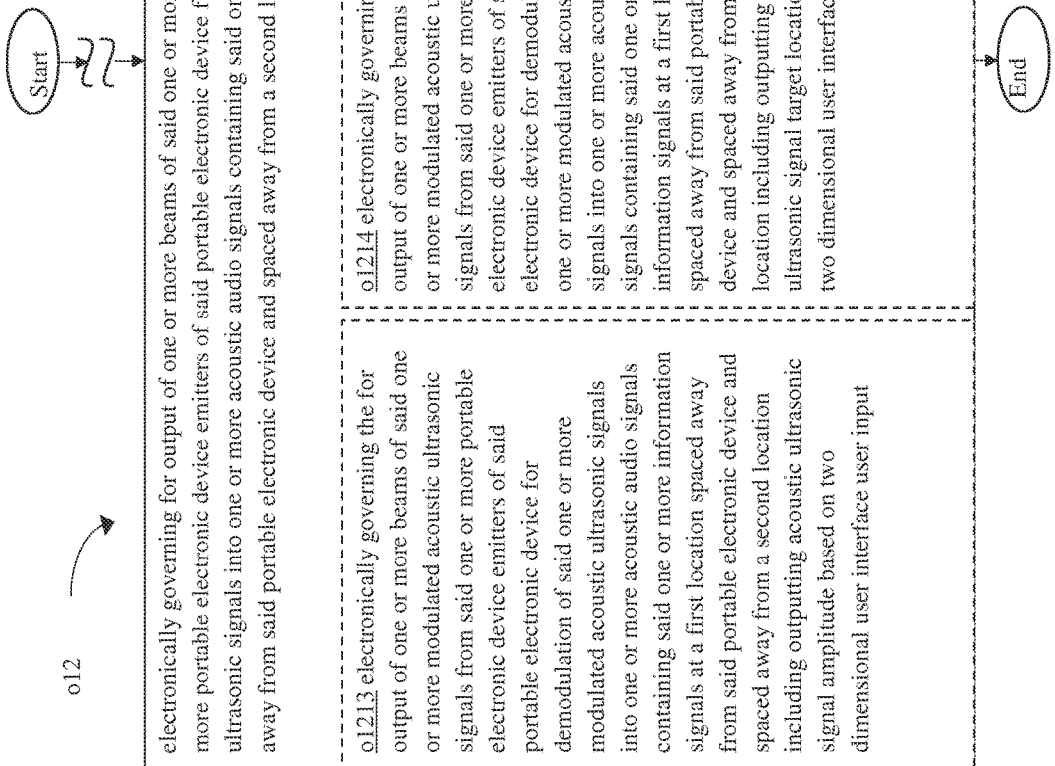

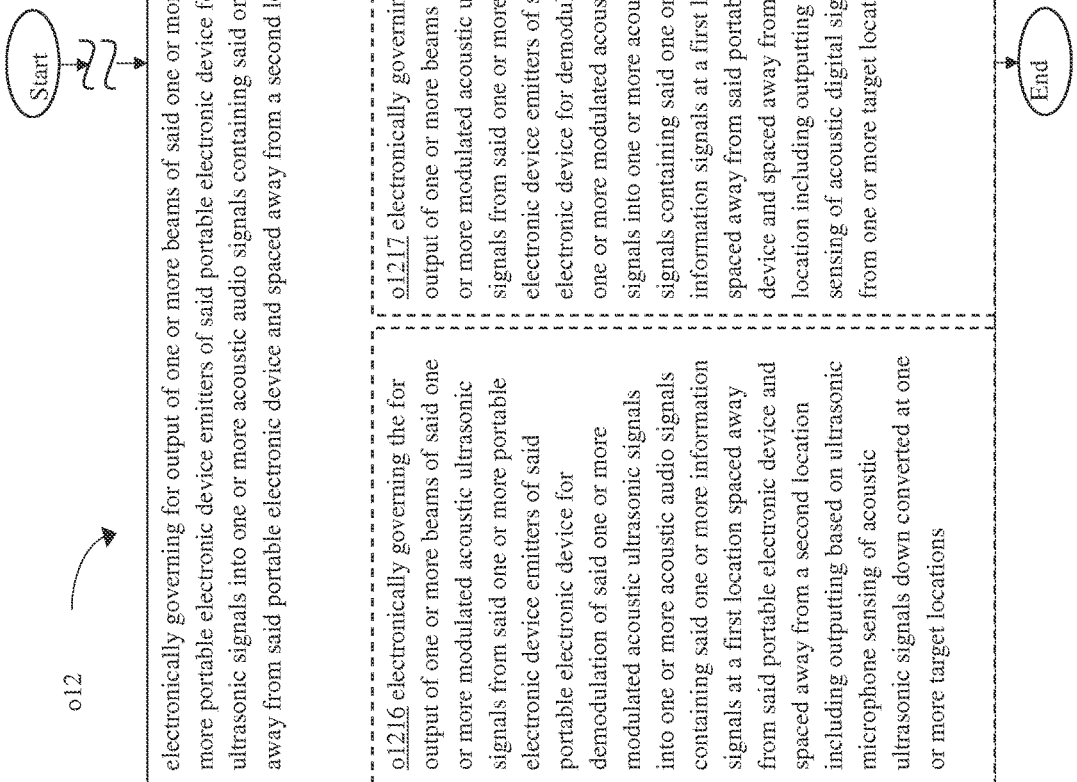

*Fig. 74* o12

Start electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1219 electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including one or more ultrasonic signals having frequencies with a range of between 60 to 200 kHz o1220 electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including vectoring of two or more beams of acoustic ultrasonic signals to down convert to one or more acoustic audio signals o1221 electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting one or more acoustic ultrasonic signals to produce one or more acoustic audio signals through non-linear atmospheric interaction End

*Fig. 75*

o12 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1222 electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting one or more acoustic ultrasonic signals to produce one or more acoustic audio signals through non-linear human tissue interaction o1223 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via vectoring of two or more beams of acoustic ultrasonic signals interfering at one or more target locations o1224 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via one or more arrays of transducers to focus one or more beams of acoustic ultrasonic signals at one or more target locations

Fig. 76

o12 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1225 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via interference of two or more acoustic ultrasonic signals to produce one or more acoustic audio signals o1226 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear atmospheric interaction of one or more acoustic ultrasonic signals o1227 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear human tissue interaction of one or more acoustic ultrasonic signals

Fig. 77 o12

Start electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1228 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear non-tissue solid interaction of one or more acoustic ultrasonic signals o1229 electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear personal ornament interaction of one or more acoustic ultrasonic signals o1230 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more audio signals tailored to frequency response information for one or more ears of a target human listener End

Fig. 78 o12

Start → 77 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1231 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals containing one or more digitally coded identifiers o1232 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals tailored according to a sensed acoustic environment o1233 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals tailored according to feedback sensing by portable electronic device End

Fig. 79 o12 electronically governing for output of one or more beams of said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1234 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more binaural acoustic audio signals o1235 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more stereophonic acoustic audio signals o1236 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more monophonic acoustic audio signals directed to a location of one ear of a target listener

*Fig. 80* o12 electronically governing for output of one or more beams of said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1237 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals containing out-of-phase cancellation of background sound in a vicinity of a target listener o1238 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals containing phase-shifting of an original speech of a target listener in near real-time to the original speech being o1239 electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals being emitted at greater than 150 decibels

*Fig. 81* o12

Start electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1240 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information designated to be transmitted or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information containing an entire amount of said audio output information or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information that is psychologically influential End

Fig. 83 o12

Start electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1246 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location in a vicinity of one or more ears of a target listener o1247 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location in a vicinity of a first individual o1248 electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location near one or more first individuals but not a second End

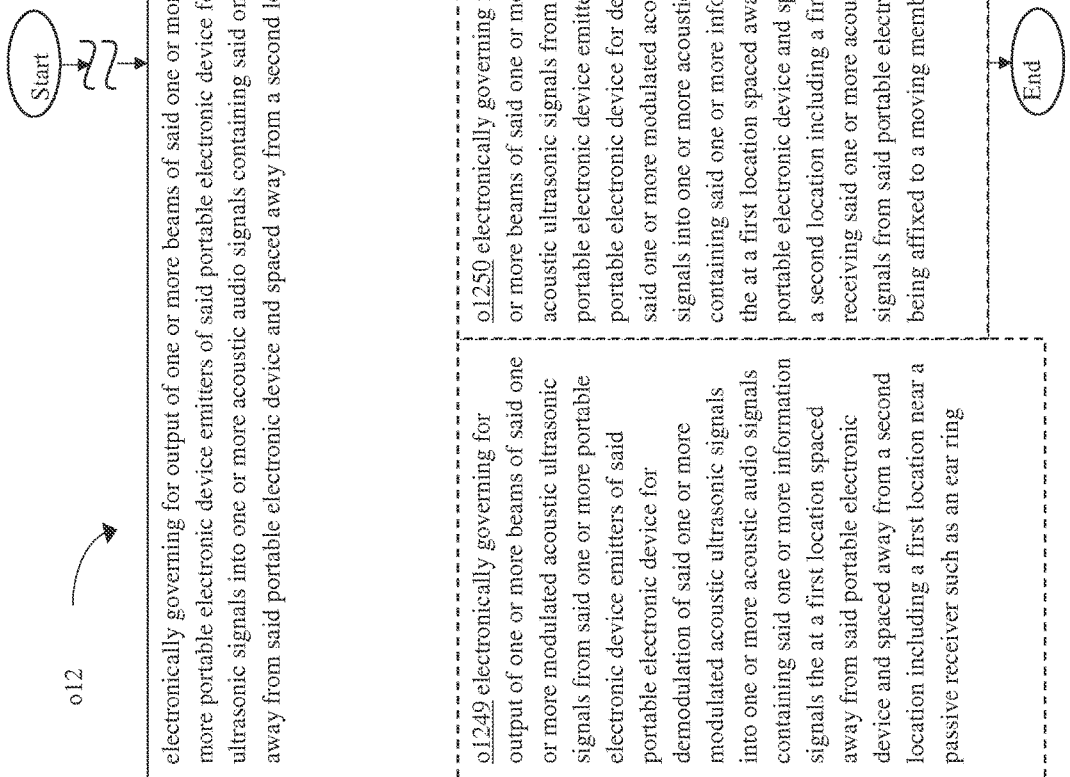

*Fig. 87* o12

Start electronically governing for output of one or more beams of said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1258 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a cell phone portable electronic device o1259 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a laptop computer portable electronic device o1260 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a personal data assistant (PDA) portable electronic device End

Fig. 88 o12 electronically governing for output of one or more beams of said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1261 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a smart phone portable electronic device o1262 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a security personnel device portable electronic device o1263 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a sports equipment portable electronic device

Fig. 89 o12

Start electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1264 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a wearable media portable electronic device o1265 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a wristwatch portable electronic device o1266 electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a two-way radio portable electronic device End

Fig. 90 electronically governing for output of one or more beams of said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1267 electronically governing for output of one or more beams of said one or more modulated acoustic ultrasonic signals from said one or more portable electronic device emitters of said portable electronic device for demodulation the of said one or more modulated acoustic ultrasonic signals into one or more acoustic audio signals containing said one or more information signals at a first location spaced away from said portable electronic device and spaced away from a second location including determination of targeting area based in part on one or more frequencies o1268 electronically governing for output of one or more beams of said one or more modulated acoustic ultrasonic signals from said one or more portable electronic device emitters of said portable electronic device for demodulation the of said one or more modulated acoustic ultrasonic signals into one or more acoustic audio signals containing said one or more information signals at a first location spaced away from said portable electronic device and spaced away from a second location including transducer placement based in part on one or more frequencies to be used for said one or more acoustic o1269 electronically governing for output of one or more beams of said one or more modulated acoustic ultrasonic signals from said one or more portable electronic device emitters of said portable electronic device for demodulation the of said one or more modulated acoustic ultrasonic signals into one or more acoustic audio signals containing said one or more information signals at a first location spaced away from said portable electronic device and spaced away from a second location including amplitude to be used for said ultrasonic acoustic signals based on size

Fig. 91 o12 

Start ∿∿ electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location o1270 electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement at least partially along vicinity of said portable o1271 electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement at least partially in display screen of said portable electronic device o1272 electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement at least partially in keyboard area of said portable End

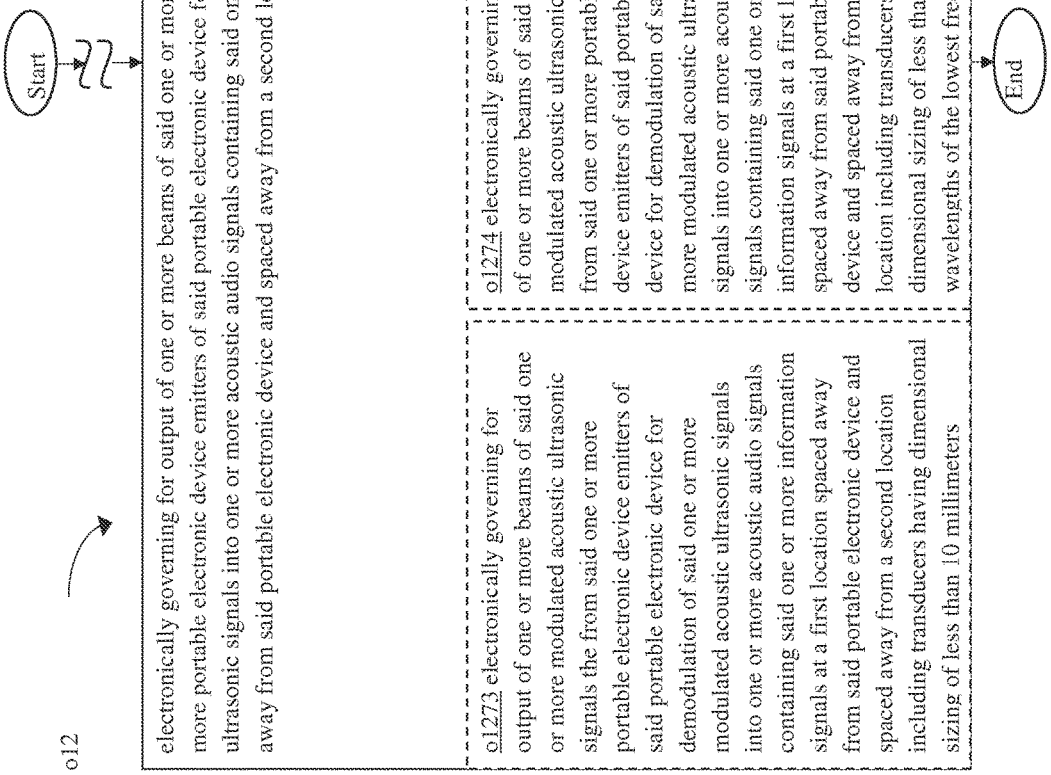

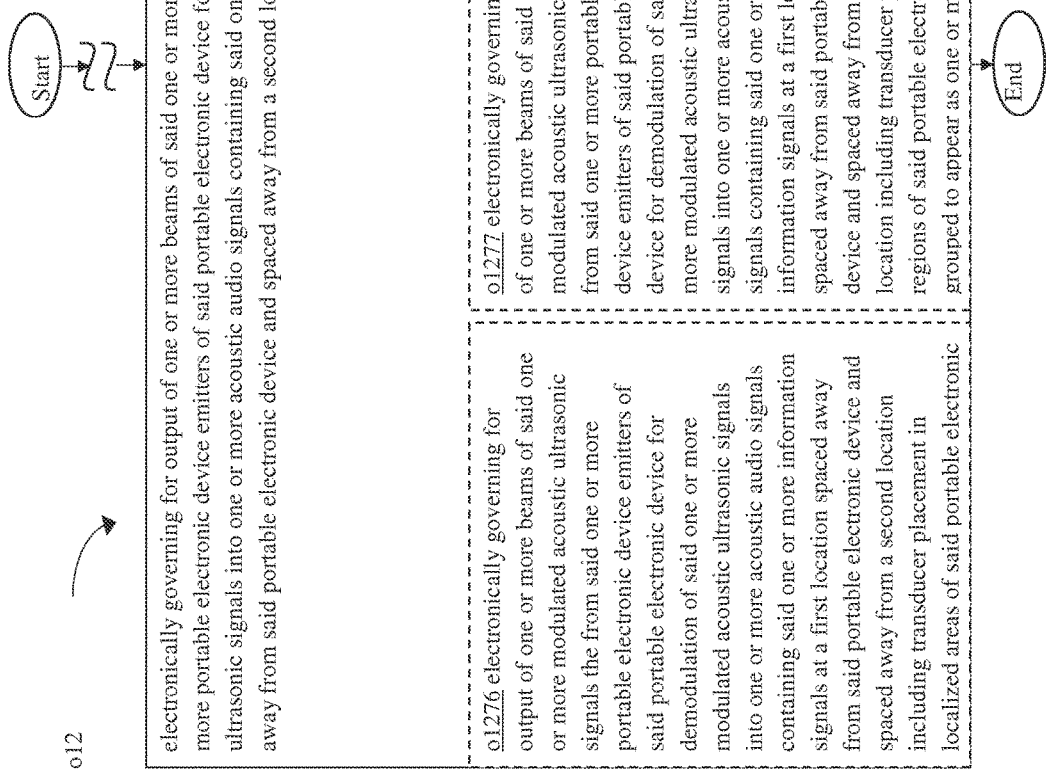

PORTABLE ELECTRONIC DEVICE DIRECTED AUDIO TARGETED USER SYSTEM AND METHOD

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/844,525, entitled PORTABLE ELECTRONIC DEVICE DIRECTED AUDIO SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation of U.S. patent application Ser. No. 13/844,615, entitled PORTABLE ELECTRONIC DEVICE DIRECTED AUDIO TARGETED USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/844,678, entitled PORTABLE ELECTRONIC DEVICE DIRECTED AUDIO TARGETED MULTI-USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/844,732, entitled PORTABLE ELECTRONIC DEVICE DIRECTED AUDIO EMITTER ARRANGEMENT SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/920,280, entitled PORTABLE ELECTRONIC DEVICE DIRECTED AUDIO SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

For purposes of the USPTO extra-statutory requirements, the present application constitutes a continuation of U.S. patent application Ser. No. 13/920,296, entitled PORTABLE ELECTRONIC DEVICE DIRECTED AUDIO TARGETED USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/920,305, entitled PORTABLE ELECTRONIC DEVICE DIRECTED AUDIO TARGETED MULTI-USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/920,312, entitled PORTABLE ELECTRONIC DEVICE DIRECTED AUDIO EMITTER ARRANGEMENT SYSTEM AND METHOD, naming Michael H. Baym, William David Duncan, Roderick A. Hyde, Edward K. Y. June, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/163,496, entitled PORTABLE ELECTRONIC DEVICE DIRECTED AUDIO SYSTEM AND METHOD, naming Michael H. Baym, William David Duncan, Roderick A. Hyde, Edward K. Y. June, Richard T. Lord, Robert W. Lord, Nathan P. Myhrvold and Lowell L. Wood, Jr. as inventors, filed 24 January, 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/163,818, entitled PORTABLE ELECTRONIC DEVICE DIRECTED AUDIO TARGETED MULTI-USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 24 January, 2014, which is currently co-pending or is an application of which a currently co-pending application is entitled to the benefit of the filing date.

Under the auspices of various alleged "rules" implementing the America Invents Act (AIA), the United States Patent and Trademark Office (USPTO) is purporting to require that an Attorney for a Client make various legal and/or factual statements/commentaries/admissions (e.g. Concerning any "Statement under 37 CFR 1.55 or 1.78 for AIA (First Inventor to File) Transition Application") related to written description/new matter, and/or advise his Client to make such legal and/or factual statements/commentaries/admissions. Attorney expressly points out that the burden of both alleging that an application contains new matter with respect to its parent(s) and establishing a prima facie case of lack of written description under 35 U.S.C. § 112, first paragraph lies firmly on the USPTO. Accordingly, and expressly in view of duties owed his client, Attorney further points out that the AIA legislation, while referencing the first to file, does not appear to constitute enabling legislation that would empower the USPTO to compel an Attorney to either make/advise such legal and/or factual statements/commentaries/admissions. Notwithstanding the foregoing, Attorney/Applicant understand that the USPTO's computer programs/personnel have certain data entry requirements, and hence Attorney/Applicant have provided a designation(s) of a relationship between the present application and its parent application(s) as set forth herein and in any ADS filed in this application, but expressly points out that such designation(s) is not to be construed in any way as any type of commentary and/or admission as to whether or not a claim in the present application is supported by a parent application, or whether or not the present application contains any new matter in addition to the matter of its parent application(s) in general and/or especially as such might relate to an effective filing date before, on, or after 16 Mar. 2013.

The fact that the Attorney/Applicant may have made certain statements in view of practical data entry requirements of the USPTO should NOT be taken as an admission of any sort. Attorney/Applicant hereby reserves any and all rights to contest/contradict/confirm such statements at a later time. Furthermore, no waiver (legal, factual, or otherwise), implicit or explicit, is hereby intended (e.g., with respect to any statements/admissions made by the Attorney/Applicant in response to the purported requirements of the USPTO related to the relationship between the present application and parent application[s], and/or regarding new matter or alleged new matter relative to the parent application[s]). For example, although not expressly stated and possibly despite a designation of the present application as a continuation-in-part of a parent application, Attorney/Applicant may later assert that the present application or one or more of its claims do not contain any new matter in addition to the matter of its parent application[s], or vice versa.

SUMMARY

In one aspect, a computationally-implemented method includes, but is not limited to electronically conditioning one or more information signals accessed at least in part through one or more portions of a portable electronic device to be transmitted from one or more portable electronic device emitters of said portable electronic device through one or more modulated acoustic ultrasonic signals; and electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically conditioning one or more information signals accessed at least in part through one or more portions of a portable electronic device to be transmitted from one or more portable electronic device emitters of said portable electronic device through one or more modulated acoustic ultrasonic signals; and means for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. In addition to the foregoing, other system aspects are described in the claims, drawings, and text forming a part of the disclosure set forth herein.

A computationally-implemented system includes, but is not limited to a electronically conditioning electrical circuitry arrangement for electronically conditioning one or more information signals accessed at least in part through one or more portions of a portable electronic device to be transmitted from one or more portable electronic device emitters of said portable electronic device through one or more modulated acoustic ultrasonic signals; and an electronically governing electrical circuitry arrangement for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. In addition to the foregoing, other system aspects are described in the claims, drawings, and text forming a part of the disclosure set forth herein.

A system includes, but is not limited to a electronically conditioning module configured to operate in accordance with electronically conditioning one or more information signals accessed at least in part through one or more portions of a portable electronic device to be transmitted from one or more portable electronic device emitters of said portable electronic device through one or more modulated acoustic ultrasonic signals; and an electronically governing module configured to operate in accordance with electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. In addition to the foregoing, other system aspects are described in the claims, drawings, and text forming a part of the disclosure set forth herein.

An article of manufacture including one or more non-transitory signal-bearing storage medium bearing one or more instructions for electronically conditioning one or more information signals accessed at least in part through one or more portions of a portable electronic device to be transmitted from one or more portable electronic device emitters of said portable electronic device through one or more modulated acoustic ultrasonic signals; and one or more instructions for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically conditioning one or more information signals accessed at least in part through one or more portions of a portable electronic device to be transmitted from one or more portable electronic device emitters of said portable electronic device through one or more modulated acoustic ultrasonic signals; and electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of portable electronic device directed audio that may provide context, for instance, in introducing one or more processes and/or devices described herein.

FIGS. 19-24 depict various schematic representations of down conversion of one or more acoustic ultrasonic signals into acoustic audio signals.

FIG. 26 is a block diagram depicting a control and information processing subsystem s100 of an exemplary implementation of the portable electronic device directed audio 10 of FIG. 1.

FIG. 27 is a block diagram depicting an information storage subsystem s200 of an exemplary implementation of the portable electronic device directed audio 10 of FIG. 1.

FIG. 29 is a block diagram depicting a sensing subsystem s400 of an exemplary implementation of the portable electronic device directed audio 10 of FIG. 1.

FIG. 30 is a block diagram depicting an electronic communication subsystem s500 of an exemplary implementation of the portable electronic device directed audio 10 of FIG. 1.

FIG. 31 is a block diagram depicting a power subsystem s600 of an exemplary implementation of the portable electronic device directed audio 10 of FIG. 1.

FIG. 33 is a block diagram depicting one or more exemplary electrical circuitry arrangements of the portable electronic device directed audio 10 of FIG. 1.

FIG. 35 is a block diagram depicting one or more exemplary electrical circuitry arrangements of the portable electronic device directed audio 10 of FIG. 1.

FIG. 36 is a block diagram depicting one or more exemplary electrical circuitry arrangements of the portable electronic device directed audio 10 of FIG. 1.

FIG. 37 is a block diagram depicting one or more exemplary electrical circuitry arrangements of the portable electronic device directed audio 10 of FIG. 1.

FIG. 38 is a block diagram depicting one or more exemplary electrical circuitry arrangements of the portable electronic device directed audio 10 of FIG. 1.

FIG. 40 is a block diagram depicting one or more exemplary instructions of the information storage subsystem s200 of the portable electronic device directed audio 10 of FIG. 1.

FIG. 44 is a block diagram depicting one or more exemplary instructions of the information storage subsystem s200 of the portable electronic device directed audio 10 of FIG. 1.

FIG. 45 is a block diagram depicting one or more exemplary instructions of the information storage subsystem s200 of the portable electronic device directed audio 10 of FIG. 1.

FIG. 49 is a block diagram depicting one or more exemplary modules of the portable electronic device directed audio 10 of FIG. 1.

FIG. 51 is a block diagram depicting one or more exemplary modules of the portable electronic device directed audio 10 of FIG. 1.

FIG. 52 is a block diagram depicting one or more exemplary modules of the portable electronic device directed audio 10 of FIG. 1.

FIG. 53 is a high-level flowchart illustrating an operational flow o10 representing exemplary operations related to electronically conditioning one or more information signals accessed at least in part through one or more portions of a portable electronic device to be transmitted from one or more portable electronic device emitters of said portable electronic device through one or more modulated acoustic ultrasonic signals, and electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location at least associated with the depicted exemplary implementations of the system.

FIG. 54 is a high-level flowchart including exemplary implementations of operation o11 of FIG. 53.

FIG. 57 is a high-level flowchart including exemplary implementations of operation o11 of FIG. 53.

FIG. 59 is a high-level flowchart including exemplary implementations of operation o11 of FIG. 53.

FIG. 60 is a high-level flowchart including exemplary implementations of operation o11 of FIG. 53.

FIG. 64 is a high-level flowchart including exemplary implementations of operation o11 of FIG. 53.

FIG. 69 is a high-level flowchart including exemplary implementations of operation o12 of FIG. 53.

FIG. 70 is a high-level flowchart including exemplary implementations of operation o12 of FIG. 53.

FIG. 72 is a high-level flowchart including exemplary implementations of operation o12 of FIG. 53.

FIG. 73 is a high-level flowchart including exemplary implementations of operation o12 of FIG. 53.

FIG. 74 is a high-level flowchart including exemplary implementations of operation o12 of FIG. 53.

FIG. 75 is a high-level flowchart including exemplary implementations of operation o12 of FIG. 53.

FIG. 76 is a high-level flowchart including exemplary implementations of operation o12 of FIG. 53.

FIG. 77 is a high-level flowchart including exemplary implementations of operation o12 of FIG. 53.

FIG. 78 is a high-level flowchart including exemplary implementations of operation o12 of FIG. 53.

FIG. 79 is a high-level flowchart including exemplary implementations of operation o12 of FIG. 53.

FIG. 80 is a high-level flowchart including exemplary implementations of operation o12 of FIG. 53.

FIG. 81 is a high-level flowchart including exemplary implementations of operation o12 of FIG. 53.

FIG. 83 is a high-level flowchart including exemplary implementations of operation o12 of FIG. 53.

FIG. 84 is a high-level flowchart including exemplary implementations of operation o12 of FIG. 53.

FIG. 87 is a high-level flowchart including exemplary implementations of operation o12 of FIG. 53.

FIG. 88 is a high-level flowchart including exemplary implementations of operation o12 of FIG. 53.

FIG. 89 is a high-level flowchart including exemplary implementations of operation o12 of FIG. 53.

FIG. 90 is a high-level flowchart including exemplary implementations of operation o12 of FIG. 53.

FIG. 91 is a high-level flowchart including exemplary implementations of operation o12 of FIG. 53.

FIG. 92 is a high-level flowchart including exemplary implementations of operation o12 of FIG. 53.

FIG. 93 is a high-level flowchart including exemplary implementations of operation o12 of FIG. 53.

DETAILED DESCRIPTION

Figure 1:
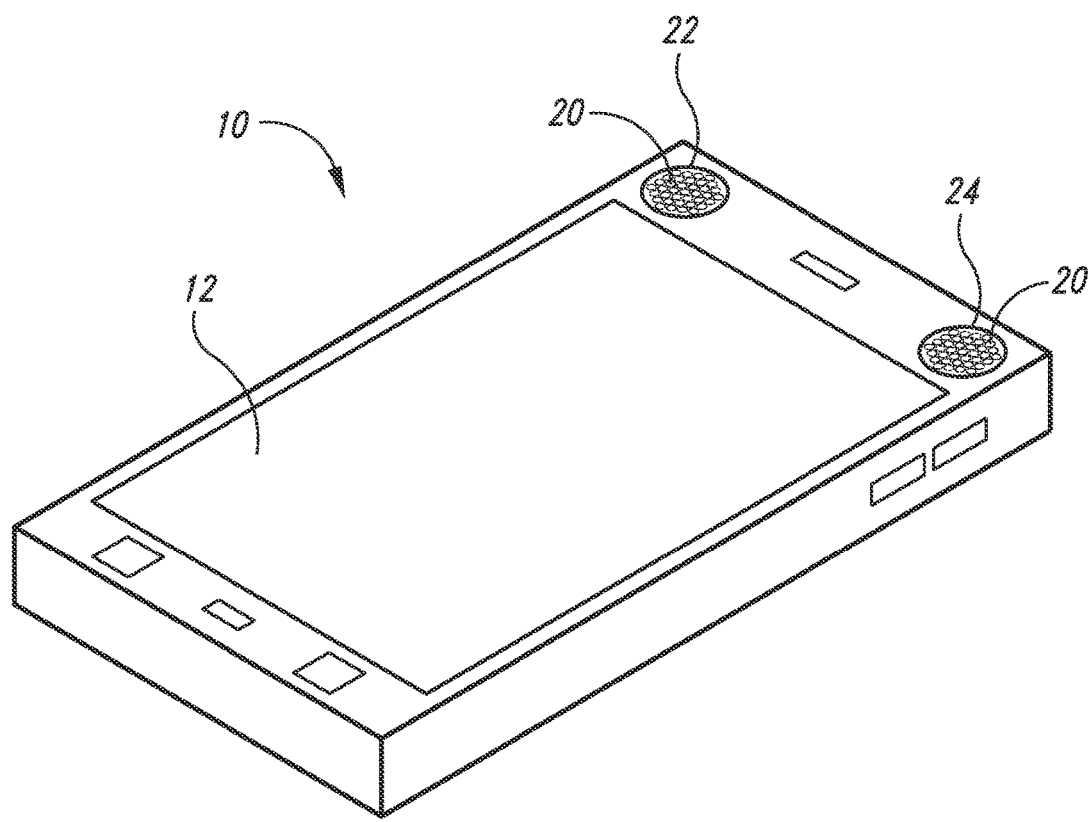
FIG. 1 is a perspective view depicting a smart phone implementation as related with a portable electronic device directed audio.
Figure 2:
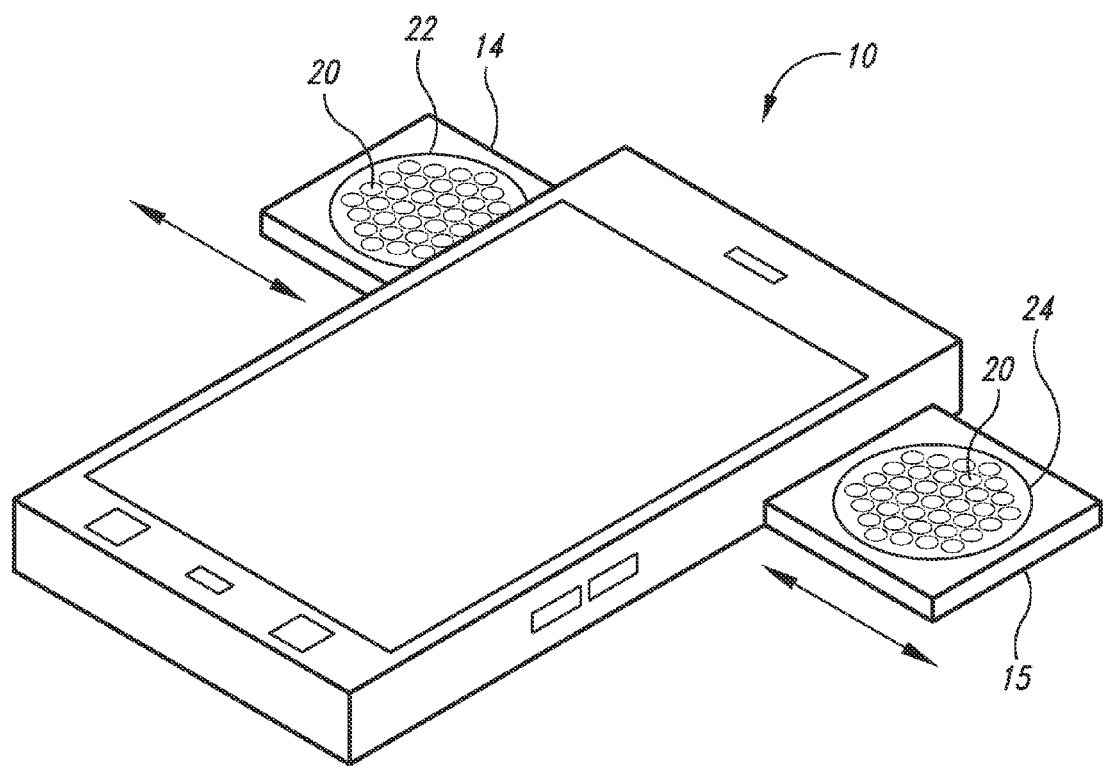
FIG. 2 is a perspective view depicting a smart phone implementation as related with a portable electronic device directed audio.
Figure 3:
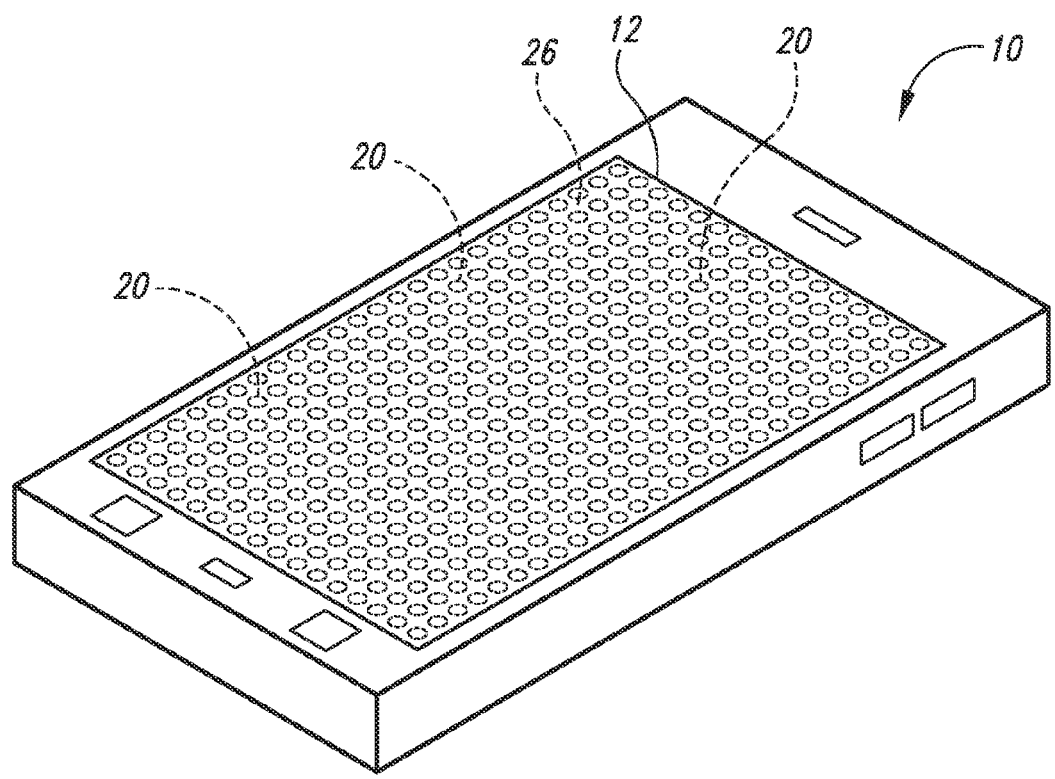
FIG. 3 is a perspective view depicting a smart phone implementation as related with a portable electronic device directed audio.
Figure 4:
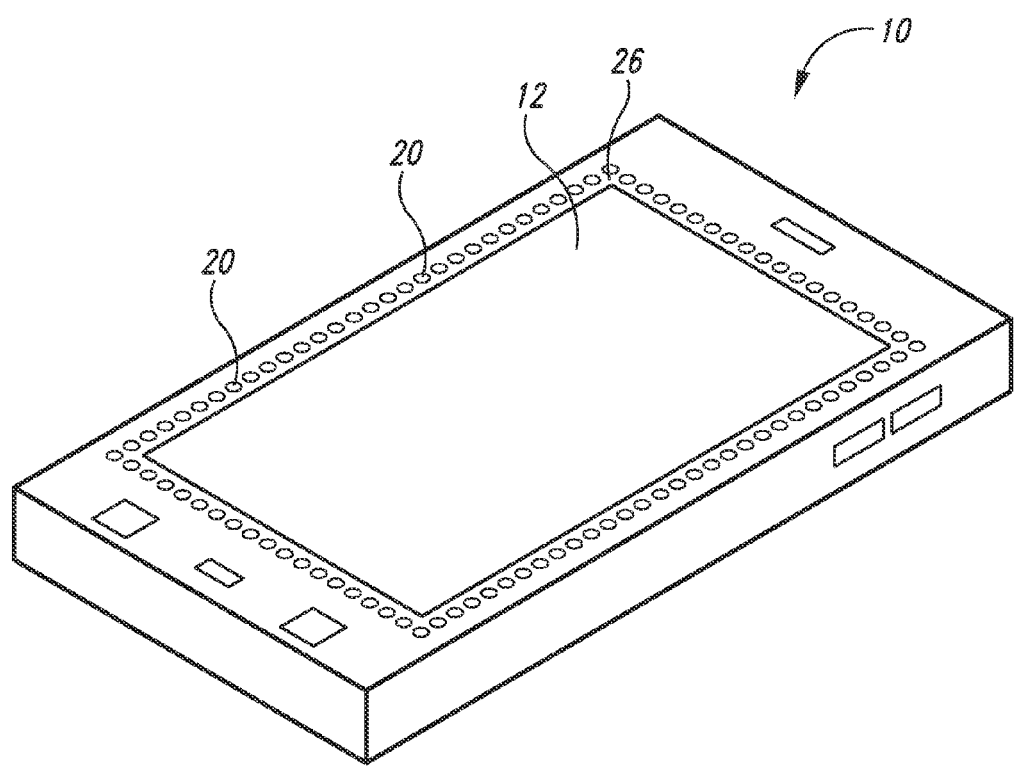
FIG. 4 is a perspective view depicting a smart phone implementation as related with a portable electronic device directed audio.
Figure 5:
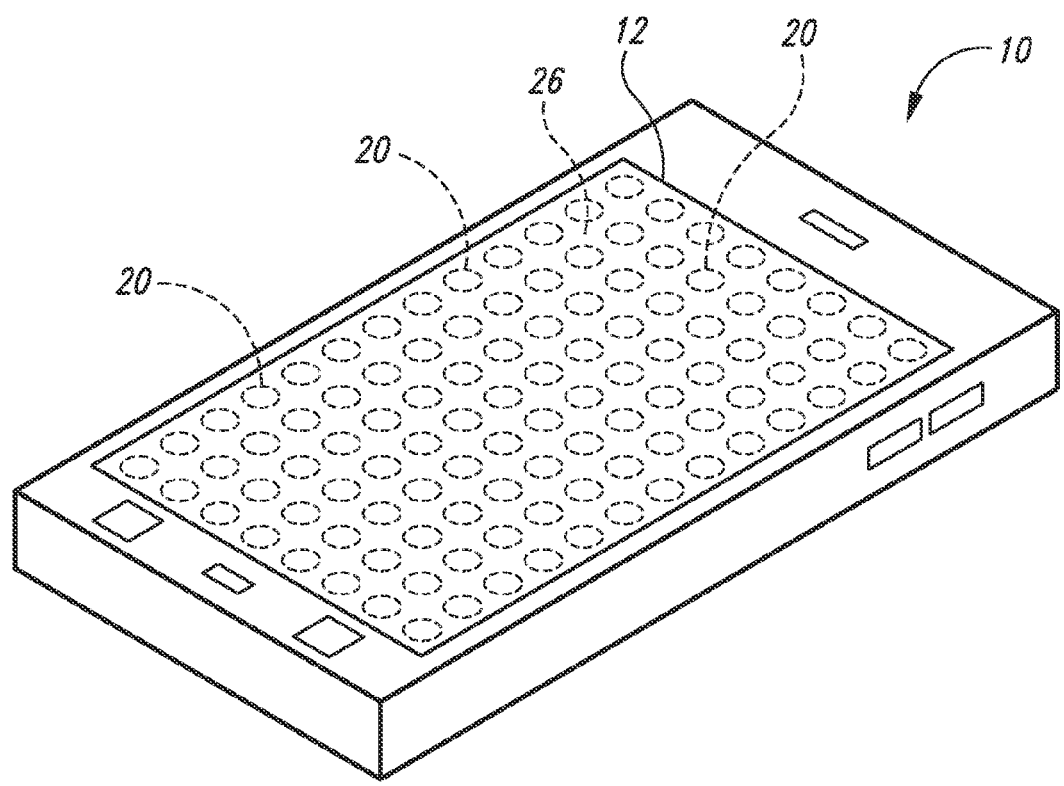
FIG. 5 is a perspective view depicting a smart phone implementation as related with a portable electronic device directed audio.
Figure 6:
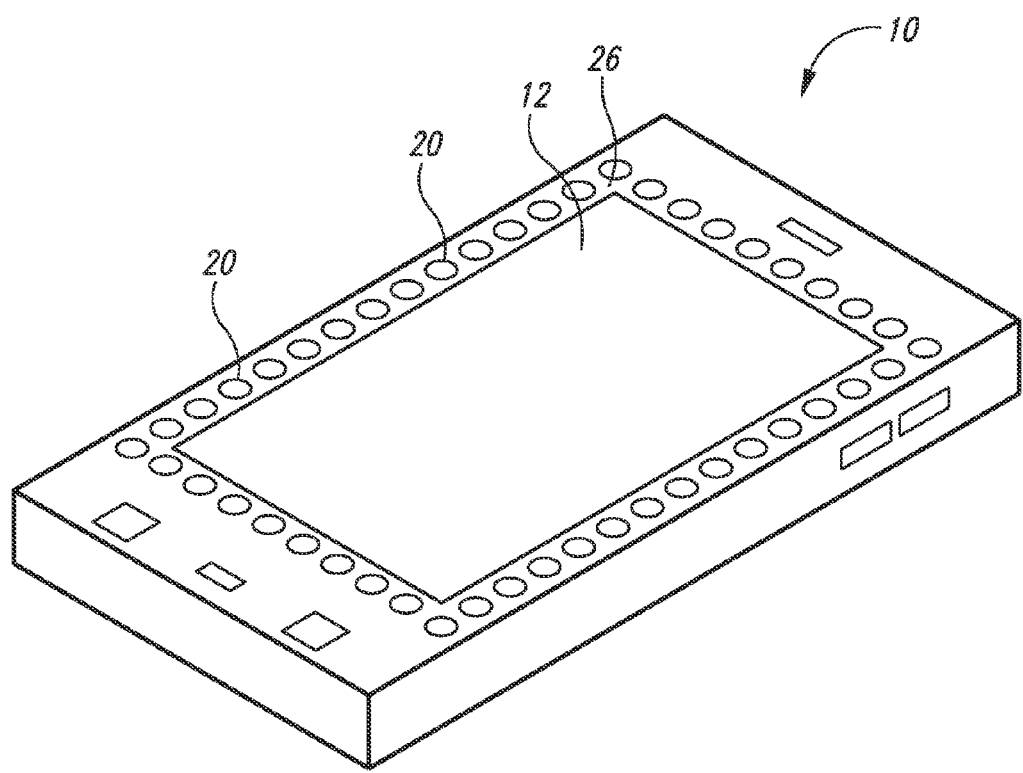
FIG. 6 is a perspective view depicting a smart phone implementation as related with a portable electronic device directed audio.
Figure 7:
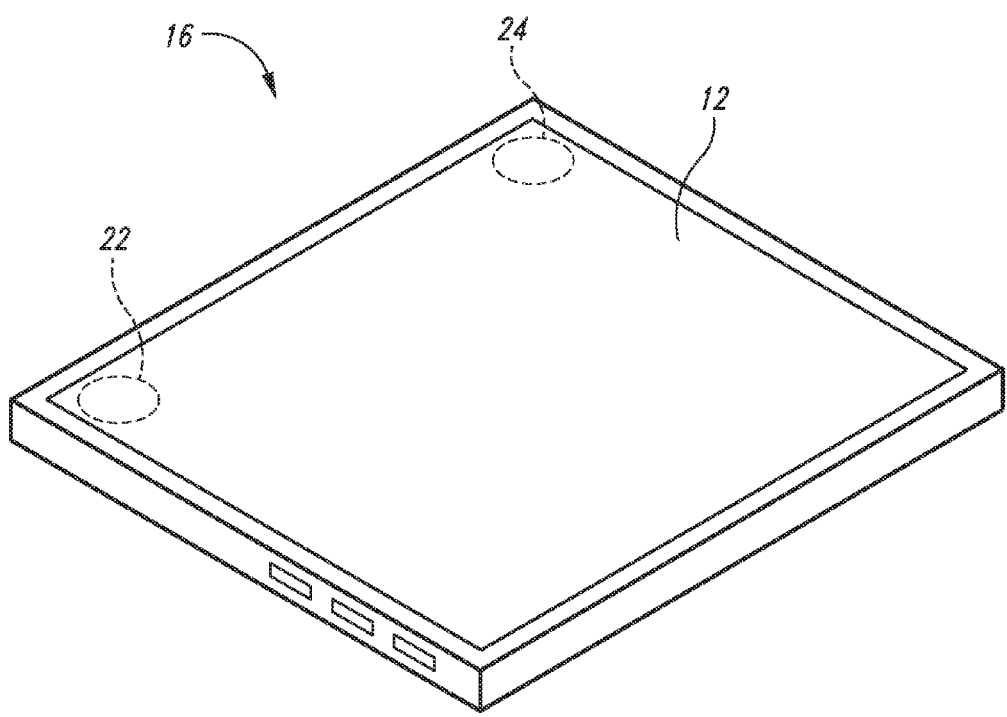
FIG. 7 is a perspective view depicting a tablet computer implementation as related with a portable electronic device directed audio.
Figure 8:
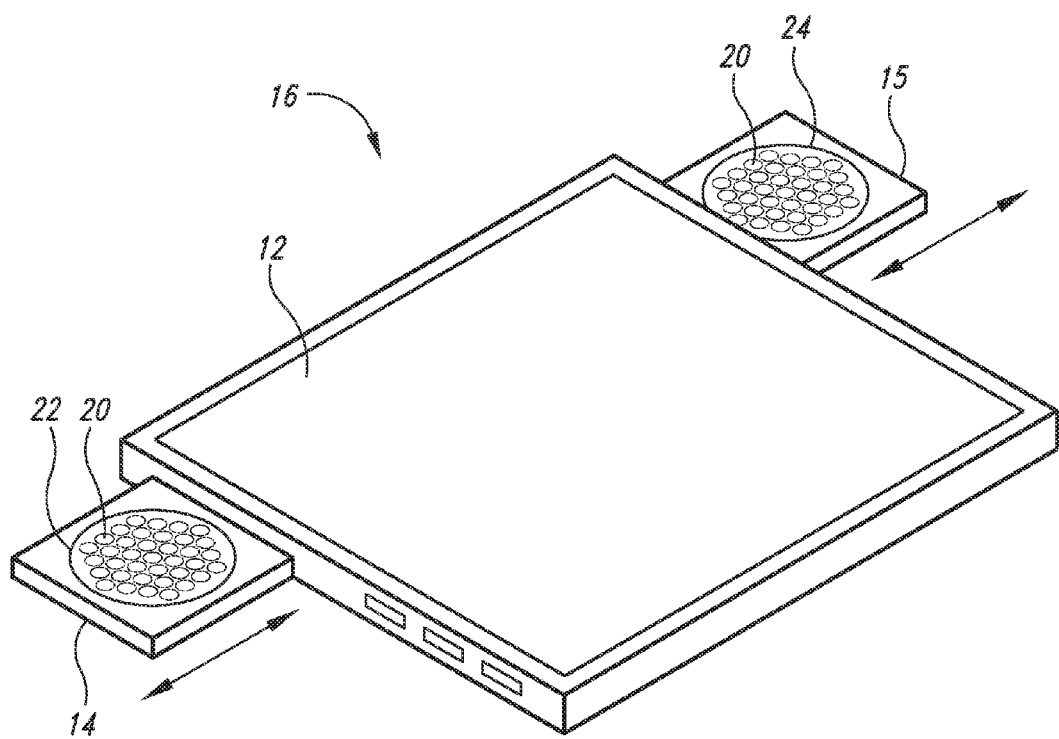
FIG. 8 is a perspective view depicting a tablet computer implementation as related with a portable electronic device directed audio.
Figure 9:
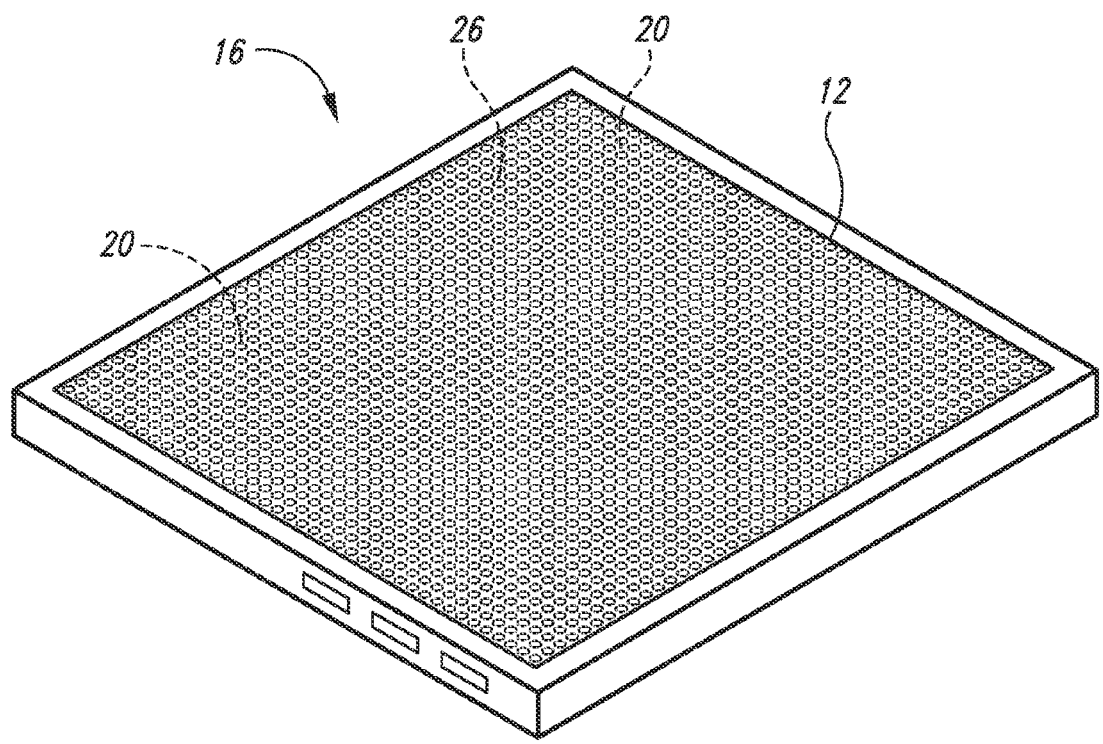
FIG. 9 is a perspective view depicting a tablet computer implementation as related with a portable electronic device directed audio.
Figure 10:
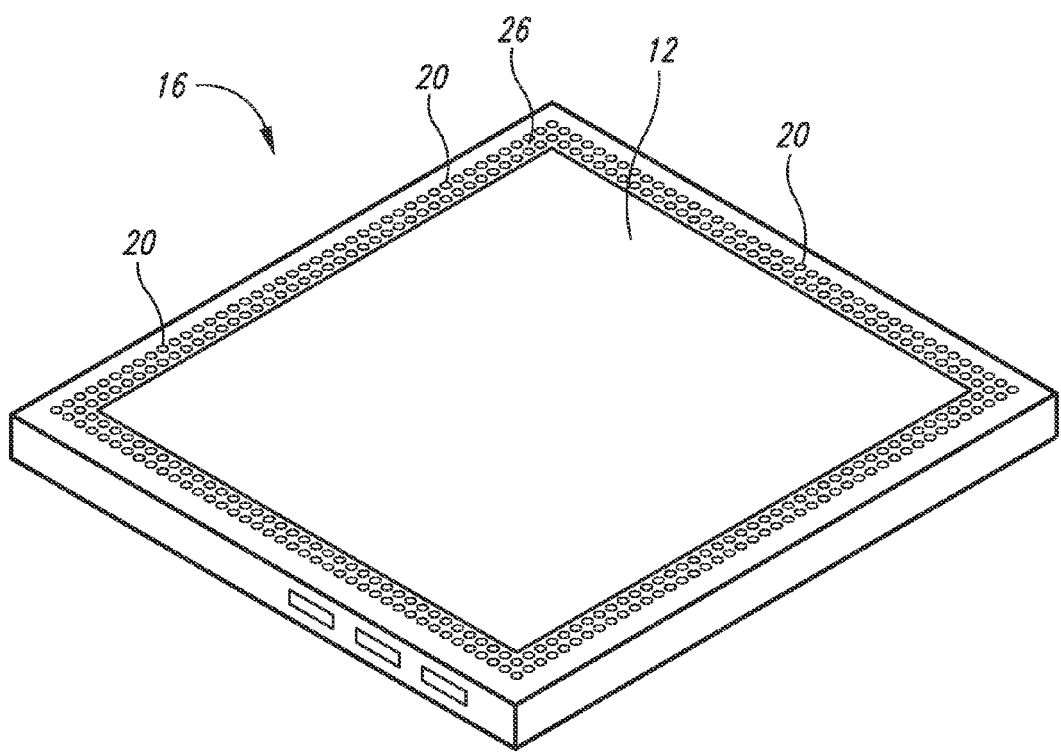
FIG. 10 is a perspective view depicting a tablet computer implementation as related with a portable electronic device directed audio.
Figure 11:
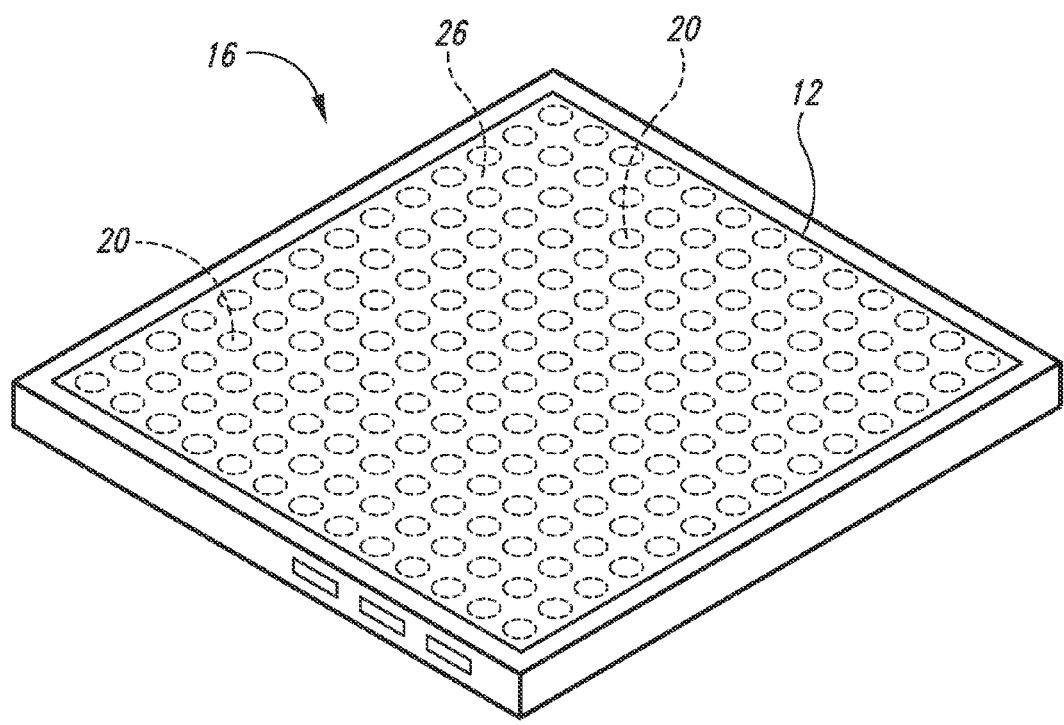
FIG. 11 is a perspective view depicting a tablet computer implementation as related with a portable electronic device directed audio.
Figure 12:
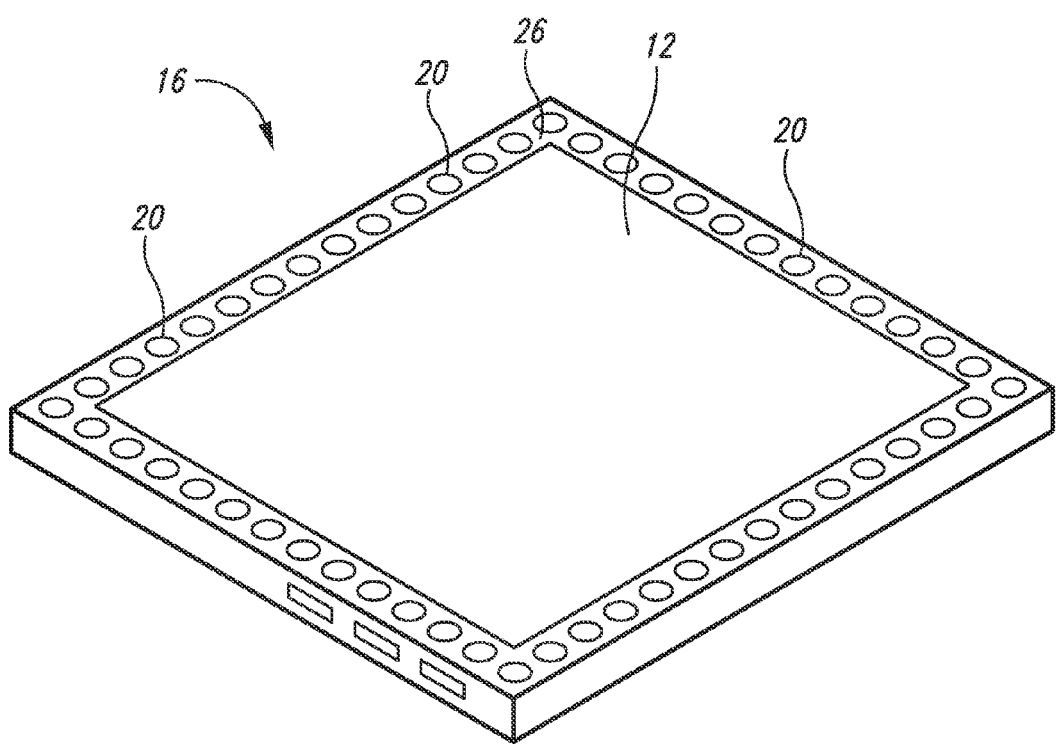
FIG. 12 is a perspective view depicting a tablet computer implementation as related with a portable electronic device directed audio.
Figure 13:
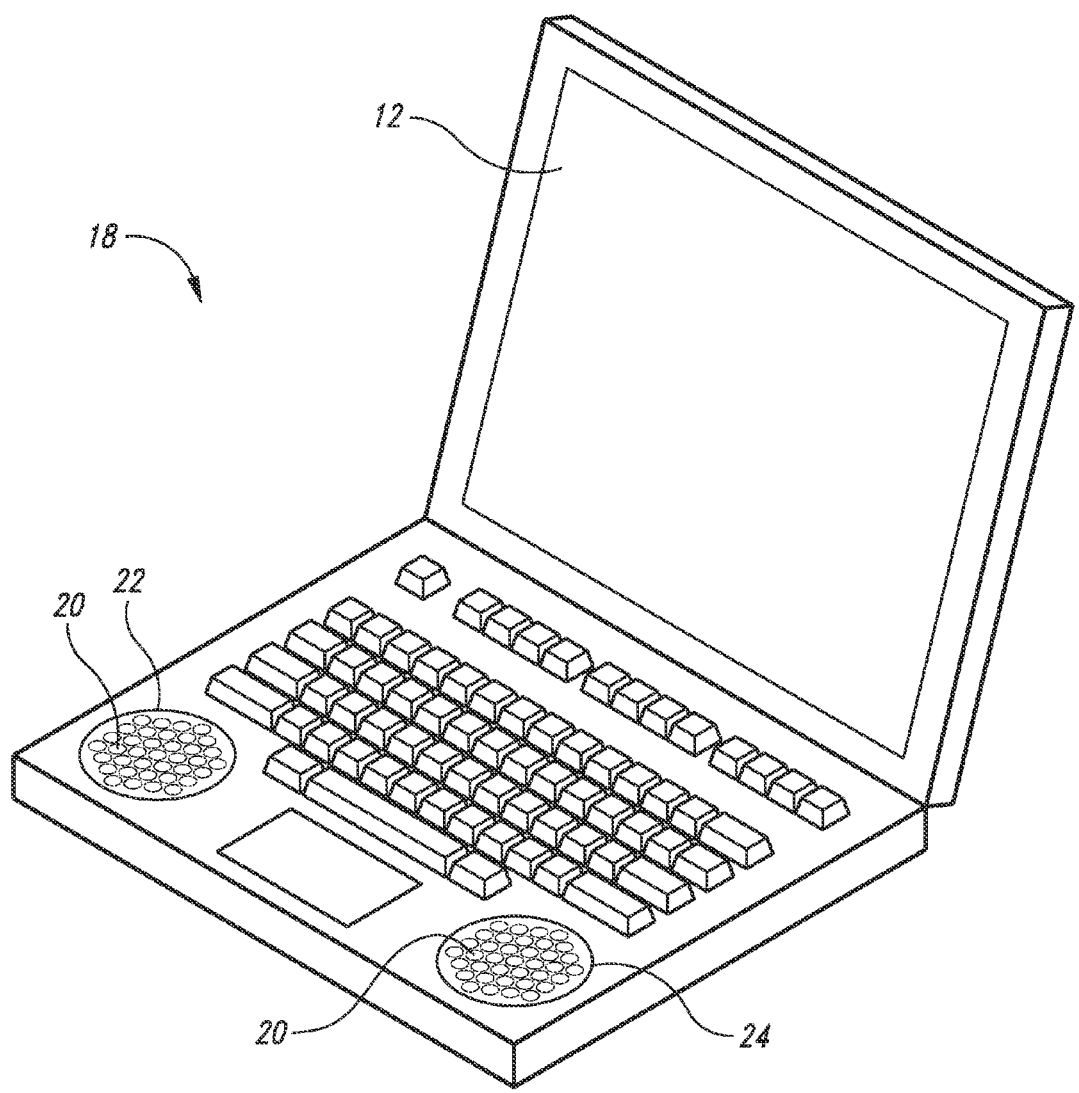
FIG. 13 is a perspective view depicting a laptop computer implementation as related with a portable electronic device directed audio.
Figure 14:
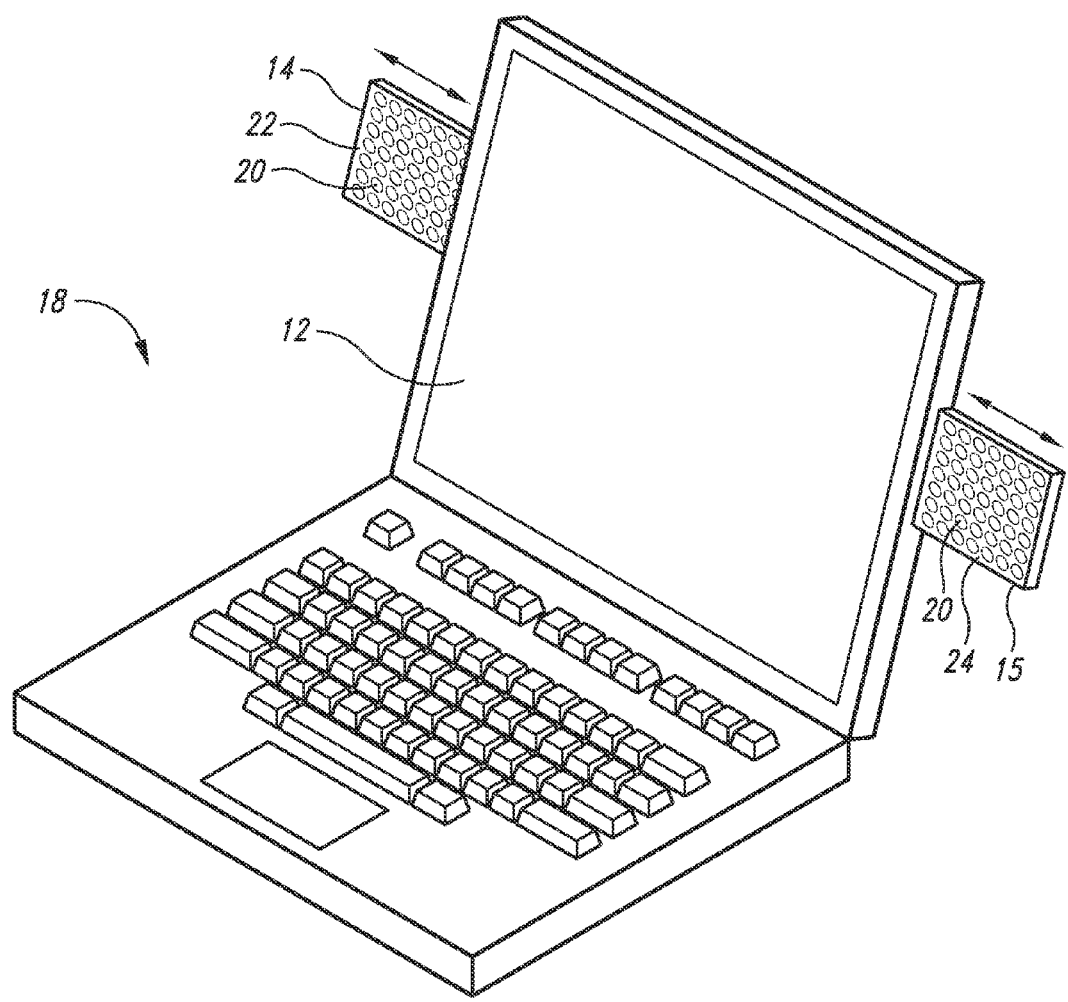
FIG. 14 is a perspective view depicting a laptop computer implementation as related with a portable electronic device directed audio.
Figure 15:
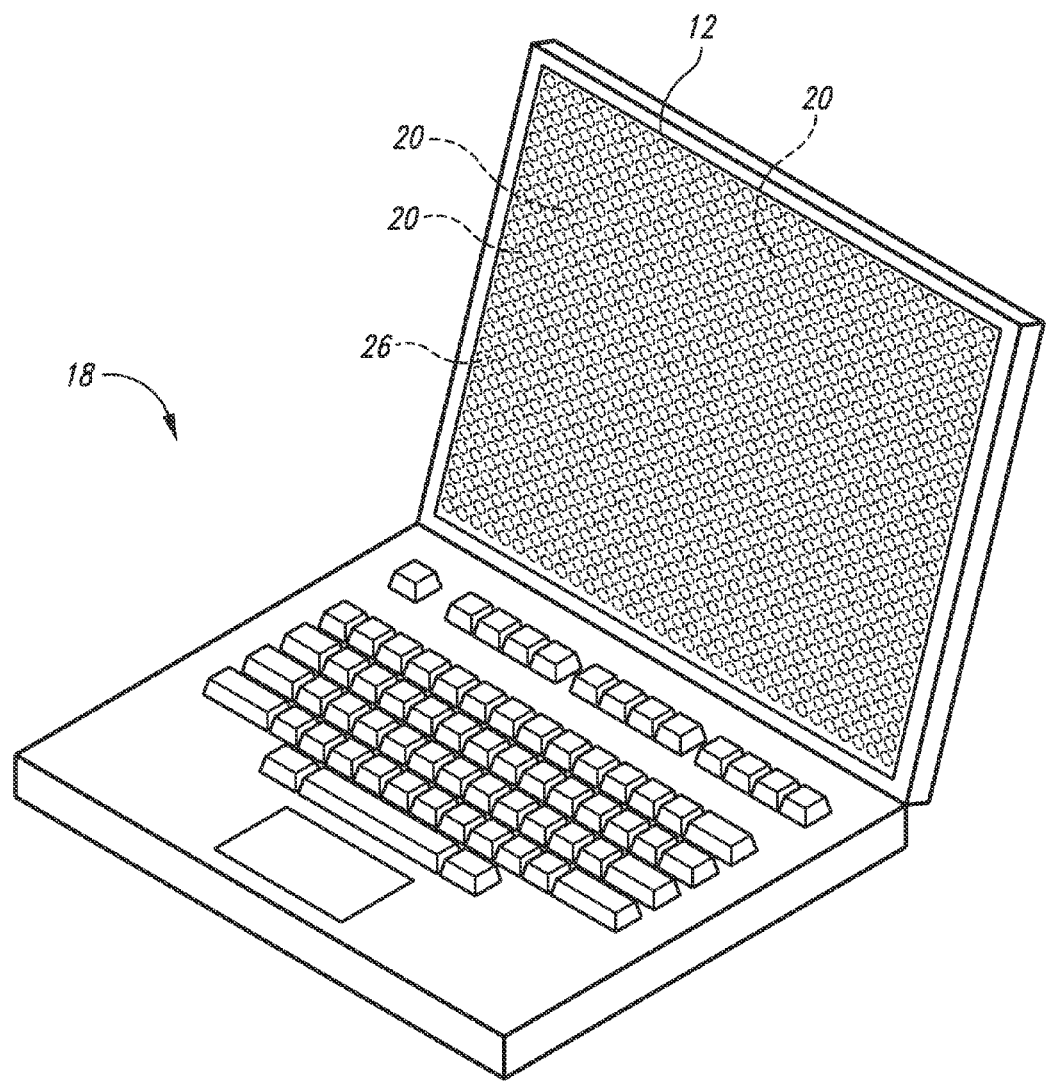
FIG. 15 is a perspective view depicting a laptop computer implementation as related with a portable electronic device directed audio.
Figure 16:
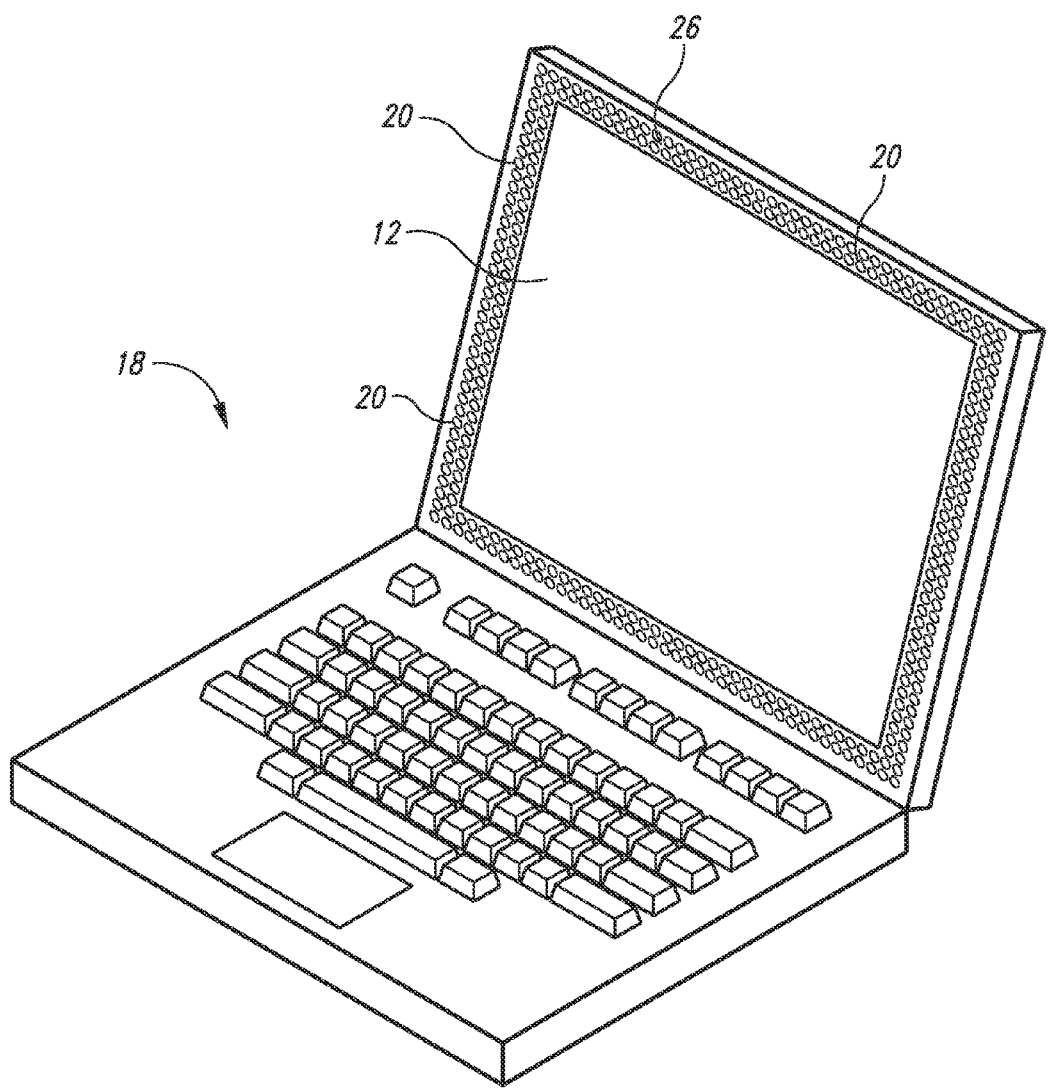
FIG. 16 is a perspective view depicting a laptop computer implementation as related with a portable electronic device directed audio.
Figure 17:
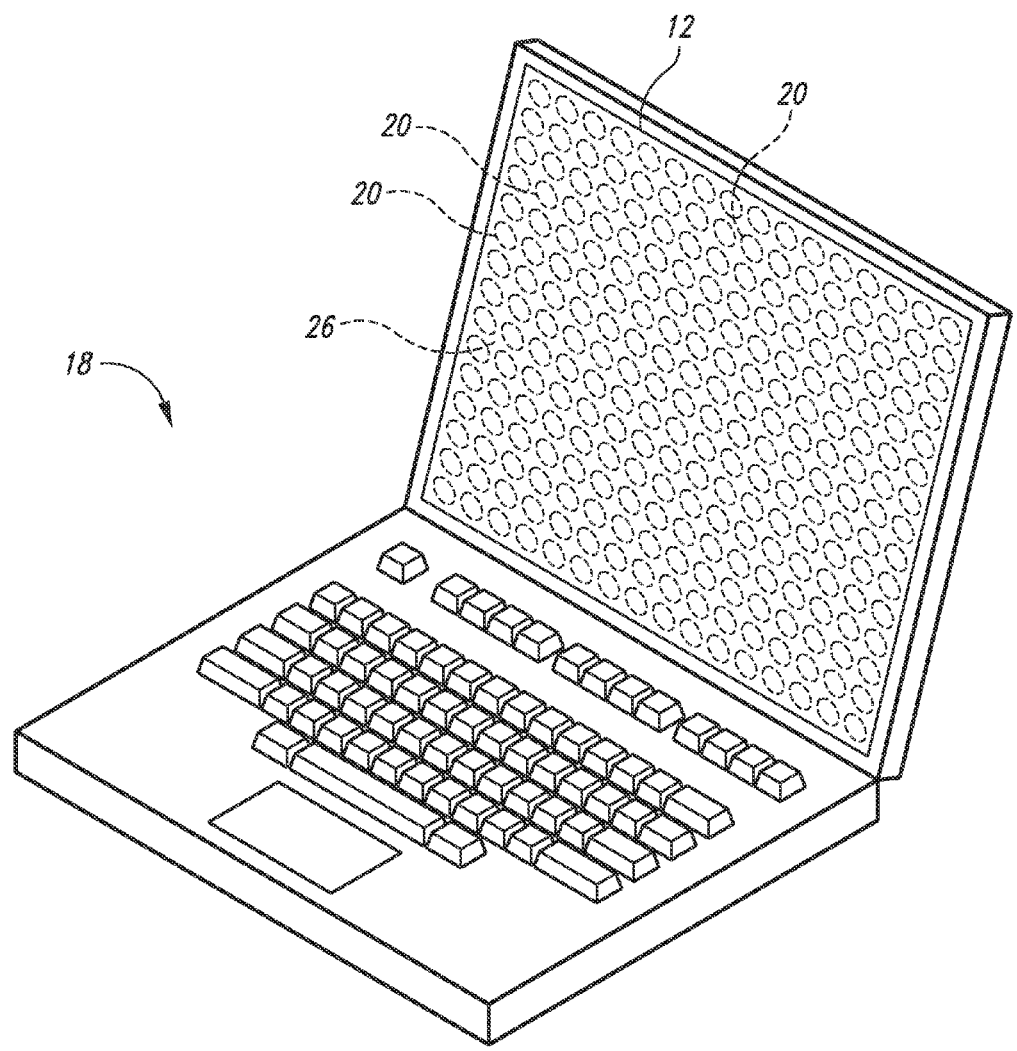
FIG. 17 is a perspective view depicting a laptop computer implementation as related with a portable electronic device directed audio.
Figure 18:
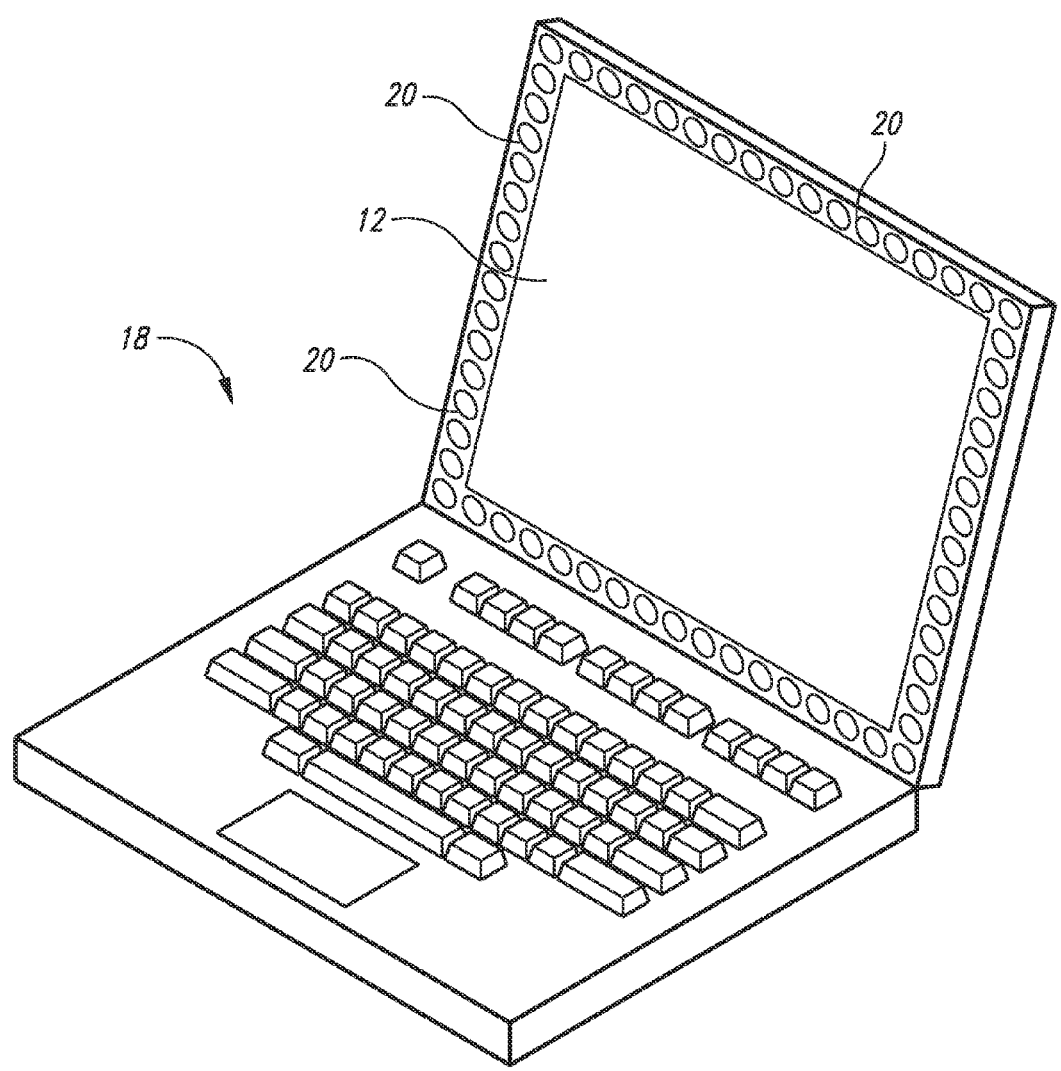
FIG. 18 is a perspective view depicting a laptop computer implementation as related with a portable electronic device directed audio.
Figure 19:
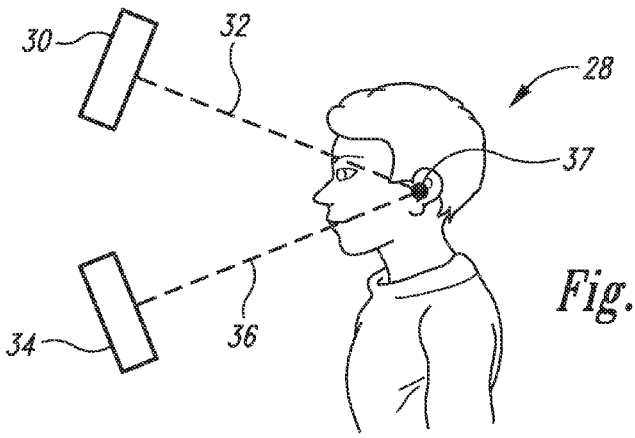
Figure 20:
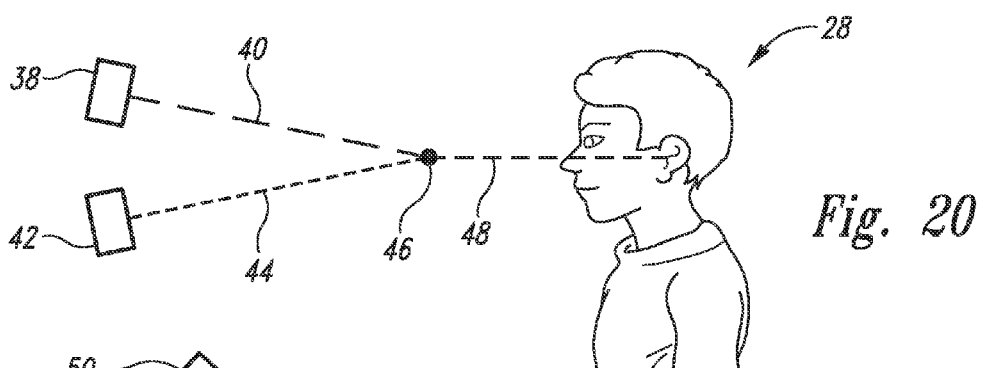
Figure 21:
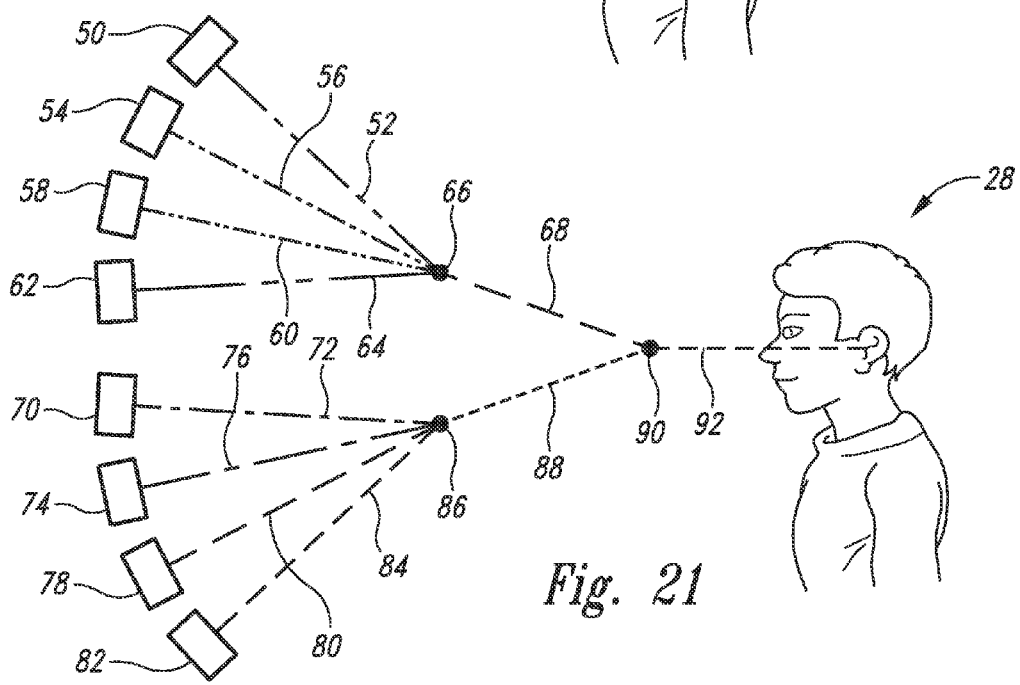
Figure 22:
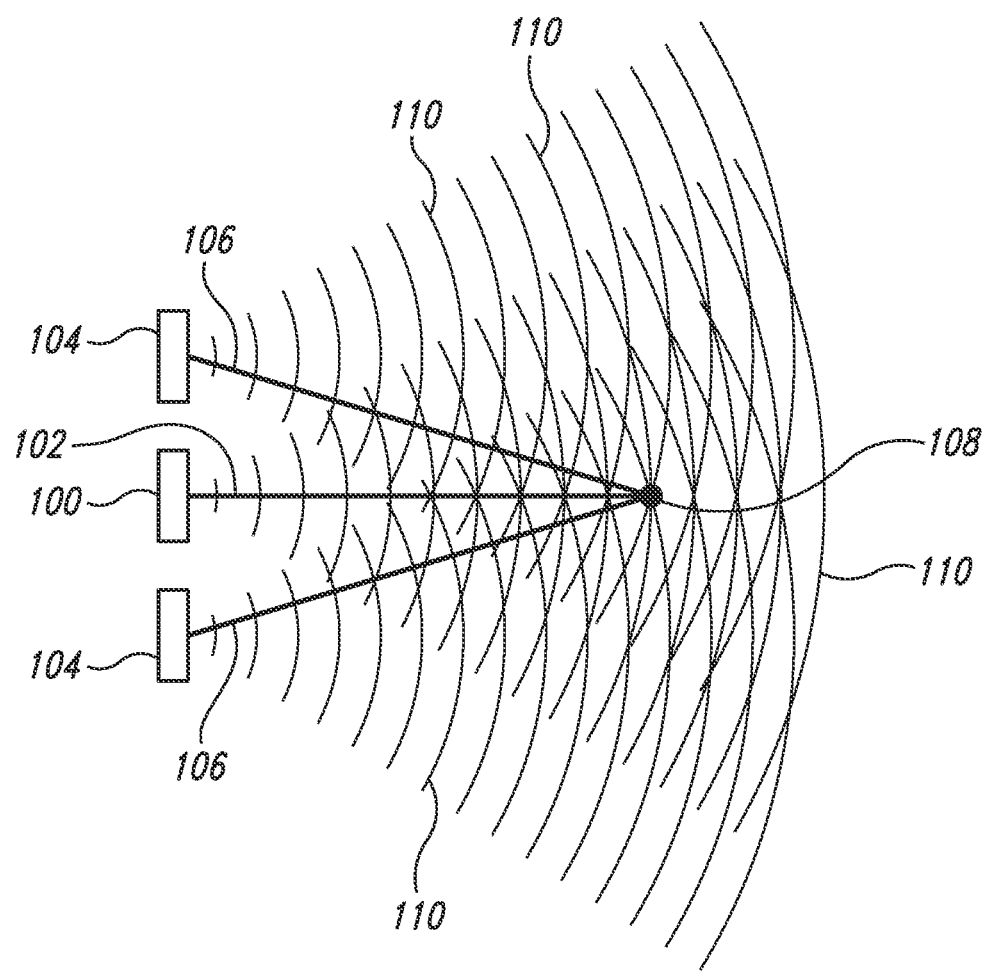

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

With reference now to the Figures, FIGS. 1-24 depict environment(s) and/or an implementation(s) of technologies described herein. FIGS. 1-5 are perspective views depicting mobile device implementations 10, such as smart phone implementations, as related with a portable electronic device directed audio including display screens 12, arrays or other collections 22, 24, 26 of emitters 20 such as ultrasonic transducers. Various configurations are depicted for ultrasonic transducers or other emitters, including slide trays 14 and 15, such as configured in arrays to transmit acoustic ultrasonic signals modulated with one or more acoustic audio signals. Other depictions include locating the emitters 20 either integral with or around the periphery of the display screen 12. The acoustic audio signals can interact non-linearly with atmosphere, solid objects such as human tissue, or with each other to cause down conversion of part of the ultrasonic signals into acoustic audio signals directed at one or more desired locations such as near one or more target human ears.

FIGS. 7-12 are perspective views depicting tablet computer implementations as related with a portable electronic device directed audio including various configurations for ultrasonic transducers or other emitters such as configured in arrays to transmit acoustic ultrasonic signals modulated with one or more acoustic audio signals. The acoustic audio signals can interact non-linearly with atmosphere, solid objects such as human tissue, or with each other to cause down conversion of part of the ultrasonic signals into acoustic audio signals directed at one or more desired locations such as near one or more target human ears.

FIGS. 13-18 are perspective views depicting laptop computer implementations as related with a portable electronic device directed audio including various configurations for ultrasonic transducers or other emitters such as configured in arrays to transmit acoustic ultrasonic signals modulated with one or more acoustic audio signals. The acoustic audio signals can interact non-linearly with atmosphere, solid objects such as human tissue, or with each other to cause down conversion of part of the ultrasonic signals into acoustic audio signals directed at one or more desired locations such as near one or more target human ears.

Various approaches can be used in sizing emitter collections such as transducer arrays. For instance, approaches can consider an effective transducer size related to wavelengths of associated ultrasonic signals being emitted. Given an aperture area of emitters considered as antenna a dimension related to squaring of a wavelength involved would be related to a percentage of power contained by a beam being emitted. For instance, a given percentage of aperture area would have an equivalent percentage of original power being transmitted through an ultrasonic beam. For example, if a tablet was approximately forty square inches in aperture area with a perimeter of 25 linear inches a 60 GHz signal would have about a 0.2 inch wavelength with 25×0.2 square inches of effective aperture area. With transducers located along such a perimeter there could be about roughly a 10% transmission factor involved with an ultrasonic beam being emitted. In attempts to confine a beam, wavelength divided by aperture dimension could serve as a guide. For instance, 0.2 inches divided by 5 square inches could result in an approximate radius at a two foot range of approximately one or a few tenths of an inch. Such directionality of sound transmission could serve to isolate listener to only desired target listeners to down conversions into acoustic audio signals occurring at or near such listeners. For instance, FIGS. 19-24 depicted in schematic conceptual representations of various ultrasonic signals interacting with atmosphere, each other, or objects such as a target listener to produce a down-conversion of acoustic audio signals to be heard by one or more target listeners.

Figure 25:
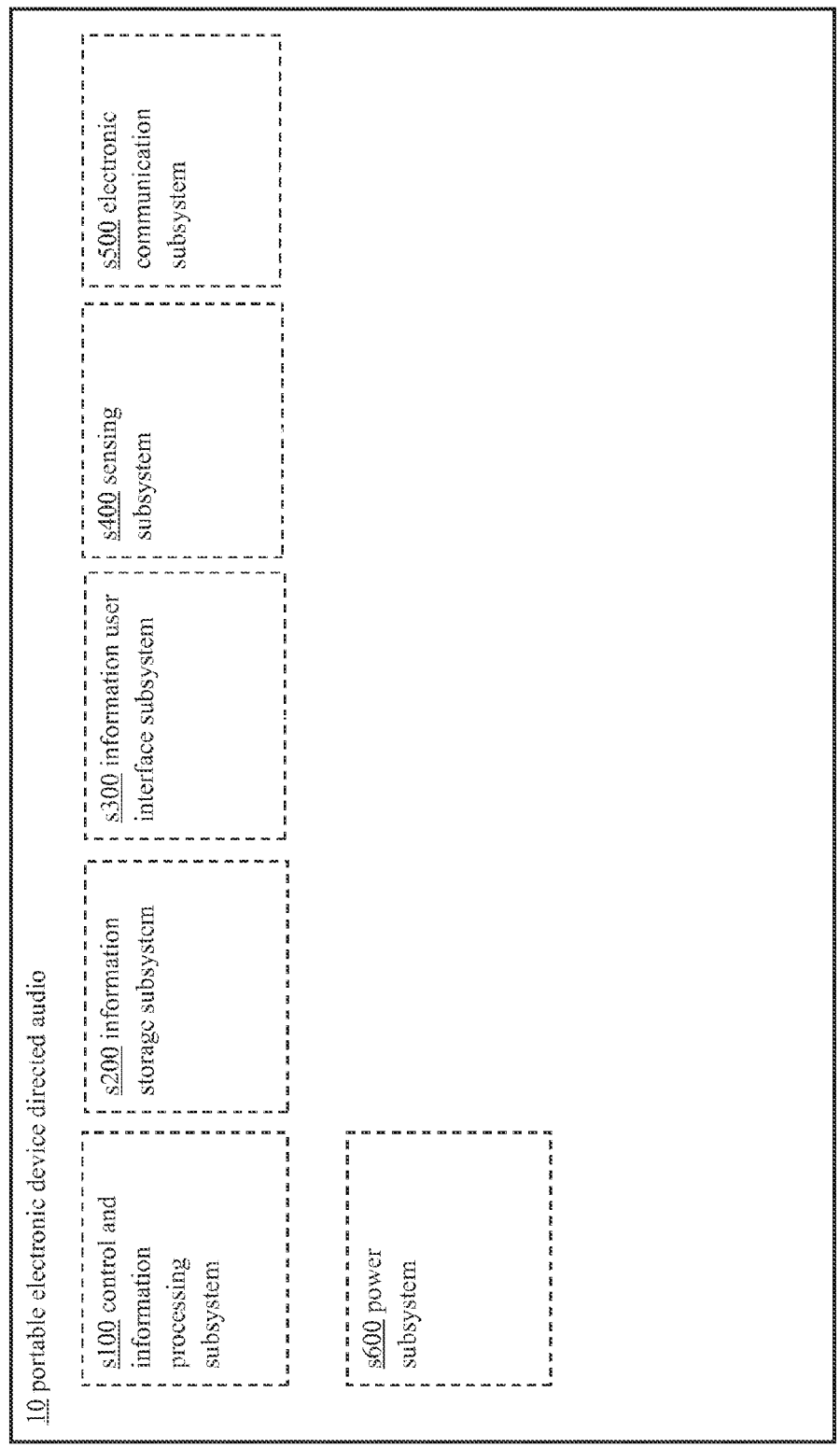
FIG. 25 is a block diagram depicting an exemplary implementation of the portable electronic device directed audio 10 of FIG. 1 including exemplary subsystems.

An exemplary version of the portable electronic device directed audio 10 is shown in FIG. 25 to optionally include various subsystems such as control and information processing subsystem s100, information storage subsystem s200, information user interface subsystem s300, sensing subsystem s400, electronic communication subsystem s500, and power subsystem s600.

An exemplary implementation of the control and information processing subsystem s100 is shown in FIG. 26 to optionally include various components such as microprocessor component s102, central processing unit (CPU) component s104, digital signal processor (DSP) component s106, application specific integrated circuit (ASIC) component s108, field programmable gate array (FPGA) component s110, multiprocessor component s112, optical processing component s114, logic component s116, remote processor component s118, multi-core array component s120, server processor component s122, database engine component s124, search engine component s126, image recognition component s128, audio recognition component s130, spectrum analysis component s132, lexigraphy engine component s134, operating system component s136, voice recognition component s138, and network processor component s140.

An exemplary implementation of the information storage subsystem s200 is shown in FIG. 27 to optionally include various components such as random access memory (RAM) component s202, dynamic random access memory (DRAM) component s204, other volatile memory component s206, persistent memory component s208, read only memory (ROM) component s210, electrically erasable programmable read only memory (EEPROM) component s212, compact disk (CD) component s214, digital versatile disk (DVD) component s216, flash memory component s218, other nonvolatile memory component s220, hard drive component s222, disk farm component s224, disk cluster component s226, remote backup component s228, server component s230, digital tape component s232, optical storage component s234, Blu Ray disk component s236, computer readable signal bearing medium s238, and removable media component s240.

Figure 28:
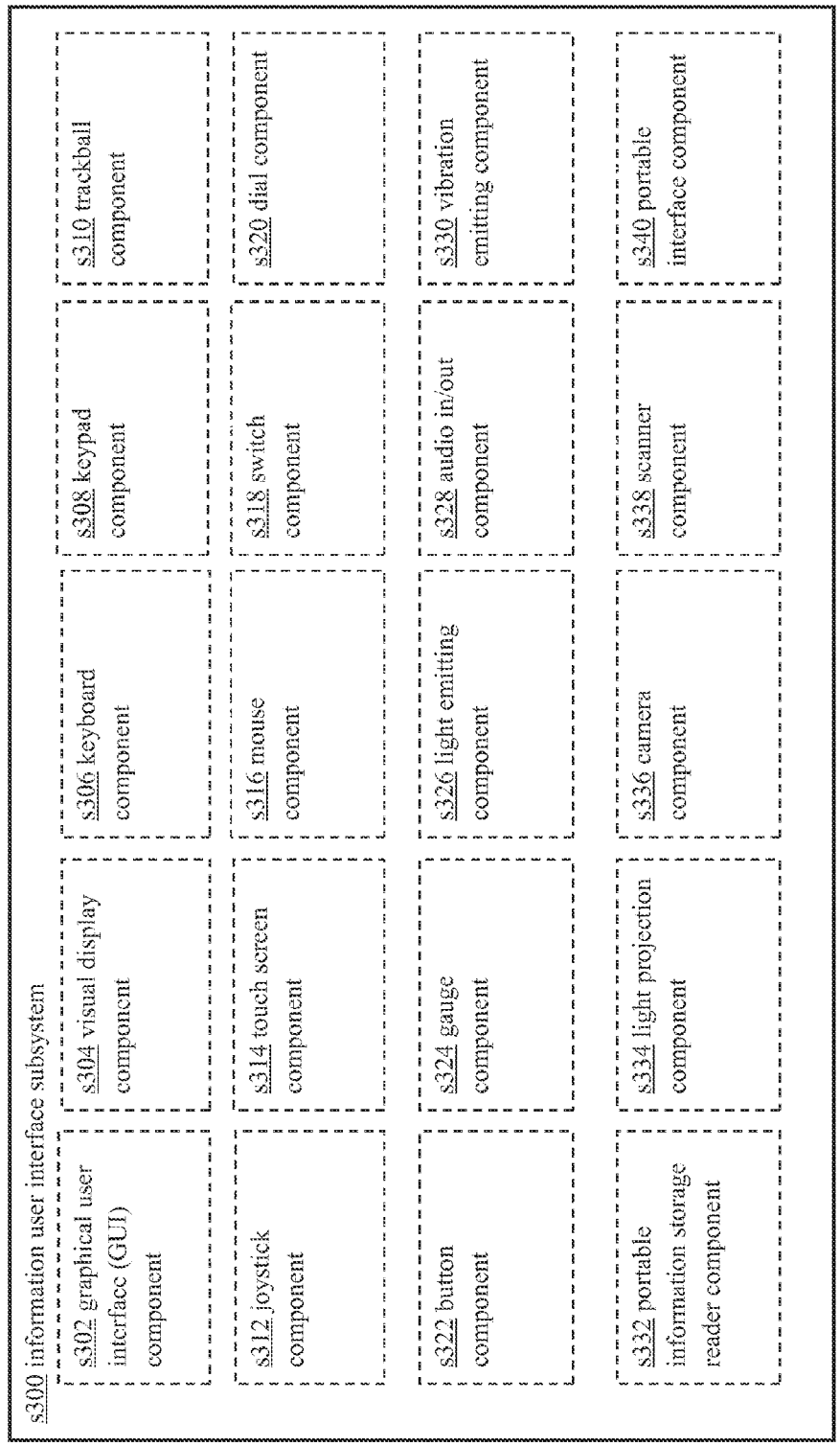
FIG. 28 is a block diagram depicting an information user interface subsystem s300 of an exemplary implementation of the portable electronic device directed audio 10 of FIG. 1.

An exemplary implementation of the information user interface subsystem s300 is shown in FIG. 28 to optionally include various components such as graphical user interface (GUI) component s302, visual display component s304, keyboard component s306, keypad component s308, trackball component s310, joystick component s312, touch screen component s314, mouse component s316, switch component s318, dial component s320, button component s322, gauge component s324, light emitting component s326, audio in/out component s328, vibration emitting component s330, portable information storage reader component s332, light projection component s334, camera component s336, scanner component s338, and portable interface component s340.

An exemplary implementation of the sensing subsystem s400 is shown in FIG. 29 to optionally include various components such as electromagnetic sensing component s402, antenna component s404, photo detecting component s406, micro-electro-mech sys (MEMS) detecting component s408, weight sensing component s410, temperature sensing component s412, radio freq ID (RFID) sensing component s414, chemical sensing component s416, optical sensing component s418, sound sensing component s420, gas sensing component s422, liquid sensing component s424, solid sensing component s426, climate sensing component s428, vibration sensing component s430, motion sensing component s432, pressure sensing component s434, pattern sensing component s436, color sensing component s438, and encryption sensing component s440.

An exemplary implementation of the electronic communication subsystem s500 is shown in FIG. 30 to optionally include various components such as network cable component s502, optical network component s504, waveguide network component s506, internet network component s508, wireless network component s510, wired network component s512, cellular network component s514, wide area network component s516, local area network component s518, encrypted communication component s520, transceiver component s522, infrared network component s524, transmitter component s526, receiver component s528, receiver component s528, long-range communication component s530, short-range communication component s532, RFID communication component s534, encrypted communication component s536, SMS communication component s538, and tablet communication component s540.

An exemplary implementation of the power subsystem s600 is shown in FIG. 31 to optionally include various components such as electrical component s602, hydrocarbon fuel component s604, hydrogen fuel component s606, solid fuel component s608, liquid fuel component s610, gaseous fuel component s612, battery component s614, battery component s622, battery component s624, battery component s626, battery component s628, power cell component s630, steam generation component s632, solar cell component s634, solar reflector component s636, thermonuclear component s638, and co-generation component s640.

Figure 32:
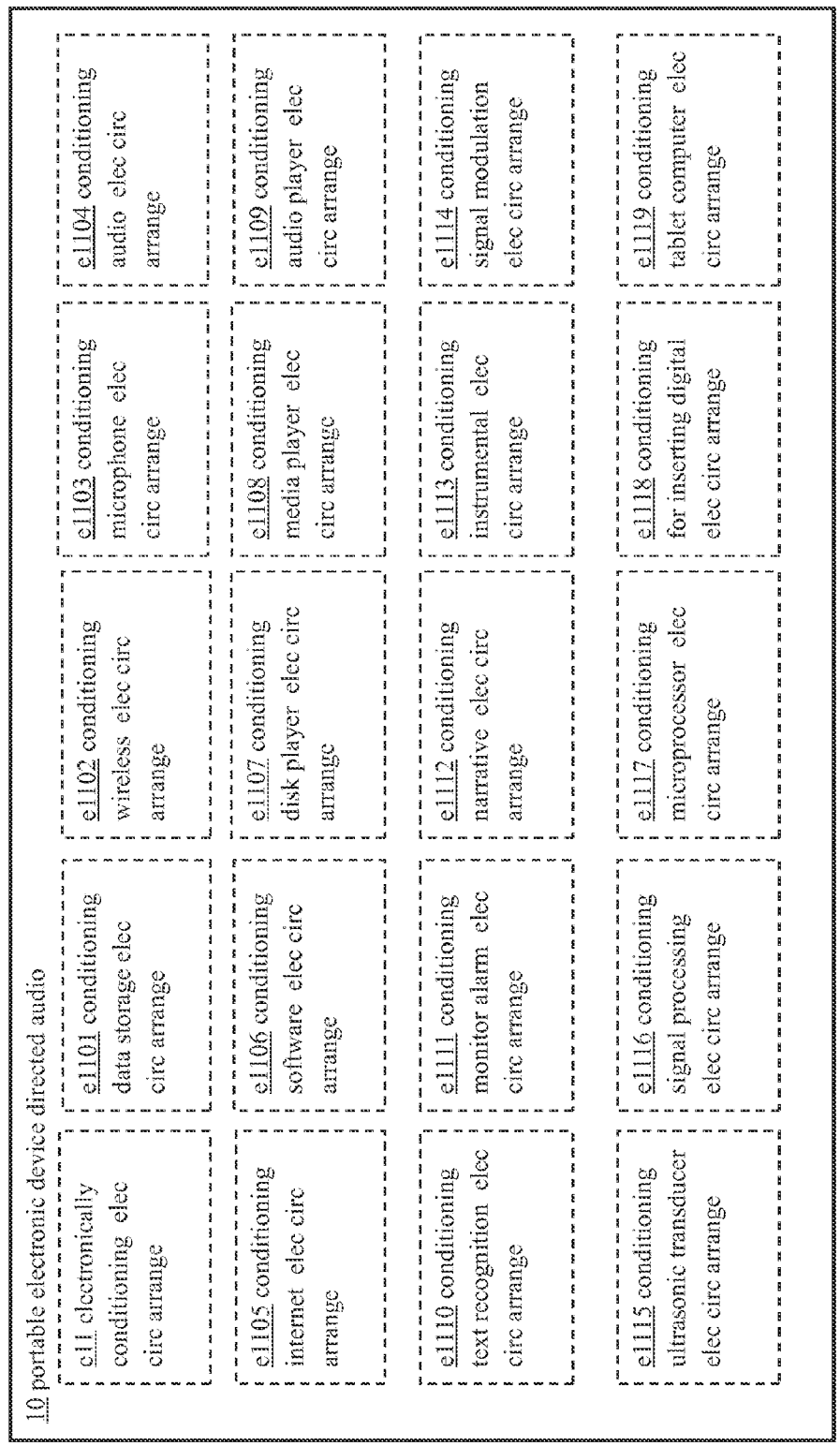
FIG. 32 is a block diagram depicting one or more exemplary electrical circuitry arrangements of the portable electronic device directed audio 10 of FIG. 1.

Implementations involve different combinations (otherwise known as "electrical circuitry arrangements") of components from the subsystems of the portable electronic device directed audio 10. Exemplary depictions of some of these electrical circuitry arrangements are shown in FIG. 32 to include electronically conditioning electrical circuitry arrangement e11, conditioning data storage electrical circuitry arrangement e1101, conditioning wireless electrical circuitry arrangement e1102, conditioning microphone electrical circuitry arrangement e1103, conditioning audio electrical circuitry arrangement e1104, conditioning internet electrical circuitry arrangement e1105, conditioning software electrical circuitry arrangement e1106, conditioning disk player electrical circuitry arrangement e1107, conditioning media player electrical circuitry arrangement e1108, conditioning audio player electrical circuitry arrangement e1109, conditioning text recognition electrical circuitry arrangement e1110, conditioning monitor alarm electrical circuitry arrangement e1111, conditioning narrative electrical circuitry arrangement e1112, conditioning instrumental electrical circuitry arrangement e1113, conditioning signal modulation electrical circuitry arrangement e1114, conditioning ultrasonic transducer electrical circuitry arrangement e1115, conditioning signal processing electrical circuitry arrangement e1116, conditioning microprocessor electrical circuitry arrangement e1117, conditioning for inserting digital electrical circuitry arrangement e1118, and conditioning tablet computer electrical circuitry arrangement e1119.

Some of these electrical circuitry arrangements are depicted in FIG. 33 to include conditioning handheld mobile electrical circuitry arrangement e1120, conditioning cell phone electrical circuitry arrangement e1121, conditioning portable laptop electrical circuitry arrangement e1122, conditioning PDA electrical circuitry arrangement e1123, conditioning smart phone electrical circuitry arrangement e1124, conditioning security personnel electrical circuitry arrangement e1125, conditioning athletic sports electrical circuitry arrangement e1126, conditioning wearable media electrical circuitry arrangement e1127, conditioning wristwatch electrical circuitry arrangement e1128, conditioning two-way radio electrical circuitry arrangement e1129, conditioning beams electrical circuitry arrangement e1130, conditioning steered beams electrical circuitry arrangement e113, conditioning phased array electrical circuitry arrangement e1132, conditioning audio electrical circuitry arrangement e1133, conditioning absolute position electrical circuitry arrangement e1134, conditioning relative position electrical circuitry arrangement e1135, conditioning quality characterization target locations electrical circuitry arrangement e1136, conditioning ultrasonic transducers electrical circuitry arrangement e1137, conditioning reference electrical circuitry arrangement e1138, and conditioning more acoustic ultrasonic electrical circuitry arrangement e1139.

Figure 34:
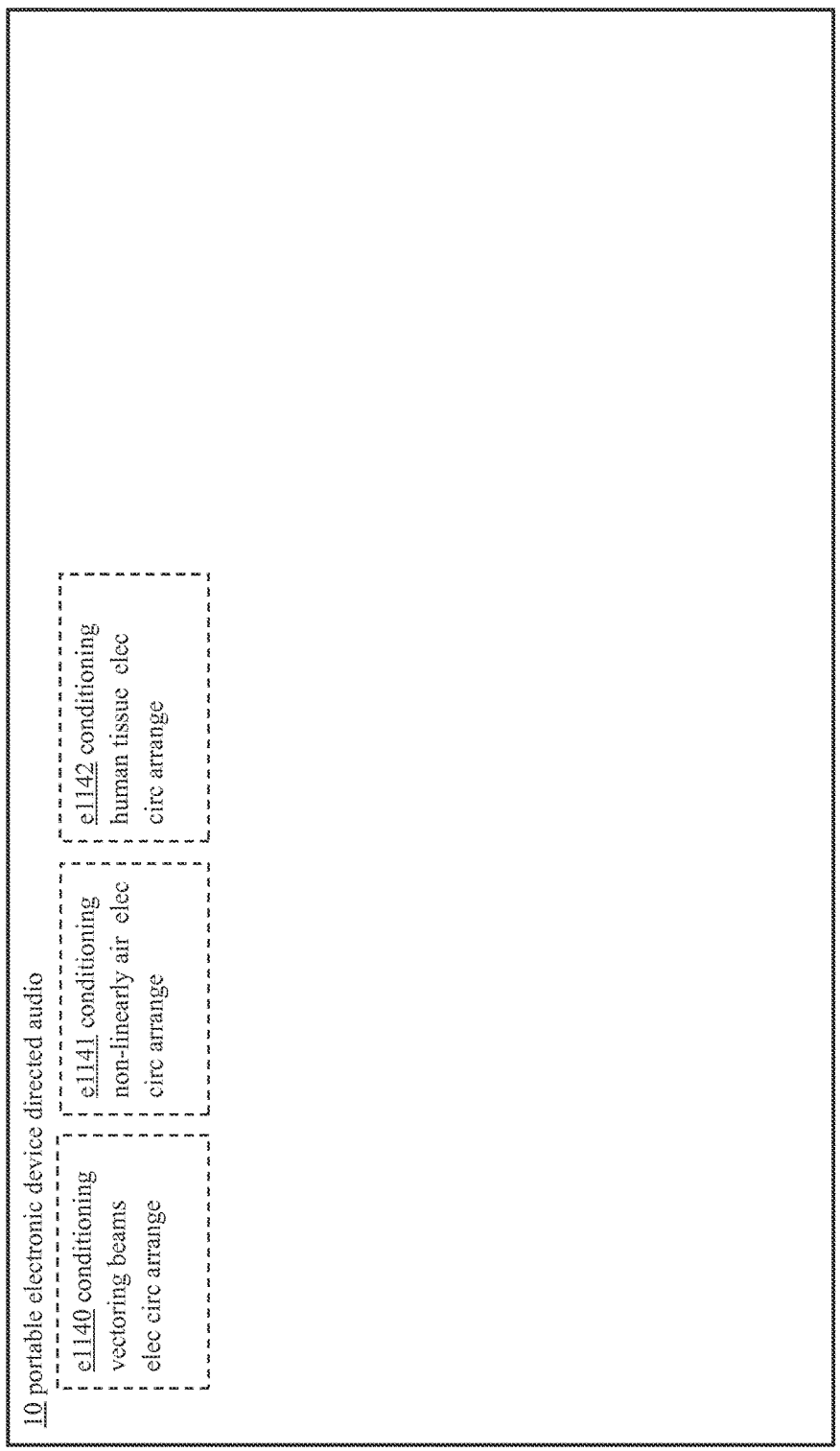
FIG. 34 is a block diagram depicting one or more exemplary electrical circuitry arrangements of the portable electronic device directed audio 10 of FIG. 1.

Some of these electrical circuitry arrangements are depicted in FIG. 34 to include conditioning vectoring beams electrical circuitry arrangement e1140, conditioning non-linearly air electrical circuitry arrangement e1141, and conditioning human tissue electrical circuitry arrangement e1142.

Some of these electrical circuitry arrangements are depicted in FIG. 35 to include electronically governing electrical circuitry arrangement e12, governing thermal imaging electrical circuitry arrangement e1201, governing visual imaging electrical circuitry arrangement e1202, governing acoustic imaging electrical circuitry arrangement e1203, governing sensed acoustic electrical circuitry arrangement e1204, governing adjacent electrical circuitry arrangement e1205, governing Doppler frequency electrical circuitry arrangement e1206, governing digitally coded electrical circuitry arrangement e1207, governing ranging electrical circuitry arrangement e1208, governing visual tracking electrical circuitry arrangement e1209, governing thermal tracking electrical circuitry arrangement e1210, governing greatest intensity electrical circuitry arrangement e1211, and governing thermal tracking electrical circuitry arrangement e1212, governing signal amplitude electrical circuitry arrangement e1213, governing target location electrical circuitry arrangement e1214, governing audio microphone electrical circuitry arrangement e1215, governing ultrasonic microphone electrical circuitry arrangement e1216, governing acoustic digital electrical circuitry arrangement e1217, governing acoustic noise electrical circuitry arrangement e1218, and governing ultrasonic signals electrical circuitry arrangement e1219.

Some of these electrical circuitry arrangements are depicted in FIG. 36 to include governing vectoring electrical circuitry arrangement e1220, governing atmospheric interaction electrical circuitry arrangement e1221, governing human tissue electrical circuitry arrangement e1222, governing signals interfering electrical circuitry arrangement e1223, governing transducers to focus electrical circuitry arrangement e1224, governing interference electrical circuitry arrangement e1225, governing nonlinear atmospheric electrical circuitry arrangement e1226, governing nonlinear tissue electrical circuitry arrangement e1227, governing nonlinear non-tissue electrical circuitry arrangement e1228, governing nonlinear personal electrical circuitry arrangement e1229, governing binaural acoustic electrical circuitry arrangement e1234, governing digitally coded electrical circuitry arrangement e1231, governing signals tailored electrical circuitry arrangement e1232, governing feedback sensing electrical circuitry arrangement e1233, governing binaural acoustic electrical circuitry arrangement e1234, governing stereophonic acoustic electrical circuitry arrangement e1235, governing monophonic acoustic electrical circuitry arrangement e1236, governing phase cancellation electrical circuitry arrangement e1237, governing phase-shifting electrical circuitry arrangement e1238 and governing emitted greater electrical circuitry arrangement e1239.

Some of these electrical circuitry arrangements are depicted in FIG. 37 to include governing information designated electrical circuitry arrangement e1240, governing information containing electrical circuitry arrangement e1241, governing psychologically influential electrical circuitry arrangement e1242, governing verbal oratory electrical circuitry arrangement e1243, governing music selections electrical circuitry arrangement e1244, governing location away electrical circuitry arrangement e1245, governing vicinity ears electrical circuitry arrangement e1246, governing vicinity individual electrical circuitry arrangement e1247, governing near individuals electrical circuitry arrangement e1248, governing passive receiver electrical circuitry arrangement e1249, governing moving member electrical circuitry arrangement e1250, governing listener's head electrical circuitry arrangement e1251, governing sensed accelerometer electrical circuitry arrangement e1252, governing six feet electrical circuitry arrangement e1253, governing twelve feet electrical circuitry arrangement e1254, governing three feet electrical circuitry arrangement e1255, governing emitter arrangements electrical circuitry arrangement e1256, governing handheld mobile electrical circuitry arrangement e1257, governing cell phone electrical circuitry arrangement e1258 and governing laptop computer electrical circuitry arrangement e1259.

Some of these electrical circuitry arrangements are depicted in FIG. 38 to include governing PDA electrical circuitry arrangement e1260, governing smart phone electrical circuitry arrangement e1261, governing security personnel electrical circuitry arrangement e1262, governing sports equipment electrical circuitry arrangement e1263, governing wearable media electrical circuitry arrangement e1264, governing wristwatch electrical circuitry arrangement e1265, governing two-way radio electrical circuitry arrangement e1266, governing targeting area electrical circuitry arrangement e1267, governing transducer placement electrical circuitry arrangement e1268, governing amplitude size electrical circuitry arrangement e1269, governing along vicinity electrical circuitry arrangement e1270, governing display screen electrical circuitry arrangement e1271, governing keyboard area electrical circuitry arrangement e1272, governing dimensional sizing electrical circuitry arrangement e1273, governing wavelengths of the lowest electrical circuitry arrangement e1274, governing placement in body electrical circuitry arrangement e1275, governing localized areas electrical circuitry arrangement e1276, governing collective speakers electrical circuitry arrangement e1277, and governing multiple arrays electrical circuitry arrangement e1278.

In implementations one or more instructions are stored and/or otherwise borne in various subsystems, components, and/or accessories of the portable electronic device directed audio 10 such as being borne in a non-transitory signal bearing medium of information storage subsystem s200. One or more exemplary instructions depicted in FIG. 39 as being borne in an exemplary version of a non-transitory signal bearing medium of information storage subsystem s200 include one or more electronically conditioning instructions i11, one or more conditioning data storage instructions i1101, one or more conditioning wireless instructions i1102, one or more conditioning microphone instructions i1103, one or more conditioning audio instructions i1104, one or more conditioning internet instructions i1105, one or more conditioning software instructions i1106, one or more conditioning disk player instructions i1107, one or more conditioning media player instructions i1108, one or more conditioning audio player instructions i1109, one or more conditioning text recognition instructions i1110, one or more conditioning monitor alarm instructions i1111, one or more conditioning narrative instructions i1112, one or more conditioning instrumental instructions i1113, one or more conditioning signal modulation instructions i1114, one or more conditioning ultrasonic transducer instructions i1115, one or more conditioning signal processing instructions i1116, one or more conditioning microprocessor instructions i1117, one or more conditioning for inserting digital instructions i1118, and one or more conditioning tablet computer instructions i1119.

One or more exemplary instructions depicted in FIG. 40 as being borne in an exemplary version of a non-transitory signal bearing medium of information storage subsystem s200 include one or more conditioning handheld mobile instructions i1120, one or more conditioning cell phone instructions i1121, one or more conditioning portable laptop instructions i1122, one or more conditioning PDA instructions i1123, one or more conditioning smart phone instructions i1124, one or more conditioning security personnel instructions i1125, one or more conditioning athletic sports instructions i1126, one or more conditioning wearable media instructions i1127, one or more conditioning wristwatch instructions i1128, one or more conditioning two-way radio instructions i1129, one or more conditioning beams instructions i1130, one or more conditioning steered beams instructions i1131, one or more conditioning phased array instructions i1132, one or more conditioning audio instructions i1133, one or more conditioning absolute position instructions i1134, one or more conditioning relative position instructions i1135, one or more conditioning quality characterization target locations instructions i1136, one or more conditioning ultrasonic transducers instructions i1137, one or more conditioning reference instructions i1138, and one or more conditioning more acoustic ultrasonic instructions i1139.

Figure 41:
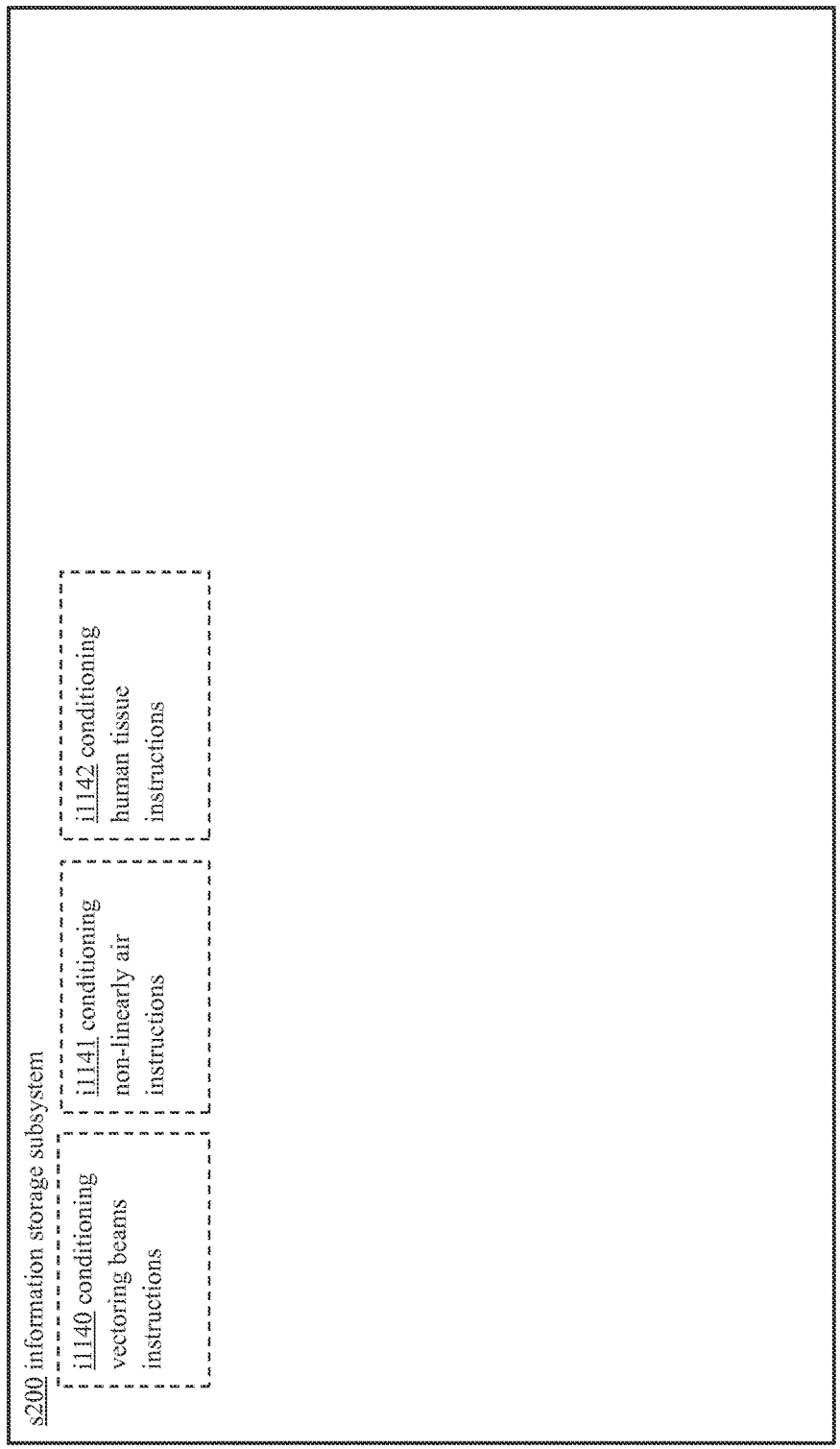
FIG. 41 is a block diagram depicting one or more exemplary instructions of the information storage subsystem s200 of the portable electronic device directed audio 10 of FIG. 1.

One or more exemplary instructions depicted in FIG. 41 as being borne in an exemplary version of a non-transitory signal bearing medium of information storage subsystem s200 include one or more conditioning vectoring beams instructions i1140, one or more conditioning non-linearly air instructions i1141, and one or more conditioning human tissue instructions i1142.

Figure 42:
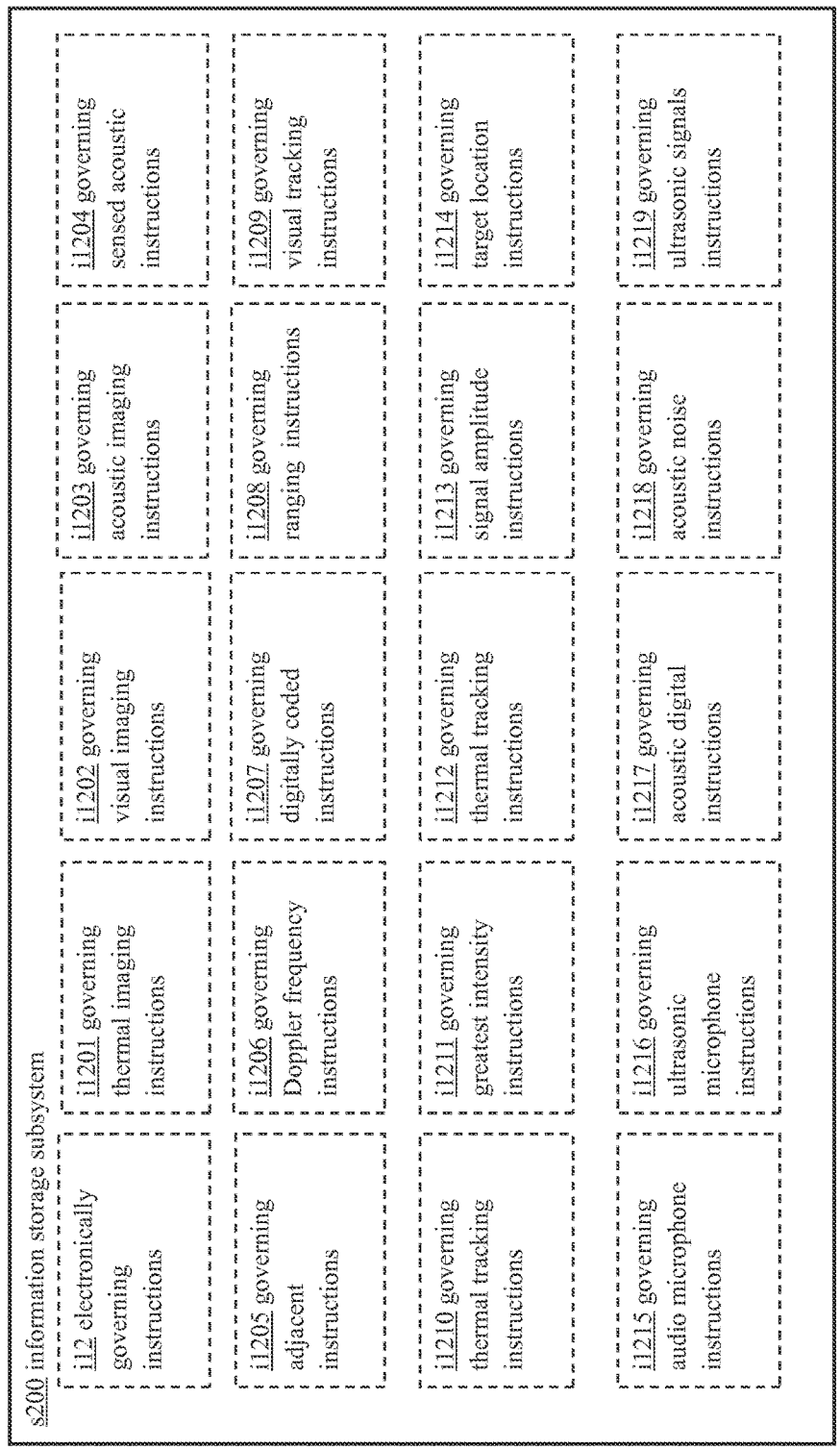
FIG. 42 is a block diagram depicting one or more exemplary instructions of the information storage subsystem s200 of the portable electronic device directed audio 10 of FIG. 1.

One or more exemplary instructions depicted in FIG. 42 as being borne in an exemplary version of a non-transitory signal bearing medium of information storage subsystem s200 include one or more electronically governing instructions i12, one or more governing thermal imaging instructions i1201, one or more governing visual imaging instructions i1202, one or more governing acoustic imaging instructions i1203, one or more governing sensed acoustic instructions i1204, one or more governing adjacent instructions i1205, one or more governing Doppler frequency instructions i1206, one or more governing digitally coded instructions i1207, one or more governing ranging instructions i1208, one or more governing visual tracking instructions i1209, one or more governing thermal tracking instructions i1210, one or more governing greatest intensity instructions i1211, one or more governing thermal tracking instructions i1212, one or more governing signal amplitude instructions i1213, one or more governing target location instructions i1214, one or more governing audio microphone instructions i1215, one or more governing ultrasonic microphone instructions i1216, one or more governing acoustic digital instructions i1217, one or more governing acoustic noise instructions i1218, and one or more governing ultrasonic signals instructions i1219.

Figure 43:
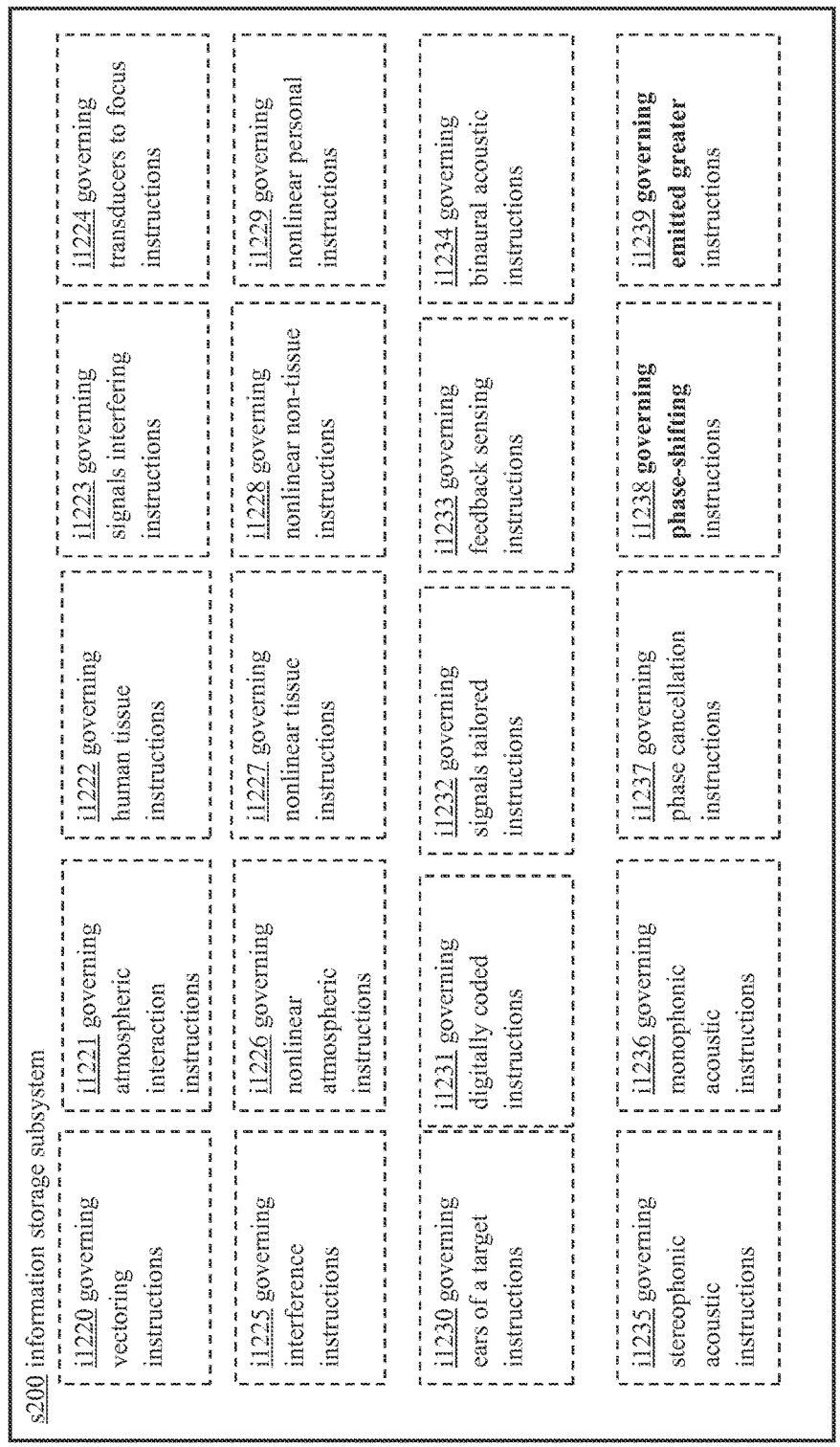
FIG. 43 is a block diagram depicting one or more exemplary instructions of the information storage subsystem s200 of the portable electronic device directed audio 10 of FIG. 1.

One or more exemplary instructions depicted in FIG. 43 as being borne in an exemplary version of a non-transitory signal bearing medium of information storage subsystem s200 include one or more governing vectoring instructions i1220, one or more governing atmospheric interaction instructions i1221, one or more governing human tissue instructions i1222, one or more governing signals interfering instructions i1223, one or more governing transducers to focus instructions i1224, one or more governing interference instructions i1225, one or more governing nonlinear atmospheric instructions i1226, one or more governing nonlinear tissue instructions i1227, one or more governing nonlinear non-tissue instructions i1228, one or more governing non-linear personal instructions i1229, one or more governing binaural acoustic instructions i1234, one or more governing digitally coded instructions i1231, one or more governing signals tailored instructions i1232, one or more governing feedback sensing instructions i1233, one or more governing binaural acoustic instructions i1234, one or more governing stereophonic acoustic instructions i1235, one or more governing monophonic acoustic instructions i1236, one or more governing phase cancellation instructions i1237, one or more governing phase-shifting instructions i1238 and one or more governing emitted greater instructions i1239.

One or more exemplary instructions depicted in FIG. 44 as being borne in an exemplary version of a non-transitory signal bearing medium of information storage subsystem s200 include one or more governing information designated instructions i1240, one or more governing information containing instructions i1241, one or more governing psychologically influential instructions i1242, one or more governing verbal oratory instructions i1243, one or more governing music selections instructions i1244, one or more governing location away instructions i1245, one or more governing vicinity ears instructions i1246, one or more governing vicinity individual instructions i1247, one or more governing near individuals instructions i1248, one or more governing passive receiver instructions i1249, one or more governing moving member instructions i1250, one or more governing listener's head instructions i1251, one or more governing sensed accelerometer instructions i1252, one or more governing six feet instructions i1253, one or more governing twelve feet instructions i1254, one or more governing three feet instructions i1255, one or more governing emitter arrangements instructions i1256, one or more governing handheld mobile instructions i1257, one or more governing cell phone instructions i1258 and one or more governing laptop computer instructions i1259.

One or more exemplary instructions depicted in FIG. 45 as being borne in an exemplary version of a non-transitory signal bearing medium of information storage subsystem s200 include one or more governing PDA instructions i1260, one or more governing smart phone instructions i1261, one or more governing security personnel instructions i1262, one or more governing sports equipment instructions i1263, one or more governing wearable media instructions i1264, one or more governing wristwatch instructions i1265, one or more governing two-way radio instructions i1266, one or more governing targeting area instructions i1267, one or more governing transducer placement instructions i1268, one or more governing amplitude size instructions i1269, one or more governing along vicinity instructions i1270, one or more governing display screen instructions i1271, one or more governing keyboard area instructions i1272, one or more governing dimensional sizing instructions i1273, one or more governing wavelengths of the lowest instructions i1274, one or more governing placement in body instructions i1275, one or more governing localized areas instructions i1276, one or more governing collective speakers instructions i1277, and one or more governing multiple arrays instructions i1278.

Figure 46:
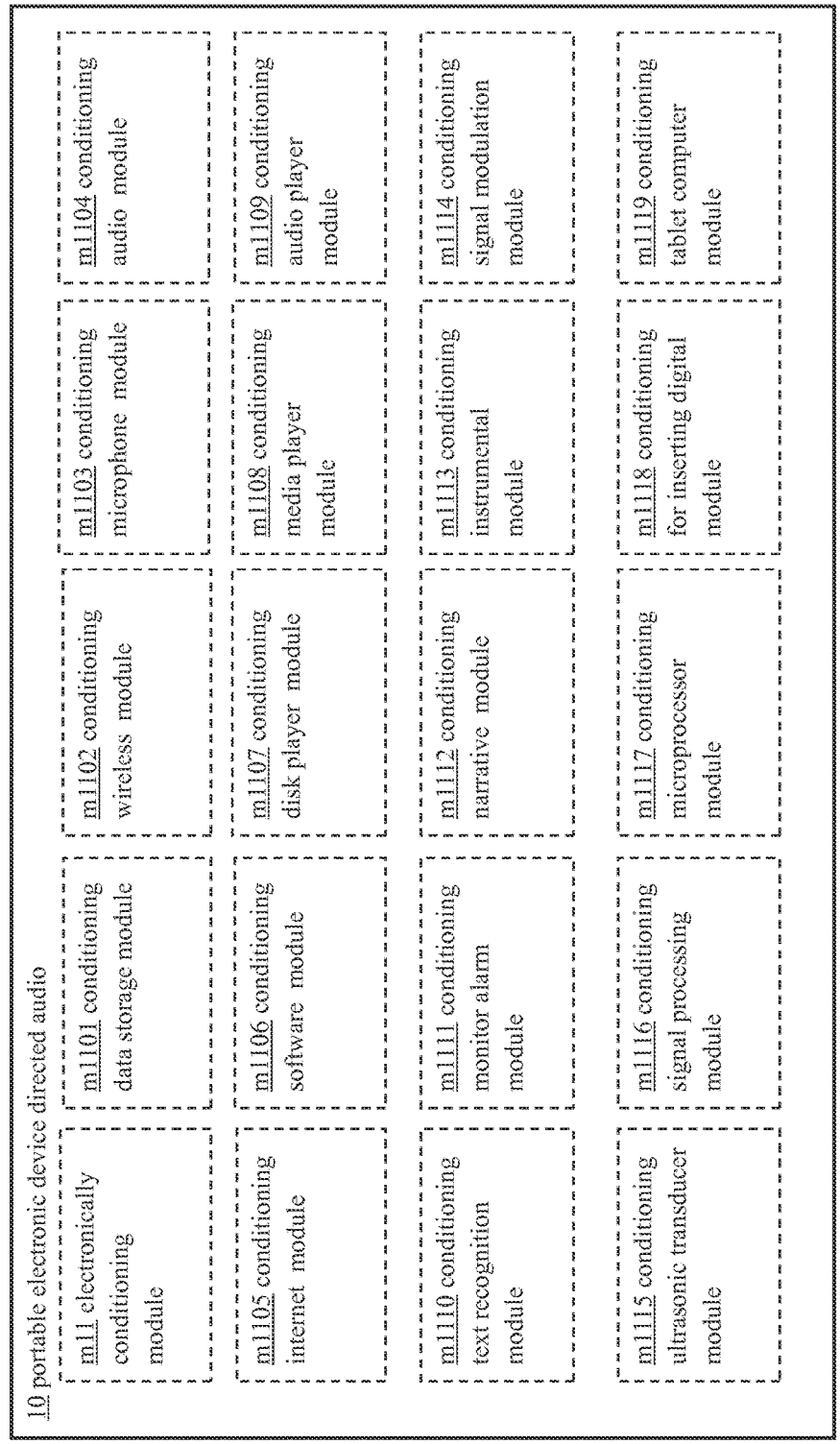
FIG. 46 is a block diagram depicting one or more exemplary modules of the portable electronic device directed audio 10 of FIG. 1.

Implementations of modules involve different combinations (limited to patentable subject matter under 35 U.S.C. 101) of one or more aspects from one or more of the electrical circuitry arrangements and/or one or more aspects from one or more of the instructions of the portable electronic device directed audio 10. Exemplary depictions of some of these modules are shown in FIG. 46 to include electronically conditioning module m11, conditioning data storage module m1101, conditioning wireless module m1102, conditioning microphone module m1103, conditioning audio module m1104, conditioning internet module m1105, conditioning software module m1106, conditioning disk player module m1107, conditioning media player module m1108, conditioning audio player module m1109, conditioning text recognition module m1110, conditioning monitor alarm module m1111, conditioning narrative module m1112, conditioning instrumental module m1113, conditioning signal modulation module m1114, conditioning ultrasonic transducer module m1115, conditioning signal processing module m1116, conditioning microprocessor module m1117, conditioning for inserting digital module m1118, and conditioning tablet computer module m1119.

Figure 47:
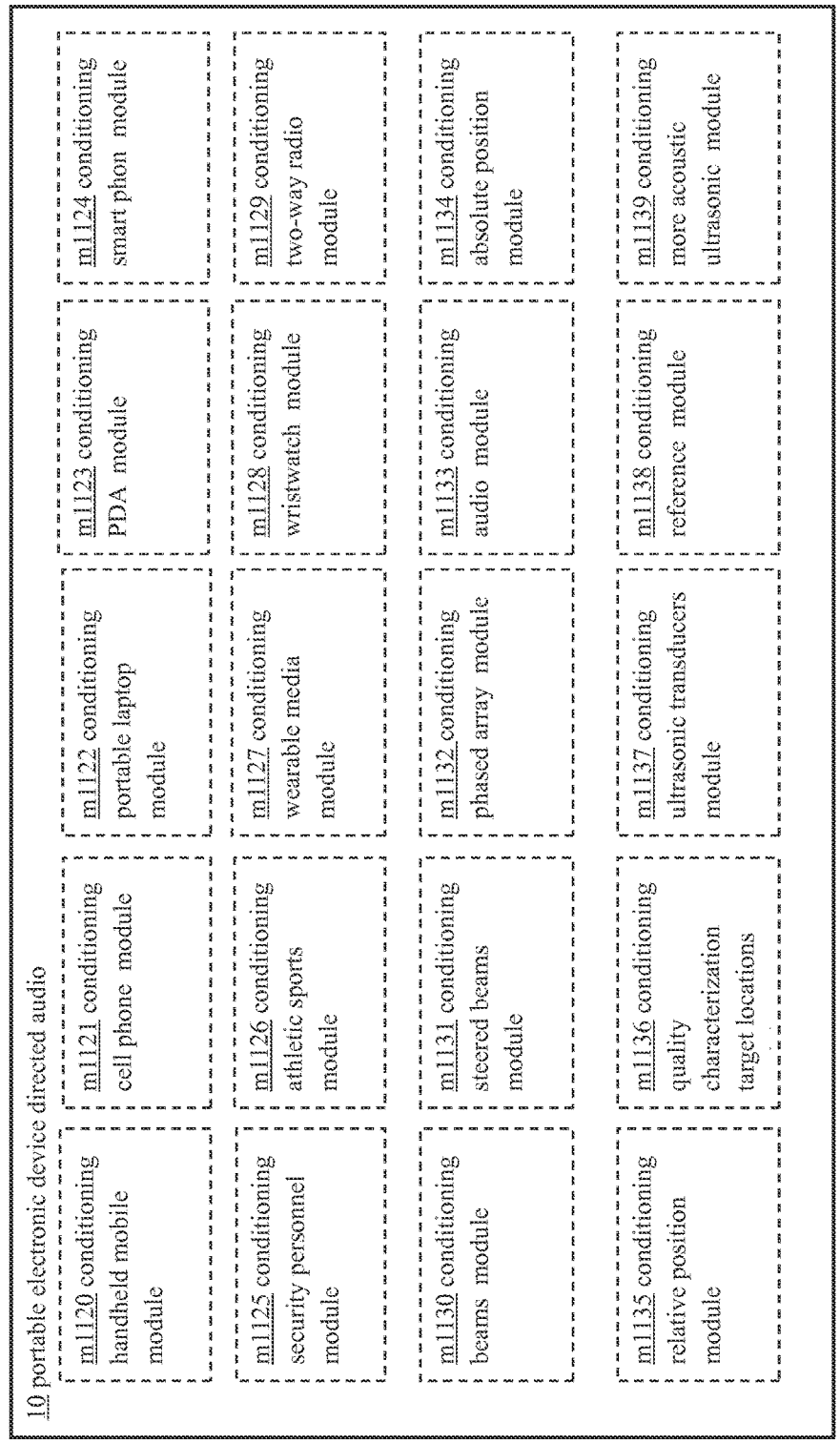
FIG. 47 is a block diagram depicting one or more exemplary modules of the portable electronic device directed audio 10 of FIG. 1.

Some of these modules are depicted in FIG. 47 to include conditioning handheld mobile module m1120, conditioning cell phone module m1121, conditioning portable laptop module m1122, conditioning PDA module m1123, conditioning smart phone module m1124, conditioning security personnel module m1125, conditioning athletic sports module m1126, conditioning wearable media module m1127, conditioning wristwatch module m1128, conditioning two-way radio module m1129, conditioning beams module m1130, conditioning steered beams module m113, conditioning phased array module m1132, conditioning audio module m1133, conditioning absolute position module m1134, conditioning relative position module m1135, conditioning quality characterization target locations module m1136, conditioning ultrasonic transducers module m1137, conditioning reference module m1138, and conditioning more acoustic ultrasonic module m1139.

Figure 48:
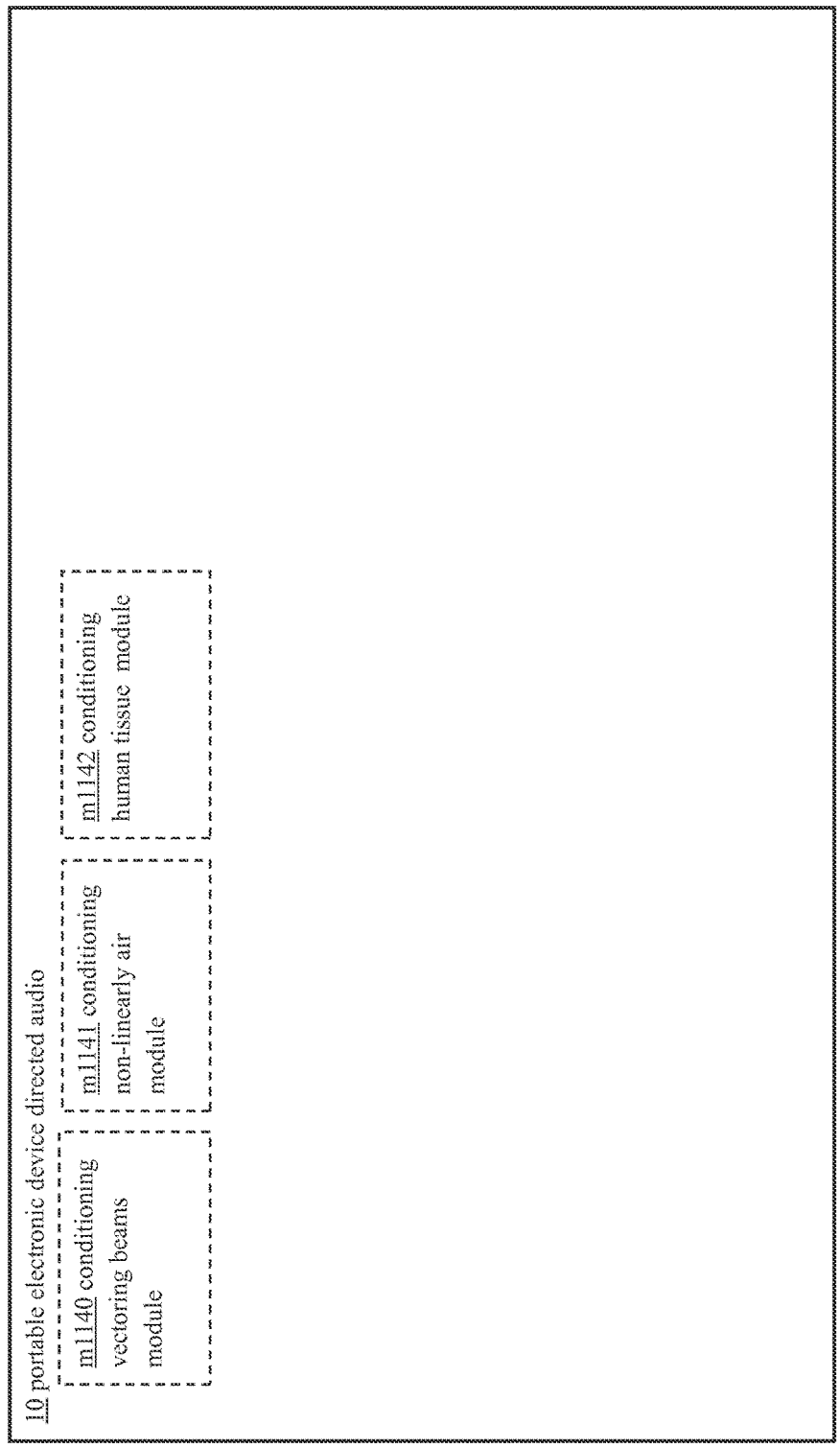
FIG. 48 is a block diagram depicting one or more exemplary modules of the portable electronic device directed audio 10 of FIG. 1.

Some of these modules are depicted in FIG. 48 to include conditioning vectoring beams module m1140, conditioning non-linearly air module m1141, and conditioning human tissue module m1142.

Some of these modules are depicted in FIG. 49 to include electronically governing module m12, governing thermal imaging module m1201, governing visual imaging module m1202, governing acoustic imaging module m1203, governing sensed acoustic module m1204, governing adjacent module m1205, governing Doppler frequency module m1206, governing digitally coded module m1207, governing ranging module m1208, governing visual tracking module m1209, governing thermal tracking module m1210, governing greatest intensity module m1211, and governing thermal tracking module m1212, governing signal amplitude module m1213, governing target location module m1214, governing audio microphone module m1215, governing ultrasonic microphone module m1216, governing acoustic digital module m1217, governing acoustic noise module m1218, and governing ultrasonic signals module m1219.

Figure 50:
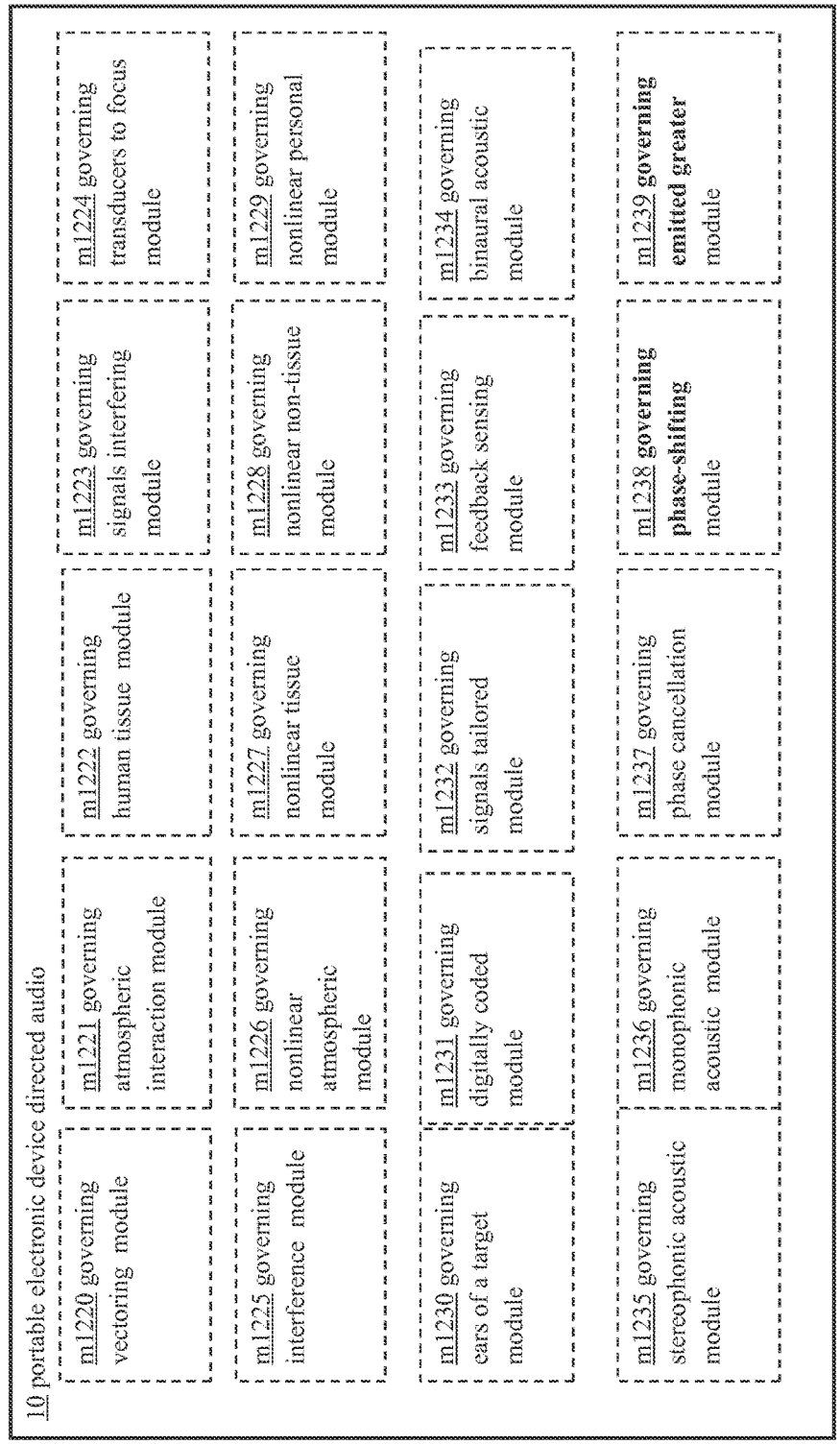
FIG. 50 is a block diagram depicting one or more exemplary modules of the portable electronic device directed audio 10 of FIG. 1.

Some of these modules are depicted in FIG. 50 to include governing vectoring module m12, governing atmospheric interaction module m1221, governing human tissue module m1222, governing signals interfering module m1223, governing transducers to focus module m1224, governing interference module m1225, governing nonlinear atmospheric module m1226, governing nonlinear tissue module m1227, governing nonlinear non-tissue module m1228, governing nonlinear personal module m1229, governing binaural acoustic module m1234, governing digitally coded module m1231, governing signals tailored module m1232, governing feedback sensing module m1233, governing binaural acoustic module m1234, governing stereophonic acoustic module m1235, governing monophonic acoustic module m1236, governing phase cancellation module m1237, governing phase-shifting module m1238, and governing emitted greater module m1239.

Some of these modules are depicted in FIG. 51 to include governing information designated module m12, governing information containing module m1241, governing psychologically influential module m1242, governing verbal oratory module m1243, governing music selections module m1244, governing location away module m1245, governing vicinity ears module m1246, governing vicinity individual module m1247, governing near individuals module m1248, governing passive receiver module m1249, governing moving member module m1250, governing listener's head module m1251, governing sensed accelerometer module m1252, governing six feet module m1253, governing twelve feet module m1254, governing three feet module m1255, governing emitter arrangements module m1256, governing handheld mobile module m1257, governing cell phone module m1258, and governing laptop computer module m1259.

Some of these modules are depicted in FIG. 52 to include governing PDA module m12, governing smart phone module m1261, governing security personnel module m1262, governing sports equipment module m1263, governing wearable media module m1264, governing wristwatch module m1265, governing two-way radio module m1266, governing targeting area module m1267, governing transducer placement module m1268, governing amplitude size module m1269, governing along vicinity module m1270, governing display screen module m1271, governing keyboard area module m1272, governing dimensional sizing module m1273, governing wavelengths of the lowest module m1274, governing placement in body module m1275, governing localized areas module m1276, governing collective speakers module m1277, and governing multiple arrays module m1278.

In some implementations, non-transitory signal-bearing medium of information storage subsystem s200 as articles of manufacture may store the one or more exemplary instructions. In some implementations, the non-transitory signal bearing medium may include a computer-readable medium. In some implementations, the non-transitory signal-bearing medium may include a recordable medium. In some implementations, the signal-bearing medium may include a communication medium.

The various subsystems and components of the portable electronic device directed audio s10 such as the control and information processing subsystem s100, the information storage subsystem s200, the information user interface subsystems 300, the sensing subsystem s400 and the electronic communication subsystem s500 and their sub-components and the other exemplary entities depicted may be embodied by hardware, software and/or firmware (limited to patentable subject matter under 35 USC 101). For example, in some implementations of the portable electronic device directed audio s10, aspects may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

An operational flow o10 as shown in FIG. 53 represents example operations related to electronically conditioning one or more information signals accessed at least in part through one or more portions of a portable electronic device to be transmitted from one or more portable electronic device emitters of said portable electronic device through one or more modulated acoustic ultrasonic signals and electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location.

FIG. 53 and those figures that follow may have various examples of operational flows, and explanation may be provided with respect to the above-described examples of FIGS. 1-12 and/or with respect to other examples and contexts. Nonetheless, it should be understood that the operational flows may be executed in a number of other environments and contexts, and/or in modified versions of FIGS. 1-12. Furthermore, although the various operational flows are presented in the sequence(s) illustrated, it should be understood that the various operations may be performed in other orders than those which are illustrated, or may be performed concurrently.

In FIG. 53 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

As shown in FIG. 53, the operational flow o10 proceeds to operation o11 for electronically conditioning one or more information signals accessed at least in part through one or more portions of a portable electronic device to be transmitted from one or more portable electronic device emitters of said portable electronic device through one or more modulated acoustic ultrasonic signals. An exemplary version of a non-transitory signal bearing medium of information storage subsystem s200 is depicted as bearing one or more electronically conditioning instructions i11 that when executed will direct performance of the operation o11. In an implementation, the one or more electronically conditioning instructions i11 when executed direct electronically conditioning (e.g. including one or more preamplifier portions, including one or more transceiver portions, including one or more digital amplifier portions, etc.) one or more information signals (e.g. including lecture formatted information, including foreign language speech information, including classical music selection information, etc.) accessed at least in part through one or more portions of a portable electronic device (e.g. through reception of cable communication packets, via Wi-Fi signal reception, by near-field infrared receiver, etc.) to be transmitted (e.g. through one or more cable interface portions, via one or more speaker portions, by one or more transducer portions, etc.) from one or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) through one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.). Furthermore, the electronically conditioning electrical circuitry arrangement ("elec circ arrange") e11 when activated will perform the operation o1101. Also, the conditioning data storage module m1101, when executed and/or activated, will direct performance of and/or performs the operation o11. In an implementation, the electronically conditioning electrical circuitry arrangement e11, when activated performs electronically conditioning (e.g. including one or more preamplifier portions, including one or more transceiver portions, including one or more digital amplifier portions, etc.) one or more information signals (e.g. including lecture formatted information, including foreign language speech information, including classical music selection information, etc.) accessed at least in part through one or more portions of a portable electronic device (e.g. through reception of cable communication packets, via Wi-Fi signal reception, by near-field infrared receiver, etc.) to be transmitted (e.g. through one or more cable interface portions, via one or more speaker portions, by one or more transducer portions, etc.) from one or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) through one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.). Also, the electronically conditioning module m11, when executed and/or activated, will direct performance of and/or perform the operation o11. In an implementation, the electronically conditioning one or more information signals accessed at least in part through one or more portions of a portable electronic device to be transmitted from one or more portable electronic device emitters of said portable electronic device through one or more modulated acoustic ultrasonic signals is carried out by electronically conditioning (e.g. including one or more preamplifier portions, including one or more transceiver portions, including one or more digital amplifier portions, etc.) one or more information signals (e.g. including lecture formatted information, including foreign language speech information, including classical music selection information, etc.) accessed at least in part through one or more portions of a portable electronic device (e.g. through reception of cable communication packets, via Wi-Fi signal reception, by near-field infrared receiver, etc.) to be transmitted (e.g. through one or more cable interface portions, via one or more speaker portions, by one or more transducer portions, etc.) from one or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) through one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.).

Figure 39:
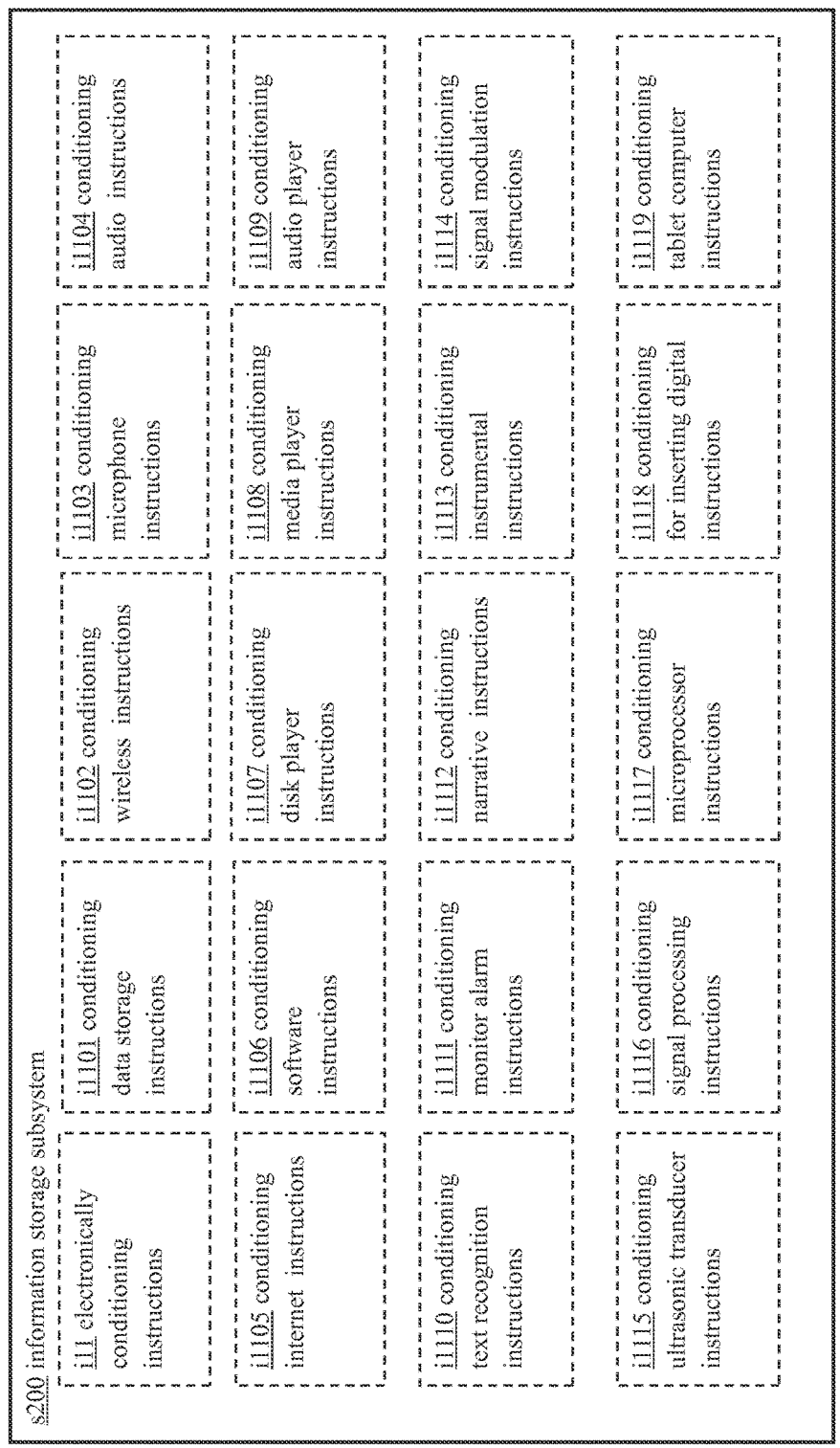
FIG. 39 is a block diagram depicting one or more exemplary instructions of the information storage subsystem s200 of the portable electronic device directed audio 10 of FIG. 1.

In one or more implementations, as shown in FIG. 54, operation o11 includes an operation o1101 for electronically conditioning one or more information signals the accessed at least in part through one or more portions of a portable electronic device to be transmitted from one or more portable electronic device emitters of said portable electronic device through one or more modulated acoustic ultrasonic signals through one or more data storage portions of said portable electronic device. Origination of an illustratively derived conditioning data storage component group can be accomplished through skilled in the art design choice selection of one or more of the above depicted components from one or more of the above depicted subsystems shown in FIG. 25. Components from the conditioning data storage component group can be used in implementing execution of the one or more conditioning data storage instructions i1101 of FIG. 39, can be used in performance of the conditioning data storage electrical circuitry arrangement e1101 of FIG. 32, and/or can be used in otherwise fulfillment of the operation o1101. An exemplary non-transitory signal bearing medium version of the information storage subsystem s200 is depicted in FIG. 39 as bearing the one or more conditioning data storage instructions i1101 that when executed will direct performance of the operation o1101. Furthermore, the conditioning data storage electrical circuitry arrangement ("elec circ arrange") e1101, when activated, will perform the operation o1101. Also, the conditioning data storage module m1101, when executed and/or activated, will direct performance of and/or perform the operation o1101. For instance, in one or more exemplary implementations, the one or more conditioning data storage instructions i1101, when executed, direct performance of the operation o1101 in the illustrative depiction as follows, and/or the conditioning data storage electrical circuitry arrangement e1101, when activated, performs the operation o1101 in the illustrative depiction as follows, and/or the conditioning data storage module m1101, when executed and/or activated, directs performance of and/or performs the operation o1101 in the illustrative depiction as follows, and/or the operation o1101 is otherwise carried out in the illustrative depiction as follows: electronically conditioning (e.g. including one or more preamplifier portions, etc.) one or more information signals (e.g. including lecture formatted information, etc.) the accessed at least in part through one or more portions of a portable electronic device (e.g. through reception of cable communication packets, etc.) to be transmitted (e.g. through one or more cable interface portions, etc.) from one or more portable electronic device emitters (e.g. including one or more perimeter arrays, etc.) of said portable electronic device (e.g. including one or more 3G mobile components, etc.) through one or more modulated acoustic ultrasonic signals (e.g. via multiple acoustic ultrasonic signals configured to be demodulated through mutual interference therewith to at least in part result in one or more acoustic audio signals, etc.) through one or more data storage portions of said portable electronic device (e.g. including one or more tablet memory portions, etc.).

In one or more implementations, as shown in FIG. 54, operation o11 includes an operation o1102 for electronically conditioning one or more information signals the accessed at least in part through one or more portions of a portable electronic device to be transmitted from one or more portable electronic device emitters of said portable electronic device through one or more modulated acoustic ultrasonic signals via one or more wireless communication portions of said portable electronic device. Origination of an illustratively derived conditioning wireless component group can be accomplished through skilled in the art design choice selection of one or more of the above depicted components from one or more of the above depicted subsystems shown in FIG. 25. Components from the conditioning wireless component group can be used in implementing execution of the one or more conditioning wireless instructions i1102 of FIG. 39, can be used in performance of the conditioning wireless electrical circuitry arrangement e1102 of FIG. 32, and/or can be used in otherwise fulfillment of the operation o1102. An exemplary non-transitory signal bearing medium version of the information storage subsystem s200 is depicted in FIG. 39 as bearing the one or more conditioning wireless instructions i1102 that when executed will direct performance of the operation o1102. Furthermore, the conditioning wireless electrical circuitry arrangement ("elec circ arrange") e1102, when activated, will perform the operation o1102. Also, the conditioning wireless module m1102, when executed and/or activated, will direct performance of and/or perform the operation o1102. For instance, in one or more exemplary implementations, the one or more conditioning wireless instructions i1102, when executed, direct performance of the operation o1102 in the illustrative depiction as follows, and/or the conditioning wireless electrical circuitry arrangement e1102, when activated, performs the operation o1102 in the illustrative depiction as follows, and/or the conditioning wireless module m1102, when executed and/or activated, directs performance of and/or performs the operation o1102 in the illustrative depiction as follows, and/or the operation o1102 is otherwise carried out in the illustrative depiction as follows: electronically conditioning (e.g. including one or more transceiver portions, etc.) one or more information signals (e.g. including foreign language speech information, etc.) the accessed at least in part through one or more portions of a portable electronic device (e.g. via Wi-Fi signal reception, etc.) to be transmitted (e.g. via one or more speaker portions, etc.) from one or more portable electronic device emitters (e.g. including one or more polar arrays, etc.) of said portable electronic device (e.g. including one or more cellular components, etc.) through one or more modulated acoustic ultrasonic signals (e.g. via one or more acoustic ultrasonic signals configured to be demodulated through nonlinear atmospheric interaction to at least in part generate one or more acoustic audio signals, etc.) via one or more wireless communication portions of said portable electronic device (e.g. including one or more tablet WiFi, etc.).

In one or more implementations, as shown in FIG. 54, operation o11 includes an operation o1103 for electronically conditioning one or more information signals the accessed at least in part through one or more portions of a portable electronic device to be transmitted from one or more portable electronic device emitters of said portable electronic device through one or more modulated acoustic ultrasonic signals through one or more microphone portions of said portable electronic device. Origination of an illustratively derived conditioning microphone component group can be accomplished through skilled in the art design choice selection of one or more of the above depicted components from one or more of the above depicted subsystems shown in FIG. 25. Components from the conditioning microphone component group can be used in implementing execution of the one or more conditioning microphone instructions i1103 of FIG. 39, can be used in performance of the conditioning microphone electrical circuitry arrangement e1103 of FIG. 32, and/or can be used in otherwise fulfillment of the operation o1103. An exemplary non-transitory signal bearing medium version of the information storage subsystem s200 is depicted in FIG. 39 as bearing the one or more conditioning microphone instructions i1103 that when executed will direct performance of the operation o1103. Furthermore, the conditioning microphone electrical circuitry arrangement ("elec circ arrange") e1103, when activated, will perform the operation o1103. Also, the conditioning microphone module m1103, when executed and/or activated, will direct performance of and/or perform the operation o1103. For instance, in one or more exemplary implementations, the one or more conditioning microphone instructions i1103, when executed, direct performance of the operation o1103 in the illustrative depiction as follows, and/or the conditioning microphone electrical circuitry arrangement e1103, when activated, performs the operation o1103 in the illustrative depiction as follows, and/or the conditioning microphone module m1103, when executed and/or activated, directs performance of and/or performs the operation o1103 in the illustrative depiction as follows, and/or the operation o1103 is otherwise carried out in the illustrative depiction as follows: electronically conditioning (e.g. including one or more digital amplifier portions, etc.) one or more information signals (e.g. including classical music selection information, etc.) the accessed at least in part through one or more portions of a portable electronic device (e.g. by near-field infrared receiver, etc.) to be transmitted (e.g. by one or more transducer portions, etc.) from one or more portable electronic device emitters (e.g. including one or more orthographic arrays, etc.) of said portable electronic device (e.g. including one or more 4G components, etc.) through one or more modulated acoustic ultrasonic signals (e.g. via one or more acoustic ultrasonic signals configured to be demodulated through nonlinear human tissue interaction to at least in part produce one or more acoustic audio signals, etc.) through one or more microphone portions of said portable electronic device (e.g. including one or more smart phone directional microphone portions, etc.).

Figure 55:
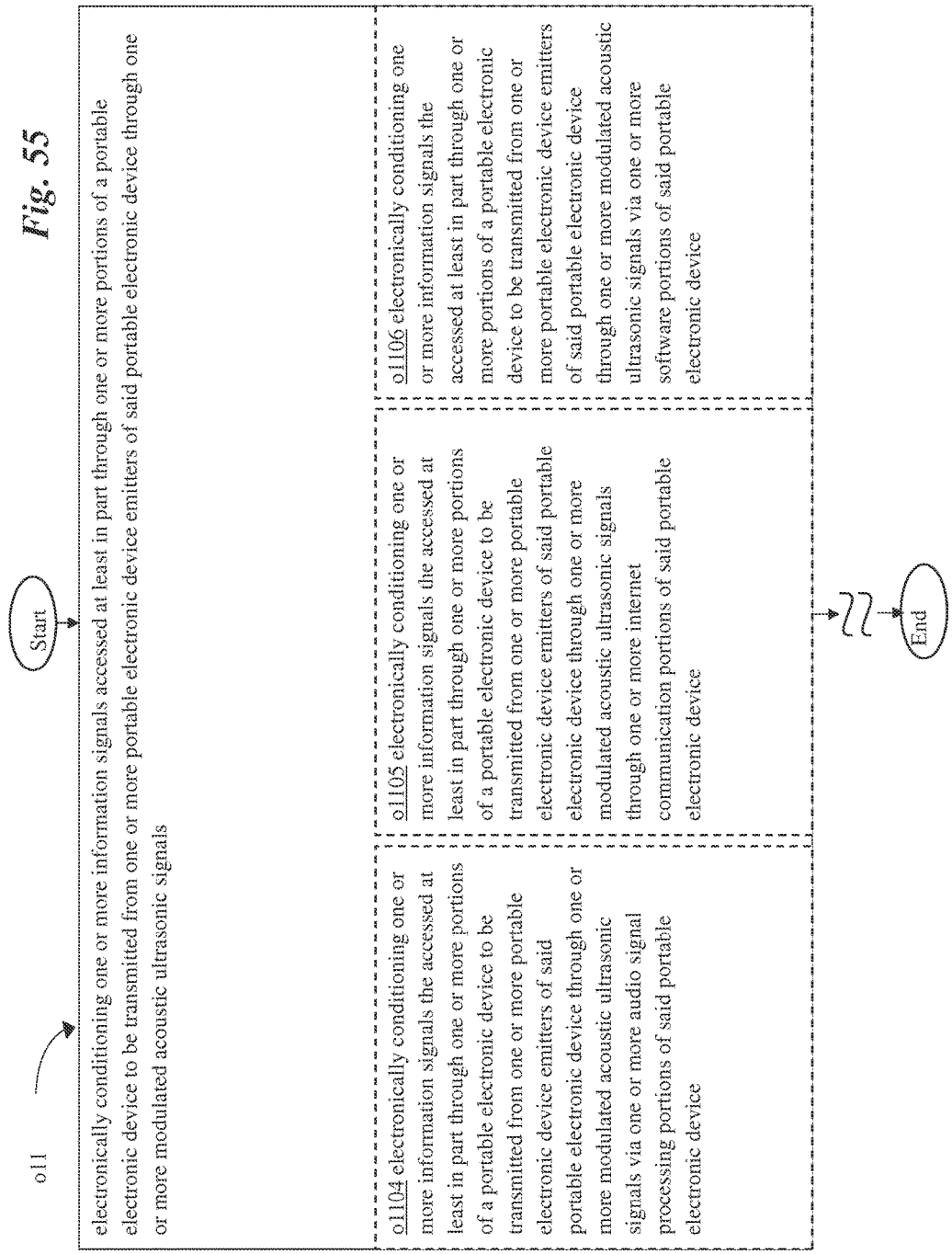
FIG. 55 is a high-level flowchart including exemplary implementations of operation o11 of FIG. 53.

In one or more implementations, as shown in FIG. 55, operation o11 includes an operation o1104 for electronically conditioning one or more information signals the accessed at least in part through one or more portions of a portable electronic device to be transmitted from one or more portable electronic device emitters of said portable electronic device through one or more modulated acoustic ultrasonic signals via one or more audio signal processing portions of said portable electronic device. Origination of an illustratively derived conditioning audio component group can be accomplished through skilled in the art design choice selection of one or more of the above depicted components from one or more of the above depicted subsystems shown in FIG. 25. Components from the conditioning audio component group can be used in implementing execution of the one or more conditioning audio instructions i1104 of FIG. 39, can be used in performance of the conditioning audio electrical circuitry arrangement e1104 of FIG. 32, and/or can be used in otherwise fulfillment of the operation o1104. An exemplary non-transitory signal bearing medium version of the information storage subsystem s200 is depicted in FIG. 39 as bearing the one or more conditioning audio instructions i1104 that when executed will direct performance of the operation o1104. Furthermore, the conditioning audio electrical circuitry arrangement ("elec circ arrange") e1104, when activated, will perform the operation o1104. Also, the conditioning audio module m1104, when executed and/or activated, will direct performance of and/or perform the operation o1104. For instance, in one or more exemplary implementations, the one or more conditioning audio instructions i1104, when executed, direct performance of the operation o1104 in the illustrative depiction as follows, and/or the conditioning audio electrical circuitry arrangement e1104, when activated, performs the operation o1104 in the illustrative depiction as follows, and/or the conditioning audio module m1104, when executed and/or activated, directs performance of and/or performs the operation o1104 in the illustrative depiction as follows, and/or the operation o1104 is otherwise carried out in the illustrative depiction as follows: electronically conditioning (e.g. including one or more digital compression portions, etc.) one or more information signals (e.g. including instructional lesson material information, etc.) the accessed at least in part through one or more portions of a portable electronic device (e.g. from hard drive access, etc.) to be transmitted (e.g. from one or more aperture portions, etc.) from one or more portable electronic device emitters (e.g. including one or more three-dimensional arrays, etc.) of said portable electronic device (e.g. including one or more WiFi components, etc.) through one or more modulated acoustic ultrasonic signals (e.g. via one or more acoustic ultrasonic signals configured to be demodulated through nonlinear polymeric interaction to at least in part result in one or more acoustic audio signals, etc.) via one or more audio signal processing portions of said portable electronic device (e.g. including one or more smart phone fast fourier transform signal processing portions, etc.).

In one or more implementations, as shown in FIG. 55, operation o11 includes an operation o1105 for electronically conditioning one or more information signals the accessed at least in part through one or more portions of a portable electronic device to be transmitted from one or more portable electronic device emitters of said portable electronic device through one or more modulated acoustic ultrasonic signals through one or more internet communication portions of said portable electronic device. Origination of an illustratively derived conditioning internet component group can be accomplished through skilled in the art design choice selection of one or more of the above depicted components from one or more of the above depicted subsystems shown in FIG. 25. Components from the conditioning internet component group can be used in implementing execution of the one or more conditioning internet instructions i1105 of FIG. 39, can be used in performance of the conditioning internet electrical circuitry arrangement e1105 of FIG. 32, and/or can be used in otherwise fulfillment of the operation o1105. An exemplary non-transitory signal bearing medium version of the information storage subsystem s200 is depicted in FIG. 39 as bearing the one or more conditioning internet instructions i1105 that when executed will direct performance of the operation o1105. Furthermore, the conditioning internet electrical circuitry arrangement ("elec circ arrange") e1105, when activated, will perform the operation o1105. Also, the conditioning internet module m1105, when executed and/or activated, will direct performance of and/or perform the operation o1105. For instance, in one or more exemplary implementations, the one or more conditioning internet instructions i1105, when executed, direct performance of the operation o1105 in the illustrative depiction as follows, and/or the conditioning internet electrical circuitry arrangement e1105, when activated, performs the operation o1105 in the illustrative depiction as follows, and/or the conditioning internet module m1105, when executed and/or activated, directs performance of and/or performs the operation o1105 in the illustrative depiction as follows, and/or the operation o1105 is otherwise carried out in the illustrative depiction as follows: electronically conditioning (e.g. including one or more signal limiter portions, etc.) one or more information signals (e.g. including warning tone information, etc.) the accessed at least in part through one or more portions of a portable electronic device (e.g. using fiber optic communication, etc.) to be transmitted (e.g. using one or more transmitter portions, etc.) from one or more portable electronic device emitters (e.g. including one or more scattered arrangements, etc.) of said portable electronic device (e.g. including one or more infrared components, etc.) through one or more modulated acoustic ultrasonic signals (e.g. via one or more acoustic ultrasonic signals configured to be demodulated through nonlinear apparel interaction to at least in part produce one or more acoustic audio signals, etc.) through one or more internet communication portions of said portable electronic device (e.g. including one or more laptop TCP/IP internet protocol portions, etc.).

In one or more implementations, as shown in FIG. 55, operation o11 includes an operation o1106 for electronically conditioning one or more information signals the accessed at least in part through one or more portions of a portable electronic device to be transmitted from one or more portable electronic device emitters of said portable electronic device through one or more modulated acoustic ultrasonic signals via one or more software portions of said portable electronic device. Origination of an illustratively derived conditioning software component group can be accomplished through skilled in the art design choice selection of one or more of the above depicted components from one or more of the above depicted subsystems shown in FIG. 25. Components from the conditioning software component group can be used in implementing execution of the one or more conditioning software instructions i1106 of FIG. 39, can be used in performance of the conditioning software electrical circuitry arrangement e1106 of FIG. 32, and/or can be used in otherwise fulfillment of the operation o1106. An exemplary non-transitory signal bearing medium version of the information storage subsystem s200 is depicted in FIG. 39 as bearing the one or more conditioning software instructions i1106 that when executed will direct performance of the operation o1106. Furthermore, the conditioning software electrical circuitry arrangement ("elec circ arrange") e1106, when activated, will perform the operation o1106. Also, the conditioning software module m1106, when executed and/or activated, will direct performance of and/or perform the operation o1106. For instance, in one or more exemplary implementations, the one or more conditioning software instructions i1106, when executed, direct performance of the operation o1106 in the illustrative depiction as follows, and/or the conditioning software electrical circuitry arrangement e1106, when activated, performs the operation o1106 in the illustrative depiction as follows, and/or the conditioning software module m1106, when executed and/or activated, directs performance of and/or performs the operation o1106 in the illustrative depiction as follows, and/or the operation o1106 is otherwise carried out in the illustrative depiction as follows: electronically conditioning (e.g. including one or more auxiliary signal output portions, etc.) one or more information signals (e.g. including white noise information, etc.) the accessed at least in part through one or more portions of a portable electronic device (e.g. through sound wave reception, etc.) to be transmitted (e.g. through one or more air-coupled transducer portions, etc.) from one or more portable electronic device emitters (e.g. including one or more staggered arrays, etc.) of said portable electronic device (e.g. including one or more personal digital assistant components, etc.) through one or more modulated acoustic ultrasonic signals (e.g. via one or more acoustic ultrasonic signals configured to be demodulated through nonlinear interaction with one or more solids to at least in part generate one or more acoustic audio signals, etc.) via one or more software portions of said portable electronic device (e.g. including one or more internet browser tablet software portions, etc.).

Figure 56:
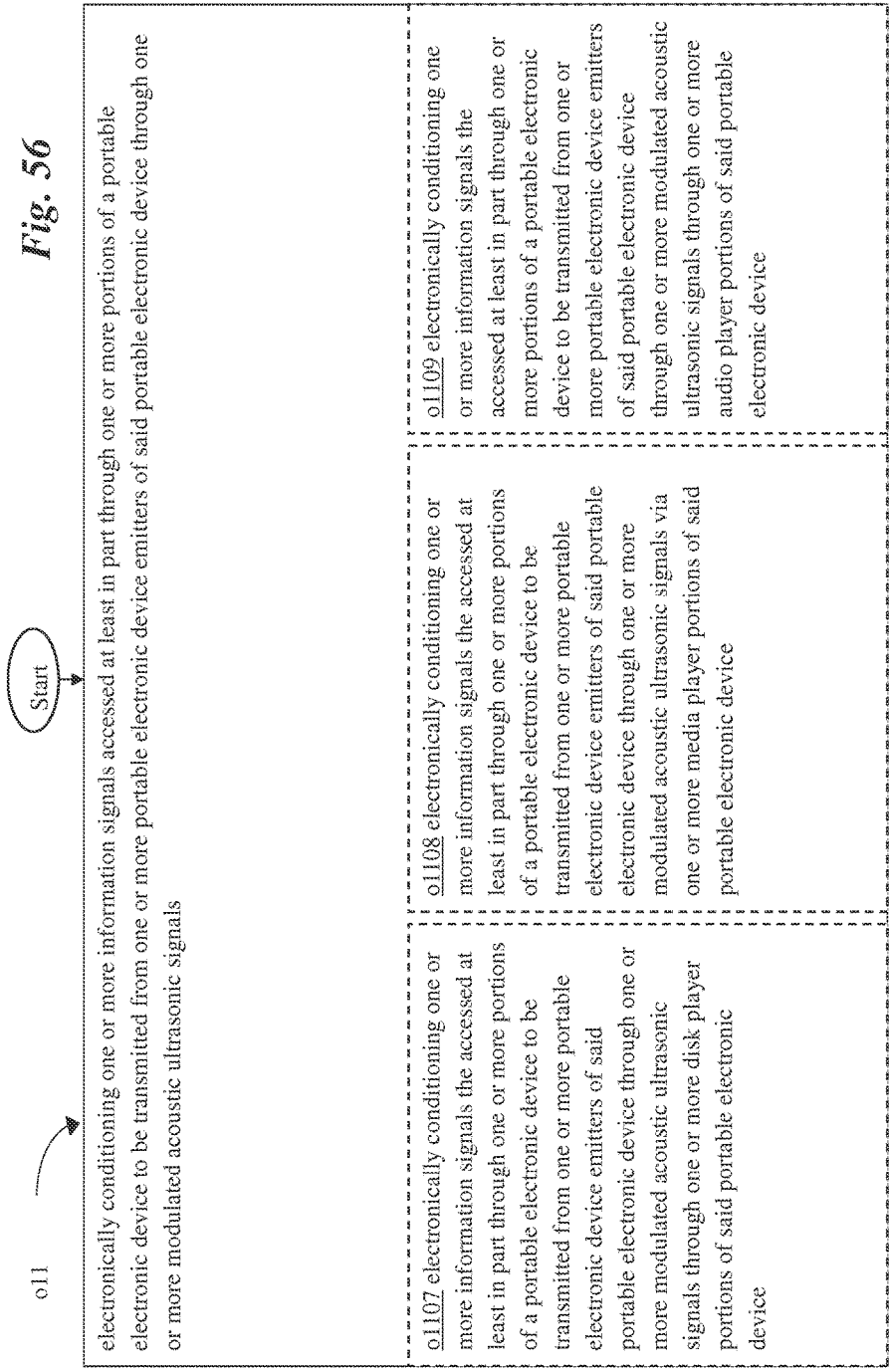
FIG. 56 is a high-level flowchart including exemplary implementations of operation o11 of FIG. 53.

In one or more implementations, as shown in FIG. 56, operation o11 includes an operation o1107 for electronically conditioning one or more information signals the accessed at least in part through one or more portions of a portable electronic device to be transmitted from one or more portable electronic device emitters of said portable electronic device through one or more modulated acoustic ultrasonic signals through one or more disk player portions of said portable electronic device. Origination of an illustratively derived conditioning disk player component group can be accomplished through skilled in the art design choice selection of one or more of the above depicted components from one or more of the above depicted subsystems shown in FIG. 25. Components from the conditioning disk player component group can be used in implementing execution of the one or more conditioning disk player instructions i1107 of FIG. 39, can be used in performance of the conditioning disk player electrical circuitry arrangement e1107 of FIG. 32, and/or can be used in otherwise fulfillment of the operation o1107. An exemplary non-transitory signal bearing medium version of the information storage subsystem s200 is depicted in FIG. 39 as bearing the one or more conditioning disk player instructions i1107 that when executed will direct performance of the operation o1107. Furthermore, the conditioning disk player electrical circuitry arrangement ("elec circ arrange") e1107, when activated, will perform the operation o1107. Also, the conditioning disk player module m1107, when executed and/or activated, will direct performance of and/or perform the operation o1107. For instance, in one or more exemplary implementations, the one or more conditioning disk player instructions i1107, when executed, direct performance of the operation o1107 in the illustrative depiction as follows, and/or the conditioning disk player electrical circuitry arrangement e1107, when activated, performs the operation o1107 in the illustrative depiction as follows, and/or the conditioning disk player module m1107, when executed and/or activated, directs performance of and/or performs the operation o1107 in the illustrative depiction as follows, and/or the operation o1107 is otherwise carried out in the illustrative depiction as follows: electronically conditioning (e.g. including one or more auxiliary signal input portions, etc.) one or more information signals (e.g. including varying pitch information, etc.) the accessed at least in part through one or more portions of a portable electronic device (e.g. via radio frequency antenna, etc.) to be transmitted (e.g. via one or more thin-film membrane portions, etc.) from one or more portable electronic device emitters (e.g. including one or more linear arrangements, etc.) of said portable electronic device (e.g. including one or more smart phone components, etc.) through one or more modulated acoustic ultrasonic signals (e.g. via one or more acoustic ultrasonic signals including signals having one or more frequencies above 60 kHz, etc.) through one or more disk player portions of said portable electronic device (e.g. including one or more laptop Blu-Ray player portions, etc.).

In one or more implementations, as shown in FIG. 56, operation o11 includes an operation o1108 for electronically conditioning one or more information signals the accessed at least in part through one or more portions of a portable electronic device to be transmitted from one or more portable electronic device emitters of said portable electronic device through one or more modulated acoustic ultrasonic signals via one or more media player portions of said portable electronic device. Origination of an illustratively derived conditioning media player component group can be accomplished through skilled in the art design choice selection of one or more of the above depicted components from one or more of the above depicted subsystems shown in FIG. 25. Components from the conditioning media player component group can be used in implementing execution of the one or more conditioning media player instructions i1108 of FIG. 39, can be used in performance of the conditioning media player electrical circuitry arrangement e1108 of FIG. 32, and/or can be used in otherwise fulfillment of the operation o1108. An exemplary non-transitory signal bearing medium version of the information storage subsystem s200 is depicted in FIG. 39 as bearing the one or more conditioning media player instructions i1108 that when executed will direct performance of the operation o1108. Furthermore, the conditioning media player electrical circuitry arrangement ("elec circ arrange") e1108, when activated, will perform the operation o1108. Also, the conditioning media player module m1108, when executed and/or activated, will direct performance of and/or perform the operation o1108. For instance, in one or more exemplary implementations, the one or more conditioning media player instructions i1108, when executed, direct performance of the operation o1108 in the illustrative depiction as follows, and/or the conditioning media player electrical circuitry arrangement e1108, when activated, performs the operation o1108 in the illustrative depiction as follows, and/or the conditioning media player module m1108, when executed and/or activated, directs performance of and/or performs the operation o1108 in the illustrative depiction as follows, and/or the operation o1108 is otherwise carried out in the illustrative depiction as follows: electronically conditioning (e.g. including one or more equalizer portions, etc.) one or more information signals (e.g. including note sequence information, etc.) the accessed at least in part through one or more portions of a portable electronic device (e.g. by reception of wireless transmission, etc.) to be transmitted (e.g. by one or more resonant surface portions, etc.) from one or more portable electronic device emitters (e.g. including one or more parabolic arrangements, etc.) of said portable electronic device (e.g. including one or more cell phone components, etc.) through one or more modulated acoustic ultrasonic signals (e.g. via one or more acoustic ultrasonic signals including signals having one or more frequencies above 80 kHz, etc.) via one or more media player portions of said portable electronic device (e.g. including one or more tablet mp4 player portions, etc.).

In one or more implementations, as shown in FIG. 56, operation o11 includes an operation o1109 for electronically conditioning one or more information signals the accessed at least in part through one or more portions of a portable electronic device to be transmitted from one or more portable electronic device emitters of said portable electronic device through one or more modulated acoustic ultrasonic signals through one or more audio player portions of said portable electronic device. Origination of an illustratively derived conditioning audio player component group can be accomplished through skilled in the art design choice selection of one or more of the above depicted components from one or more of the above depicted subsystems shown in FIG. 25. Components from the conditioning audio player component group can be used in implementing execution of the one or more conditioning audio player instructions i1109 of FIG. 39, can be used in performance of the conditioning audio player electrical circuitry arrangement e1109 of FIG. 32, and/or can be used in otherwise fulfillment of the operation o1109. An exemplary non-transitory signal bearing medium version of the information storage subsystem s200 is depicted in FIG. 39 as bearing the one or more conditioning audio player instructions i1109 that when executed will direct performance of the operation o1109. Furthermore, the conditioning audio player electrical circuitry arrangement ("elec circ arrange") e1109, when activated, will perform the operation o1109. Also, the conditioning audio player module m1109, when executed and/or activated, will direct performance of and/or perform the operation o1109. For instance, in one or more exemplary implementations, the one or more conditioning audio player instructions i1109, when executed, direct performance of the operation o1109 in the illustrative depiction as follows, and/or the conditioning audio player electrical circuitry arrangement e1109, when activated, performs the operation o1109 in the illustrative depiction as follows, and/or the conditioning audio player module m1109, when executed and/or activated, directs performance of and/or performs the operation o1109 in the illustrative depiction as follows, and/or the operation o1109 is otherwise carried out in the illustrative depiction as follows: electronically conditioning (e.g. including one or more modulation portions, etc.) one or more information signals (e.g. including two-way conversation information, etc.) the accessed at least in part through one or more portions of a portable electronic device (e.g. from memory stick access, etc.) to be transmitted (e.g. from one or more signal processor portions, etc.) from one or more portable electronic device emitters (e.g. including one or more hyperbolic arrangements, etc.) of said portable electronic device (e.g. including one or more laptop components, etc.) through one or more modulated acoustic ultrasonic signals (e.g. via one or more acoustic ultrasonic signals including signals having one or more frequencies above 100 kHz, etc.) through one or more audio player portions of said portable electronic device (e.g. including one or more mp3 player portions, etc.).

In one or more implementations, as shown in FIG. 57, operation o11 includes an operation o1110 for electronically conditioning one or more information signals the accessed at least in part through one or more portions of a portable electronic device to be transmitted from one or more portable electronic device emitters of said portable electronic device through one or more modulated acoustic ultrasonic signals via one or more text recognition portions of said portable electronic device. Origination of an illustratively derived conditioning text recognition component group can be accomplished through skilled in the art design choice selection of one or more of the above depicted components from one or more of the above depicted subsystems shown in FIG. 25. Components from the conditioning text recognition component group can be used in implementing execution of the one or more conditioning text recognition instructions i1110 of FIG. 39, can be used in performance of the conditioning text recognition electrical circuitry arrangement e1110 of FIG. 32, and/or can be used in otherwise fulfillment of the operation o1110. An exemplary non-transitory signal bearing medium version of the information storage subsystem s200 is depicted in FIG. 39 as bearing the one or more conditioning text recognition instructions i1110 that when executed will direct performance of the operation o1110. Furthermore, the conditioning text recognition electrical circuitry arrangement ("elec circ arrange") e1110, when activated, will perform the operation o1110. Also, the conditioning text recognition module m1110, when executed and/or activated, will direct performance of and/or perform the operation o1110. For instance, in one or more exemplary implementations, the one or more conditioning text recognition instructions i1110, when executed, direct performance of the operation o1110 in the illustrative depiction as follows, and/or the conditioning text recognition electrical circuitry arrangement e1110, when activated, performs the operation o1110 in the illustrative depiction as follows, and/or the conditioning text recognition module m1110, when executed and/or activated, directs performance of and/or performs the operation o1110 in the illustrative depiction as follows, and/or the operation o1110 is otherwise carried out in the illustrative depiction as follows: electronically conditioning (e.g. including one or more signal mixing portions, etc.) one or more information signals (e.g. including confidential information, etc.) the accessed at least in part through one or more portions of a portable electronic device (e.g. using flash drive stored data, etc.) to be transmitted (e.g. using one or more transmitter portions, etc.) from one or more portable electronic device emitters (e.g. including one or more enclosed arrangements, etc.) of said portable electronic device (e.g. including one or more tablet computer components, etc.) through one or more modulated acoustic ultrasonic signals (e.g. via one or more acoustic ultrasonic signals including signals having one or more frequencies above 120 kHz, etc.) via one or more text recognition portions of said portable electronic device (e.g. including one or more laptop based text reading software portions, etc.).

In one or more implementations, as shown in FIG. 57, operation o11 includes an operation o1111 for electronically conditioning one or more information signals the accessed at least in part through one or more portions of a portable electronic device to be transmitted from one or more portable electronic device emitters of said portable electronic device through one or more modulated acoustic ultrasonic signals through one or more monitor alarm system portions of said portable electronic device. Origination of an illustratively derived conditioning monitor alarm component group can be accomplished through skilled in the art design choice selection of one or more of the above depicted components from one or more of the above depicted subsystems shown in FIG. 25. Components from the conditioning monitor alarm component group can be used in implementing execution of the one or more conditioning monitor alarm instructions i1111 of FIG. 39, can be used in performance of the conditioning monitor alarm electrical circuitry arrangement e1111 of FIG. 32, and/or can be used in otherwise fulfillment of the operation o1111. An exemplary non-transitory signal bearing medium version of the information storage subsystem s200 is depicted in FIG. 39 as bearing the one or more conditioning monitor alarm instructions i1111 that when executed will direct performance of the operation o1111. Furthermore, the conditioning monitor alarm electrical circuitry arrangement ("elec circ arrange") e1111, when activated, will perform the operation o1111. Also, the conditioning monitor alarm module m1111, when executed and/or activated, will direct performance of and/or perform the operation o1111. For instance, in one or more exemplary implementations, the one or more conditioning monitor alarm instructions i1111, when executed, direct performance of the operation o1111 in the illustrative depiction as follows, and/or the conditioning monitor alarm electrical circuitry arrangement e1111, when activated, performs the operation o1111 in the illustrative depiction as follows, and/or the conditioning monitor alarm module m1111, when executed and/or activated, directs performance of and/or performs the operation o1111 in the illustrative depiction as follows, and/or the operation o1111 is otherwise carried out in the illustrative depiction as follows: electronically conditioning (e.g. including one or more ultrasonic generator portions, etc.) one or more information signals (e.g. including eavesdropping information, etc.) the accessed at least in part through one or more portions of a portable electronic device (e.g. through processor synthesized information, etc.) to be transmitted (e.g. through one or more transducer membrane portions, etc.) from one or more portable electronic device emitters (e.g. including one or more transducer arrangements, etc.) of said portable electronic device (e.g. including one or more mp3 player components, etc.) through one or more modulated acoustic ultrasonic signals (e.g. via one or more acoustic ultrasonic signals including signals having one or more frequencies above 140 kHz, etc.) through one or more monitor alarm system portions of said portable electronic device (e.g. including one or more alarm based motion sensor portions, etc.).

In one or more implementations, as shown in FIG. 57, operation o11 includes an operation o1112 for electronically conditioning the one or more information signals accessed at least in part through one or more portions of a portable electronic device to be transmitted from one or more portable electronic device emitters of said portable electronic device through one or more modulated acoustic ultrasonic signals including narrative speeches. Origination of an illustratively derived conditioning narrative component group can be accomplished through skilled in the art design choice selection of one or more of the above depicted components from one or more of the above depicted subsystems shown in FIG. 25. Components from the conditioning narrative component group can be used in implementing execution of the one or more conditioning narrative instructions i1112 of FIG. 39, can be used in performance of the conditioning narrative electrical circuitry arrangement e1112 of FIG. 32, and/or can be used in otherwise fulfillment of the operation o1112. An exemplary non-transitory signal bearing medium version of the information storage subsystem s200 is depicted in FIG. 39 as bearing the one or more conditioning narrative instructions i1112 that when executed will direct performance of the operation o1112. Furthermore, the conditioning narrative electrical circuitry arrangement ("elec circ arrange") e1112, when activated, will perform the operation o1112. Also, the conditioning narrative module m1112, when executed and/or activated, will direct performance of and/or perform the operation o1112. For instance, in one or more exemplary implementations, the one or more conditioning narrative instructions i1112, when executed, direct performance of the operation o1112 in the illustrative depiction as follows, and/or the conditioning narrative electrical circuitry arrangement e1112, when activated, performs the operation o1112 in the illustrative depiction as follows, and/or the conditioning narrative module m1112, when executed and/or activated, directs performance of and/or performs the operation o1112 in the illustrative depiction as follows, and/or the operation o1112 is otherwise carried out in the illustrative depiction as follows: electronically conditioning (e.g. including one or more parametric modulation portions, etc.) the one or more information signals (e.g. including pre-recorded information, etc.) accessed at least in part through one or more portions of a portable electronic device (e.g. via ROM drive reads, etc.) to be transmitted (e.g. via one or more transducer array portions, etc.) from one or more portable electronic device emitters (e.g. including one or more aperture arrangements, etc.) of said portable electronic device (e.g. including one or more mobile phone components, etc.) through one or more modulated acoustic ultrasonic signals (e.g. via one or more acoustic ultrasonic signals including signals having one or more frequencies above 160 kHz, etc.) including narrative speeches (e.g. including one or more online school classroom lectures, etc.).

Figure 58:
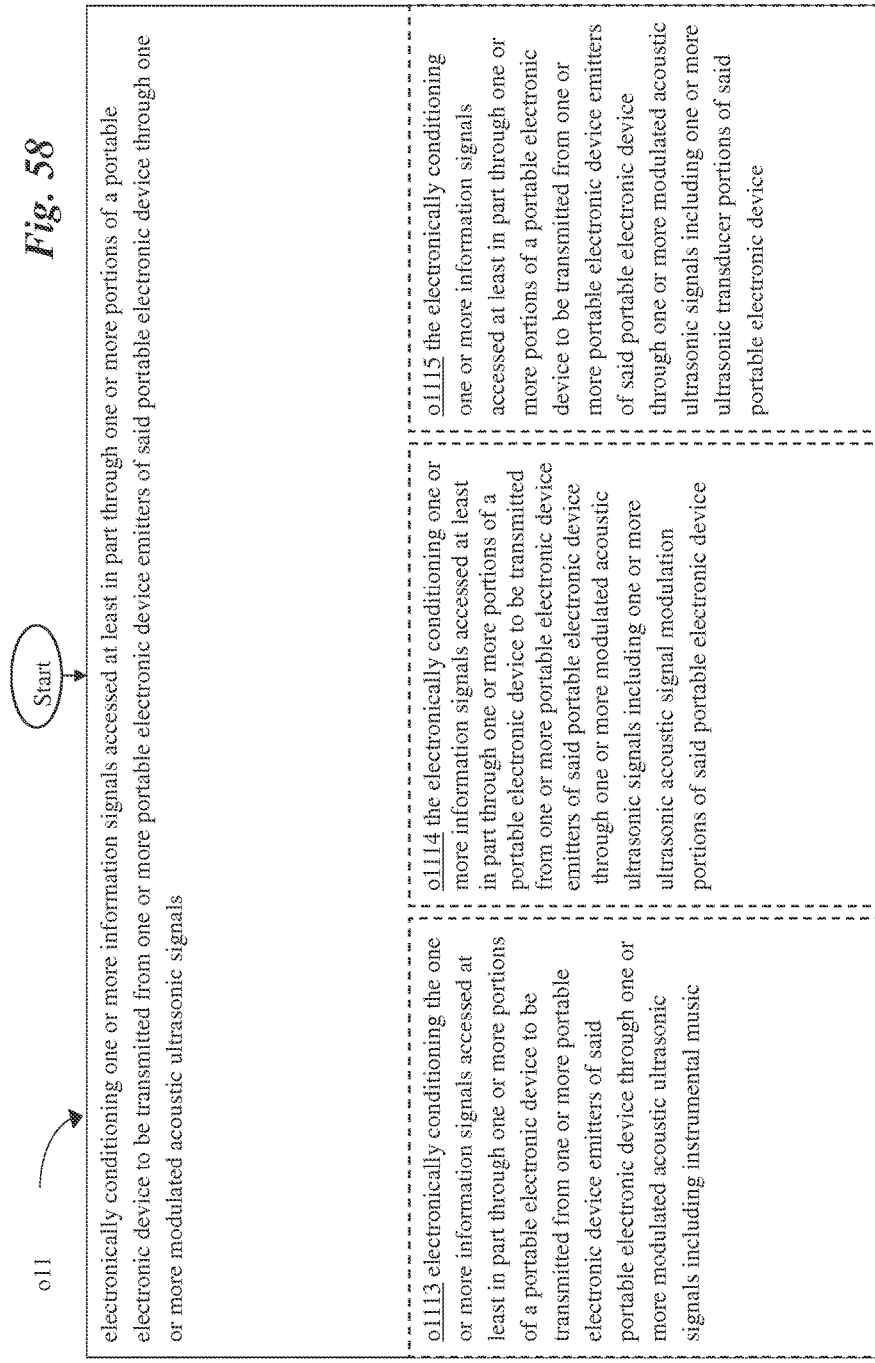
FIG. 58 is a high-level flowchart including exemplary implementations of operation o11 of FIG. 53.

In one or more implementations, as shown in FIG. 58, operation o11 includes an operation o1113 for electronically conditioning the one or more information signals accessed at least in part through one or more portions of a portable electronic device to be transmitted from one or more portable electronic device emitters of said portable electronic device through one or more modulated acoustic ultrasonic signals including instrumental music. Origination of an illustratively derived conditioning instrumental component group can be accomplished through skilled in the art design choice selection of one or more of the above depicted components from one or more of the above depicted subsystems shown in FIG. 25. Components from the conditioning instrumental component group can be used in implementing execution of the one or more conditioning instrumental instructions i1113 of FIG. 39, can be used in performance of the conditioning instrumental electrical circuitry arrangement e1113 of FIG. 32, and/or can be used in otherwise fulfillment of the operation o1113. An exemplary non-transitory signal bearing medium version of the information storage subsystem s200 is depicted in FIG. 39 as bearing the one or more conditioning instrumental instructions i1113 that when executed will direct performance of the operation o1113. Furthermore, the conditioning instrumental electrical circuitry arrangement ("elec circ arrange") e1113, when activated, will perform the operation o1113. Also, the conditioning instrumental module m1113, when executed and/or activated, will direct performance of and/or perform the operation o1113. For instance, in one or more exemplary implementations, the one or more conditioning instrumental instructions i1113, when executed, direct performance of the operation o1113 in the illustrative depiction as follows, and/or the conditioning instrumental electrical circuitry arrangement e1113, when activated, performs the operation o1113 in the illustrative depiction as follows, and/or the conditioning instrumental module m1113, when executed and/or activated, directs performance of and/or performs the operation o1113 in the illustrative depiction as follows, and/or the operation o1113 is otherwise carried out in the illustrative depiction as follows: electronically conditioning (e.g. including one or more nonlinear modulation portions, etc.) the one or more information signals (e.g. including processor generated information, etc.) accessed at least in part through one or more portions of a portable electronic device (e.g. by CD-ROM playback, etc.) to be transmitted (e.g. by one or more membrane speaker portions, etc.) from one or more portable electronic device emitters (e.g. including one or more transmitter arrangements, etc.) of said portable electronic device (e.g. including one or more two-way radio components, etc.) through one or more modulated acoustic ultrasonic signals (e.g. via one or more acoustic ultrasonic signals including signals having one or more frequencies above 180 kHz, etc.) including instrumental music (e.g. including one or more WAV file formatted music, etc.).

In one or more implementations, as shown in FIG. 58, operation o11 includes an operation o1114 for the electronically conditioning one or more information signals accessed at least in part through one or more portions of a portable electronic device to be transmitted from one or more portable electronic device emitters of said portable electronic device through one or more modulated acoustic ultrasonic signals including one or more ultrasonic acoustic signal modulation portions of said portable electronic device. Origination of an illustratively derived conditioning signal modulation component group can be accomplished through skilled in the art design choice selection of one or more of the above depicted components from one or more of the above depicted subsystems shown in FIG. 25. Components from the conditioning signal modulation component group can be used in implementing execution of the one or more conditioning signal modulation instructions i1114 of FIG. 39, can be used in performance of the conditioning signal modulation electrical circuitry arrangement e1114 of FIG. 32, and/or can be used in otherwise fulfillment of the operation o1114. An exemplary non-transitory signal bearing medium version of the information storage subsystem s200 is depicted in FIG. 39 as bearing the one or more conditioning signal modulation instructions i1114 that when executed will direct performance of the operation o1114. Furthermore, the conditioning signal modulation electrical circuitry arrangement ("elec circ arrange") e1114, when activated, will perform the operation o1114. Also, the conditioning signal modulation module m1114, when executed and/or activated, will direct performance of and/or perform the operation o1114. For instance, in one or more exemplary implementations, the one or more conditioning signal modulation instructions i1114, when executed, direct performance of the operation o1114 in the illustrative depiction as follows, and/or the conditioning signal modulation electrical circuitry arrangement e1114, when activated, performs the operation o1114 in the illustrative depiction as follows, and/or the conditioning signal modulation module m1114, when executed and/or activated, directs performance of and/or performs the operation o1114 in the illustrative depiction as follows, and/or the operation o1114 is otherwise carried out in the illustrative depiction as follows: the electronically conditioning (e.g. including one or more digital signal processing portions, etc.) one or more information signals (e.g. including internet based information, etc.) accessed at least in part through one or more portions of a portable electronic device (e.g. from DVD player, etc.) to be transmitted (e.g. from one or more ultrasonic transducer portions, etc.) from one or more portable electronic device emitters (e.g. including one or more air-coupled transducer arrangements, etc.) of said portable electronic device (e.g. including one or more security network components, etc.) through one or more modulated acoustic ultrasonic signals (e.g. via one or more acoustic ultrasonic signals including signals having one or more frequencies above 200 kHz, etc.) including one or more ultrasonic acoustic signal modulation portions of said portable electronic device (e.g. including one or more 120 kHz acoustic ultrasonic signals modulated with audio music signals of a tablet device, etc.).

In one or more implementations, as shown in FIG. 58, operation o11 includes an operation o1115 for the electronically conditioning one or more information signals accessed at least in part through one or more portions of a portable electronic device to be transmitted from one or more portable electronic device emitters of said portable electronic device through one or more modulated acoustic ultrasonic signals including one or more ultrasonic transducer portions of said portable electronic device. Origination of an illustratively derived conditioning ultrasonic transducer component group can be accomplished through skilled in the art design choice selection of one or more of the above depicted components from one or more of the above depicted subsystems shown in FIG. 25. Components from the conditioning ultrasonic transducer component group can be used in implementing execution of the one or more conditioning ultrasonic transducer instructions i1115 of FIG. 39, can be used in performance of the conditioning ultrasonic transducer electrical circuitry arrangement e1115 of FIG. 32, and/or can be used in otherwise fulfillment of the operation o1115. An exemplary non-transitory signal bearing medium version of the information storage subsystem s200 is depicted in FIG. 39 as bearing the one or more conditioning ultrasonic transducer instructions i1115 that when executed will direct performance of the operation o1115. Furthermore, the conditioning ultrasonic transducer electrical circuitry arrangement ("elec circ arrange") e1115, when activated, will perform the operation o1115. Also, the conditioning ultrasonic transducer module m1115, when executed and/or activated, will direct performance of and/or perform the operation o1115. For instance, in one or more exemplary implementations, the one or more conditioning ultrasonic transducer instructions i1115, when executed, direct performance of the operation o1115 in the illustrative depiction as follows, and/or the conditioning ultrasonic transducer electrical circuitry arrangement e1115, when activated, performs the operation o1115 in the illustrative depiction as follows, and/or the conditioning ultrasonic transducer module m1115, when executed and/or activated, directs performance of and/or performs the operation o1115 in the illustrative depiction as follows, and/or the operation o1115 is otherwise carried out in the illustrative depiction as follows: the electronically conditioning (e.g. including one or more central processing unit portions, etc.) one or more information signals (e.g. including digital audio information, etc.) accessed at least in part through one or more portions of a portable electronic device (e.g. using mp3 media player, etc.) to be transmitted (e.g. using one or more electrostatic transducer portions, etc.) from one or more portable electronic device emitters (e.g. including one or more thin-film membrane arrangements, etc.) of said portable electronic device (e.g. including one or more netbook components, etc.) through one or more modulated acoustic ultrasonic signals (e.g. via one or more acoustic ultrasonic signals including signals having one or more frequencies above 180 kHz, etc.) including one or more ultrasonic transducer portions of said portable electronic device (e.g. including one or more thin film transducer portions of a tablet computer, etc.).

In one or more implementations, as shown in FIG. 59, operation o11 includes an operation o1116 for the electronically conditioning one or more information signals accessed at least in part through one or more portions of a portable electronic device to be transmitted from one or more portable electronic device emitters of said portable electronic device through one or more modulated acoustic ultrasonic signals including one or more signal processing portions of said portable electronic device. Origination of an illustratively derived conditioning signal processing component group can be accomplished through skilled in the art design choice selection of one or more of the above depicted components from one or more of the above depicted subsystems shown in FIG. 25. Components from the conditioning signal processing component group can be used in implementing execution of the one or more conditioning signal processing instructions i1116 of FIG. 39, can be used in performance of the conditioning signal processing electrical circuitry arrangement e1116 of FIG. 32, and/or can be used in otherwise fulfillment of the operation o1116. An exemplary non-transitory signal bearing medium version of the information storage subsystem s200 is depicted in FIG. 39 as bearing the one or more conditioning signal processing instructions i1116 that when executed will direct performance of the operation o1116. Furthermore, the conditioning signal processing electrical circuitry arrangement ("elec circ arrange") e1116, when activated, will perform the operation o1116. Also, the conditioning signal processing module m1116, when executed and/or activated, will direct performance of and/or perform the operation o1116. For instance, in one or more exemplary implementations, the one or more conditioning signal processing instructions i1116, when executed, direct performance of the operation o1116 in the illustrative depiction as follows, and/or the conditioning signal processing electrical circuitry arrangement e1116, when activated, performs the operation o1116 in the illustrative depiction as follows, and/or the conditioning signal processing module m1116, when executed and/or activated, directs performance of and/or performs the operation o1116 in the illustrative depiction as follows, and/or the operation o1116 is otherwise carried out in the illustrative depiction as follows: the electronically conditioning (e.g. including one or more analog processor portions, etc.) one or more information signals (e.g. including analog audio information, etc.) accessed at least in part through one or more portions of a portable electronic device (e.g. through internet communication protocols, etc.) to be transmitted (e.g. through one or more piezoelectric transducer portions, etc.) from one or more portable electronic device emitters (e.g. including one or more resonant surface arrangements, etc.) of said portable electronic device (e.g. including one or more ultrabook components, etc.) through one or more modulated acoustic ultrasonic signals (e.g. via multiple acoustic ultrasonic signals configured to be demodulated through mutual interference therewith to at least in part result in one or more acoustic audio signals, etc.) including one or more signal processing portions of said portable electronic device (e.g. including one or more tablet signal compression processor portions, etc.).

In one or more implementations, as shown in FIG. 59, operation o11 includes an operation o1117 for the electronically conditioning one or more information signals accessed at least in part through one or more portions of a portable electronic device to be transmitted from one or more portable electronic device emitters of said portable electronic device through one or more modulated acoustic ultrasonic signals including one or more microprocessor portions of said portable electronic device. Origination of an illustratively derived conditioning microprocessor component group can be accomplished through skilled in the art design choice selection of one or more of the above depicted components from one or more of the above depicted subsystems shown in FIG. 25. Components from the conditioning microprocessor component group can be used in implementing execution of the one or more conditioning microprocessor instructions i1117 of FIG. 39, can be used in performance of the conditioning microprocessor electrical circuitry arrangement e1117 of FIG. 32, and/or can be used in otherwise fulfillment of the operation o1117. An exemplary non-transitory signal bearing medium version of the information storage subsystem s200 is depicted in FIG. 39 as bearing the one or more conditioning microprocessor instructions i1117 that when executed will direct performance of the operation o1117. Furthermore, the conditioning microprocessor electrical circuitry arrangement ("elec circ arrange") e1117, when activated, will perform the operation o1117. Also, the conditioning microprocessor module m1117, when executed and/or activated, will direct performance of and/or perform the operation o1117. For instance, in one or more exemplary implementations, the one or more conditioning microprocessor instructions i1117, when executed, direct performance of the operation o1117 in the illustrative depiction as follows, and/or the conditioning microprocessor electrical circuitry arrangement e1117, when activated, performs the operation o1117 in the illustrative depiction as follows, and/or the conditioning microprocessor module m1117, when executed and/or activated, directs performance of and/or performs the operation o1117 in the illustrative depiction as follows, and/or the operation o1117 is otherwise carried out in the illustrative depiction as follows: the electronically conditioning (e.g. including one or more digital decompression portions, etc.) one or more information signals (e.g. including high frequency audio information, etc.) accessed at least in part through one or more portions of a portable electronic device (e.g. including one or more 3G mobile components, etc.) to be transmitted (e.g. via one or more electrostrictive transducer portions, etc.) from one or more portable electronic device emitters (e.g. including one or more transmitter arrangements, etc.) of said portable electronic device (e.g. including one or more flip-phone components, etc.) through one or more modulated acoustic ultrasonic signals (e.g. via one or more acoustic ultrasonic signals configured to be demodulated through nonlinear atmospheric interaction to at least in part generate one or more acoustic audio signals, etc.) including one or more microprocessor portions of said portable electronic device (e.g. including one or more smart phone microprocessor portions, etc.).

In one or more implementations, as shown in FIG. 59, operation o11 includes an operation o1118 for the electronically conditioning one or more information signals accessed at least in part through one or more portions of a portable electronic device to be transmitted from one or more portable electronic device emitters of said portable electronic device through one or more modulated acoustic ultrasonic signals including one or more digital processor portions of said portable electronic device for inserting digital information into said audio output information. Origination of an illustratively derived conditioning for inserting digital component group can be accomplished through skilled in the art design choice selection of one or more of the above depicted components from one or more of the above depicted subsystems shown in FIG. 25. Components from the conditioning for inserting digital component group can be used in implementing execution of the one or more conditioning for inserting digital instructions i1118 of FIG. 39, can be used in performance of the conditioning for inserting digital electrical circuitry arrangement e1118 of FIG. 32, and/or can be used in otherwise fulfillment of the operation o1118. An exemplary non-transitory signal bearing medium version of the information storage subsystem s200 is depicted in FIG. 39 as bearing the one or more conditioning for inserting digital instructions i1118 that when executed will direct performance of the operation o1118. Furthermore, the conditioning for inserting digital electrical circuitry arrangement ("elec circ arrange") e1118, when activated, will perform the operation o1118. Also, the conditioning for inserting digital module m1118, when executed and/or activated, will direct performance of and/or perform the operation o1118. For instance, in one or more exemplary implementations, the one or more conditioning for inserting digital instructions i1118, when executed, direct performance of the operation o1118 in the illustrative depiction as follows, and/or the conditioning for inserting digital electrical circuitry arrangement e1118, when activated, performs the operation o1118 in the illustrative depiction as follows, and/or the conditioning for inserting digital module m1118, when executed and/or activated, directs performance of and/or performs the operation o1118 in the illustrative depiction as follows, and/or the operation o1118 is otherwise carried out in the illustrative depiction as follows: the electronically conditioning (e.g. including one or more ultrasonic signal modulation portions, etc.) one or more information signals (e.g. including low frequency audio information, etc.) accessed at least in part through one or more portions of a portable electronic device (e.g. including one or more cellular components, etc.) to be transmitted (e.g. by one or more electro-thermo-mechanical film transducer portions, etc.) from one or more portable electronic device emitters (e.g. including one or more transducer membrane arrangements, etc.) of said portable electronic device (e.g. including one or more portable computer components, etc.) through one or more modulated acoustic ultrasonic signals (e.g. via one or more acoustic ultrasonic signals configured to be demodulated through nonlinear human tissue interaction to at least in part produce one or more acoustic audio signals, etc.) including one or more digital processor portions of said portable electronic device for inserting digital information into said audio output information (e.g. including one or more tablet processor portions to insert one or more digital signatures to track acoustic audio reception quality from a notebook computer, etc.).

In one or more implementations, as shown in FIG. 60, operation o11 includes an operation o1119 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic tablet computer systems. Origination of an illustratively derived conditioning tablet computer component group can be accomplished through skilled in the art design choice selection of one or more of the above depicted components from one or more of the above depicted subsystems shown in FIG. 25. Components from the conditioning tablet computer component group can be used in implementing execution of the one or more conditioning tablet computer instructions i1119 of FIG. 39, can be used in performance of the conditioning tablet computer electrical circuitry arrangement e1119 of FIG. 32, and/or can be used in otherwise fulfillment of the operation o1119. An exemplary non-transitory signal bearing medium version of the information storage subsystem s200 is depicted in FIG. 39 as bearing the one or more conditioning tablet computer instructions i1119 that when executed will direct performance of the operation o1119. Furthermore, the conditioning tablet computer electrical circuitry arrangement ("elec circ arrange") e1119, when activated, will perform the operation o1119. Also, the conditioning tablet computer module m1119, when executed and/or activated, will direct performance of and/or perform the operation o1119. For instance, in one or more exemplary implementations, the one or more conditioning tablet computer instructions i1119, when executed, direct performance of the operation o1119 in the illustrative depiction as follows, and/or the conditioning tablet computer electrical circuitry arrangement e1119, when activated, performs the operation o1119 in the illustrative depiction as follows, and/or the conditioning tablet computer module m1119, when executed and/or activated, directs performance of and/or performs the operation o1119 in the illustrative depiction as follows, and/or the operation o1119 is otherwise carried out in the illustrative depiction as follows: electronically conditioning (e.g. including one or more electronic storage portions, etc.) one or more information signals (e.g. including lecture formatted information, etc.) accessed at least in part through one or more portions of a portable electronic device (e.g. including one or more 4G components, etc.) to be transmitted (e.g. from one or more polyvinylidene fluoride film transducer portions, etc.) from one or more portable electronic device emitters (e.g. including one or more transducer array arrangements, etc.) the of said portable electronic device (e.g. including one or more boombox components, etc.) through one or more modulated acoustic ultrasonic signals (e.g. via one or more acoustic ultrasonic signals configured to be demodulated through nonlinear polymeric interaction to at least in part result in one or more acoustic audio signals, etc.) as one or more electronic tablet computer systems (e.g. including one or more 4G capable tablet computer portions, etc.).

In one or more implementations, as shown in FIG. 60, operation o11 includes an operation o1120 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic handheld mobile device systems. Origination of an illustratively derived conditioning handheld mobile component group can be accomplished through skilled in the art design choice selection of one or more of the above depicted components from one or more of the above depicted subsystems shown in FIG. 25. Components from the conditioning handheld mobile component group can be used in implementing execution of the one or more conditioning handheld mobile instructions i1120 of FIG. 40, can be used in performance of the conditioning handheld mobile electrical circuitry arrangement e1120 of FIG. 33, and/or can be used in otherwise fulfillment of the operation o1120. An exemplary non-transitory signal bearing medium version of the information storage subsystem s200 is depicted in FIG. 40 as bearing the one or more conditioning handheld mobile instructions i1120 that when executed will direct performance of the operation o1120. Furthermore, the conditioning handheld mobile electrical circuitry arrangement ("elec circ arrange") e1120, when activated, will perform the operation o1120. Also, the conditioning handheld mobile module m1120, when executed and/or activated, will direct performance of and/or perform the operation o1120. For instance, in one or more exemplary implementations, the one or more conditioning handheld mobile instructions i1120, when executed, direct performance of the operation o1120 in the illustrative depiction as follows, and/or the conditioning handheld mobile electrical circuitry arrangement e1120, when activated, performs the operation o1120 in the illustrative depiction as follows, and/or the conditioning handheld mobile module m1120, when executed and/or activated, directs performance of and/or performs the operation o1120 in the illustrative depiction as follows, and/or the operation o1120 is otherwise carried out in the illustrative depiction as follows: electronically conditioning (e.g. including one or more random access memory portions, etc.) one or more information signals (e.g. including foreign language speech information, etc.) accessed at least in part through one or more portions of a portable electronic device (e.g. including one or more WiFi components, etc.) to be transmitted (e.g. using one or more deposition transducer portions, etc.) from one or more portable electronic device emitters (e.g. including one or more membrane speaker arrangements, etc.) the of said portable electronic device (e.g. including one or more digital audio output components, etc.) through one or more modulated acoustic ultrasonic signals (e.g. via one or more acoustic ultrasonic signals configured to be demodulated through nonlinear apparel interaction to at least in part produce one or more acoustic audio signals, etc.) as one or more electronic handheld mobile device systems (e.g. including one or more smart phone portions, etc.).

In one or more implementations, as shown in FIG. 60, operation o11 includes an operation o1121 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic cell phone systems. Origination of an illustratively derived conditioning cell phone component group can be accomplished through skilled in the art design choice selection of one or more of the above depicted components from one or more of the above depicted subsystems shown in FIG. 25. Components from the conditioning cell phone component group can be used in implementing execution of the one or more conditioning cell phone instructions i1121 of FIG. 40, can be used in performance of the conditioning cell phone electrical circuitry arrangement e1121 of FIG. 33, and/or can be used in otherwise fulfillment of the operation o1121. An exemplary non-transitory signal bearing medium version of the information storage subsystem s200 is depicted in FIG. 40 as bearing the one or more conditioning cell phone instructions i1121 that when executed will direct performance of the operation o1121. Furthermore, the conditioning cell phone electrical circuitry arrangement ("elec circ arrange") e1121, when activated, will perform the operation o1121. Also, the conditioning cell phone module m1121, when executed and/or activated, will direct performance of and/or perform the operation o1121. For instance, in one or more exemplary implementations, the one or more conditioning cell phone instructions i1121, when executed, direct performance of the operation o1121 in the illustrative depiction as follows, and/or the conditioning cell phone electrical circuitry arrangement e1121, when activated, performs the operation o1121 in the illustrative depiction as follows, and/or the conditioning cell phone module m1121, when executed and/or activated, directs performance of and/or performs the operation o1121 in the illustrative depiction as follows, and/or the operation o1121 is otherwise carried out in the illustrative depiction as follows: electronically conditioning (e.g. including one or more flash drive portions, etc.) one or more information signals (e.g. including classical music selection information, etc.) accessed at least in part through one or more portions of a portable electronic device (e.g. including one or more infrared components, etc.) to be transmitted (e.g. through one or more emitter array portions, etc.) from one or more portable electronic device emitters (e.g. including one or more ultrasonic transducer arrangements, etc.) the of said portable electronic device (e.g. including one or more CD player components, etc.) through one or more modulated acoustic ultrasonic signals (e.g. via one or more acoustic ultrasonic signals configured to be demodulated through nonlinear interaction with one or more solids to at least in part generate one or more acoustic audio signals, etc.) as one or more electronic cell phone systems (e.g. including one or more cellular flip-phone portions, etc.).

Figure 61:
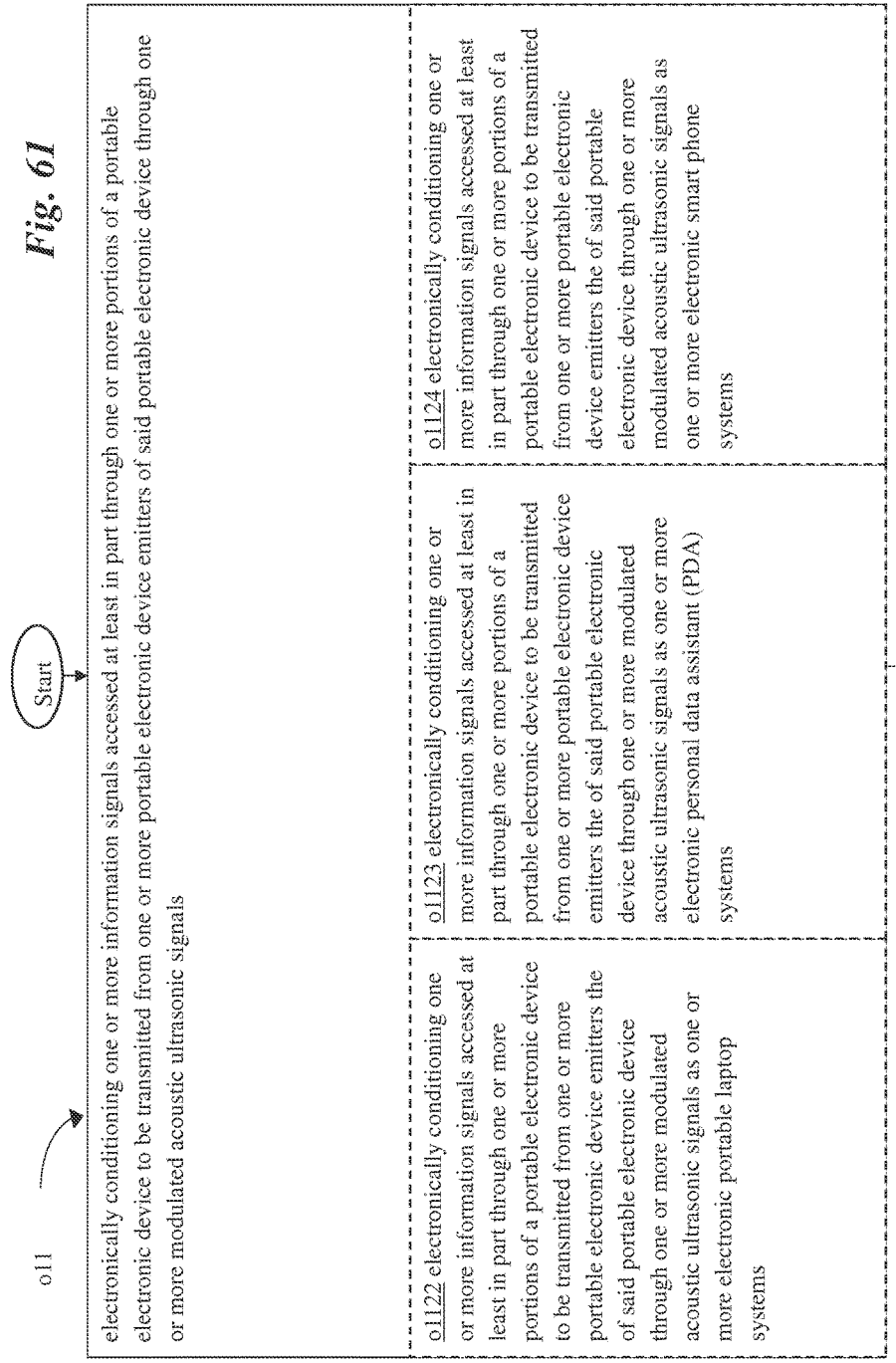
FIG. 61 is a high-level flowchart including exemplary implementations of operation o11 of FIG. 53.

In one or more implementations, as shown in FIG. 61, operation o11 includes an operation o1122 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic portable laptop systems. Origination of an illustratively derived conditioning portable laptop component group can be accomplished through skilled in the art design choice selection of one or more of the above depicted components from one or more of the above depicted subsystems shown in FIG. 25. Components from the conditioning portable laptop component group can be used in implementing execution of the one or more conditioning portable laptop instructions i1122 of FIG. 40, can be used in performance of the conditioning portable laptop electrical circuitry arrangement e1122 of FIG. 33, and/or can be used in otherwise fulfillment of the operation o1122. An exemplary non-transitory signal bearing medium version of the information storage subsystem s200 is depicted in FIG. 40 as bearing the one or more conditioning portable laptop instructions i1122 that when executed will direct performance of the operation o1122. Furthermore, the conditioning portable laptop electrical circuitry arrangement ("elec circ arrange") e1122, when activated, will perform the operation o1122. Also, the conditioning portable laptop module m1122, when executed and/or activated, will direct performance of and/or perform the operation o1122. For instance, in one or more exemplary implementations, the one or more conditioning portable laptop instructions i1122, when executed, direct performance of the operation o1122 in the illustrative depiction as follows, and/or the conditioning portable laptop electrical circuitry arrangement e1122, when activated, performs the operation o1122 in the illustrative depiction as follows, and/or the conditioning portable laptop module m1122, when executed and/or activated, directs performance of and/or performs the operation o1122 in the illustrative depiction as follows, and/or the operation o1122 is otherwise carried out in the illustrative depiction as follows: electronically conditioning (e.g. including one or more portable memory portions, etc.) one or more information signals (e.g. including instructional lesson material information, etc.) accessed at least in part through one or more portions of a portable electronic device (e.g. including one or more personal digital assistant components, etc.) to be transmitted (e.g. via one or more dispersed transducer portions, etc.) from one or more portable electronic device emitters (e.g. including one or more electrostatic transducer arrangements, etc.) the of said portable electronic device (e.g. including one or more digital music player components, etc.) through one or more modulated acoustic ultrasonic signals (e.g. via one or more acoustic ultrasonic signals including signals having one or more frequencies above 60 kHz, etc.) as one or more electronic portable laptop systems (e.g. including one or more business laptop portions, etc.).

In one or more implementations, as shown in FIG. 61, operation o11 includes an operation o1123 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic personal data assistant (PDA) systems. Origination of an illustratively derived conditioning PDA component group can be accomplished through skilled in the art design choice selection of one or more of the above depicted components from one or more of the above depicted subsystems shown in FIG. 25. Components from the conditioning PDA component group can be used in implementing execution of the one or more conditioning PDA instructions i1123 of FIG. 40, can be used in performance of the conditioning PDA electrical circuitry arrangement e1123 of FIG. 33, and/or can be used in otherwise fulfillment of the operation o1123. An exemplary non-transitory signal bearing medium version of the information storage subsystem s200 is depicted in FIG. 40 as bearing the one or more conditioning PDA instructions i1123 that when executed will direct performance of the operation o1123. Furthermore, the conditioning PDA electrical circuitry arrangement ("elec circ arrange") e1123, when activated, will perform the operation o1123. Also, the conditioning PDA module m1123, when executed and/or activated, will direct performance of and/or perform the operation o1123. For instance, in one or more exemplary implementations, the one or more conditioning PDA instructions i1123, when executed, direct performance of the operation o1123 in the illustrative depiction as follows, and/or the conditioning PDA electrical circuitry arrangement e1123, when activated, performs the operation o1123 in the illustrative depiction as follows, and/or the conditioning PDA module m1123, when executed and/or activated, directs performance of and/or performs the operation o1123 in the illustrative depiction as follows, and/or the operation o1123 is otherwise carried out in the illustrative depiction as follows: electronically conditioning (e.g. including one or more backup storage portions, etc.) one or more information signals (e.g. including warning tone information, etc.) accessed at least in part through one or more portions of a portable electronic device (e.g. including one or more smart phone components, etc.) to be transmitted (e.g. by one or more monitor embedded transducer portions, etc.) from one or more portable electronic device emitters (e.g. including one or more piezoelectric transducer arrangements, etc.) the of said portable electronic device (e.g. including one or more handheld radio components, etc.) through one or more modulated acoustic ultrasonic signals (e.g. via one or more acoustic ultrasonic signals including signals having one or more frequencies above 80 kHz, etc.) as one or more electronic personal data assistant (PDA) systems (e.g. including one or more credit card sized electronic managers, etc.).

In one or more implementations, as shown in FIG. 61, operation o11 includes an operation o1124 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic smart phone systems. Origination of an illustratively derived conditioning smart phone component group can be accomplished through skilled in the art design choice selection of one or more of the above depicted components from one or more of the above depicted subsystems shown in FIG. 25. Components from the conditioning smart phone component group can be used in implementing execution of the one or more conditioning smart phone instructions i1124 of FIG. 40, can be used in performance of the conditioning smart phone electrical circuitry arrangement e1124 of FIG. 33, and/or can be used in otherwise fulfillment of the operation o1124. An exemplary non-transitory signal bearing medium version of the information storage subsystem s200 is depicted in FIG. 40 as bearing the one or more conditioning smart phone instructions i1124 that when executed will direct performance of the operation o1124. Furthermore, the conditioning smart phone electrical circuitry arrangement ("elec circ arrange") e1124, when activated, will perform the operation o1124. Also, the conditioning smart phone module m1124, when executed and/or activated, will direct performance of and/or perform the operation o1124. For instance, in one or more exemplary implementations, the one or more conditioning smart phone instructions i1124, when executed, direct performance of the operation o1124 in the illustrative depiction as follows, and/or the conditioning smart phone electrical circuitry arrangement e1124, when activated, performs the operation o1124 in the illustrative depiction as follows, and/or the conditioning smart phone module m1124, when executed and/or activated, directs performance of and/or performs the operation o1124 in the illustrative depiction as follows, and/or the operation o1124 is otherwise carried out in the illustrative depiction as follows: electronically conditioning (e.g. including one or more network interface portions, etc.) one or more information signals (e.g. including white noise information, etc.) accessed at least in part through one or more portions of a portable electronic device (e.g. including one or more cell phone components, etc.) to be transmitted (e.g. from one or more keyboard embedded transducer portions, etc.) from one or more portable electronic device emitters (e.g. including one or more electrostrictive transducer arrangements, etc.) the of said portable electronic device (e.g. including one or more spread spectrum components, etc.) through one or more modulated acoustic ultrasonic signals (e.g. via one or more acoustic ultrasonic signals including signals having one or more frequencies above 100 kHz, etc.) as one or more electronic smart phone systems (e.g. including one or more 4G smart phone systems, etc.).

Figure 62:
FIG. 62 is a high-level flowchart including exemplary implementations of operation o11 of FIG. 53.

In one or more implementations, as shown in FIG. 62, operation o11 includes an operation o1125 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic security personnel systems. Origination of an illustratively derived conditioning security personnel component group can be accomplished through skilled in the art design choice selection of one or more of the above depicted components from one or more of the above depicted subsystems shown in FIG. 25. Components from the conditioning security personnel component group can be used in implementing execution of the one or more conditioning security personnel instructions i1125 of FIG. 40, can be used in performance of the conditioning security personnel electrical circuitry arrangement e1125 of FIG. 33, and/or can be used in otherwise fulfillment of the operation o1125. An exemplary non-transitory signal bearing medium version of the information storage subsystem s200 is depicted in FIG. 40 as bearing the one or more conditioning security personnel instructions i1125 that when executed will direct performance of the operation o1125. Furthermore, the conditioning security personnel electrical circuitry arrangement ("elec circ arrange") e1125, when activated, will perform the operation o1125. Also, the conditioning security personnel module m1125, when executed and/or activated, will direct performance of and/or perform the operation o1125. For instance, in one or more exemplary implementations, the one or more conditioning security personnel instructions i1125, when executed, direct performance of the operation o1125 in the illustrative depiction as follows, and/or the conditioning security personnel electrical circuitry arrangement e1125, when activated, performs the operation o1125 in the illustrative depiction as follows, and/or the conditioning security personnel module m1125, when executed and/or activated, directs performance of and/or performs the operation o1125 in the illustrative depiction as follows, and/or the operation o1125 is otherwise carried out in the illustrative depiction as follows: electronically conditioning (e.g. including one or more preamplifier portions, etc.) one or more information signals (e.g. including varying pitch information, etc.) accessed at least in part through one or more portions of a portable electronic device (e.g. including one or more laptop components, etc.) to be transmitted (e.g. using one or more device body embedded transducer portions, etc.) from one or more portable electronic device emitters (e.g. including one or more electro-thermo-mechanical film transducer arrangements, etc.) the of said portable electronic device (e.g. including one or more wireless components, etc.) through one or more modulated acoustic ultrasonic signals (e.g. via one or more acoustic ultrasonic signals including signals having one or more frequencies above 120 kHz, etc.) as one or more electronic security personnel systems (e.g. including one or more two-way radio portions, etc.).

In one or more implementations, as shown in FIG. 62, operation o11 includes an operation o1126 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic athletic sports equipment systems. Origination of an illustratively derived conditioning athletic sports component group can be accomplished through skilled in the art design choice selection of one or more of the above depicted components from one or more of the above depicted subsystems shown in FIG. 25. Components from the conditioning athletic sports component group can be used in implementing execution of the one or more conditioning athletic sports instructions i1126 of FIG. 40, can be used in performance of the conditioning athletic sports electrical circuitry arrangement e1126 of FIG. 33, and/or can be used in otherwise fulfillment of the operation o1126. An exemplary non-transitory signal bearing medium version of the information storage subsystem s200 is depicted in FIG. 40 as bearing the one or more conditioning athletic sports instructions i1126 that when executed will direct performance of the operation o1126. Furthermore, the conditioning athletic sports electrical circuitry arrangement ("elec circ arrange") e1126, when activated, will perform the operation o1126. Also, the conditioning athletic sports module m1126, when executed and/or activated, will direct performance of and/or perform the operation o1126. For instance, in one or more exemplary implementations, the one or more conditioning athletic sports instructions i1126, when executed, direct performance of the operation o1126 in the illustrative depiction as follows, and/or the conditioning athletic sports electrical circuitry arrangement e1126, when activated, performs the operation o1126 in the illustrative depiction as follows, and/or the conditioning athletic sports module m1126, when executed and/or activated, directs performance of and/or performs the operation o1126 in the illustrative depiction as follows, and/or the operation o1126 is otherwise carried out in the illustrative depiction as follows: electronically conditioning (e.g. including one or more transceiver portions, etc.) one or more information signals (e.g. including note sequence information, etc.) accessed at least in part through one or more portions of a portable electronic device (e.g. including one or more tablet computer components, etc.) to be transmitted (e.g. using one or more transmitter portions, etc.) from one or more portable electronic device emitters (e.g. including one or more polyvinylidene fluoride film transducer arrangements, etc.) the of said portable electronic device (e.g. including one or more frequency division multiplexing components, etc.) through one or more modulated acoustic ultrasonic signals (e.g. via one or more acoustic ultrasonic signals including signals having one or more frequencies above 140 kHz, etc.) as one or more electronic athletic sports equipment systems (e.g. including one or more integrated sports helmet communication portions, etc.).

In one or more implementations, as shown in FIG. 62, operation o11 includes an operation o1127 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic wearable media systems. Origination of an illustratively derived conditioning wearable media component group can be accomplished through skilled in the art design choice selection of one or more of the above depicted components from one or more of the above depicted subsystems shown in FIG. 25. Components from the conditioning wearable media component group can be used in implementing execution of the one or more conditioning wearable media instructions i1127 of FIG. 40, can be used in performance of the conditioning wearable media electrical circuitry arrangement e1127 of FIG. 33, and/or can be used in otherwise fulfillment of the operation o1127. An exemplary non-transitory signal bearing medium version of the information storage subsystem s200 is depicted in FIG. 40 as bearing the one or more conditioning wearable media instructions i1127 that when executed will direct performance of the operation o1127. Furthermore, the conditioning wearable media electrical circuitry arrangement ("elec circ arrange") e1127, when activated, will perform the operation o1127. Also, the conditioning wearable media module m1127, when executed and/or activated, will direct performance of and/or perform the operation o1127. For instance, in one or more exemplary implementations, the one or more conditioning wearable media instructions i1127, when executed, direct performance of the operation o1127 in the illustrative depiction as follows, and/or the conditioning wearable media electrical circuitry arrangement e1127, when activated, performs the operation o1127 in the illustrative depiction as follows, and/or the conditioning wearable media module m1127, when executed and/or activated, directs performance of and/or performs the operation o1127 in the illustrative depiction as follows, and/or the operation o1127 is otherwise carried out in the illustrative depiction as follows: electronically conditioning (e.g. including one or more digital amplifier portions, etc.) one or more information signals (e.g. including two-way conversation information, etc.) accessed at least in part through one or more portions of a portable electronic device (e.g. including one or more mp3 player components, etc.) to be transmitted (e.g. through one or more transducer membrane portions, etc.) from one or more portable electronic device emitters (e.g. including one or more deposition transducer arrangements, etc.) the of said portable electronic device (e.g. including one or more time division multiplexing components, etc.) through one or more modulated acoustic ultrasonic signals (e.g. via one or more acoustic ultrasonic signals including signals having one or more frequencies above 160 kHz, etc.) as one or more electronic wearable media systems (e.g. including one or more coat based computer based portions, etc.).

Figure 63:
FIG. 63 is a high-level flowchart including exemplary implementations of operation o11 of FIG. 53.

In one or more implementations, as shown in FIG. 63, operation o11 includes an operation o1128 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic wristwatch systems. Origination of an illustratively derived conditioning wristwatch component group can be accomplished through skilled in the art design choice selection of one or more of the above depicted components from one or more of the above depicted subsystems shown in FIG. 25. Components from the conditioning wristwatch component group can be used in implementing execution of the one or more conditioning wristwatch instructions i1128 of FIG. 40, can be used in performance of the conditioning wristwatch electrical circuitry arrangement e1128 of FIG. 33, and/or can be used in otherwise fulfillment of the operation o1128. An exemplary non-transitory signal bearing medium version of the information storage subsystem s200 is depicted in FIG. 40 as bearing the one or more conditioning wristwatch instructions i1128 that when executed will direct performance of the operation o1128. Furthermore, the conditioning wristwatch electrical circuitry arrangement ("elec circ arrange") e1128, when activated, will perform the operation o1128. Also, the conditioning wristwatch module m1128, when executed and/or activated, will direct performance of and/or perform the operation o1128. For instance, in one or more exemplary implementations, the one or more conditioning wristwatch instructions i1128, when executed, direct performance of the operation o1128 in the illustrative depiction as follows, and/or the conditioning wristwatch electrical circuitry arrangement e1128, when activated, performs the operation o1128 in the illustrative depiction as follows, and/or the conditioning wristwatch module m1128, when executed and/or activated, directs performance of and/or performs the operation o1128 in the illustrative depiction as follows, and/or the operation o1128 is otherwise carried out in the illustrative depiction as follows: electronically conditioning (e.g. including one or more digital compression portions, etc.) one or more information signals (e.g. including confidential information, etc.) accessed at least in part through one or more portions of a portable electronic device (e.g. including one or more mobile phone components, etc.) to be transmitted (e.g. via one or more transducer array portions, etc.) from one or more portable electronic device emitters (e.g. including one or more emitter array arrangements, etc.) the of said portable electronic device (e.g. including one or more clamshell phone components, etc.) through one or more modulated acoustic ultrasonic signals (e.g. via one or more acoustic ultrasonic signals including signals having one or more frequencies above 180 kHz, etc.) as one or more electronic wristwatch systems (e.g. including one or more phone watch portions, etc.).

In one or more implementations, as shown in FIG. 63, operation o11 includes an operation o1129 for electronically conditioning one or more information signals accessed at least in part through one or more portions of a portable electronic device to be transmitted from one or more portable electronic device emitters the of said portable electronic device through one or more modulated acoustic ultrasonic signals as one or more electronic two-way radio systems. Origination of an illustratively derived conditioning two-way radio component group can be accomplished through skilled in the art design choice selection of one or more of the above depicted components from one or more of the above depicted subsystems shown in FIG. 25. Components from the conditioning two-way radio component group can be used in implementing execution of the one or more conditioning two-way radio instructions i1129 of FIG. 40, can be used in performance of the conditioning two-way radio electrical circuitry arrangement e1129 of FIG. 33, and/or can be used in otherwise fulfillment of the operation o1129. An exemplary non-transitory signal bearing medium version of the information storage subsystem s200 is depicted in FIG. 40 as bearing the one or more conditioning two-way radio instructions i1129 that when executed will direct performance of the operation o1129. Furthermore, the conditioning two-way radio electrical circuitry arrangement ("elec circ arrange") e1129, when activated, will perform the operation o1129. Also, the conditioning two-way radio module m1129, when executed and/or activated, will direct performance of and/or perform the operation o1129. For instance, in one or more exemplary implementations, the one or more conditioning two-way radio instructions i1129, when executed, direct performance of the operation o1129 in the illustrative depiction as follows, and/or the conditioning two-way radio electrical circuitry arrangement e1129, when activated, performs the operation o1129 in the illustrative depiction as follows, and/or the conditioning two-way radio module m1129, when executed and/or activated, directs performance of and/or performs the operation o1129 in the illustrative depiction as follows, and/or the operation o1129 is otherwise carried out in the illustrative depiction as follows: electronically conditioning (e.g. including one or more signal limiter portions, etc.) one or more information signals (e.g. including eavesdropping information, etc.) accessed at least in part through one or more portions of a portable electronic device (e.g. including one or more two-way radio components, etc.) to be transmitted (e.g. by one or more membrane speaker portions, etc.) from one or more portable electronic device emitters (e.g. including one or more dispersed transducer arrangements, etc.) the of said portable electronic device (e.g. including one or more media player components, etc.) through one or more modulated acoustic ultrasonic signals (e.g. via one or more acoustic ultrasonic signals including signals having one or more frequencies above 200 kHz, etc.) as one or more electronic two-way radio systems (e.g. including one or more walkie-talkie portions, etc.).

In one or more implementations, as shown in FIG. 63, operation o11 includes an operation o1130 for electronically conditioning one or more information signals accessed at least in part through one or more portions of a portable electronic device the to be transmitted from one or more portable electronic device emitters of said portable electronic device through one or more modulated acoustic ultrasonic signals as through one or more collections of ultrasonic transducers arranged to output one or more beams of acoustic ultrasonic signals. Origination of an illustratively derived conditioning beams component group can be accomplished through skilled in the art design choice selection of one or more of the above depicted components from one or more of the above depicted subsystems shown in FIG. 25. Components from the conditioning beams component group can be used in implementing execution of the one or more conditioning beams instructions i1130 of FIG. 40, can be used in performance of the conditioning beams electrical circuitry arrangement e1130 of FIG. 33, and/or can be used in otherwise fulfillment of the operation o1130. An exemplary non-transitory signal bearing medium version of the information storage subsystem s200 is depicted in FIG. 40 as bearing the one or more conditioning beams instructions i1130 that when executed will direct performance of the operation o1130. Furthermore, the conditioning beams electrical circuitry arrangement ("elec circ arrange") e1130, when activated, will perform the operation o1130. Also, the conditioning beams module m1130, when executed and/or activated, will direct performance of and/or perform the operation o1130. For instance, in one or more exemplary implementations, the one or more conditioning beams instructions i1130, when executed, direct performance of the operation o1130 in the illustrative depiction as follows, and/or the conditioning beams electrical circuitry arrangement e1130, when activated, performs the operation o1130 in the illustrative depiction as follows, and/or the conditioning beams module m1130, when executed and/or activated, directs performance of and/or performs the operation o1130 in the illustrative depiction as follows, and/or the operation o1130 is otherwise carried out in the illustrative depiction as follows: electronically conditioning (e.g. including one or more auxiliary signal output portions, etc.) one or more information signals (e.g. including pre-recorded information, etc.) accessed at least in part through one or more portions of a portable electronic device (e.g. including one or more security network components, etc.) the to be transmitted (e.g. from one or more ultrasonic transducer portions, etc.) from one or more portable electronic device emitters (e.g. including one or more monitor embedded transducer arrangements, etc.) of said portable electronic device (e.g. including one or more 3G mobile components, etc.) through one or more modulated acoustic ultrasonic signals (e.g. via one or more acoustic ultrasonic signals including signals having one or more frequencies above 60 kHz, etc.) as through one or more collections of ultrasonic transducers arranged to output one or more beams of acoustic ultrasonic signals (e.g. including one or more transducer arrays configured to output two interfering ultrasonic beams, etc.).

In one or more implementations, as shown in FIG. 64, operation o11 includes an operation o1131 for electronically conditioning one or more information signals accessed at least in part through one or more portions of a portable electronic device the to be transmitted from one or more portable electronic device emitters of said portable electronic device through one or more modulated acoustic ultrasonic signals via one or more steered beams of acoustic ultrasonic signals. Origination of an illustratively derived conditioning steered beams component group can be accomplished through skilled in the art design choice selection of one or more of the above depicted components from one or more of the above depicted subsystems shown in FIG. 25. Components from the conditioning steered beams component group can be used in implementing execution of the one or more conditioning steered beams instructions i1131 of FIG. 40, can be used in performance of the conditioning steered beams electrical circuitry arrangement e1131 of FIG. 33, and/or can be used in otherwise fulfillment of the operation o1131. An exemplary non-transitory signal bearing medium version of the information storage subsystem s200 is depicted in FIG. 40 as bearing the one or more conditioning steered beams instructions i1131 that when executed will direct performance of the operation o1131. Furthermore, the conditioning steered beams electrical circuitry arrangement ("elec circ arrange") e1131, when activated, will perform the operation o1131. Also, the conditioning steered beams module m1131, when executed and/or activated, will direct performance of and/or perform the operation o1131. For instance, in one or more exemplary implementations, the one or more conditioning steered beams instructions i1131, when executed, direct performance of the operation o1131 in the illustrative depiction as follows, and/or the conditioning steered beams electrical circuitry arrangement e1131, when activated, performs the operation o1131 in the illustrative depiction as follows, and/or the conditioning steered beams module m1131, when executed and/or activated, directs performance of and/or performs the operation o1131 in the illustrative depiction as follows, and/or the operation o1131 is otherwise carried out in the illustrative depiction as follows: electronically conditioning (e.g. including one or more auxiliary signal input portions, etc.) one or more information signals (e.g. including processor generated information, etc.) accessed at least in part through one or more portions of a portable electronic device (e.g. including one or more netbook components, etc.) the to be transmitted (e.g. using one or more electrostatic transducer portions, etc.) from one or more portable electronic device emitters (e.g. including one or more keyboard embedded transducer arrangements, etc.) of said portable electronic device (e.g. including one or more cellular components, etc.) through one or more modulated acoustic ultrasonic signals (e.g. via multiple acoustic ultrasonic signals configured to be demodulated through mutual interference therewith to at least in part result in one or more acoustic audio signals, etc.) via one or more steered beams of acoustic ultrasonic signals (e.g. including one or more phased based beam steering portions, etc.).

In one or more implementations, as shown in FIG. 64, operation o11 includes an operation o1132 for electronically conditioning one or more information signals accessed at least in part through one or more portions of a portable electronic device the to be transmitted from one or more portable electronic device emitters of said portable electronic device through one or more modulated acoustic ultrasonic signals by phased array steering of one or more acoustic ultrasonic signals. Origination of an illustratively derived conditioning phased array component group can be accomplished through skilled in the art design choice selection of one or more of the above depicted components from one or more of the above depicted subsystems shown in FIG. 25. Components from the conditioning phased array component group can be used in implementing execution of the one or more conditioning phased array instructions i1132 of FIG. 40, can be used in performance of the conditioning phased array electrical circuitry arrangement e1132 of FIG. 33, and/or can be used in otherwise fulfillment of the operation o1132. An exemplary non-transitory signal bearing medium version of the information storage subsystem s200 is depicted in FIG. 40 as bearing the one or more conditioning phased array instructions i1132 that when executed will direct performance of the operation o1132. Furthermore, the conditioning phased array electrical circuitry arrangement ("elec circ arrange") e1132, when activated, will perform the operation o1132. Also, the conditioning phased array module m1132, when executed and/or activated, will direct performance of and/or perform the operation o1132. For instance, in one or more exemplary implementations, the one or more conditioning phased array instructions i1132, when executed, direct performance of the operation o1132 in the illustrative depiction as follows, and/or the conditioning phased array electrical circuitry arrangement e1132, when activated, performs the operation o1132 in the illustrative depiction as follows, and/or the conditioning phased array module m1132, when executed and/or activated, directs performance of and/or performs the operation o1132 in the illustrative depiction as follows, and/or the operation o1132 is otherwise carried out in the illustrative depiction as follows: electronically conditioning (e.g. including one or more equalizer portions, etc.) one or more information signals (e.g. including internet based information, etc.) accessed at least in part through one or more portions of a portable electronic device (e.g. including one or more ultrabook components, etc.) the to be transmitted (e.g. through one or more piezoelectric transducer portions, etc.) from one or more portable electronic device emitters (e.g. including one or more device body embedded transducer arrangements, etc.) of said portable electronic device (e.g. including one or more 4G components, etc.) through one or more modulated acoustic ultrasonic signals (e.g. via one or more acoustic ultrasonic signals configured to be demodulated through nonlinear atmospheric interaction to at least in part generate one or more acoustic audio signals, etc.) by phased array steering of one or more acoustic ultrasonic signals (e.g. including steering to a designated location, etc.).

In one or more implementations, as shown in FIG. 64, operation o11 includes an operation o1133 for electronically conditioning one or more information signals accessed at least in part through one or more portions of a portable electronic device the to be transmitted from one or more portable electronic device emitters of said portable electronic device through one or more modulated acoustic ultrasonic signals as one or more acoustic ultrasonic signals modulated via one or more audio signals. Origination of an illustratively derived conditioning audio component group can be accomplished through skilled in the art design choice selection of one or more of the above depicted components from one or more of the above depicted subsystems shown in FIG. 25. Components from the conditioning audio component group can be used in implementing execution of the one or more conditioning audio instructions i1133 of FIG. 40, can be used in performance of the conditioning audio electrical circuitry arrangement e1133 of FIG. 33, and/or can be used in otherwise fulfillment of the operation o1133. An exemplary non-transitory signal bearing medium version of the information storage subsystem s200 is depicted in FIG. 40 as bearing the one or more conditioning audio instructions i1133 that when executed will direct performance of the operation o1133. Furthermore, the conditioning audio electrical circuitry arrangement ("elec circ arrange") e1133, when activated, will perform the operation o1133. Also, the conditioning audio module m1133, when executed and/or activated, will direct performance of and/or perform the operation o1133. For instance, in one or more exemplary implementations, the one or more conditioning audio instructions i1133, when executed, direct performance of the operation o1133 in the illustrative depiction as follows, and/or the conditioning audio electrical circuitry arrangement e1133, when activated, performs the operation o1133 in the illustrative depiction as follows, and/or the conditioning audio module m1133, when executed and/or activated, directs performance of and/or performs the operation o1133 in the illustrative depiction as follows, and/or the operation o1133 is otherwise carried out in the illustrative depiction as follows: electronically conditioning (e.g. including one or more modulation portions, etc.) one or more information signals (e.g. including digital audio information, etc.) accessed at least in part through one or more portions of a portable electronic device (e.g. including one or more flip-phone components, etc.) the to be transmitted (e.g. via one or more electrostrictive transducer portions, etc.) from one or more portable electronic device emitters (e.g. including one or more device perimeter embedded transducer arrangements, etc.) of said portable electronic device (e.g. including one or more WiFi components, etc.) through one or more modulated acoustic ultrasonic signals (e.g. via one or more acoustic ultrasonic signals configured to be demodulated through nonlinear human tissue interaction to at least in part produce one or more acoustic audio signals, etc.) as one or more acoustic ultrasonic signals modulated via one or more audio signals (e.g. including one or more 120 kHz signals being modulated by human speech based signals, etc.).

Figure 65:
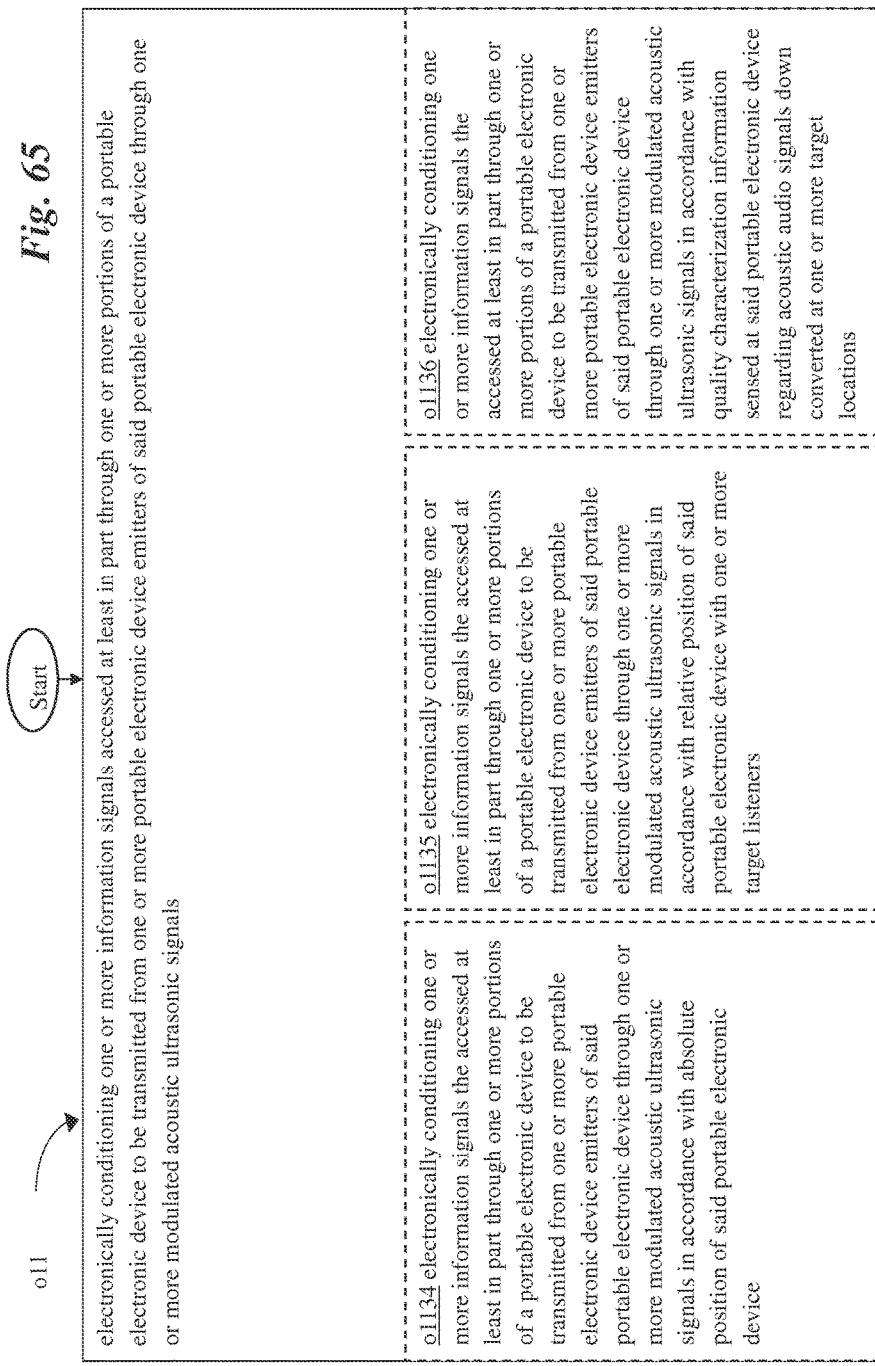
FIG. 65 is a high-level flowchart including exemplary implementations of operation o11 of FIG. 53.

In one or more implementations, as shown in FIG. 65, operation o11 includes an operation o1134 for electronically conditioning one or more information signals the accessed at least in part through one or more portions of a portable electronic device to be transmitted from one or more portable electronic device emitters of said portable electronic device through one or more modulated acoustic ultrasonic signals in accordance with absolute position of said portable electronic device. Origination of an illustratively derived conditioning absolute position component group can be accomplished through skilled in the art design choice selection of one or more of the above depicted components from one or more of the above depicted subsystems shown in FIG. 25. Components from the conditioning absolute position component group can be used in implementing execution of the one or more conditioning absolute position instructions i1134 of FIG. 40, can be used in performance of the conditioning absolute position electrical circuitry arrangement e1134 of FIG. 33, and/or can be used in otherwise fulfillment of the operation o1134. An exemplary non-transitory signal bearing medium version of the information storage subsystem s200 is depicted in FIG. 40 as bearing the one or more conditioning absolute position instructions i1134 that when executed will direct performance of the operation o1134. Furthermore, the conditioning absolute position electrical circuitry arrangement ("elec circ arrange") e1134, when activated, will perform the operation o1134. Also, the conditioning absolute position module m1134, when executed and/or activated, will direct performance of and/or perform the operation o1134. For instance, in one or more exemplary implementations, the one or more conditioning absolute position instructions i1134, when executed, direct performance of the operation o1134 in the illustrative depiction as follows, and/or the conditioning absolute position electrical circuitry arrangement e1134, when activated, performs the operation o1134 in the illustrative depiction as follows, and/or the conditioning absolute position module m1134, when executed and/or activated, directs performance of and/or performs the operation o1134 in the illustrative depiction as follows, and/or the operation o1134 is otherwise carried out in the illustrative depiction as follows: electronically conditioning (e.g. including one or more signal mixing portions, etc.) one or more information signals (e.g. including analog audio information, etc.) the accessed at least in part through one or more portions of a portable electronic device (e.g. including one or more portable computer components, etc.) to be transmitted (e.g. by one or more electro-thermo-mechanical film transducer portions, etc.) from one or more portable electronic device emitters (e.g. including one or more multiple emitter array arrangements, etc.) of said portable electronic device (e.g. including one or more infrared components, etc.) through one or more modulated acoustic ultrasonic signals (e.g. via one or more acoustic ultrasonic signals configured to be demodulated through nonlinear polymeric interaction to at least in part result in one or more acoustic audio signals, etc.) in accordance with absolute position of said portable electronic device (e.g. based on GPS coordinates, etc.).

In one or more implementations, as shown in FIG. 65, operation o11 includes an operation o1135 for electronically conditioning one or more information signals the accessed at least in part through one or more portions of a portable electronic device to be transmitted from one or more portable electronic device emitters of said portable electronic device through one or more modulated acoustic ultrasonic signals in accordance with relative position of said portable electronic device with one or more target listeners. Origination of an illustratively derived conditioning relative position component group can be accomplished through skilled in the art design choice selection of one or more of the above depicted components from one or more of the above depicted subsystems shown in FIG. 25. Components from the conditioning relative position component group can be used in implementing execution of the one or more conditioning relative position instructions i1135 of FIG. 40, can be used in performance of the conditioning relative position electrical circuitry arrangement e1135 of FIG. 33, and/or can be used in otherwise fulfillment of the operation o1135. An exemplary non-transitory signal bearing medium version of the information storage subsystem s200 is depicted in FIG. 40 as bearing the one or more conditioning relative position instructions i1135 that when executed will direct performance of the operation o1135. Furthermore, the conditioning relative position electrical circuitry arrangement ("elec circ arrange") e1135, when activated, will perform the operation o1135. Also, the conditioning relative position module m1135, when executed and/or activated, will direct performance of and/or perform the operation o1135. For instance, in one or more exemplary implementations, the one or more conditioning relative position instructions i1135, when executed, direct performance of the operation o1135 in the illustrative depiction as follows, and/or the conditioning relative position electrical circuitry arrangement e1135, when activated, performs the operation o1135 in the illustrative depiction as follows, and/or the conditioning relative position module m1135, when executed and/or activated, directs performance of and/or performs the operation o1135 in the illustrative depiction as follows, and/or the operation o1135 is otherwise carried out in the illustrative depiction as follows: electronically conditioning (e.g. including one or more ultrasonic generator portions, etc.) one or more information signals (e.g. including high frequency audio information, etc.) the accessed at least in part through one or more portions of a portable electronic device (e.g. including one or more boombox components, etc.) to be transmitted (e.g. from one or more polyvinylidene fluoride film transducer portions, etc.) from one or more portable electronic device emitters (e.g. including one or more perimeter arrays, etc.) of said portable electronic device (e.g. including one or more personal digital assistant components, etc.) through one or more modulated acoustic ultrasonic signals (e.g. via one or more acoustic ultrasonic signals configured to be demodulated through nonlinear apparel interaction to at least in part produce one or more acoustic audio signals, etc.) in accordance with relative position of said portable electronic device with one or more target listeners (e.g. based on distance from a tablet to a group of listeners ranged through ultrasonic signals, etc.).

In one or more implementations, as shown in FIG. 65, operation o11 includes an operation o1136 for electronically conditioning one or more information signals the accessed at least in part through one or more portions of a portable electronic device to be transmitted from one or more portable electronic device emitters of said portable electronic device through one or more modulated acoustic ultrasonic signals in accordance with quality characterization information sensed at said portable electronic device regarding acoustic audio signals down converted at one or more target locations. Origination of an illustratively derived conditioning quality characterization target locations component group can be accomplished through skilled in the art design choice selection of one or more of the above depicted components from one or more of the above depicted subsystems shown in FIG. 25. Components from the conditioning quality characterization target locations component group can be used in implementing execution of the one or more conditioning quality characterization target locations instructions i1136 of FIG. 40, can be used in performance of the conditioning quality characterization target locations electrical circuitry arrangement e1136 of FIG. 33, and/or can be used in otherwise fulfillment of the operation o1136. An exemplary non-transitory signal bearing medium version of the information storage subsystem s200 is depicted in FIG. 40 as bearing the one or more conditioning quality characterization target locations instructions i1136 that when executed will direct performance of the operation o1136. Furthermore, the conditioning quality characterization target locations electrical circuitry arrangement ("elec circ arrange") e1136, when activated, will perform the operation o1136. Also, the conditioning quality characterization target locations module m1136, when executed and/or activated, will direct performance of and/or perform the operation o1136. For instance, in one or more exemplary implementations, the one or more conditioning quality characterization target locations instructions i1136, when executed, direct performance of the operation o1136 in the illustrative depiction as follows, and/or the conditioning quality characterization target locations electrical circuitry arrangement e1136, when activated, performs the operation o1136 in the illustrative depiction as follows, and/or the conditioning quality characterization target locations module m1136, when executed and/or activated, directs performance of and/or performs the operation o1136 in the illustrative depiction as follows, and/or the operation o1136 is otherwise carried out in the illustrative depiction as follows: electronically conditioning (e.g. more digital decompression portions, etc.) one or more information signals (e.g. including low frequency audio information, etc.) the accessed at least in part through one or more portions of a portable electronic device (e.g. including one or more digital audio output components, etc.) to be transmitted (e.g. using one or more deposition transducer portions, etc.) from one or more portable electronic device emitters (e.g. including one or more polar arrays, etc.) of said portable electronic device (e.g. including one or more smart phone components, etc.) through one or more modulated acoustic ultrasonic signals (e.g. via one or more acoustic ultrasonic signals configured to be demodulated through nonlinear interaction with one or more solids to at least in part generate one or more acoustic audio signals, etc.) in accordance with quality characterization information sensed at said portable electronic device regarding acoustic audio signals down converted at one or more target locations (e.g. based on sensing down-converted audio quality through one or more microphone sensing portions of a tablet computer, etc.).

Figure 66:
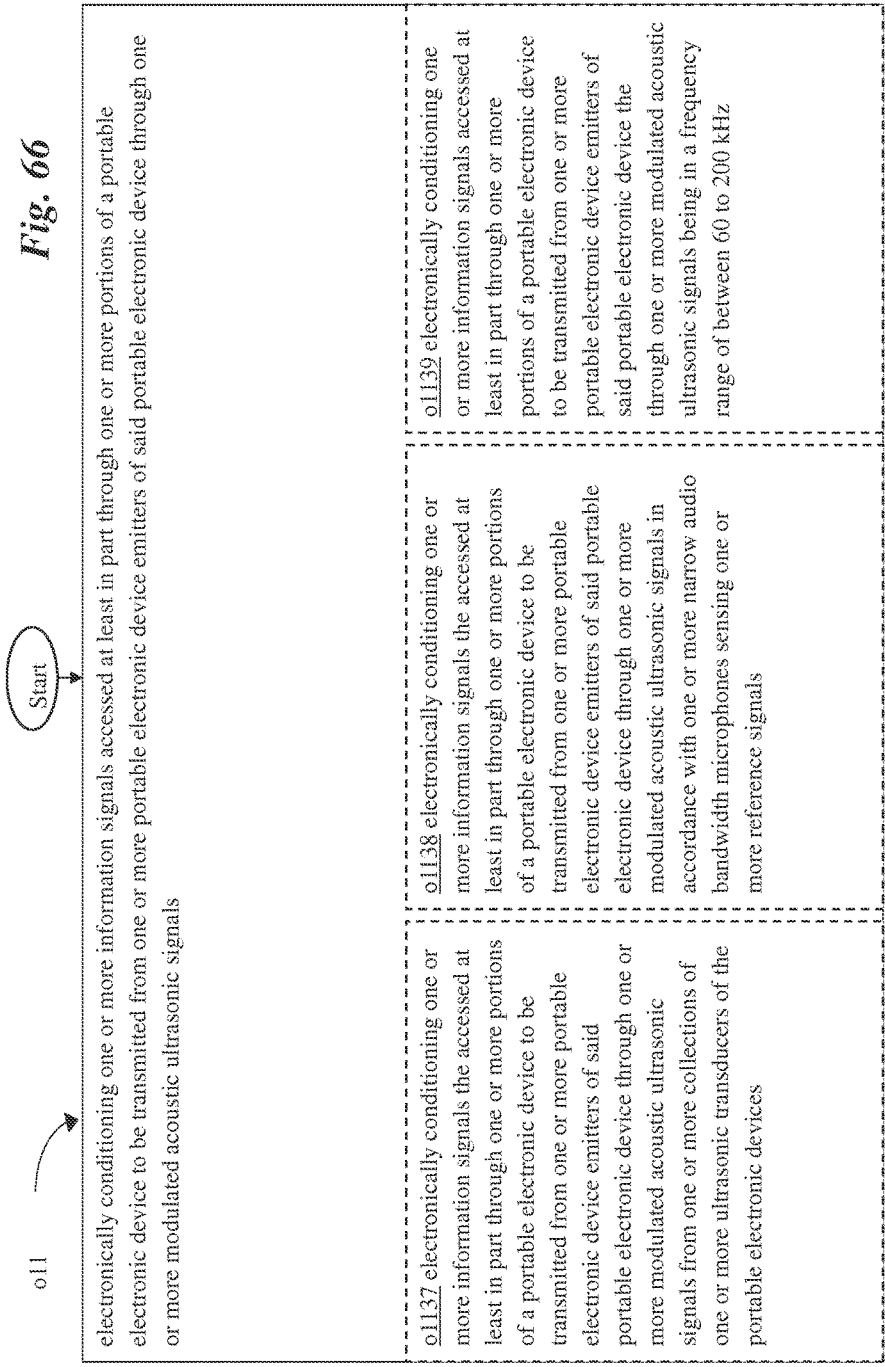
FIG. 66 is a high-level flowchart including exemplary implementations of operation o11 of FIG. 53.

In one or more implementations, as shown in FIG. 66, operation o11 includes an operation o1137 for electronically conditioning one or more information signals the accessed at least in part through one or more portions of a portable electronic device to be transmitted from one or more portable electronic device emitters of said portable electronic device through one or more modulated acoustic ultrasonic signals from one or more collections of one or more ultrasonic transducers of the portable electronic devices. Origination of an illustratively derived conditioning ultrasonic transducers component group can be accomplished through skilled in the art design choice selection of one or more of the above depicted components from one or more of the above depicted subsystems shown in FIG. 25. Components from the conditioning ultrasonic transducers component group can be used in implementing execution of the one or more conditioning ultrasonic transducers instructions i1137 of FIG. 40, can be used in performance of the conditioning ultrasonic transducers electrical circuitry arrangement e1137 of FIG. 33, and/or can be used in otherwise fulfillment of the operation o1137. An exemplary non-transitory signal bearing medium version of the information storage subsystem s200 is depicted in FIG. 40 as bearing the one or more conditioning ultrasonic transducers instructions i1137 that when executed will direct performance of the operation o1137. Furthermore, the conditioning ultrasonic transducers electrical circuitry arrangement ("elec circ arrange") e1137, when activated, will perform the operation o1137. Also, the conditioning ultrasonic transducers module m1137, when executed and/or activated, will direct performance of and/or perform the operation o1137. For instance, in one or more exemplary implementations, the one or more conditioning ultrasonic transducers instructions i1137, when executed, direct performance of the operation o1137 in the illustrative depiction as follows, and/or the conditioning ultrasonic transducers electrical circuitry arrangement e1137, when activated, performs the operation o1137 in the illustrative depiction as follows, and/or the conditioning ultrasonic transducers module m1137, when executed and/or activated, directs performance of and/or performs the operation o1137 in the illustrative depiction as follows, and/or the operation o1137 is otherwise carried out in the illustrative depiction as follows: electronically conditioning (e.g. including one or more ultrasonic signal modulation portions, etc.) one or more information signals (e.g. including lecture formatted information, etc.) the accessed at least in part through one or more portions of a portable electronic device (e.g. including one or more CD player components, etc.) to be transmitted (e.g. through one or more emitter array portions, etc.) from one or more portable electronic device emitters (e.g. including one or more orthographic arrays, etc.) of said portable electronic device (e.g. including one or more cell phone components, etc.) through one or more modulated acoustic ultrasonic signals (e.g. via one or more acoustic ultrasonic signals including signals having one or more frequencies above 60 kHz, etc.) from one or more collections of one or more ultrasonic transducers of the portable electronic devices (e.g. including one or more arrays of transducers located around a perimeter of a tablet computer, etc.).

In one or more implementations, as shown in FIG. 66, operation o11 includes an operation o1138 for electronically conditioning one or more information signals the accessed at least in part through one or more portions of a portable electronic device to be transmitted from one or more portable electronic device emitters of said portable electronic device through one or more modulated acoustic ultrasonic signals in accordance with one or more narrow audio bandwidth microphones sensing one or more reference signals. Origination of an illustratively derived conditioning reference component group can be accomplished through skilled in the art design choice selection of one or more of the above depicted components from one or more of the above depicted subsystems shown in FIG. 25. Components from the conditioning reference component group can be used in implementing execution of the one or more conditioning reference instructions i1138 of FIG. 40, can be used in performance of the conditioning reference electrical circuitry arrangement e1138 of FIG. 33, and/or can be used in otherwise fulfillment of the operation o1138. An exemplary non-transitory signal bearing medium version of the information storage subsystem s200 is depicted in FIG. 40 as bearing the one or more conditioning reference instructions i1138 that when executed will direct performance of the operation o1138. Furthermore, the conditioning reference electrical circuitry arrangement ("elec circ arrange") e1138, when activated, will perform the operation o1138. Also, the conditioning reference module m1138, when executed and/or activated, will direct performance of and/or perform the operation o1138. For instance, in one or more exemplary implementations, the one or more conditioning reference instructions i1138, when executed, direct performance of the operation o1138 in the illustrative depiction as follows, and/or the conditioning reference electrical circuitry arrangement e1138, when activated, performs the operation o1138 in the illustrative depiction as follows, and/or the conditioning reference module m1138, when executed and/or activated, directs performance of and/or performs the operation o1138 in the illustrative depiction as follows, and/or the operation o1138 is otherwise carried out in the illustrative depiction as follows: electronically conditioning (e.g. including one or more electronic storage portions, etc.) one or more information signals (e.g. including foreign language speech information, etc.) the accessed at least in part through one or more portions of a portable electronic device (e.g. including one or more digital music player components, etc.) to be transmitted (e.g. via one or more dispersed transducer portions, etc.) from one or more portable electronic device emitters (e.g. including one or more three-dimensional arrays, etc.) of said portable electronic device (e.g. including one or more laptop components, etc.) through one or more modulated acoustic ultrasonic signals (e.g. via one or more acoustic ultrasonic signals including signals having one or more frequencies above 80 kHz, etc.) in accordance with one or more narrow audio bandwidth microphones sensing one or more reference signals (e.g. including one or more microphones located in a smart phone to sense digitally coded audio signals modulated into an ultrasonic carrier signal, etc.).

In one or more implementations, as shown in FIG. 66, operation o11 includes an operation o1139 for electronically conditioning one or more information signals accessed at least in part through one or more portions of a portable electronic device to be transmitted from one or more portable electronic device emitters of said portable electronic device the through one or more modulated acoustic ultrasonic signals being in a frequency range of between 60 to 200 kHz. Origination of an illustratively derived conditioning more acoustic ultrasonic component group can be accomplished through skilled in the art design choice selection of one or more of the above depicted components from one or more of the above depicted subsystems shown in FIG. 25. Components from the conditioning more acoustic ultrasonic component group can be used in implementing execution of the one or more conditioning more acoustic ultrasonic instructions i1139 of FIG. 40, can be used in performance of the conditioning more acoustic ultrasonic electrical circuitry arrangement e1139 of FIG. 33, and/or can be used in otherwise fulfillment of the operation o1139. An exemplary non-transitory signal bearing medium version of the information storage subsystem s200 is depicted in FIG. 40 as bearing the one or more conditioning more acoustic ultrasonic instructions i1139 that when executed will direct performance of the operation o1139. Furthermore, the conditioning more acoustic ultrasonic electrical circuitry arrangement ("elec circ arrange") e1139, when activated, will perform the operation o1139. Also, the conditioning more acoustic ultrasonic module m1139, when executed and/or activated, will direct performance of and/or perform the operation o1139. For instance, in one or more exemplary implementations, the one or more conditioning more acoustic ultrasonic instructions i1139, when executed, direct performance of the operation o1139 in the illustrative depiction as follows, and/or the conditioning more acoustic ultrasonic electrical circuitry arrangement e1139, when activated, performs the operation o1139 in the illustrative depiction as follows, and/or the conditioning more acoustic ultrasonic module m1139, when executed and/or activated, directs performance of and/or performs the operation o1139 in the illustrative depiction as follows, and/or the operation o1139 is otherwise carried out in the illustrative depiction as follows: electronically conditioning (e.g. including one or more random access memory portions, etc.) one or more information signals (e.g. including classical music selection information, etc.) accessed at least in part through one or more portions of a portable electronic device (e.g. including one or more handheld radio components, etc.) to be transmitted (e.g. by one or more monitor embedded transducer portions, etc.) from one or more portable electronic device emitters (e.g. including one or more scattered arrangements, etc.) of said portable electronic device (e.g. including one or more tablet computer components, etc.) the through one or more modulated acoustic ultrasonic signals (e.g. via one or more acoustic ultrasonic signals including signals having one or more frequencies above 100 kHz, etc.) being in a frequency range of between 60 to 200 kHz (e.g. including an acoustic ultrasonic based carrier signal of 120 kHz, etc.).

Figure 67:
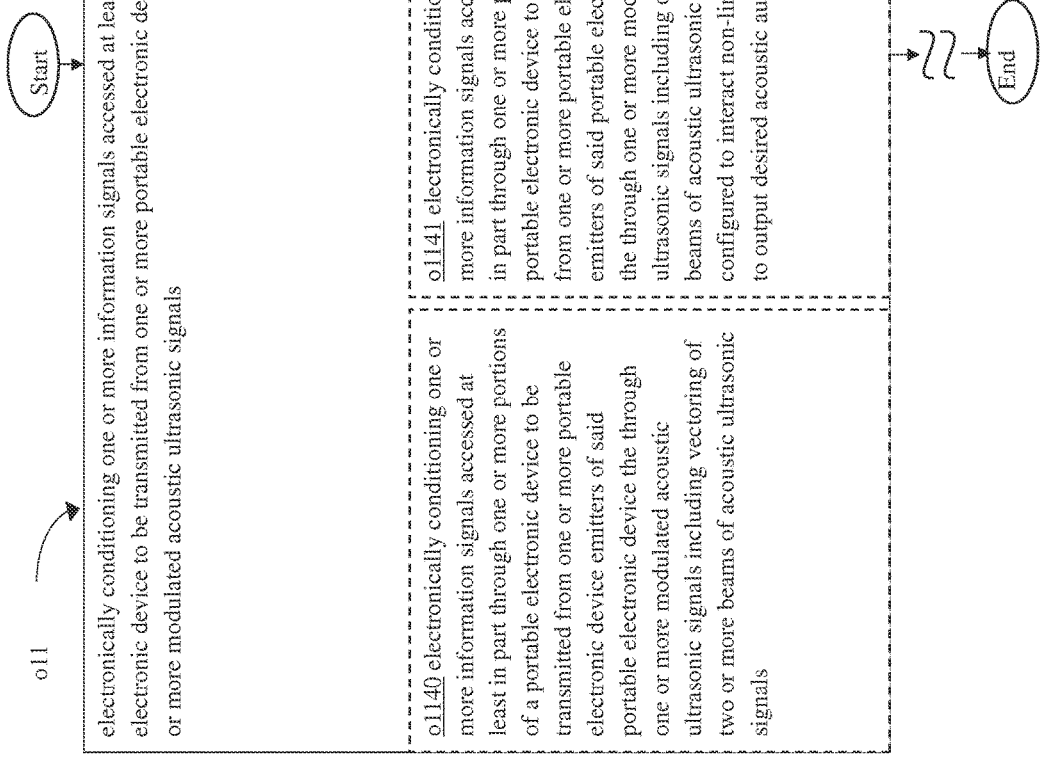
FIG. 67 is a high-level flowchart including exemplary implementations of operation o11 of FIG. 53.

In one or more implementations, as shown in FIG. 67, operation o11 includes an operation o1140 for electronically conditioning one or more information signals accessed at least in part through one or more portions of a portable electronic device to be transmitted from one or more portable electronic device emitters of said portable electronic device the through one or more modulated acoustic ultrasonic signals including vectoring of two or more beams of acoustic ultrasonic signals. Origination of an illustratively derived conditioning vectoring beams component group can be accomplished through skilled in the art design choice selection of one or more of the above depicted components from one or more of the above depicted subsystems shown in FIG. 25. Components from the conditioning vectoring beams component group can be used in implementing execution of the one or more conditioning vectoring beams instructions i1140 of FIG. 41, can be used in performance of the conditioning vectoring beams electrical circuitry arrangement e1140 of FIG. 34, and/or can be used in otherwise fulfillment of the operation o1140. An exemplary non-transitory signal bearing medium version of the information storage subsystem s200 is depicted in FIG. 41 as bearing the one or more conditioning vectoring beams instructions i1140 that when executed will direct performance of the operation o1140. Furthermore, the conditioning vectoring beams electrical circuitry arrangement ("elec circ arrange") e1140, when activated, will perform the operation o1140. Also, the conditioning vectoring beams module m1140, when executed and/or activated, will direct performance of and/or perform the operation o1140. For instance, in one or more exemplary implementations, the one or more conditioning vectoring beams instructions i1140, when executed, direct performance of the operation o1140 in the illustrative depiction as follows, and/or the conditioning vectoring beams electrical circuitry arrangement e1140, when activated, performs the operation o1140 in the illustrative depiction as follows, and/or the conditioning vectoring beams module m1140, when executed and/or activated, directs performance of and/or performs the operation o1140 in the illustrative depiction as follows, and/or the operation o1140 is otherwise carried out in the illustrative depiction as follows: electronically conditioning (e.g. including one or more flash drive portions, etc.) one or more information signals (e.g. including instructional lesson material information, etc.) accessed at least in part through one or more portions of a portable electronic device (e.g. including one or more spread spectrum components, etc.) to be transmitted (e.g. from one or more keyboard embedded transducer portions, etc.) from one or more portable electronic device emitters (e.g. including one or more staggered arrays, etc.) of said portable electronic device (e.g. including one or more mp3 player components, etc.) the through one or more modulated acoustic ultrasonic signals (e.g. via one or more acoustic ultrasonic signals including signals having one or more frequencies above 120 kHz, etc.) including vectoring of two or more beams of acoustic ultrasonic signals (e.g. including transmitting two ultrasonic beams from transducer arrays of a smart phone, etc.).

In one or more implementations, as shown in FIG. 67, operation o11 includes an operation o1141 for electronically conditioning one or more information signals accessed at least in part through one or more portions of a portable electronic device to be transmitted from one or more portable electronic device emitters of said portable electronic device the through one or more modulated acoustic ultrasonic signals including one or more beams of acoustic ultrasonic signals configured to interact non-linearly with air to output desired acoustic audio signals. Origination of an illustratively derived conditioning non-linearly air component group can be accomplished through skilled in the art design choice selection of one or more of the above depicted components from one or more of the above depicted subsystems shown in FIG. 25. Components from the conditioning non-linearly air component group can be used in implementing execution of the one or more conditioning non-linearly air instructions i1141 of FIG. 41, can be used in performance of the conditioning non-linearly air electrical circuitry arrangement e1141 of FIG. 34, and/or can be used in otherwise fulfillment of the operation o1141. An exemplary non-transitory signal bearing medium version of the information storage subsystem s200 is depicted in FIG. 41 as bearing the one or more conditioning non-linearly air instructions i1141 that when executed will direct performance of the operation o1141. Furthermore, the conditioning non-linearly air electrical circuitry arrangement ("elec circ arrange") e1141, when activated, will perform the operation o1141. Also, the conditioning non-linearly air module m1141, when executed and/or activated, will direct performance of and/or perform the operation o1141. For instance, in one or more exemplary implementations, the one or more conditioning non-linearly air instructions i1141, when executed, direct performance of the operation o1141 in the illustrative depiction as follows, and/or the conditioning non-linearly air electrical circuitry arrangement e1141, when activated, performs the operation o1141 in the illustrative depiction as follows, and/or the conditioning non-linearly air module m1141, when executed and/or activated, directs performance of and/or performs the operation o1141 in the illustrative depiction as follows, and/or the operation o1141 is otherwise carried out in the illustrative depiction as follows: electronically conditioning (e.g. including one or more portable memory portions, etc.) one or more information signals (e.g. including warning tone information, etc.) accessed at least in part through one or more portions of a portable electronic device (e.g. including one or more wireless components, etc.) to be transmitted (e.g. using one or more device body embedded transducer portions, etc.) from one or more portable electronic device emitters (e.g. including one or more linear arrangements, etc.) of said portable electronic device (e.g. including one or more mobile phone components, etc.) the through one or more modulated acoustic ultrasonic signals (e.g. via one or more acoustic ultrasonic signals including signals having one or more frequencies above 140 kHz, etc.) including one or more beams of acoustic ultrasonic signals configured to interact non-linearly with air to output desired acoustic audio signals (e.g. including a beam of acoustic ultrasonic signals transmitted from a tablet to interact with air to produce audio near an ear of a target listener, etc.).

In one or more implementations, as shown in FIG. 67, operation o11 includes an operation o1142 for electronically conditioning one or more information signals accessed at least in part through one or more portions of a portable electronic device to be transmitted from one or more portable electronic device emitters of said portable electronic device the through one or more modulated acoustic ultrasonic signals including one or more beams of acoustic ultrasonic signals outputted to interact non-linearly with human tissue to down convert to one or more acoustic audio signals. Origination of an illustratively derived conditioning human tissue component group can be accomplished through skilled in the art design choice selection of one or more of the above depicted components from one or more of the above depicted subsystems shown in FIG. 25. Components from the conditioning human tissue component group can be used in implementing execution of the one or more conditioning human tissue instructions i1142 of FIG. 41, can be used in performance of the conditioning human tissue electrical circuitry arrangement e1142 of FIG. 34, and/or can be used in otherwise fulfillment of the operation o1142. An exemplary non-transitory signal bearing medium version of the information storage subsystem s200 is depicted in FIG. 41 as bearing the one or more conditioning human tissue instructions i1142 that when executed will direct performance of the operation o1142. Furthermore, the conditioning human tissue electrical circuitry arrangement ("elec circ arrange") e1142, when activated, will perform the operation o1142. Also, the conditioning human tissue module m1142, when executed and/or activated, will direct performance of and/or perform the operation o1142. For instance, in one or more exemplary implementations, the one or more conditioning human tissue instructions i1142, when executed, direct performance of the operation o1142 in the illustrative depiction as follows, and/or the conditioning human tissue electrical circuitry arrangement e1142, when activated, performs the operation o1142 in the illustrative depiction as follows, and/or the conditioning human tissue module m1142, when executed and/or activated, directs performance of and/or performs the operation o1142 in the illustrative depiction as follows, and/or the operation o1142 is otherwise carried out in the illustrative depiction as follows: electronically conditioning (e.g. including one or more backup storage portions, etc.) one or more information signals (e.g. including white noise information, etc.) accessed at least in part through one or more portions of a portable electronic device (e.g. including one or more frequency division multiplexing components, etc.) to be transmitted (e.g. through one or more device perimeter embedded transducer portions, etc.) from one or more portable electronic device emitters (e.g. including one or more parabolic arrangements, etc.) of said portable electronic device (e.g. including one or more two-way radio components, etc.) the through one or more modulated acoustic ultrasonic signals (e.g. via one or more acoustic ultrasonic signals including signals having one or more frequencies above 160 kHz, etc.) including one or more beams of acoustic ultrasonic signals outputted to interact non-linearly with human tissue to down convert to one or more acoustic audio signals (e.g. including a beam of acoustic ultrasonic signals transmitted from a laptop to interact with human tissue near an ear of a target listener, etc.).

As shown in FIG. 53, the operational flow o10 proceeds to operation o12 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location. An exemplary version of a non-transitory signal bearing medium of information storage subsystem s200 is depicted as bearing one or more electronically governing instructions i12 that when executed will direct performance of the operation o12. In an implementation, the one or more electronically governing instructions i12 when executed direct electronically governing (e.g. through reception of cable communication packets, via Wi-Fi signal reception, by near-field infrared receiver, etc.) for output (e.g. through one or more cable interface portions, via one or more speaker portions, by one or more transducer portions, etc.) of one or more beams (e.g. including containing beginning portions, including containing middle portions, including containing end portions, etc.) of said one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) from said one or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) for demodulation (e.g. including at least in part demodulation by signal down conversion, including at least in part demodulation through signal amplitude demodulation, including at least in part demodulation via signal frequency demodulation portions, etc.) of said one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) into one or more acoustic audio signals (e.g. including one or more low frequency acoustic audio signals, including one or more high frequency acoustic audio signals, including one or more full spectrum acoustic audio signals, etc.) containing said one or more information signals (e.g. including containing beginning portions, including containing middle portions, including containing end portions, etc.) at a first location (e.g. exclusive to one or more designated ears, exclusive to one or more identified persons, exclusive to one or more predetermined ears, etc.) spaced away from said portable electronic device (e.g. within a confines of a room, within an arm's length, within a three-foot radius, etc.) and spaced away from a second location (e.g. exclusive to one or more designated ears, exclusive to one or more identified persons, exclusive to one or more predetermined ears, etc.). Furthermore, the electronically governing electrical circuitry arrangement e12 when activated will perform the operation o12. Also, the electronically governing module m12, when executed and/or activated, will direct performance of and/or perform the operation o12. In an implementation, the electronically governing electrical circuitry arrangement e12, when activated performs the operation o12 in the illustrative depiction as follows, and/or the electronically governing module m12, when executed and/or activated, directs performance of and/or performs electronically governing (e.g. through reception of cable communication packets, via Wi-Fi signal reception, by near-field infrared receiver, etc.) for output (e.g. through one or more cable interface portions, via one or more speaker portions, by one or more transducer portions, etc.) of one or more beams (e.g. including containing beginning portions, including containing middle portions, including containing end portions, etc.) of said one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) from said one or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) for demodulation (e.g. including at least in part demodulation by signal down conversion, including at least in part demodulation through signal amplitude demodulation, including at least in part demodulation via signal frequency demodulation portions, etc.) of said one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) into one or more acoustic audio signals (e.g. including one or more low frequency acoustic audio signals, including one or more high frequency acoustic audio signals, including one or more full spectrum acoustic audio signals, etc.) containing said one or more information signals (e.g. including containing beginning portions, including containing middle portions, including containing end portions, etc.) at a first location (e.g. exclusive to one or more designated ears, exclusive to one or more identified persons, exclusive to one or more predetermined ears, etc.) spaced away from said portable electronic device (e.g. within a confines of a room, within an arm's length, within a three-foot radius, etc.) and spaced away from a second location (e.g. exclusive to one or more designated ears, exclusive to one or more identified persons, exclusive to one or more predetermined ears, etc.). In an implementation, the electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location is carried out by electronically governing (e.g. through reception of cable communication packets, via Wi-Fi signal reception, by near-field infrared receiver, etc.) for output (e.g. through one or more cable interface portions, via one or more speaker portions, by one or more transducer portions, etc.) of one or more beams (e.g. including containing beginning portions, including containing middle portions, including containing end portions, etc.) of said one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) from said one or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) for demodulation (e.g. including at least in part demodulation by signal down conversion, including at least in part demodulation through signal amplitude demodulation, including at least in part demodulation via signal frequency demodulation portions, etc.) of said one or more modulated acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) into one or more acoustic audio signals (e.g. including one or more low frequency acoustic audio signals, including one or more high frequency acoustic audio signals, including one or more full spectrum acoustic audio signals, etc.) containing said one or more information signals (e.g. including containing beginning portions, including containing middle portions, including containing end portions, etc.) at a first location (e.g. exclusive to one or more designated ears, exclusive to one or more identified persons, exclusive to one or more predetermined ears, etc.) spaced away from said portable electronic device (e.g. within a confines of a room, within an arm's length, within a three-foot radius, etc.) and spaced away from a second location (e.g. exclusive to one or more designated ears, exclusive to one or more identified persons, exclusive to one or more predetermined ears, etc.).

Figure 68:
FIG. 68 is a high-level flowchart including exemplary implementations of operation o12 of FIG. 53.

In one or more implementations, as shown in FIG. 68, operation o12 includes an operation o1201 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including steering one or more acoustic ultrasonic signals according to at least in part thermal imaging of one or more target listeners. Origination of an illustratively derived governing thermal imaging component group can be accomplished through skilled in the art design choice selection of one or more of the above depicted components from one or more of the above depicted subsystems shown in FIG. 25. Components from the governing thermal imaging component group can be used in implementing execution of the one or more governing thermal imaging instructions i1201 of FIG. 42, can be used in performance of the governing thermal imaging electrical circuitry arrangement e1201 of FIG. 35, and/or can be used in otherwise fulfillment of the operation o1201. An exemplary non-transitory signal bearing medium version of the information storage subsystem s200 is depicted in FIG. 42 as bearing the one or more governing thermal imaging instructions i1201 that when executed will direct performance of the operation o1201. Furthermore, the governing thermal imaging electrical circuitry arrangement ("elec circ arrange") e1201, when activated, will perform the operation o1201. Also, the governing thermal imaging module m1201, when executed and/or activated, will direct performance of and/or perform the operation o1201. For instance, in one or more exemplary implementations, the one or more governing thermal imaging instructions i1201, when executed, direct performance of the operation o1201 in the illustrative depiction as follows, and/or the governing thermal imaging electrical circuitry arrangement e1201, when activated, performs the operation o1201 in the illustrative depiction as follows, and/or the governing thermal imaging module m1201, when executed and/or activated, directs performance of and/or performs the operation o1201 in the illustrative depiction as follows, and/or the operation o1201 is otherwise carried out in the illustrative depiction as follows: electronically governing (e.g. through reception of cable communication packets, etc.) the for output (e.g. through one or more cable interface portions, etc.) of one or more beams (e.g. including containing beginning portions, etc.) of said one or more modulated acoustic ultrasonic signals (e.g. via multiple acoustic ultrasonic signals configured to be demodulated through mutual interference therewith to at least in part result in one or more acoustic audio signals, etc.) from said one or more portable electronic device emitters (e.g. including one or more perimeter arrays, etc.) of said portable electronic device (e.g. including one or more 3G mobile components, etc.) for demodulation (e.g. including at least in part demodulation by signal down conversion, etc.) of said one or more modulated acoustic ultrasonic signals (e.g. via multiple acoustic ultrasonic signals configured to be demodulated through mutual interference therewith to at least in part result in one or more acoustic audio signals, etc.) into one or more acoustic audio signals (e.g. including one or more low frequency acoustic audio signals, etc.) containing said one or more information signals (e.g. including containing beginning portions, etc.) at a first location (e.g. exclusive to one or more designated ears, etc.) spaced away from said portable electronic device (e.g. within a confines of a room, etc.) and spaced away from a second location (e.g. exclusive to one or more designated ears, etc.) including steering one or more acoustic ultrasonic signals according to at least in part thermal imaging of one or more target listeners (e.g. including infrared sensing from a tablet to determine ear position of a target listener to steer ultrasonic beam portions through phase control, etc.).

In one or more implementations, as shown in FIG. 68, operation o12 includes an operation o1202 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including steering one or more acoustic ultrasonic signals according to at least in part visual imaging of one or more target listeners. Origination of an illustratively derived governing visual imaging component group can be accomplished through skilled in the art design choice selection of one or more of the above depicted components from one or more of the above depicted subsystems shown in FIG. 25. Components from the governing visual imaging component group can be used in implementing execution of the one or more governing visual imaging instructions i1202 of FIG. 42, can be used in performance of the governing visual imaging electrical circuitry arrangement e1202 of FIG. 35, and/or can be used in otherwise fulfillment of the operation o1202. An exemplary non-transitory signal bearing medium version of the information storage subsystem s200 is depicted in FIG. 42 as bearing the one or more governing visual imaging instructions i1202 that when executed will direct performance of the operation o1202. Furthermore, the governing visual imaging electrical circuitry arrangement ("elec circ arrange") e1202, when activated, will perform the operation o1202. Also, the governing visual imaging module m1202, when executed and/or activated, will direct performance of and/or perform the operation o1202. For instance, in one or more exemplary implementations, the one or more governing visual imaging instructions i1202, when executed, direct performance of the operation o1202 in the illustrative depiction as follows, and/or the governing visual imaging electrical circuitry arrangement e1202, when activated, performs the operation o1202 in the illustrative depiction as follows, and/or the governing visual imaging module m1202, when executed and/or activated, directs performance of and/or performs the operation o1202 in the illustrative depiction as follows, and/or the operation o1202 is otherwise carried out in the illustrative depiction as follows: electronically governing (e.g. via Wi-Fi signal reception, etc.) the for output (e.g. via one or more speaker portions, etc.) of one or more beams (e.g. including containing middle portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) from said one or more portable electronic device emitters (e.g. including one or more polar arrays, etc.) of said portable electronic device (e.g. including one or more cellular components, etc.) for demodulation (e.g. including at least in part demodulation through signal amplitude demodulation, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) into one or more acoustic audio signals (e.g. including one or more high frequency acoustic audio signals, etc.) containing said one or more information signals (e.g. including containing middle portions, etc.) at a first location (e.g. exclusive to one or more identified persons, etc.) spaced away from said portable electronic device (e.g. within an arm's length, etc.) and spaced away from a second location (e.g. exclusive to one or more identified persons, etc.) including steering one or more acoustic ultrasonic signals according to at least in part visual imaging of one or more target listeners (e.g. including camera based visual recognition from a laptop to determine target listener location to steer one or more ultrasonic beams through phase array control, etc.).

In one or more implementations, as shown in FIG. 68, operation o12 includes an operation o1203 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including steering one or more acoustic ultrasonic signals according to at least in part acoustic imaging of one or more target listeners. Origination of an illustratively derived governing acoustic imaging component group can be accomplished through skilled in the art design choice selection of one or more of the above depicted components from one or more of the above depicted subsystems shown in FIG. 25. Components from the governing acoustic imaging component group can be used in implementing execution of the one or more governing acoustic imaging instructions i1203 of FIG. 42, can be used in performance of the governing acoustic imaging electrical circuitry arrangement e1203 of FIG. 35, and/or can be used in otherwise fulfillment of the operation o1203. An exemplary non-transitory signal bearing medium version of the information storage subsystem s200 is depicted in FIG. 42 as bearing the one or more governing acoustic imaging instructions i1203 that when executed will direct performance of the operation o1203. Furthermore, the governing acoustic imaging electrical circuitry arrangement ("elec circ arrange") e1203, when activated, will perform the operation o1203. Also, the governing acoustic imaging module m1203, when executed and/or activated, will direct performance of and/or perform the operation o1203. For instance, in one or more exemplary implementations, the one or more governing acoustic imaging instructions i1203, when executed, direct performance of the operation o1203 in the illustrative depiction as follows, and/or the governing acoustic imaging electrical circuitry arrangement e1203, when activated, performs the operation o1203 in the illustrative depiction as follows, and/or the governing acoustic imaging module m1203, when executed and/or activated, directs performance of and/or performs the operation o1203 in the illustrative depiction as follows, and/or the operation o1203 is otherwise carried out in the illustrative depiction as follows: electronically governing (e.g. by near-field infrared receiver, etc.) the for output (e.g. by one or more transducer portions, etc.) of one or more beams (e.g. including containing end portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) from said one or more portable electronic device emitters (e.g. including one or more orthographic arrays, etc.) of said portable electronic device (e.g. including one or more 4G components, etc.) for demodulation (e.g. including at least in part demodulation via signal frequency demodulation portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) into one or more acoustic audio signals (e.g. including one or more full spectrum acoustic audio signals, etc.) containing said one or more information signals (e.g. including containing end portions, etc.) at a first location (e.g. exclusive to one or more predetermined ears, etc.) spaced away from said portable electronic device (e.g. within a three-foot radius, etc.) and spaced away from a second location (e.g. exclusive to one or more predetermined ears, etc.) including steering one or more acoustic ultrasonic signals according to at least in part acoustic imaging of one or more target listeners (e.g. including acoustic imaging from a smart phone to determine target listener location to steer one or more ultrasonic beams through phase array control, etc.).

In one or more implementations, as shown in FIG. 69, operation o12 includes an operation o1204 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting according sensed acoustic environment adjacent one or more target listeners. Origination of an illustratively derived governing sensed acoustic component group can be accomplished through skilled in the art design choice selection of one or more of the above depicted components from one or more of the above depicted subsystems shown in FIG. 25. Components from the governing sensed acoustic component group can be used in implementing execution of the one or more governing sensed acoustic instructions i1204 of FIG. 42, can be used in performance of the governing sensed acoustic electrical circuitry arrangement e1204 of FIG. 35, and/or can be used in otherwise fulfillment of the operation o1204. An exemplary non-transitory signal bearing medium version of the information storage subsystem s200 is depicted in FIG. 42 as bearing the one or more governing sensed acoustic instructions i1204 that when executed will direct performance of the operation o1204. Furthermore, the governing sensed acoustic electrical circuitry arrangement ("elec circ arrange") e1204, when activated, will perform the operation o1204. Also, the governing sensed acoustic module m1204, when executed and/or activated, will direct performance of and/or perform the operation o1204. For instance, in one or more exemplary implementations, the one or more governing sensed acoustic instructions i1204, when executed, direct performance of the operation o1204 in the illustrative depiction as follows, and/or the governing sensed acoustic electrical circuitry arrangement e1204, when activated, performs the operation o1204 in the illustrative depiction as follows, and/or the governing sensed acoustic module m1204, when executed and/or activated, directs performance of and/or performs the operation o1204 in the illustrative depiction as follows, and/or the operation o1204 is otherwise carried out in the illustrative depiction as follows: electronically governing (e.g. from hard drive access, etc.) the for output (e.g. from one or more aperture portions, etc.) of one or more beams (e.g. including containing some portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) from said one or more portable electronic device emitters (e.g. including one or more three-dimensional arrays, etc.) of said portable electronic device (e.g. including one or more WiFi components, etc.) for demodulation (e.g. including at least in part demodulation with signal phase demodulation portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) into one or more acoustic audio signals (e.g. including one or more partial spectrum acoustic audio signals, etc.) containing said one or more information signals (e.g. including containing some portions, etc.) at a first location (e.g. exclusive to one or more desired groups of people, etc.) spaced away from said portable electronic device (e.g. within a distance from a portable device to a person, etc.) and spaced away from a second location (e.g. exclusive to one or more desired groups of people, etc.) including outputting according sensed acoustic environment adjacent one or more target listeners (e.g. including sensing quality of down-converting audio at a target listener through use of a sensitive audio microphone of a tablet, etc.).

In one or more implementations, as shown in FIG. 69, operation o12 includes an operation o1205 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting acoustic ultrasonic signal components according to sensed presence of others adjacent to one or more targeted listeners. Origination of an illustratively derived governing adjacent component group can be accomplished through skilled in the art design choice selection of one or more of the above depicted components from one or more of the above depicted subsystems shown in FIG. 25. Components from the governing adjacent component group can be used in implementing execution of the one or more governing adjacent instructions i1205 of FIG. 42, can be used in performance of the governing adjacent electrical circuitry arrangement e1205 of FIG. 35, and/or can be used in otherwise fulfillment of the operation o1205. An exemplary non-transitory signal bearing medium version of the information storage subsystem s200 is depicted in FIG. 42 as bearing the one or more governing adjacent instructions i1205 that when executed will direct performance of the operation o1205. Furthermore, the governing adjacent electrical circuitry arrangement ("elec circ arrange") e1205, when activated, will perform the operation o1205. Also, the governing adjacent module m1205, when executed and/or activated, will direct performance of and/or perform the operation o1205. For instance, in one or more exemplary implementations, the one or more governing adjacent instructions i1205, when executed, direct performance of the operation o1205 in the illustrative depiction as follows, and/or the governing adjacent electrical circuitry arrangement e1205, when activated, performs the operation o1205 in the illustrative depiction as follows, and/or the governing adjacent module m1205, when executed and/or activated, directs performance of and/or performs the operation o1205 in the illustrative depiction as follows, and/or the operation o1205 is otherwise carried out in the illustrative depiction as follows: electronically governing (e.g. using fiber optic communication, etc.) the for output (e.g. using one or more transmitter portions, etc.) of one or more beams (e.g. including containing all portions, etc.) of said one or more modulated acoustic ultrasonic signals (e.g. via one or more acoustic ultrasonic signals configured to be demodulated through nonlinear apparel interaction to at least in part produce one or more acoustic audio signals, etc.) from said one or more portable electronic device emitters (e.g. including one or more scattered arrangements, etc.) of said portable electronic device (e.g. including one or more infrared components, etc.) for demodulation (e.g. including at least in part demodulation using signal rectification, etc.) of said one or more modulated acoustic ultrasonic signals (e.g. via one or more acoustic ultrasonic signals configured to be demodulated through nonlinear apparel interaction to at least in part produce one or more acoustic audio signals, etc.) into one or more acoustic audio signals (e.g. including one or more low amplitude acoustic audio signals, etc.) containing said one or more information signals (e.g. including containing all portions, etc.) at a first location (e.g. exclusive to one or more chosen audio receivers, etc.) spaced away from said portable electronic device (e.g. within a distance from a display screen to a person, etc.) and spaced away from a second location (e.g. exclusive to one or more chosen audio receivers, etc.) including outputting acoustic ultrasonic signal components according to sensed presence of others adjacent to one or more targeted listeners (e.g. including using ultrasonic imaging of a vicinity of target listener to determine if others without security clearances are near the target listener, etc.).

In one or more implementations, as shown in FIG. 69, operation o12 includes an operation o1206 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting to compensate for Doppler frequency shifting duet to movement of said portable electronic device. Origination of an illustratively derived governing Doppler frequency component group can be accomplished through skilled in the art design choice selection of one or more of the above depicted components from one or more of the above depicted subsystems shown in FIG. 25. Components from the governing Doppler frequency component group can be used in implementing execution of the one or more governing Doppler frequency instructions i1206 of FIG. 42, can be used in performance of the governing Doppler frequency electrical circuitry arrangement e1206 of FIG. 35, and/or can be used in otherwise fulfillment of the operation o1206. An exemplary non-transitory signal bearing medium version of the information storage subsystem s200 is depicted in FIG. 42 as bearing the one or more governing Doppler frequency instructions i1206 that when executed will direct performance of the operation o1206. Furthermore, the governing Doppler frequency electrical circuitry arrangement ("elec circ arrange") e1206, when activated, will perform the operation o1206. Also, the governing Doppler frequency module m1206, when executed and/or activated, will direct performance of and/or perform the operation o1206. For instance, in one or more exemplary implementations, the one or more governing Doppler frequency instructions i1206, when executed, direct performance of the operation o1206 in the illustrative depiction as follows, and/or the governing Doppler frequency electrical circuitry arrangement e1206, when activated, performs the operation o1206 in the illustrative depiction as follows, and/or the governing Doppler frequency module m1206, when executed and/or activated, directs performance of and/or performs the operation o1206 in the illustrative depiction as follows, and/or the operation o1206 is otherwise carried out in the illustrative depiction as follows: electronically governing (e.g. through sound wave reception, etc.) the for output (e.g. through one or more air-coupled transducer portions, etc.) of one or more beams (e.g. including containing measure portions, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) from said one or more portable electronic device emitters (e.g. including one or more staggered arrays, etc.) of said portable electronic device (e.g. including one or more personal digital assistant components, etc.) for demodulation (e.g. including at least in part demodulation by signal filtering, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) into one or more acoustic audio signals (e.g. including one or more high amplitude acoustic audio signals, etc.) containing said one or more information signals (e.g. including containing measure portions, etc.) at a first location (e.g. exclusive to one or more selected microphones, etc.) spaced away from said portable electronic device (e.g. within a distance from a portable device to an ear, etc.) and spaced away from a second location (e.g. exclusive to one or more selected microphones, etc.) including outputting to compensate for Doppler frequency shifting duet to movement of said portable electronic device (e.g. including frequency shifting audio components to account for quick arm movements having a smart watch attached thereto, etc.).

In one or more implementations, as shown in FIG. 70, operation o12 includes an operation o1207 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including embedding one or more digitally coded acoustic audio signals in one or more acoustic ultrasonic signals. Origination of an illustratively derived governing digitally coded component group can be accomplished through skilled in the art design choice selection of one or more of the above depicted components from one or more of the above depicted subsystems shown in FIG. 25. Components from the governing digitally coded component group can be used in implementing execution of the one or more governing digitally coded instructions i1207 of FIG. 42, can be used in performance of the governing digitally coded electrical circuitry arrangement e1207 of FIG. 35, and/or can be used in otherwise fulfillment of the operation o1207. An exemplary non-transitory signal bearing medium version of the information storage subsystem s200 is depicted in FIG. 42 as bearing the one or more governing digitally coded instructions i1207 that when executed will direct performance of the operation o1207. Furthermore, the governing digitally coded electrical circuitry arrangement ("elec circ arrange") e1207, when activated, will perform the operation o1207. Also, the governing digitally coded module m1207, when executed and/or activated, will direct performance of and/or perform the operation o1207. For instance, in one or more exemplary implementations, the one or more governing digitally coded instructions i1207, when executed, direct performance of the operation o1207 in the illustrative depiction as follows, and/or the governing digitally coded electrical circuitry arrangement e1207, when activated, performs the operation o1207 in the illustrative depiction as follows, and/or the governing digitally coded module m1207, when executed and/or activated, directs performance of and/or performs the operation o1207 in the illustrative depiction as follows, and/or the operation o1207 is otherwise carried out in the illustrative depiction as follows: electronically governing (e.g. via radio frequency antenna, etc.) the for output (e.g. via one or more thin-film membrane portions, etc.) of one or more beams (e.g. including containing phrase portions, etc.) of said one or more modulated acoustic ultrasonic signals (e.g. via one or more acoustic ultrasonic signals including signals having one or more frequencies above 60 kHz, etc.) from said one or more portable electronic device emitters (e.g. including one or more linear arrangements, etc.) of said portable electronic device (e.g. including one or more smart phone components, etc.) for demodulation (e.g. including at least in part demodulation through signal intelligence recovery, etc.) of said one or more modulated acoustic ultrasonic signals (e.g. via one or more acoustic ultrasonic signals including signals having one or more frequencies above 60 kHz, etc.) into one or more acoustic audio signals (e.g. including one or more high frequency acoustic audio signals, etc.) containing said one or more information signals (e.g. including containing phrase portions, etc.) at a first location (e.g. exclusive to one or more designated surfaces, etc.) spaced away from said portable electronic device (e.g. within a distance from a display screen to an ear, etc.) and spaced away from a second location (e.g. exclusive to one or more designated surfaces, etc.) including embedding one or more digitally coded acoustic audio signals in one or more acoustic ultrasonic signals (e.g. including digitally coded acoustic signals to sense level of quality of acoustic audio signals downconverted from an ultrasonic carrier signal, etc.).

In one or more implementations, as shown in FIG. 70, operation o12 includes an operation o1208 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting one or more acoustic ultrasonic signals for ranging one or more target listeners. Origination of an illustratively derived governing ranging component group can be accomplished through skilled in the art design choice selection of one or more of the above depicted components from one or more of the above depicted subsystems shown in FIG. 25. Components from the governing ranging component group can be used in implementing execution of the one or more governing ranging instructions i1208 of FIG. 42, can be used in performance of the governing ranging electrical circuitry arrangement e1208 of FIG. 35, and/or can be used in otherwise fulfillment of the operation o1208. An exemplary non-transitory signal bearing medium version of the information storage subsystem s200 is depicted in FIG. 42 as bearing the one or more governing ranging instructions i1208 that when executed will direct performance of the operation o1208. Furthermore, the governing ranging electrical circuitry arrangement ("elec circ arrange") e1208, when activated, will perform the operation o1208. Also, the governing ranging module m1208, when executed and/or activated, will direct performance of and/or perform the operation o1208. For instance, in one or more exemplary implementations, the one or more governing ranging instructions i1208, when executed, direct performance of the operation o1208 in the illustrative depiction as follows, and/or the governing ranging electrical circuitry arrangement e1208, when activated, performs the operation o1208 in the illustrative depiction as follows, and/or the governing ranging module m1208, when executed and/or activated, directs performance of and/or performs the operation o1208 in the illustrative depiction as follows, and/or the operation o1208 is otherwise carried out in the illustrative depiction as follows: electronically governing (e.g. by reception of wireless transmission, etc.) the for output (e.g. by one or more resonant surface portions, etc.) of one or more beams (e.g. including containing chapter portions, etc.) of said one or more modulated acoustic ultrasonic signals (e.g. via one or more acoustic ultrasonic signals including signals having one or more frequencies above 80 kHz, etc.) from said one or more portable electronic device emitters (e.g. including one or more parabolic arrangements, etc.) of said portable electronic device (e.g. including one or more cell phone components, etc.) for demodulation (e.g. including demodulation via mutual interference therewith multiple acoustic ultrasonic signals configured to be demodulated through to at least in part result in one or more acoustic audio signals, etc.) of said one or more modulated acoustic ultrasonic signals (e.g. via one or more acoustic ultrasonic signals including signals having one or more frequencies above 80 kHz, etc.) into one or more acoustic audio signals (e.g. including one or more lecture information containing acoustic audio signals, etc.) containing said one or more information signals (e.g. including containing chapter portions, etc.) at a first location (e.g. exclusive to one or more selected ranges, etc.) spaced away from said portable electronic device (e.g. within a distance from a portable device to a center of a group, etc.) and spaced away from a second location (e.g. exclusive to one or more identified objects, etc.) including outputting one or more acoustic ultrasonic signals for ranging one or more target listeners (e.g. including using portions of ultrasonic signals sent from a tablet computer to a target listener to determine positioning of the target listener relative to the tablet computer, etc.).

In one or more implementations, as shown in FIG. 70, operation o12 includes an operation o1209 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including adjusting acoustic ultrasonic signal amplitude based on visual tracking of one or more target listeners. Origination of an illustratively derived governing visual tracking component group can be accomplished through skilled in the art design choice selection of one or more of the above depicted components from one or more of the above depicted subsystems shown in FIG. 25. Components from the governing visual tracking component group can be used in implementing execution of the one or more governing visual tracking instructions i1209 of FIG. 42, can be used in performance of the governing visual tracking electrical circuitry arrangement e1209 of FIG. 35, and/or can be used in otherwise fulfillment of the operation o1209. An exemplary non-transitory signal bearing medium version of the information storage subsystem s200 is depicted in FIG. 42 as bearing the one or more governing visual tracking instructions i1209 that when executed will direct performance of the operation o1209. Furthermore, the governing visual tracking electrical circuitry arrangement ("elec circ arrange") e1209, when activated, will perform the operation o1209. Also, the governing visual tracking module m1209, when executed and/or activated, will direct performance of and/or perform the operation o1209. For instance, in one or more exemplary implementations, the one or more governing visual tracking instructions i1209, when executed, direct performance of the operation o1209 in the illustrative depiction as follows, and/or the governing visual tracking electrical circuitry arrangement e1209, when activated, performs the operation o1209 in the illustrative depiction as follows, and/or the governing visual tracking module m1209, when executed and/or activated, directs performance of and/or performs the operation o1209 in the illustrative depiction as follows, and/or the operation o1209 is otherwise carried out in the illustrative depiction as follows: electronically governing (e.g. from memory stick access, etc.) the for output (e.g. from one or more signal processor portions, etc.) of one or more beams (e.g. including containing sectional portions, etc.) of said one or more modulated acoustic ultrasonic signals (e.g. via one or more acoustic ultrasonic signals including signals having one or more frequencies above 100 kHz, etc.) from said one or more portable electronic device emitters (e.g. including one or more hyperbolic arrangements, etc.) of said portable electronic device (e.g. including one or more laptop components, etc.) for demodulation (e.g. including demodulation using one or more acoustic ultrasonic signals configured to be demodulated through nonlinear atmospheric interaction to at least in part generate one or more acoustic audio signals, etc.) of said one or more modulated acoustic ultrasonic signals (e.g. via one or more acoustic ultrasonic signals including signals having one or more frequencies above 100 kHz, etc.) into one or more acoustic audio signals (e.g. including one or more foreign language speech information containing acoustic audio signals, etc.) containing said one or more information signals (e.g. including containing sectional portions, etc.) at a first location (e.g. exclusive to one or more designated directions, etc.) spaced away from said portable electronic device (e.g. within a distance from a display screen to a center of a group, etc.) and spaced away from a second location (e.g.

exclusive to one or more predetermined locations, etc.) including adjusting acoustic ultrasonic signal amplitude based on visual tracking of one or more target listeners (e.g. including adjustment of amplitude of ultrasonic signals transmitted from a laptop based upon visual recognition of one or more target listeners by algorithms being run on the laptop, etc.).

Figure 71:
FIG. 71 is a high-level flowchart including exemplary implementations of operation o12 of FIG. 53.

In one or more implementations, as shown in FIG. 71, operation o12 includes an operation o1210 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including adjusting acoustic ultrasonic signal amplitude based on thermal tracking of one or more target listeners. Origination of an illustratively derived governing thermal tracking component group can be accomplished through skilled in the art design choice selection of one or more of the above depicted components from one or more of the above depicted subsystems shown in FIG. 25. Components from the governing thermal tracking component group can be used in implementing execution of the one or more governing thermal tracking instructions i1210 of FIG. 42, can be used in performance of the governing thermal tracking electrical circuitry arrangement e1210 of FIG. 35, and/or can be used in otherwise fulfillment of the operation o1210. An exemplary non-transitory signal bearing medium version of the information storage subsystem s200 is depicted in FIG. 42 as bearing the one or more governing thermal tracking instructions i1210 that when executed will direct performance of the operation o1210. Furthermore, the governing thermal tracking electrical circuitry arrangement ("elec circ arrange") e1210, when activated, will perform the operation o1210. Also, the governing thermal tracking module m1210, when executed and/or activated, will direct performance of and/or perform the operation o1210. For instance, in one or more exemplary implementations, the one or more governing thermal tracking instructions i1210, when executed, direct performance of the operation o1210 in the illustrative depiction as follows, and/or the governing thermal tracking electrical circuitry arrangement e1210, when activated, performs the operation o1210 in the illustrative depiction as follows, and/or the governing thermal tracking module m1210, when executed and/or activated, directs performance of and/or performs the operation o1210 in the illustrative depiction as follows, and/or the operation o1210 is otherwise carried out in the illustrative depiction as follows: electronically governing (e.g. using flash drive stored data, etc.) the for output (e.g. using one or more transmitter portions, etc.) of one or more beams (e.g. including containing whole portions, etc.) of said one or more modulated acoustic ultrasonic signals (e.g. via one or more acoustic ultrasonic signals including signals having one or more frequencies above 120 kHz, etc.) from said one or more portable electronic device emitters (e.g. including one or more enclosed arrangements, etc.) of said portable electronic device (e.g. including one or more tablet computer components, etc.) for demodulation (e.g. including demodulation with one or more acoustic ultrasonic signals configured to be demodulated through nonlinear human tissue interaction to at least in part produce one or more acoustic audio signals, etc.) of said one or more modulated acoustic ultrasonic signals (e.g. via one or more acoustic ultrasonic signals including signals having one or more frequencies above 120 kHz, etc.) into one or more acoustic audio signals (e.g. including one or more classical music selection information containing acoustic audio signals, etc.) containing said one or more information signals (e.g. including containing whole portions, etc.) at a first location (e.g. inclusive to one or more designated ears, etc.) spaced away from said portable electronic device (e.g. within a distance from a transmitter to a receiver, etc.) and spaced away from a second location (e.g. exclusive to one or more desired environments, etc.) including adjusting acoustic ultrasonic signal amplitude based on thermal tracking of one or more target listeners (e.g. including adjustment of amplitude of ultrasonic signals transmitted from a laptop based upon infrared recognition of one or more target listeners by algorithms being run on the laptop, etc.).

In one or more implementations, as shown in FIG. 71, operation o12 includes an operation o1211 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including adjusting location of greatest intensity of down converted acoustic audio signals based on visual tracking of one or more target listeners. Origination of an illustratively derived governing greatest intensity component group can be accomplished through skilled in the art design choice selection of one or more of the above depicted components from one or more of the above depicted subsystems shown in FIG. 25. Components from the governing greatest intensity component group can be used in implementing execution of the one or more governing greatest intensity instructions i1211 of FIG. 42, can be used in performance of the governing greatest intensity electrical circuitry arrangement e1211 of FIG. 35, and/or can be used in otherwise fulfillment of the operation o1211. An exemplary non-transitory signal bearing medium version of the information storage subsystem s200 is depicted in FIG. 42 as bearing the one or more governing greatest intensity instructions i1211 that when executed will direct performance of the operation o1211. Furthermore, the governing greatest intensity electrical circuitry arrangement ("elec circ arrange") e1211, when activated, will perform the operation o1211. Also, the governing greatest intensity module m1211, when executed and/or activated, will direct performance of and/or perform the operation o1211. For instance, in one or more exemplary implementations, the one or more governing greatest intensity instructions i1211, when executed, direct performance of the operation o1211 in the illustrative depiction as follows, and/or the governing greatest intensity electrical circuitry arrangement e1211, when activated, performs the operation o1211 in the illustrative depiction as follows, and/or the governing greatest intensity module m1211, when executed and/or activated, directs performance of and/or performs the operation o1211 in the illustrative depiction as follows, and/or the operation o1211 is otherwise carried out in the illustrative depiction as follows: electronically governing (e.g. through processor synthesized information, etc.) the for output (e.g. through one or more transducer membrane portions, etc.) of one or more beams (e.g. including containing transitionary portions, etc.) of said one or more modulated acoustic ultrasonic signals (e.g. via one or more acoustic ultrasonic signals including signals having one or more frequencies above 140 kHz, etc.) from said one or more portable electronic device emitters (e.g. including one or more transducer arrangements, etc.) of said portable electronic device (e.g. including one or more mp3 player components, etc.) for demodulation (e.g. including demodulation by one or more acoustic ultrasonic signals configured to be demodulated through nonlinear polymeric interaction to at least in part result in one or more acoustic audio signals, etc.) of said one or more modulated acoustic ultrasonic signals (e.g. via one or more acoustic ultrasonic signals including signals having one or more frequencies above 140 kHz, etc.) into one or more acoustic audio signals (e.g. including one or more instructional lesson material information containing acoustic audio signals, etc.) containing said one or more information signals (e.g. including containing partial portions, etc.) at a first location (e.g. inclusive to one or more predetermined ears, etc.) spaced away from said portable electronic device (e.g. within a distance from a first seat back to a second seat back, etc.) and spaced away from a second location (e.g. exclusive to one or more chosen distances, etc.) including adjusting location of greatest intensity of down converted acoustic audio signals based on visual tracking of one or more target listeners (e.g. including adjustment of location of intensity of ultrasonic signals transmitted from a tablet computer based upon visual recognition of one or more target listeners by algorithms being run on the tablet, etc.).

In one or more implementations, as shown in FIG. 71, operation o12 includes an operation o1212 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including adjusting location of greatest intensity of down converted acoustic audio signals based on thermal tracking of one or more target listeners. Origination of an illustratively derived governing thermal tracking component group can be accomplished through skilled in the art design choice selection of one or more of the above depicted components from one or more of the above depicted subsystems shown in FIG. 25. Components from the governing thermal tracking component group can be used in implementing execution of the one or more governing thermal tracking instructions i1212 of FIG. 42, can be used in performance of the governing thermal tracking electrical circuitry arrangement e1212 of FIG. 35, and/or can be used in otherwise fulfillment of the operation o1212. An exemplary non-transitory signal bearing medium version of the information storage subsystem s200 is depicted in FIG. 42 as bearing the one or more governing thermal tracking instructions i1212 that when executed will direct performance of the operation o1212. Furthermore, the governing thermal tracking electrical circuitry arrangement ("elec circ arrange") e1212, when activated, will perform the operation o1212. Also, the governing thermal tracking module m1212, when executed and/or activated, will direct performance of and/or perform the operation o1212. For instance, in one or more exemplary implementations, the one or more governing thermal tracking instructions i1212, when executed, direct performance of the operation o1212 in the illustrative depiction as follows, and/or the governing thermal tracking electrical circuitry arrangement e1212, when activated, performs the operation o1212 in the illustrative depiction as follows, and/or the governing thermal tracking module m1212, when executed and/or activated, directs performance of and/or performs the operation o1212 in the illustrative depiction as follows, and/or the operation o1212 is otherwise carried out in the illustrative depiction as follows: electronically governing (e.g. via ROM drive reads, etc.) the for output (e.g. via one or more transducer array portions, etc.) of one or more beams (e.g. including containing temporary portions, etc.) of said one or more modulated acoustic ultrasonic signals (e.g. via one or more acoustic ultrasonic signals including signals having one or more frequencies above 160 kHz, etc.) from said one or more portable electronic device emitters (e.g. including one or more aperture arrangements, etc.) of said portable electronic device (e.g. including one or more mobile phone components, etc.) for demodulation (e.g. including demodulation through one or more acoustic ultrasonic signals configured to be demodulated through nonlinear apparel interaction to at least in part produce one or more acoustic audio signals, etc.) of said one or more modulated acoustic ultrasonic signals (e.g. via one or more acoustic ultrasonic signals including signals having one or more frequencies above 160 kHz, etc.) into one or more acoustic audio signals (e.g. including one or more warning tone information containing acoustic audio signals, etc.) containing said one or more information signals (e.g. including containing transitionary portions, etc.) at a first location (e.g. inclusive to one or more desired groups of people, etc.) spaced away from said portable electronic device (e.g. within a distance from a seat back to a tray table, etc.) and spaced away from a second location (e.g. exclusive to one or more selected ranges, etc.) including adjusting location of greatest intensity of down converted acoustic audio signals based on thermal tracking of one or more target listeners (e.g. including adjustment of location of intensity of ultrasonic signals transmitted from a tablet computer based upon infrared tracking of one or more target listeners by algorithms being run on the tablet, etc.).

In one or more implementations, as shown in FIG. 72, operation o12 includes an operation o1213 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting acoustic ultrasonic signal amplitude based on two dimensional user interface user input. Origination of an illustratively derived governing signal amplitude component group can be accomplished through skilled in the art design choice selection of one or more of the above depicted components from one or more of the above depicted subsystems shown in FIG. 25. Components from the governing signal amplitude component group can be used in implementing execution of the one or more governing signal amplitude instructions i1213 of FIG. 42, can be used in performance of the governing signal amplitude electrical circuitry arrangement e1213 of FIG. 35, and/or can be used in otherwise fulfillment of the operation o1213. An exemplary non-transitory signal bearing medium version of the information storage subsystem s200 is depicted in FIG. 42 as bearing the one or more governing signal amplitude instructions i1213 that when executed will direct performance of the operation o1213. Furthermore, the governing signal amplitude electrical circuitry arrangement ("elec circ arrange") e1213, when activated, will perform the operation o1213. Also, the governing signal amplitude module m1213, when executed and/or activated, will direct performance of and/or perform the operation o1213. For instance, in one or more exemplary implementations, the one or more governing signal amplitude instructions i1213, when executed, direct performance of the operation o1213 in the illustrative depiction as follows, and/or the governing signal amplitude electrical circuitry arrangement e1213, when activated, performs the operation o1213 in the illustrative depiction as follows, and/or the governing signal amplitude module m1213, when executed and/or activated, directs performance of and/or performs the operation o1213 in the illustrative depiction as follows, and/or the operation o1213 is otherwise carried out in the illustrative depiction as follows: electronically governing (e.g. by CD-ROM playback, etc.) the for output (e.g. by one or more membrane speaker portions, etc.) of one or more beams (e.g. including containing steady state portions, etc.) of said one or more modulated acoustic ultrasonic signals (e.g. via one or more acoustic ultrasonic signals including signals having one or more frequencies above 180 kHz, etc.) from said one or more portable electronic device emitters (e.g. including one or more transmitter arrangements, etc.) of said portable electronic device (e.g. including one or more two-way radio components, etc.) for demodulation (e.g. including demodulation by one or more acoustic ultrasonic signals configured to be demodulated through nonlinear interaction with one or more solids to at least in part generate one or more acoustic audio signals, etc.) of said one or more modulated acoustic ultrasonic signals (e.g. via one or more acoustic ultrasonic signals including signals having one or more frequencies above 180 kHz, etc.) into one or more acoustic audio signals (e.g. including one or more white noise information containing acoustic audio signals, etc.) containing said one or more information signals (e.g. including containing temporary portions, etc.) at a first location (e.g. inclusive to one or more chosen audio receivers, etc.) spaced away from said portable electronic device (e.g. within a distance of an aisle way, etc.) and spaced away from a second location (e.g. exclusive to one or more designated directions, etc.) including outputting acoustic ultrasonic signal amplitude based on two dimensional user interface user input (e.g. including adjustment of amplitude of ultrasonic signals transmitted from a laptop based upon track pad input to the laptop, etc.).

In one or more implementations, as shown in FIG. 72, operation o12 includes an operation o1214 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting acoustic ultrasonic signal target location based on two dimensional user interface user input. Origination of an illustratively derived governing target location component group can be accomplished through skilled in the art design choice selection of one or more of the above depicted components from one or more of the above depicted subsystems shown in FIG. 25. Components from the governing target location component group can be used in implementing execution of the one or more governing target location instructions i1214 of FIG. 42, can be used in performance of the governing target location electrical circuitry arrangement e1214 of FIG. 35, and/or can be used in otherwise fulfillment of the operation o1214. An exemplary non-transitory signal bearing medium version of the information storage subsystem s200 is depicted in FIG. 42 as bearing the one or more governing target location instructions i1214 that when executed will direct performance of the operation o1214. Furthermore, the governing target location electrical circuitry arrangement ("elec circ arrange") e1214, when activated, will perform the operation o1214. Also, the governing target location module m1214, when executed and/or activated, will direct performance of and/or perform the operation o1214. For instance, in one or more exemplary implementations, the one or more governing target location instructions i1214, when executed, direct performance of the operation o1214 in the illustrative depiction as follows, and/or the governing target location electrical circuitry arrangement e1214, when activated, performs the operation o1214 in the illustrative depiction as follows, and/or the governing target location module m1214, when executed and/or activated, directs performance of and/or performs the operation o1214 in the illustrative depiction as follows, and/or the operation o1214 is otherwise carried out in the illustrative depiction as follows: electronically governing (e.g. from DVD player, etc.) the for output (e.g. from one or more ultrasonic transducer portions, etc.) of one or more beams (e.g. including containing integrated portions, etc.) of said one or more modulated acoustic ultrasonic signals (e.g. via one or more acoustic ultrasonic signals including signals having one or more frequencies above 200 kHz, etc.) from said one or more portable electronic device emitters (e.g. including one or more air-coupled transducer arrangements, etc.) of said portable electronic device (e.g. including one or more security network components, etc.) for demodulation (e.g. including at least in part demodulation by signal down conversion, etc.) of said one or more modulated acoustic ultrasonic signals (e.g. via one or more acoustic ultrasonic signals including signals having one or more frequencies above 200 kHz, etc.) into one or more acoustic audio signals (e.g. including varying pitch information containing acoustic audio signals, etc.) containing said one or more information signals (e.g. including containing steady state portions, etc.) at a first location (e.g. inclusive to one or more selected microphones, etc.) spaced away from said portable electronic device (e.g. within a distance from a desk to a chair, etc.) and spaced away from a second location (e.g. inclusive to one or more designated ears, etc.) including outputting acoustic ultrasonic signal target location based on two dimensional user interface user input (e.g. including adjustment of target location of ultrasonic signals transmitted from a laptop based upon track pad input to the laptop, etc.).

In one or more implementations, as shown in FIG. 72, operation o12 includes an operation o1215 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting based on audio microphone sensing of acoustic audio signals down converted at one or more target locations. Origination of an illustratively derived governing audio microphone component group can be accomplished through skilled in the art design choice selection of one or more of the above depicted components from one or more of the above depicted subsystems shown in FIG. 25. Components from the governing audio microphone component group can be used in implementing execution of the one or more governing audio microphone instructions i1215 of FIG. 42, can be used in performance of the governing audio microphone electrical circuitry arrangement e1215 of FIG. 35, and/or can be used in otherwise fulfillment of the operation o1215. An exemplary non-transitory signal bearing medium version of the information storage subsystem s200 is depicted in FIG. 42 as bearing the one or more governing audio microphone instructions i1215 that when executed will direct performance of the operation o1215. Furthermore, the governing audio microphone electrical circuitry arrangement ("elec circ arrange") e1215, when activated, will perform the operation o1215. Also, the governing audio microphone module m1215, when executed and/or activated, will direct performance of and/or perform the operation o1215. For instance, in one or more exemplary implementations, the one or more governing audio microphone instructions i1215, when executed, direct performance of the operation o1215 in the illustrative depiction as follows, and/or the governing audio microphone electrical circuitry arrangement e1215, when activated, performs the operation o1215 in the illustrative depiction as follows, and/or the governing audio microphone module m1215, when executed and/or activated, directs performance of and/or performs the operation o1215 in the illustrative depiction as follows, and/or the operation o1215 is otherwise carried out in the illustrative depiction as follows: electronically governing (e.g. using mp3 media player, etc.) the for output (e.g. using one or more electrostatic transducer portions, etc.) of one or more beams (e.g. including containing disparate portions, etc.) of said one or more modulated acoustic ultrasonic signals (e.g. via multiple acoustic ultrasonic signals configured to be demodulated through mutual interference therewith to at least in part result in one or more acoustic audio signals, etc.) from said one or more portable electronic device emitters (e.g. including one or more thin-film membrane arrangements, etc.) of said portable electronic device (e.g. including one or more netbook components, etc.) for demodulation (e.g. including at least in part demodulation through signal amplitude demodulation, etc.) of said one or more modulated acoustic ultrasonic signals (e.g. via multiple acoustic ultrasonic signals configured to be demodulated through mutual interference therewith to at least in part result in one or more acoustic audio signals, etc.) into one or more acoustic audio signals (e.g. including one or more note sequence information containing acoustic audio signals, etc.) containing said one or more information signals (e.g. including containing integrated portions, etc.) at a first location (e.g. inclusive to one or more designated surfaces, etc.) spaced away from said portable electronic device (e.g. within a distance from a dashboard to a headrest, etc.) and spaced away from a second location (e.g. inclusive to one or more identified persons, etc.) including outputting based on audio microphone sensing of acoustic audio signals down converted at one or more target locations (e.g. including adjustment of audio signal amplitude to be down-converted from ultrasonic signals transmitted from a laptop based upon sensing of the down converted audio signals by audio microphone portions located on the laptop, etc.).

In one or more implementations, as shown in FIG. 73, operation o12 includes an operation o1216 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting based on ultrasonic microphone sensing of acoustic ultrasonic signals down converted at one or more target locations. Origination of an illustratively derived governing ultrasonic microphone component group can be accomplished through skilled in the art design choice selection of one or more of the above depicted components from one or more of the above depicted subsystems shown in FIG. 25. Components from the governing ultrasonic microphone component group can be used in implementing execution of the one or more governing ultrasonic microphone instructions i1216 of FIG. 42, can be used in performance of the governing ultrasonic microphone electrical circuitry arrangement e1216 of FIG. 35, and/or can be used in otherwise fulfillment of the operation o1216. An exemplary non-transitory signal bearing medium version of the information storage subsystem s200 is depicted in FIG. 42 as bearing the one or more governing ultrasonic microphone instructions i1216 that when executed will direct performance of the operation o1216. Furthermore, the governing ultrasonic microphone electrical circuitry arrangement ("elec circ arrange") e1216, when activated, will perform the operation o1216. Also, the governing ultrasonic microphone module m1216, when executed and/or activated, will direct performance of and/or perform the operation o1216. For instance, in one or more exemplary implementations, the one or more governing ultrasonic microphone instructions i1216, when executed, direct performance of the operation o1216 in the illustrative depiction as follows, and/or the governing ultrasonic microphone electrical circuitry arrangement e1216, when activated, performs the operation o1216 in the illustrative depiction as follows, and/or the governing ultrasonic microphone module m1216, when executed and/or activated, directs performance of and/or performs the operation o1216 in the illustrative depiction as follows, and/or the operation o1216 is otherwise carried out in the illustrative depiction as follows: electronically governing (e.g. through internet communication protocols, etc.) the for output (e.g. through one or more piezoelectric transducer portions, etc.) of one or more beams (e.g. including containing beginning portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) from said one or more portable electronic device emitters (e.g. including one or more resonant surface arrangements, etc.) of said portable electronic device (e.g. including one or more ultrabook components, etc.) for demodulation (e.g. including at least in part demodulation via signal frequency demodulation portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) into one or more acoustic audio signals (e.g. including one or more two-way conversation information containing acoustic audio signals, etc.) containing said one or more information signals (e.g. including containing disparate portions, etc.) at a first location (e.g. inclusive to one or more identified objects, etc.) spaced away from said portable electronic device (e.g. less than confines of a room, etc.) and spaced away from a second location (e.g. inclusive to one or more predetermined ears, etc.) including outputting based on ultrasonic microphone sensing of acoustic ultrasonic signals down converted at one or more target locations (e.g. including adjustment of ultrasonic signal amplitude transmitted from a tablet computer based upon sensing of the ultrasonic signals by ultrasonic microphone portions located on the tablet, etc.).

In one or more implementations, as shown in FIG. 73, operation o12 includes an operation o1217 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting based on sensing of acoustic digital signals received from one or more target locations. Origination of an illustratively derived governing acoustic digital component group can be accomplished through skilled in the art design choice selection of one or more of the above depicted components from one or more of the above depicted subsystems shown in FIG. 25. Components from the governing acoustic digital component group can be used in implementing execution of the one or more governing acoustic digital instructions i1217 of FIG. 42, can be used in performance of the governing acoustic digital electrical circuitry arrangement e1217 of FIG. 35, and/or can be used in otherwise fulfillment of the operation o1217. An exemplary non-transitory signal bearing medium version of the information storage subsystem s200 is depicted in FIG. 42 as bearing the one or more governing acoustic digital instructions i1217 that when executed will direct performance of the operation o1217. Furthermore, the governing acoustic digital electrical circuitry arrangement ("elec circ arrange") e1217, when activated, will perform the operation o1217. Also, the governing acoustic digital module m1217, when executed and/or activated, will direct performance of and/or perform the operation o1217. For instance, in one or more exemplary implementations, the one or more governing acoustic digital instructions i1217, when executed, direct performance of the operation o1217 in the illustrative depiction as follows, and/or the governing acoustic digital electrical circuitry arrangement e1217, when activated, performs the operation o1217 in the illustrative depiction as follows, and/or the governing acoustic digital module m1217, when executed and/or activated, directs performance of and/or performs the operation o1217 in the illustrative depiction as follows, and/or the operation o1217 is otherwise carried out in the illustrative depiction as follows: electronically governing (e.g. through reception of cable communication packets, etc.) the for output (e.g. via one or more electrostrictive transducer portions, etc.) of one or more beams (e.g. including containing middle portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) from said one or more portable electronic device emitters (e.g. including one or more transmitter arrangements, etc.) of said portable electronic device (e.g. including one or more flip-phone components, etc.) for demodulation (e.g. including at least in part demodulation with signal phase demodulation portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) into one or more acoustic audio signals (e.g. including one or more confidential information containing acoustic audio signals, etc.) containing said one or more information signals (e.g. including lecture formatted information, etc.) at a first location (e.g. inclusive to one or more predetermined locations, etc.) spaced away from said portable electronic device (e.g. less than an arm's length, etc.) and spaced away from a second location (e.g. inclusive to one or more desired groups of people, etc.) including outputting based on sensing of acoustic digital signals received from one or more target locations (e.g. including adjustment of audio signal quality to be down-converted from ultrasonic signals transmitted from a laptop based upon sensing of audio digital signals as part of the down converted audio signals by audio microphone portions located on the laptop, etc.).

In one or more implementations, as shown in FIG. 73, operation o12 includes an operation o1218 for electronically governing the for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting acoustic ultrasonic signals to be down converted into acoustic anti-noise signals to at least in part cancel acoustic noise signals sensed at one or more target locations. Origination of an illustratively derived governing acoustic noise component group can be accomplished through skilled in the art design choice selection of one or more of the above depicted components from one or more of the above depicted subsystems shown in FIG. 25. Components from the governing acoustic noise component group can be used in implementing execution of the one or more governing acoustic noise instructions i1218 of FIG. 42, can be used in performance of the governing acoustic noise electrical circuitry arrangement e1218 of FIG. 35, and/or can be used in otherwise fulfillment of the operation o1218. An exemplary non-transitory signal bearing medium version of the information storage subsystem s200 is depicted in FIG. 42 as bearing the one or more governing acoustic noise instructions i1218 that when executed will direct performance of the operation o1218. Furthermore, the governing acoustic noise electrical circuitry arrangement ("elec circ arrange") e1218, when activated, will perform the operation o1218. Also, the governing acoustic noise module m1218, when executed and/or activated, will direct performance of and/or perform the operation o1218. For instance, in one or more exemplary implementations, the one or more governing acoustic noise instructions i1218, when executed, direct performance of the operation o1218 in the illustrative depiction as follows, and/or the governing acoustic noise electrical circuitry arrangement e1218, when activated, performs the operation o1218 in the illustrative depiction as follows, and/or the governing acoustic noise module m1218, when executed and/or activated, directs performance of and/or performs the operation o1218 in the illustrative depiction as follows, and/or the operation o1218 is otherwise carried out in the illustrative depiction as follows: electronically governing (e.g. via Wi-Fi signal reception, etc.) the for output (e.g. by one or more electro-thermo-mechanical film transducer portions, etc.) of one or more beams (e.g. including containing end portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) from said one or more portable electronic device emitters (e.g. including one or more transducer membrane arrangements, etc.) of said portable electronic device (e.g. including one or more portable computer components, etc.) for demodulation (e.g. including at least in part demodulation using signal rectification, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) into one or more acoustic audio signals (e.g. including one or more eavesdropping information containing acoustic audio signals, etc.) containing said one or more information signals (e.g. including foreign language speech information, etc.) at a first location (e.g. inclusive to one or more desired environments, etc.) spaced away from said portable electronic device (e.g. less than a three-foot radius, etc.) and spaced away from a second location (e.g. inclusive to one or more chosen audio receivers, etc.) including outputting acoustic ultrasonic signals to be down converted into acoustic anti-noise signals to at least in part cancel acoustic noise signals sensed at one or more target locations (e.g. including adjustment of anti-noise audio signal amplitude to be down-converted from ultrasonic signals transmitted from a laptop based upon sensing of the noise audio signals by audio microphone portions located on the laptop, etc.).

In one or more implementations, as shown in FIG. 74, operation o12 includes an operation o1219 for electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including one or more ultrasonic signals having frequencies with a range of between 60 to 200 kHz. Origination of an illustratively derived governing ultrasonic signals component group can be accomplished through skilled in the art design choice selection of one or more of the above depicted components from one or more of the above depicted subsystems shown in FIG. 25. Components from the governing ultrasonic signals component group can be used in implementing execution of the one or more governing ultrasonic signals instructions i1219 of FIG. 42, can be used in performance of the governing ultrasonic signals electrical circuitry arrangement e1219 of FIG. 35, and/or can be used in otherwise fulfillment of the operation o1219. An exemplary non-transitory signal bearing medium version of the information storage subsystem s200 is depicted in FIG. 42 as bearing the one or more governing ultrasonic signals instructions i1219 that when executed will direct performance of the operation o1219. Furthermore, the governing ultrasonic signals electrical circuitry arrangement ("elec circ arrange") e1219, when activated, will perform the operation o1219. Also, the governing ultrasonic signals module m1219, when executed and/or activated, will direct performance of and/or perform the operation o1219. For instance, in one or more exemplary implementations, the one or more governing ultrasonic signals instructions i1219, when executed, direct performance of the operation o1219 in the illustrative depiction as follows, and/or the governing ultrasonic signals electrical circuitry arrangement e1219, when activated, performs the operation o1219 in the illustrative depiction as follows, and/or the governing ultrasonic signals module m1219, when executed and/or activated, directs performance of and/or performs the operation o1219 in the illustrative depiction as follows, and/or the operation o1219 is otherwise carried out in the illustrative depiction as follows: electronically governing (e.g. by near-field infrared receiver, etc.) for output (e.g. from one or more polyvinylidene fluoride film transducer portions, etc.) of one or more beams (e.g. including containing some portions, etc.) the of said one or more modulated acoustic ultrasonic signals (e.g. via one or more acoustic ultrasonic signals configured to be demodulated through nonlinear apparel interaction to at least in part produce one or more acoustic audio signals, etc.) from said one or more portable electronic device emitters (e.g. including one or more transducer array arrangements, etc.) of said portable electronic device (e.g. including one or more boombox components, etc.) for demodulation (e.g. including at least in part demodulation by signal filtering, etc.) of said one or more modulated acoustic ultrasonic signals (e.g. via one or more acoustic ultrasonic signals configured to be demodulated through nonlinear apparel interaction to at least in part produce one or more acoustic audio signals, etc.) into one or more acoustic audio signals (e.g. including one or more pre-recorded information containing acoustic audio signals, etc.) containing said one or more information signals (e.g. including classical music selection information, etc.) at a first location (e.g. inclusive to one or more chosen distances, etc.) spaced away from said portable electronic device (e.g. less than a distance from a portable device to a person, etc.) and spaced away from a second location (e.g. inclusive to one or more selected microphones, etc.) including one or more ultrasonic signals having frequencies with a range of between 60 to 200 kHz (e.g. including an acoustic ultrasonic carrier signal including frequency of 150 kHz, etc.).

In one or more implementations, as shown in FIG. 74, operation o12 includes an operation o1220 for electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including vectoring of two or more beams of acoustic ultrasonic signals to down convert to one or more acoustic audio signals. Origination of an illustratively derived governing vectoring component group can be accomplished through skilled in the art design choice selection of one or more of the above depicted components from one or more of the above depicted subsystems shown in FIG. 25. Components from the governing vectoring component group can be used in implementing execution of the one or more governing vectoring instructions i1220 of FIG. 43, can be used in performance of the governing vectoring electrical circuitry arrangement e1220 of FIG. 36, and/or can be used in otherwise fulfillment of the operation o1220. An exemplary non-transitory signal bearing medium version of the information storage subsystem s200 is depicted in FIG. 43 as bearing the one or more governing vectoring instructions i1220 that when executed will direct performance of the operation o1220. Furthermore, the governing vectoring electrical circuitry arrangement ("elec circ arrange") e1220, when activated, will perform the operation o1220. Also, the governing vectoring module m1220, when executed and/or activated, will direct performance of and/or perform the operation o1220. For instance, in one or more exemplary implementations, the one or more governing vectoring instructions i1220, when executed, direct performance of the operation o1220 in the illustrative depiction as follows, and/or the governing vectoring electrical circuitry arrangement e1220, when activated, performs the operation o1220 in the illustrative depiction as follows, and/or the governing vectoring module m1220, when executed and/or activated, directs performance of and/or performs the operation o1220 in the illustrative depiction as follows, and/or the operation o1220 is otherwise carried out in the illustrative depiction as follows: electronically governing (e.g. from hard drive access, etc.) for output (e.g. using one or more deposition transducer portions, etc.) of one or more beams (e.g. including containing all portions, etc.) the of said one or more modulated acoustic ultrasonic signals (e.g. via one or more acoustic ultrasonic signals configured to be demodulated through nonlinear interaction with one or more solids to at least in part generate one or more acoustic audio signals, etc.) from said one or more portable electronic device emitters (e.g. including one or more membrane speaker arrangements, etc.) of said portable electronic device (e.g. including one or more digital audio output components, etc.) for demodulation (e.g. including at least in part demodulation through signal intelligence recovery, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) into one or more acoustic audio signals (e.g. including one or more processor generated information containing acoustic audio signals, etc.) containing said one or more information signals (e.g. including instructional lesson material information, etc.) at a first location (e.g. inclusive to one or more selected ranges, etc.) spaced away from said portable electronic device (e.g. less than a distance from a display screen to a person, etc.) and spaced away from a second location (e.g. inclusive to one or more designated surfaces, etc.) including vectoring of two or more beams of acoustic ultrasonic signals to down convert to one or more acoustic audio signals (e.g. including transmitting two ultrasonic beams having carrier frequencies of 180 kHz that interact nonlinearly in a vicinity of a target listener to down-convert acoustic audio signals being produced by a media show being played on the laptop transmitting the ultrasonic beams, etc.).

In one or more implementations, as shown in FIG. 74, operation o12 includes an operation o1221 for electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting one or more acoustic ultrasonic signals to produce one or more acoustic audio signals through non-linear atmospheric interaction. Origination of an illustratively derived governing atmospheric interaction component group can be accomplished through skilled in the art design choice selection of one or more of the above depicted components from one or more of the above depicted subsystems shown in FIG. 25. Components from the governing atmospheric interaction component group can be used in implementing execution of the one or more governing atmospheric interaction instructions i1221 of FIG. 43, can be used in performance of the governing atmospheric interaction electrical circuitry arrangement e1221 of FIG. 36, and/or can be used in otherwise fulfillment of the operation o1221. An exemplary non-transitory signal bearing medium version of the information storage subsystem s200 is depicted in FIG. 43 as bearing the one or more governing atmospheric interaction instructions i1221 that when executed will direct performance of the operation o1221. Furthermore, the governing atmospheric interaction electrical circuitry arrangement ("elec circ arrange") e1221, when activated, will perform the operation o1221. Also, the governing atmospheric interaction module m1221, when executed and/or activated, will direct performance of and/or perform the operation o1221. For instance, in one or more exemplary implementations, the one or more governing atmospheric interaction instructions i1221, when executed, direct performance of the operation o1221 in the illustrative depiction as follows, and/or the governing atmospheric interaction electrical circuitry arrangement e1221, when activated, performs the operation o1221 in the illustrative depiction as follows, and/or the governing atmospheric interaction module m1221, when executed and/or activated, directs performance of and/or performs the operation o1221 in the illustrative depiction as follows, and/or the operation o1221 is otherwise carried out in the illustrative depiction as follows: electronically governing (e.g. using fiber optic communication, etc.) for output (e.g. via one or more dispersed transducer portions, etc.) of one or more beams (e.g. including containing measure portions, etc.) the of said one or more modulated acoustic ultrasonic signals (e.g. via one or more acoustic ultrasonic signals including signals having one or more frequencies above 60 kHz, etc.) from said one or more portable electronic device emitters (e.g. including one or more ultrasonic transducer arrangements, etc.) of said portable electronic device (e.g. including one or more CD player components, etc.) for demodulation (e.g. including demodulation via mutual interference therewith multiple acoustic ultrasonic signals configured to be demodulated through to at least in part result in one or more acoustic audio signals, etc.) of said one or more modulated acoustic ultrasonic signals (e.g. via one or more acoustic ultrasonic signals including signals having one or more frequencies above 60 kHz, etc.) into one or more acoustic audio signals (e.g. including one or more internet based information containing acoustic audio signals, etc.) containing said one or more information signals (e.g. including warning tone information, etc.) at a first location (e.g. exclusive to within a vicinity of one or more designated ears, etc.) spaced away from said portable electronic device (e.g. less than a distance from a portable device to an ear, etc.) and spaced away from a second location (e.g. inclusive to one or more identified objects, etc.) including outputting one or more acoustic ultrasonic signals to produce one or more acoustic audio signals through non-linear atmospheric interaction (e.g. including transmitting an ultrasonic beam having carrier frequency of 120 kHz that interacts nonlinearly with air in a vicinity of a target listener to down-convert acoustic audio signals being produced by a mp3 file being played on a tablet computer transmitting the ultrasonic beam, etc.).

In one or more implementations, as shown in FIG. 75, operation o12 includes an operation o1222 for electronically governing for output of one or more beams the of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including outputting one or more acoustic ultrasonic signals to produce one or more acoustic audio signals through non-linear human tissue interaction. Origination of an illustratively derived governing human tissue component group can be accomplished through skilled in the art design choice selection of one or more of the above depicted components from one or more of the above depicted subsystems shown in FIG. 25. Components from the governing human tissue component group can be used in implementing execution of the one or more governing human tissue instructions i1222 of FIG. 43, can be used in performance of the governing human tissue electrical circuitry arrangement e1222 of FIG. 36, and/or can be used in otherwise fulfillment of the operation o1222. An exemplary non-transitory signal bearing medium version of the information storage subsystem s200 is depicted in FIG. 43 as bearing the one or more governing human tissue instructions i1222 that when executed will direct performance of the operation o1222. Furthermore, the governing human tissue electrical circuitry arrangement ("elec circ arrange") e1222, when activated, will perform the operation o1222. Also, the governing human tissue module m1222, when executed and/or activated, will direct performance of and/or perform the operation o1222. For instance, in one or more exemplary implementations, the one or more governing human tissue instructions i1222, when executed, direct performance of the operation o1222 in the illustrative depiction as follows, and/or the governing human tissue electrical circuitry arrangement e1222, when activated, performs the operation o1222 in the illustrative depiction as follows, and/or the governing human tissue module m1222, when executed and/or activated, directs performance of and/or performs the operation o1222 in the illustrative depiction as follows, and/or the operation o1222 is otherwise carried out in the illustrative depiction as follows: electronically governing (e.g. through sound wave reception, etc.) for output (e.g. by one or more monitor embedded transducer portions, etc.) of one or more beams (e.g. including containing phrase portions, etc.) the of said one or more modulated acoustic ultrasonic signals (e.g. via one or more acoustic ultrasonic signals including signals having one or more frequencies above 80 kHz, etc.) from said one or more portable electronic device emitters (e.g. including one or more electrostatic transducer arrangements, etc.) of said portable electronic device (e.g. including one or more digital music player components, etc.) for demodulation (e.g. including demodulation using one or more acoustic ultrasonic signals configured to be demodulated through nonlinear atmospheric interaction to at least in part generate one or more acoustic audio signals, etc.) of said one or more modulated acoustic ultrasonic signals (e.g. via one or more acoustic ultrasonic signals including signals having one or more frequencies above 80 kHz, etc.) into one or more acoustic audio signals (e.g. including one or more digital audio information containing acoustic audio signals, etc.) containing said one or more information signals (e.g. including white noise information, etc.) at a first location (e.g. exclusive to within a vicinity of one or more identified persons, etc.) spaced away from said portable electronic device (e.g. less than a distance from a display screen to an ear, etc.) and spaced away from a second location (e.g. inclusive to one or more predetermined locations, etc.) including outputting one or more acoustic ultrasonic signals to produce one or more acoustic audio signals through non-linear human tissue interaction (e.g. including transmitting an ultrasonic beam having carrier frequency of 160 kHz that interacts nonlinearly with human tissue of a target listener to down-convert acoustic audio signals being produced by a video file being played on a smart phone transmitting the ultrasonic beam, etc.).

In one or more implementations, as shown in FIG. 75, operation o12 includes an operation o1223 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via vectoring of two or more beams of acoustic ultrasonic signals interfering at one or more target locations. Origination of an illustratively derived governing signals interfering component group can be accomplished through skilled in the art design choice selection of one or more of the above depicted components from one or more of the above depicted subsystems shown in FIG. 25. Components from the governing signals interfering component group can be used in implementing execution of the one or more governing signals interfering instructions i1223 of FIG. 43, can be used in performance of the governing signals interfering electrical circuitry arrangement e1223 of FIG. 36, and/or can be used in otherwise fulfillment of the operation o1223. An exemplary non-transitory signal bearing medium version of the information storage subsystem s200 is depicted in FIG. 43 as bearing the one or more governing signals interfering instructions i1223 that when executed will direct performance of the operation o1223. Furthermore, the governing signals interfering electrical circuitry arrangement ("elec circ arrange") e1223, when activated, will perform the operation o1223. Also, the governing signals interfering module m1223, when executed and/or activated, will direct performance of and/or perform the operation o1223. For instance, in one or more exemplary implementations, the one or more governing signals interfering instructions i1223, when executed, direct performance of the operation o1223 in the illustrative depiction as follows, and/or the governing signals interfering electrical circuitry arrangement e1223, when activated, performs the operation o1223 in the illustrative depiction as follows, and/or the governing signals interfering module m1223, when executed and/or activated, directs performance of and/or performs the operation o1223 in the illustrative depiction as follows, and/or the operation o1223 is otherwise carried out in the illustrative depiction as follows: electronically governing (e.g. via radio frequency antenna, etc.) for output (e.g. from one or more keyboard embedded transducer portions, etc.) of one or more beams (e.g. including containing chapter portions, etc.) of said one or more modulated acoustic ultrasonic signals (e.g. via one or more acoustic ultrasonic signals including signals having one or more frequencies above 100 kHz, etc.) from said one or more portable electronic device emitters (e.g. including one or more piezoelectric transducer arrangements, etc.) of said portable electronic device (e.g. including one or more handheld radio components, etc.) the for demodulation (e.g. including demodulation with one or more acoustic ultrasonic signals configured to be demodulated through nonlinear human tissue interaction to at least in part produce one or more acoustic audio signals, etc.) of said one or more modulated acoustic ultrasonic signals (e.g. via one or more acoustic ultrasonic signals including signals having one or more frequencies above 100 kHz, etc.) into one or more acoustic audio signals (e.g. including one or more analog audio information containing acoustic audio signals, etc.)

containing said one or more information signals (e.g. including varying pitch information, etc.) at a first location (e.g. exclusive to within a vicinity of one or more predetermined ears, etc.) spaced away from said portable electronic device (e.g. less than a distance from a portable device to a center of a group, etc.) and spaced away from a second location (e.g. inclusive to one or more desired environments, etc.) via vectoring of two or more beams of acoustic ultrasonic signals interfering at one or more target locations (e.g. including transmitting two ultrasonic beams having carrier frequencies of 200 kHz that interact nonlinearly with each other in a vicinity of a target listener to down-convert acoustic audio signals being produced by an internet broadcast being played on a tablet computer transmitting the ultrasonic beams, etc.).

In one or more implementations, as shown in FIG. 75, operation o12 includes an operation o1224 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via one or more arrays of transducers to focus one or more beams of acoustic ultrasonic signals at one or more target locations. Origination of an illustratively derived governing transducers to focus component group can be accomplished through skilled in the art design choice selection of one or more of the above depicted components from one or more of the above depicted subsystems shown in FIG. 25. Components from the governing transducers to focus component group can be used in implementing execution of the one or more governing transducers to focus instructions i1224 of FIG. 43, can be used in performance of the governing transducers to focus electrical circuitry arrangement e1224 of FIG. 36, and/or can be used in otherwise fulfillment of the operation o1224. An exemplary non-transitory signal bearing medium version of the information storage subsystem s200 is depicted in FIG. 43 as bearing the one or more governing transducers to focus instructions i1224 that when executed will direct performance of the operation o1224. Furthermore, the governing transducers to focus electrical circuitry arrangement ("elec circ arrange") e1224, when activated, will perform the operation o1224. Also, the governing transducers to focus module m1224, when executed and/or activated, will direct performance of and/or perform the operation o1224. For instance, in one or more exemplary implementations, the one or more governing transducers to focus instructions i1224, when executed, direct performance of the operation o1224 in the illustrative depiction as follows, and/or the governing transducers to focus electrical circuitry arrangement e1224, when activated, performs the operation o1224 in the illustrative depiction as follows, and/or the governing transducers to focus module m1224, when executed and/or activated, directs performance of and/or performs the operation o1224 in the illustrative depiction as follows, and/or the operation o1224 is otherwise carried out in the illustrative depiction as follows: electronically governing (e.g. by reception of wireless transmission, etc.) for output (e.g. using one or more device body embedded transducer portions, etc.) of one or more beams (e.g. including containing sectional portions, etc.) of said one or more modulated acoustic ultrasonic signals (e.g. via one or more acoustic ultrasonic signals including signals having one or more frequencies above 120 kHz, etc.) from said one or more portable electronic device emitters (e.g. including one or more electrostrictive transducer arrangements, etc.) of said portable electronic device (e.g. including one or more spread spectrum components, etc.) the for demodulation (e.g. including demodulation by one or more acoustic ultrasonic signals configured to be demodulated through nonlinear polymeric interaction to at least in part result in one or more acoustic audio signals, etc.) of said one or more modulated acoustic ultrasonic signals (e.g. via one or more acoustic ultrasonic signals including signals having one or more frequencies above 120 kHz, etc.) into one or more acoustic audio signals (e.g. including one or more high frequency audio information containing acoustic audio signals, etc.) containing said one or more information signals (e.g. including note sequence information, etc.) at a first location (e.g. exclusive to within a vicinity of one or more desired groups of people, etc.) spaced away from said portable electronic device (e.g. less than a distance from a display screen to a center of a group, etc.) and spaced away from a second location (e.g. inclusive to one or more chosen distances, etc.) via one or more arrays of transducers to focus one or more beams of acoustic ultrasonic signals at one or more target locations (e.g. including an array of transducers on a laptop having a focal point for a beam of acoustic ultrasonic signals of carrier frequency of 120 kHz in a vicinity of an ear of a target listener to be down converted into acoustic audio signals being played on the laptop, etc.).

In one or more implementations, as shown in FIG. 76, operation o12 includes an operation o1225 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via interference of two or more acoustic ultrasonic signals to produce one or more acoustic audio signals. Origination of an illustratively derived governing interference component group can be accomplished through skilled in the art design choice selection of one or more of the above depicted components from one or more of the above depicted subsystems shown in FIG. 25. Components from the governing interference component group can be used in implementing execution of the one or more governing interference instructions i1225 of FIG. 43, can be used in performance of the governing interference electrical circuitry arrangement e1225 of FIG. 36, and/or can be used in otherwise fulfillment of the operation o1225. An exemplary non-transitory signal bearing medium version of the information storage subsystem s200 is depicted in FIG. 43 as bearing the one or more governing interference instructions i1225 that when executed will direct performance of the operation o1225. Furthermore, the governing interference electrical circuitry arrangement ("elec circ arrange") e1225, when activated, will perform the operation o1225. Also, the governing interference module m1225, when executed and/or activated, will direct performance of and/or perform the operation o1225. For instance, in one or more exemplary implementations, the one or more governing interference instructions i1225, when executed, direct performance of the operation o1225 in the illustrative depiction as follows, and/or the governing interference electrical circuitry arrangement e1225, when activated, performs the operation o1225 in the illustrative depiction as follows, and/or the governing interference module m1225, when executed and/ or activated, directs performance of and/or performs the operation o1225 in the illustrative depiction as follows, and/or the operation o1225 is otherwise carried out in the illustrative depiction as follows: electronically governing (e.g. from memory stick access, etc.) for output (e.g. through one or more device perimeter embedded transducer portions, etc.) of one or more beams (e.g. including containing whole portions, etc.) of said one or more modulated acoustic ultrasonic signals (e.g. via one or more acoustic ultrasonic signals including signals having one or more frequencies above 140 kHz, etc.) from said one or more portable electronic device emitters (e.g. including one or more electro-thermo-mechanical film transducer arrangements, etc.) of said portable electronic device (e.g. including one or more wireless components, etc.) the for demodulation (e.g. including demodulation through one or more acoustic ultrasonic signals configured to be demodulated through nonlinear apparel interaction to at least in part produce one or more acoustic audio signals, etc.) of said one or more modulated acoustic ultrasonic signals (e.g. via one or more acoustic ultrasonic signals including signals having one or more frequencies above 140 kHz, etc.) into one or more acoustic audio signals (e.g. including one or more low frequency audio information containing acoustic audio signals, etc.) containing said one or more information signals (e.g. including two-way conversation information, etc.) at a first location (e.g. exclusive to within a vicinity of one or more chosen audio receivers, etc.) spaced away from said portable electronic device (e.g. less than a distance from a transmitter to a receiver, etc.) and spaced away from a second location (e.g. inclusive to one or more selected ranges, etc.) via interference of two or more acoustic ultrasonic signals to produce one or more acoustic audio signals (e.g. including transmitting two ultrasonic beams having carrier frequencies of 60 kHz that interact nonlinearly with each other in a vicinity of a target listener to down-convert acoustic audio signals being produced by a media player on a notebook computer transmitting the ultrasonic beams, etc.).

In one or more implementations, as shown in FIG. 76, operation o12 includes an operation o1226 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear atmospheric interaction of one or more acoustic ultrasonic signals. Origination of an illustratively derived governing nonlinear atmospheric component group can be accomplished through skilled in the art design choice selection of one or more of the above depicted components from one or more of the above depicted subsystems shown in FIG. 25. Components from the governing nonlinear atmospheric component group can be used in implementing execution of the one or more governing nonlinear atmospheric instructions i1226 of FIG. 43, can be used in performance of the governing nonlinear atmospheric electrical circuitry arrangement e1226 of FIG. 36, and/or can be used in otherwise fulfillment of the operation o1226. An exemplary non-transitory signal bearing medium version of the information storage subsystem s200 is depicted in FIG. 43 as bearing the one or more governing nonlinear atmospheric instructions i1226 that when executed will direct performance of the operation o1226. Furthermore, the governing nonlinear atmospheric electrical circuitry arrangement ("elec circ arrange") e1226, when activated, will perform the operation o1226. Also, the governing nonlinear atmospheric module m1226, when executed and/or activated, will direct performance of and/or perform the operation o1226. For instance, in one or more exemplary implementations, the one or more governing nonlinear atmospheric instructions i1226, when executed, direct performance of the operation o1226 in the illustrative depiction as follows, and/or the governing nonlinear atmospheric electrical circuitry arrangement e1226, when activated, performs the operation o1226 in the illustrative depiction as follows, and/or the governing nonlinear atmospheric module m1226, when executed and/or activated, directs performance of and/or performs the operation o1226 in the illustrative depiction as follows, and/or the operation o1226 is otherwise carried out in the illustrative depiction as follows: electronically governing (e.g. using flash drive stored data, etc.) for output (e.g. via one or more multiple emitter array portion, etc.) of one or more beams (e.g. including containing partial portions, etc.) of said one or more modulated acoustic ultrasonic signals (e.g. via one or more acoustic ultrasonic signals including signals having one or more frequencies above 160 kHz, etc.) from said one or more portable electronic device emitters (e.g. including one or more polyvinylidene fluoride film transducer arrangements, etc.) of said portable electronic device (e.g. including one or more frequency division multiplexing components, etc.) the for demodulation (e.g. including demodulation by one or more acoustic ultrasonic signals configured to be demodulated through nonlinear interaction with one or more solids to at least in part generate one or more acoustic audio signals, etc.) of said one or more modulated acoustic ultrasonic signals (e.g. via one or more acoustic ultrasonic signals including signals having one or more frequencies above 160 kHz, etc.) into one or more acoustic audio signals (e.g. including one or more low frequency acoustic audio signals, etc.) containing said one or more information signals (e.g. including confidential information, etc.) at a first location (e.g. exclusive to within a vicinity of one or more selected microphones, etc.) spaced away from said portable electronic device (e.g. less than a distance from a first seat back to a second seat back, etc.) and spaced away from a second location (e.g. inclusive to one or more designated directions, etc.) via nonlinear atmospheric interaction of one or more acoustic ultrasonic signals (e.g. including transmitting an acoustic ultrasonic signal having carrier frequency of 80 kHz that interacts nonlinearly with air in a vicinity of a target listener to down-convert acoustic audio signals being produced by an audio player of a smart phone transmitting the acoustic ultrasonic signal, etc.).

In one or more implementations, as shown in FIG. 76, operation o12 includes an operation o1227 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear human tissue interaction of one or more acoustic ultrasonic signals. Origination of an illustratively derived governing nonlinear tissue component group can be accomplished through skilled in the art design choice selection of one or more of the above depicted components from one or more of the above depicted subsystems shown in FIG. 25. Components from the governing nonlinear tissue component group can be used in implementing execution of the one or more governing nonlinear tissue instructions i1227 of FIG. 43, can be used in performance of the governing nonlinear tissue electrical circuitry arrangement e1227 of FIG. 36, and/or can be used in otherwise fulfillment of the operation o1227. An exemplary non-transitory signal bearing medium version of the information storage subsystem s200 is depicted in FIG. 43 as bearing the one or more governing nonlinear tissue instructions i1227 that when executed will direct performance of the operation o1227. Furthermore, the governing nonlinear tissue electrical circuitry arrangement ("elec circ arrange") e1227, when activated, will perform the operation o1227. Also, the governing nonlinear tissue module m1227, when executed and/or activated, will direct performance of and/or perform the operation o1227. For instance, in one or more exemplary implementations, the one or more governing nonlinear tissue instructions i1227, when executed, direct performance of the operation o1227 in the illustrative depiction as follows, and/or the governing nonlinear tissue electrical circuitry arrangement e1227, when activated, performs the operation o1227 in the illustrative depiction as follows, and/or the governing nonlinear tissue module m1227, when executed and/or activated, directs performance of and/or performs the operation o1227 in the illustrative depiction as follows, and/or the operation o1227 is otherwise carried out in the illustrative depiction as follows: electronically governing (e.g. through processor synthesized information, etc.) for output (e.g. through one or more cable interface portions, etc.) of one or more beams (e.g. including containing transitionary portions, etc.) of said one or more modulated acoustic ultrasonic signals (e.g. via one or more acoustic ultrasonic signals including signals having one or more frequencies above 180 kHz, etc.) from said one or more portable electronic device emitters (e.g. including one or more deposition transducer arrangements, etc.) of said portable electronic device (e.g. including one or more time division multiplexing components, etc.) the for demodulation (e.g. including at least in part demodulation by signal down conversion, etc.) of said one or more modulated acoustic ultrasonic signals (e.g. via one or more acoustic ultrasonic signals including signals having one or more frequencies above 180 kHz, etc.) into one or more acoustic audio signals (e.g. including one or more high frequency acoustic audio signals, etc.) containing said one or more information signals (e.g. including eavesdropping information, etc.) at a first location (e.g. exclusive to within a vicinity of one or more designated surfaces, etc.) spaced away from said portable electronic device (e.g. less than a distance from a seat back to a tray table, etc.) and spaced away from a second location (e.g. exclusive to within a vicinity of one or more designated ears, etc.) via nonlinear human tissue interaction of one or more acoustic ultrasonic signals (e.g. including transmitting an acoustic ultrasonic signal having carrier frequency of 130 kHz that interacts nonlinearly with human tissue of a target listener to down-convert acoustic audio signals being produced by a CD player being operated by a business laptop transmitting the acoustic ultrasonic signal, etc.).

In one or more implementations, as shown in FIG. 77, operation o12 includes an operation o1228 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear non-tissue solid interaction of one or more acoustic ultrasonic signals. Origination of an illustratively derived governing nonlinear non-tissue component group can be accomplished through skilled in the art design choice selection of one or more of the above depicted components from one or more of the above depicted subsystems shown in FIG. 25. Components from the governing nonlinear non-tissue component group can be used in implementing execution of the one or more governing nonlinear non-tissue instructions i1228 of FIG. 43, can be used in performance of the governing nonlinear non-tissue electrical circuitry arrangement e1228 of FIG. 36, and/or can be used in otherwise fulfillment of the operation o1228. An exemplary non-transitory signal bearing medium version of the information storage subsystem s200 is depicted in FIG. 43 as bearing the one or more governing nonlinear non-tissue instructions i1228 that when executed will direct performance of the operation o1228. Furthermore, the governing nonlinear non-tissue electrical circuitry arrangement ("elec circ arrange") e1228, when activated, will perform the operation o1228. Also, the governing nonlinear non-tissue module m1228, when executed and/or activated, will direct performance of and/or perform the operation o1228. For instance, in one or more exemplary implementations, the one or more governing nonlinear non-tissue instructions i1228, when executed, direct performance of the operation o1228 in the illustrative depiction as follows, and/or the governing nonlinear non-tissue electrical circuitry arrangement e1228, when activated, performs the operation o1228 in the illustrative depiction as follows, and/or the governing nonlinear non-tissue module m1228, when executed and/or activated, directs performance of and/or performs the operation o1228 in the illustrative depiction as follows, and/or the operation o1228 is otherwise carried out in the illustrative depiction as follows: electronically governing (e.g. via ROM drive reads, etc.) for output (e.g. via one or more speaker portions, etc.) of one or more beams (e.g. including containing temporary portions, etc.) of said one or more modulated acoustic ultrasonic signals (e.g. via one or more acoustic ultrasonic signals including signals having one or more frequencies above 200 kHz, etc.) from said one or more portable electronic device emitters (e.g. including one or more emitter array arrangements, etc.) of said portable electronic device (e.g. including one or more clamshell phone components, etc.) the for demodulation (e.g. including at least in part demodulation through signal amplitude demodulation, etc.) of said one or more modulated acoustic ultrasonic signals (e.g. via one or more acoustic ultrasonic signals including signals having one or more frequencies above 200 kHz, etc.) into one or more acoustic audio signals (e.g. including one or more full spectrum acoustic audio signals, etc.) containing said one or more information signals (e.g. including pre-recorded information, etc.) at a first location (e.g. exclusive to within a vicinity of one or more identified objects, etc.) spaced away from said portable electronic device (e.g. less than a distance of an aisle way, etc.) and spaced away from a second location (e.g. exclusive to within a vicinity of one or more identified persons, etc.) via nonlinear non-tissue solid interaction of one or more acoustic ultrasonic signals (e.g. including transmitting an acoustic ultrasonic signal having carrier frequency of 60 kHz that interacts nonlinearly with non-tissue solid near a target listener to down-convert acoustic audio signals stored in memory of a two-way radio transmitting the acoustic ultrasonic signal, etc.).

In one or more implementations, as shown in FIG. 77, operation o12 includes an operation o1229 for electronically governing for output of one or more beams of said one or more modulated acoustic ultrasonic signals from said one or more portable electronic device emitters of said portable electronic device the for demodulation of said one or more modulated acoustic ultrasonic signals into one or more acoustic audio signals containing said one or more information signals at a first location spaced away from said portable electronic device and spaced away from a second location via nonlinear personal ornament interaction of one or more acoustic ultrasonic signals. Origination of an illustratively derived governing nonlinear personal component group can be accomplished through skilled in the art design choice selection of one or more of the above depicted components from one or more of the above depicted subsystems shown in FIG. 25. Components from the governing nonlinear personal component group can be used in implementing execution of the one or more governing nonlinear personal instructions i1229 of FIG. 43, can be used in performance of the governing nonlinear personal electrical circuitry arrangement e1229 of FIG. 36, and/or can be used in otherwise fulfillment of the operation o1229. An exemplary non-transitory signal bearing medium version of the information storage subsystem s200 is depicted in FIG. 43 as bearing the one or more governing nonlinear personal instructions i1229 that when executed will direct performance of the operation o1229. Furthermore, the governing nonlinear personal electrical circuitry arrangement ("elec circ arrange") e1229, when activated, will perform the operation o1229. Also, the governing nonlinear personal module m1229, when executed and/or activated, will direct performance of and/or perform the operation o1229. For instance, in one or more exemplary implementations, the one or more governing nonlinear personal instructions i1229, when executed, direct performance of the operation o1229 in the illustrative depiction as follows, and/or the governing nonlinear personal electrical circuitry arrangement e1229, when activated, performs the operation o1229 in the illustrative depiction as follows, and/or the governing nonlinear personal module m1229, when executed and/or activated, directs performance of and/or performs the operation o1229 in the illustrative depiction as follows, and/or the operation o1229 is otherwise carried out in the illustrative depiction as follows: electronically governing (e.g. by CD-ROM playback, etc.) for output (e.g. by one or more transducer portions, etc.) of one or more beams (e.g. including containing steady state portions, etc.) of said one or more modulated acoustic ultrasonic signals (e.g. via multiple acoustic ultrasonic signals configured to be demodulated through mutual interference therewith to at least in part result in one or more acoustic audio signals, etc.) from said one or more portable electronic device emitters (e.g. including one or more dispersed transducer arrangements, etc.) of said portable electronic device (e.g. including one or more media player components, etc.) the for demodulation (e.g. including at least in part demodulation via signal frequency demodulation portions, etc.) of said one or more modulated acoustic ultrasonic signals (e.g. via multiple acoustic ultrasonic signals configured to be demodulated through mutual interference therewith to at least in part result in one or more acoustic audio signals, etc.) into one or more acoustic audio signals (e.g. including one or more partial spectrum acoustic audio signals, etc.) containing said one or more information signals (e.g. including processor generated information, etc.) at a first location (e.g. exclusive to within a vicinity of one or more predetermined locations, etc.) spaced away from said portable electronic device (e.g. less than a distance from a desk to a chair, etc.) and spaced away from a second location (e.g. exclusive to within a vicinity of one or more predetermined ears, etc.) via nonlinear personal ornament interaction of one or more acoustic ultrasonic signals (e.g. including transmitting an acoustic ultrasonic signal having carrier frequency of 110 kHz that interacts nonlinearly with an ear ring of a target listener to down-convert acoustic audio signals being produced by an mp3 player transmitting the acoustic ultrasonic signal, etc.).

In one or more implementations, as shown in FIG. 77, operation o12 includes an operation o1230 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more audio signals tailored to frequency response information for one or more ears of a target human listener. Origination of an illustratively derived governing ears of a target component group can be accomplished through skilled in the art design choice selection of one or more of the above depicted components from one or more of the above depicted subsystems shown in FIG. 25. Components from the governing ears of a target component group can be used in implementing execution of the one or more governing ears of a target instructions i1230 of FIG. 43, can be used in performance of the governing ears of a target electrical circuitry arrangement e1230 of FIG. 36, and/or can be used in otherwise fulfillment of the operation o1230. An exemplary non-transitory signal bearing medium version of the information storage subsystem s200 is depicted in FIG. 43 as bearing the one or more governing ears of a target instructions i1230 that when executed will direct performance of the operation o1230. Furthermore, the governing ears of a target electrical circuitry arrangement ("elec circ arrange") e1230, when activated, will perform the operation o1230. Also, the governing ears of a target module m1230, when executed and/or activated, will direct performance of and/or perform the operation o1230. For instance, in one or more exemplary implementations, the one or more governing ears of a target instructions i1230, when executed, direct performance of the operation o1230 in the illustrative depiction as follows, and/or the governing ears of a target electrical circuitry arrangement e1230, when activated, performs the operation o1230 in the illustrative depiction as follows, and/or the governing ears of a target module m1230, when executed and/or activated, directs performance of and/or performs the operation o1230 in the illustrative depiction as follows, and/or the operation o1230 is otherwise carried out in the illustrative depiction as follows: electronically governing (e.g. from DVD player, etc.) for output (e.g. from one or more aperture portions, etc.) of one or more beams (e.g. including containing integrated portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) from said one or more portable electronic device emitters (e.g. including one or more monitor embedded transducer arrangements, etc.) of said portable electronic device (e.g. including one or more 3G mobile components, etc.) for demodulation (e.g. including at least in part demodulation with signal phase demodulation portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) the into one or more acoustic audio signals (e.g. including one or more low amplitude acoustic audio signals, etc.) containing said one or more information signals (e.g. including internet based information, etc.) at a first location (e.g. exclusive to within a vicinity of one or more desired environments, etc.) spaced away from said portable electronic device (e.g. less than a distance from a dashboard to a headrest, etc.) and spaced away from a second location (e.g. exclusive to within a vicinity of one or more desired groups of people, etc.) including one or more audio signals tailored to frequency response information for one or more ears of a target human listener (e.g. including acoustic audio signals tailored each for right and left ears of a target listener to account for loss of hearing by the target listener in calibrated frequency ranges, etc.).

In one or more implementations, as shown in FIG. 78, operation o12 includes an operation o1231 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals containing one or more digitally coded identifiers. Origination of an illustratively derived governing digitally coded component group can be accomplished through skilled in the art design choice selection of one or more of the above depicted components from one or more of the above depicted subsystems shown in FIG. 25. Components from the governing digitally coded component group can be used in implementing execution of the one or more governing digitally coded instructions i1231 of FIG. 43, can be used in performance of the governing digitally coded electrical circuitry arrangement e1231 of FIG. 36, and/or can be used in otherwise fulfillment of the operation o1231. An exemplary non-transitory signal bearing medium version of the information storage subsystem s200 is depicted in FIG. 43 as bearing the one or more governing digitally coded instructions i1231 that when executed will direct performance of the operation o1231. Furthermore, the governing digitally coded electrical circuitry arrangement ("elec circ arrange") e1231, when activated, will perform the operation o1231. Also, the governing digitally coded module m1231, when executed and/or activated, will direct performance of and/or perform the operation o1231. For instance, in one or more exemplary implementations, the one or more governing digitally coded instructions i1231, when executed, direct performance of the operation o1231 in the illustrative depiction as follows, and/or the governing digitally coded electrical circuitry arrangement e1231, when activated, performs the operation o1231 in the illustrative depiction as follows, and/or the governing digitally coded module m1231, when executed and/or activated, directs performance of and/or performs the operation o1231 in the illustrative depiction as follows, and/or the operation o1231 is otherwise carried out in the illustrative depiction as follows: electronically governing (e.g. through reception of cable communication packets, etc.) for output (e.g. using one or more transmitter portions, etc.) of one or more beams (e.g. including containing disparate portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) from said one or more portable electronic device emitters (e.g. including one or more keyboard embedded transducer arrangements, etc.) of said portable electronic device (e.g. including one or more cellular components, etc.) for demodulation (e.g. including at least in part demodulation using signal rectification, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) the into one or more acoustic audio signals (e.g. including one or more high amplitude acoustic audio signals, etc.) containing said one or more information signals (e.g. including digital audio information, etc.) at a first location (e.g. exclusive to within a vicinity of one or more chosen distances, etc.) spaced away from said portable electronic device (e.g. more than confines of a room, etc.) and spaced away from a second location (e.g. exclusive to within a vicinity of one or more chosen audio receivers, etc.) including one or more acoustic audio signals containing one or more digitally coded identifiers (e.g. including digitally coded identifiers placed in the acoustic audio signals to be used for quality control of down-converted audio signals in a vicinity near a target listener, etc.).

In one or more implementations, as shown in FIG. 78, operation o12 includes an operation o1232 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals tailored according to a sensed acoustic environment. Origination of an illustratively derived governing signals tailored component group can be accomplished through skilled in the art design choice selection of one or more of the above depicted components from one or more of the above depicted subsystems shown in FIG. 25. Components from the governing signals tailored component group can be used in implementing execution of the one or more governing signals tailored instructions i1232 of FIG. 43, can be used in performance of the governing signals tailored electrical circuitry arrangement e1232 of FIG. 36, and/or can be used in otherwise fulfillment of the operation o1232. An exemplary non-transitory signal bearing medium version of the information storage subsystem s200 is depicted in FIG. 43 as bearing the one or more governing signals tailored instructions i1232 that when executed will direct performance of the operation o1232. Furthermore, the governing signals tailored electrical circuitry arrangement ("elec circ arrange") e1232, when activated, will perform the operation o1232. Also, the governing signals tailored module m1232, when executed and/or activated, will direct performance of and/or perform the operation o1232. For instance, in one or more exemplary implementations, the one or more governing signals tailored instructions i1232, when executed, direct performance of the operation o1232 in the illustrative depiction as follows, and/or the governing signals tailored electrical circuitry arrangement e1232, when activated, performs the operation o1232 in the illustrative depiction as follows, and/or the governing signals tailored module m1232, when executed and/or activated, directs performance of and/or performs the operation o1232 in the illustrative depiction as follows, and/or the operation o1232 is otherwise carried out in the illustrative depiction as follows: electronically governing (e.g. via Wi-Fi signal reception, etc.) for output (e.g. through one or more air-coupled transducer portions, etc.) of one or more beams (e.g. including containing beginning portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) from said one or more portable electronic device emitters (e.g. including one or more device body embedded transducer arrangements, etc.) of said portable electronic device (e.g. including one or more 4G components, etc.) for demodulation (e.g. including at least in part demodulation by signal filtering, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) the into one or more acoustic audio signals (e.g. including one or more high frequency acoustic audio signals, etc.) containing said one or more information signals (e.g. including analog audio information, etc.) at a first location (e.g. exclusive to within a vicinity of one or more selected ranges, etc.) spaced away from said portable electronic device (e.g. more than an arm's length, etc.) and spaced away from a second location (e.g. exclusive to within a vicinity of one or more selected microphones, etc.) including one or more acoustic audio signals tailored according to a sensed acoustic environment (e.g. including frequency mixing of acoustic audio signals modulating acoustic ultrasonic signals based upon sensed frequency response of down converted acoustic audio signals near a target listener, etc.).

In one or more implementations, as shown in FIG. 78, operation o12 includes an operation o1233 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals tailored according to feedback sensing by portable electronic device. Origination of an illustratively derived governing feedback sensing component group can be accomplished through skilled in the art design choice selection of one or more of the above depicted components from one or more of the above depicted subsystems shown in FIG. 25. Components from the governing feedback sensing component group can be used in implementing execution of the one or more governing feedback sensing instructions i1233 of FIG. 43, can be used in performance of the governing feedback sensing electrical circuitry arrangement e1233 of FIG. 36, and/or can be used in otherwise fulfillment of the operation o1233. An exemplary non-transitory signal bearing medium version of the information storage subsystem s200 is depicted in FIG. 43 as bearing the one or more governing feedback sensing instructions i1233 that when executed will direct performance of the operation o1233. Furthermore, the governing feedback sensing electrical circuitry arrangement ("elec circ arrange") e1233, when activated, will perform the operation o1233. Also, the governing feedback sensing module m1233, when executed and/or activated, will direct performance of and/or perform the operation o1233. For instance, in one or more exemplary implementations, the one or more governing feedback sensing instructions i1233, when executed, direct performance of the operation o1233 in the illustrative depiction as follows, and/or the governing feedback sensing electrical circuitry arrangement e1233, when activated, performs the operation o1233 in the illustrative depiction as follows, and/or the governing feedback sensing module m1233, when executed and/or activated, directs performance of and/or performs the operation o1233 in the illustrative depiction as follows, and/or the operation o1233 is otherwise carried out in the illustrative depiction as follows: electronically governing (e.g. by near-field infrared receiver, etc.) for output (e.g. via one or more thin-film membrane portions, etc.) of one or more beams (e.g. including containing middle portions, etc.) of said one or more modulated acoustic ultrasonic signals (e.g. via one or more acoustic ultrasonic signals configured to be demodulated through nonlinear apparel interaction to at least in part produce one or more acoustic audio signals, etc.) from said one or more portable electronic device emitters (e.g. including one or more device perimeter embedded transducer arrangements, etc.) of said portable electronic device (e.g. including one or more WiFi components, etc.) for demodulation (e.g. including at least in part demodulation through signal intelligence recovery, etc.) of said one or more modulated acoustic ultrasonic signals (e.g. via one or more acoustic ultrasonic signals configured to be demodulated through nonlinear apparel interaction to at least in part produce one or more acoustic audio signals, etc.) the into one or more acoustic audio signals (e.g. including one or more lecture information containing acoustic audio signals, etc.) containing said one or more information signals (e.g. including high frequency audio information, etc.) at a first location (e.g. exclusive to within a vicinity of one or more designated directions, etc.) spaced away from said portable electronic device (e.g. more than a three-foot radius, etc.) and spaced away from a second location (e.g. exclusive to within a vicinity of one or more designated surfaces, etc.) including one or more acoustic audio signals tailored according to feedback sensing by portable electronic device (e.g. including amplitude adjustment of various frequency bands of acoustic audio signals modulating acoustic ultrasonic signals based upon verbal feedback inputted into a tablet computer by a target listener based upon perceived reception of down converted audio by the target listener, etc.).

In one or more implementations, as shown in FIG. 79, operation o12 includes an operation o1234 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more binaural acoustic audio signals. Origination of an illustratively derived governing binaural acoustic component group can be accomplished through skilled in the art design choice selection of one or more of the above depicted components from one or more of the above depicted subsystems shown in FIG. 25. Components from the governing binaural acoustic component group can be used in implementing execution of the one or more governing binaural acoustic instructions i1234 of FIG. 43, can be used in performance of the governing binaural acoustic electrical circuitry arrangement e1234 of FIG. 36, and/or can be used in otherwise fulfillment of the operation o1234. An exemplary non-transitory signal bearing medium version of the information storage subsystem s200 is depicted in FIG. 43 as bearing the one or more governing binaural acoustic instructions i1234 that when executed will direct performance of the operation o1234. Furthermore, the governing binaural acoustic electrical circuitry arrangement ("elec circ arrange") e1234, when activated, will perform the operation o1234. Also, the governing binaural acoustic module m1234, when executed and/or activated, will direct performance of and/or perform the operation o1234. For instance, in one or more exemplary implementations, the one or more governing binaural acoustic instructions i1234, when executed, direct performance of the operation o1234 in the illustrative depiction as follows, and/or the governing binaural acoustic electrical circuitry arrangement e1234, when activated, performs the operation o1234 in the illustrative depiction as follows, and/or the governing binaural acoustic module m1234, when executed and/or activated, directs performance of and/or performs the operation o1234 in the illustrative depiction as follows, and/or the operation o1234 is otherwise carried out in the illustrative depiction as follows: electronically governing (e.g. from hard drive access, etc.) for output (e.g. by one or more resonant surface portions, etc.) of one or more beams (e.g. including containing end portions, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) from said one or more portable electronic device emitters (e.g. including one or more multiple emitter array arrangements, etc.) of said portable electronic device (e.g. including one or more infrared components, etc.) for demodulation (e.g. including demodulation via mutual interference therewith multiple acoustic ultrasonic signals configured to be demodulated through to at least in part result in one or more acoustic audio signals, etc.) of one or more modulated acoustic ultrasonic signals (e.g. via one or more acoustic ultrasonic signals configured to be demodulated through nonlinear interaction with one or more solids to at least in part generate one or more acoustic audio signals, etc.) the into one or more acoustic audio signals (e.g. including one or more foreign language speech information containing acoustic audio signals, etc.) containing said one or more information signals (e.g. including low frequency audio information, etc.) at a first location (e.g. inclusive to within a vicinity of one or more designated ears, etc.) spaced away from said portable electronic device (e.g. more than a distance from a portable device to a person, etc.) and spaced away from a second location (e.g. exclusive to within a vicinity of one or more identified objects, etc.) including one or more binaural acoustic audio signals (e.g. including transmitting independently modulated acoustic ultrasonic signals to be separately down converted at each individual ear of a target listener, etc.).

In one or more implementations, as shown in FIG. 79, operation o12 includes an operation o1235 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more stereophonic acoustic audio signals. Origination of an illustratively derived governing stereophonic acoustic component group can be accomplished through skilled in the art design choice selection of one or more of the above depicted components from one or more of the above depicted subsystems shown in FIG. 25. Components from the governing stereophonic acoustic component group can be used in implementing execution of the one or more governing stereophonic acoustic instructions i1235 of FIG. 43, can be used in performance of the governing stereophonic acoustic electrical circuitry arrangement e1235 of FIG. 36, and/or can be used in otherwise fulfillment of the operation o1235. An exemplary non-transitory signal bearing medium version of the information storage subsystem s200 is depicted in FIG. 43 as bearing the one or more governing stereophonic acoustic instructions i1235 that when executed will direct performance of the operation o1235. Furthermore, the governing stereophonic acoustic electrical circuitry arrangement ("elec circ arrange") e1235, when activated, will perform the operation o1235. Also, the governing stereophonic acoustic module m1235, when executed and/or activated, will direct performance of and/or perform the operation o1235. For instance, in one or more exemplary implementations, the one or more governing stereophonic acoustic instructions i1235, when executed, direct performance of the operation o1235 in the illustrative depiction as follows, and/or the governing stereophonic acoustic electrical circuitry arrangement e1235, when activated, performs the operation o1235 in the illustrative depiction as follows, and/or the governing stereophonic acoustic module m1235, when executed and/or activated, directs performance of and/or performs the operation o1235 in the illustrative depiction as follows, and/or the operation o1235 is otherwise carried out in the illustrative depiction as follows: electronically governing (e.g. using fiber optic communication, etc.) for output (e.g. from one or more signal processor portions, etc.) of one or more beams (e.g. including containing some portions, etc.) of said one or more modulated acoustic ultrasonic signals (e.g. via one or more acoustic ultrasonic signals including signals having one or more frequencies above 60 kHz, etc.) from said one or more portable electronic device emitters (e.g. including one or more perimeter arrays, etc.) of said portable electronic device (e.g. including one or more personal digital assistant components, etc.) for demodulation (e.g. including demodulation using one or more acoustic ultrasonic signals configured to be demodulated through nonlinear atmospheric interaction to at least in part generate one or more acoustic audio signals, etc.) of said one or more modulated acoustic ultrasonic signals (e.g. via one or more acoustic ultrasonic signals including signals having one or more frequencies above 60 kHz, etc.) the into one or more acoustic audio signals (e.g. including one or more classical music selection information containing acoustic audio signals, etc.) containing said one or more information signals (e.g. including containing beginning portions, etc.) at a first location (e.g. inclusive to within a vicinity of one or more identified persons, etc.) spaced away from said portable electronic device (e.g. more than a distance from a display screen to a person, etc.) and spaced away from a second location (e.g. exclusive to within a vicinity of one or more predetermined locations, etc.) including one or more stereophonic acoustic audio signals (e.g. including transmitting independently modulated acoustic ultrasonic signals to be down converted with stereophonic separation at the ears of a target listener, etc.).

In one or more implementations, as shown in FIG. 79, operation o12 includes an operation o1236 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more monophonic acoustic audio signals directed to a location of one ear of a target listener. Origination of an illustratively derived governing monophonic acoustic component group can be accomplished through skilled in the art design choice selection of one or more of the above depicted components from one or more of the above depicted subsystems shown in FIG. 25. Components from the governing monophonic acoustic component group can be used in implementing execution of the one or more governing monophonic acoustic instructions i1236 of FIG. 43, can be used in performance of the governing monophonic acoustic electrical circuitry arrangement e1236 of FIG. 36, and/or can be used in otherwise fulfillment of the operation o1236. An exemplary non-transitory signal bearing medium version of the information storage subsystem s200 is depicted in FIG. 43 as bearing the one or more governing monophonic acoustic instructions i1236 that when executed will direct performance of the operation o1236. Furthermore, the governing monophonic acoustic electrical circuitry arrangement ("elec circ arrange") e1236, when activated, will perform the operation o1236. Also, the governing monophonic acoustic module m1236, when executed and/or activated, will direct performance of and/or perform the operation o1236. For instance, in one or more exemplary implementations, the one or more governing monophonic acoustic instructions i1236, when executed, direct performance of the operation o1236 in the illustrative depiction as follows, and/or the governing monophonic acoustic electrical circuitry arrangement e1236, when activated, performs the operation o1236 in the illustrative depiction as follows, and/or the governing monophonic acoustic module m1236, when executed and/or activated, directs performance of and/or performs the operation o1236 in the illustrative depiction as follows, and/or the operation o1236 is otherwise carried out in the illustrative depiction as follows: electronically governing (e.g. using fiber optic communication, etc.) for output (e.g. using one or more transmitter portions, etc.) of one or more beams (e.g. including containing all portions, etc.) of said one or more modulated acoustic ultrasonic signals (e.g. via one or more acoustic ultrasonic signals including signals having one or more frequencies above 80 kHz, etc.) from said one or more portable electronic device emitters (e.g. including one or more polar arrays, etc.) of said portable electronic device (e.g. including one or more smart phone components, etc.) for demodulation (e.g. including demodulation with one or more acoustic ultrasonic signals configured to be demodulated through nonlinear human tissue interaction to at least in part produce one or more acoustic audio signals, etc.) of said one or more modulated acoustic ultrasonic signals (e.g. via one or more acoustic ultrasonic signals including signals having one or more frequencies above 80 kHz, etc.) the into one or more acoustic audio signals (e.g. including one or more instructional lesson material information containing acoustic audio signals, etc.) containing said one or more information signals (e.g. including containing middle portions, etc.) at a first location (e.g. inclusive to within a vicinity of one or more predetermined ears, etc.) spaced away from said portable electronic device (e.g. more than a distance from a portable device to an ear, etc.) and spaced away from a second location (e.g. exclusive to within a vicinity of one or more desired environments, etc.) including one or more monophonic acoustic audio signals directed to a location of one ear of a target listener (e.g. including transmitting modulated acoustic ultrasonic signals to be down converted monophonically at an ear of a target listener, etc.).

In one or more implementations, as shown in FIG. 80, operation o12 includes an operation o1237 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals containing out-of-phase cancellation of background sound in a vicinity of a target listener. Origination of an illustratively derived governing phase cancellation component group can be accomplished through skilled in the art design choice selection of one or more of the above depicted components from one or more of the above depicted subsystems shown in FIG. 25. Components from the governing phase cancellation component group can be used in implementing execution of the one or more governing phase cancellation instructions i1237 of FIG. 43, can be used in performance of the governing phase cancellation electrical circuitry arrangement e1237 of FIG. 36, and/or can be used in otherwise fulfillment of the operation o1237. An exemplary non-transitory signal bearing medium version of the information storage subsystem s200 is depicted in FIG. 43 as bearing the one or more governing phase cancellation instructions i1237 that when executed will direct performance of the operation o1237. Furthermore, the governing phase cancellation electrical circuitry arrangement ("elec circ arrange") e1237, when activated, will perform the operation o1237. Also, the governing phase cancellation module m1237, when executed and/or activated, will direct performance of and/or perform the operation o1237. For instance, in one or more exemplary implementations, the one or more governing phase cancellation instructions i1237, when executed, direct performance of the operation o1237 in the illustrative depiction as follows, and/or the governing phase cancellation electrical circuitry arrangement e1237, when activated, performs the operation o1237 in the illustrative depiction as follows, and/or the governing phase cancellation module m1237, when executed and/or activated, directs performance of and/or performs the operation o1237 in the illustrative depiction as follows, and/or the operation o1237 is otherwise carried out in the illustrative depiction as follows: electronically governing (e.g. through sound wave reception, etc.) for output (e.g. through one or more transducer membrane portions, etc.) of one or more beams (e.g. including containing measure portions, etc.) of said one or more modulated acoustic ultrasonic signals (e.g. via one or more acoustic ultrasonic signals including signals having one or more frequencies above 100 kHz, etc.) from said one or more portable electronic device emitters (e.g. including one or more orthographic arrays, etc.) of said portable electronic device (e.g. including one or more cell phone components, etc.) for demodulation (e.g. including demodulation by one or more acoustic ultrasonic signals configured to be demodulated through nonlinear polymeric interaction to at least in part result in one or more acoustic audio signals, etc.) of said one or more modulated acoustic ultrasonic signals (e.g. via one or more acoustic ultrasonic signals including signals having one or more frequencies above 100 kHz, etc.) the into one or more acoustic audio signals (e.g. including one or more warning tone information containing acoustic audio signals, etc.) containing said one or more information signals (e.g. including containing end portions, etc.) at a first location (e.g. inclusive to within a vicinity of one or more desired groups of people, etc.) spaced away from said portable electronic device (e.g. more than a distance from a display screen to an ear, etc.) and spaced away from a second location (e.g. exclusive to within a vicinity of one or more chosen distances, etc.) including one or more acoustic audio signals containing out-of-phase cancellation of background sound in a vicinity of a target listener (e.g. including transmitting modulated acoustic ultrasonic signals to be down converted with anti-noise cancellation of undesirable audio sensed by a notebook computer transmitting the acoustic ultrasonic signals, etc.).

In one or more implementations, as shown in FIG. 80, operation o12 includes an operation o1238 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals containing phase-shifting of an original speech of a target listener in near real-time to the original speech being uttered. Origination of an illustratively derived governing phase-shifting component group can be accomplished through skilled in the art design choice selection of one or more of the above depicted components from one or more of the above depicted subsystems shown in FIG. 25. Components from the governing phase-shifting component group can be used in implementing execution of the one or more governing phase-shifting instructions i1238 of FIG. 43, can be used in performance of the governing phase-shifting electrical circuitry arrangement e1238 of FIG. 36, and/or can be used in otherwise fulfillment of the operation o1238. An exemplary non-transitory signal bearing medium version of the information storage subsystem s200 is depicted in FIG. 43 as bearing the one or more governing phase-shifting instructions i1238 that when executed will direct performance of the operation o1238. Furthermore, the governing phase-shifting electrical circuitry arrangement ("elec circ arrange") e1238, when activated, will perform the operation o1238. Also, the governing phase-shifting module m1238, when executed and/or activated, will direct performance of and/or perform the operation o1238. For instance, in one or more exemplary implementations, the one or more governing phase-shifting instructions i1238, when executed, direct performance of the operation o1238 in the illustrative depiction as follows, and/or the governing phase-shifting electrical circuitry arrangement e1238, when activated, performs the operation o1238 in the illustrative depiction as follows, and/or the governing phase-shifting module m1238, when executed and/or activated, directs performance of and/or performs the operation o1238 in the illustrative depiction as follows, and/or the operation o1238 is otherwise carried out in the illustrative depiction as follows: electronically governing (e.g. via radio frequency antenna, etc.) for output (e.g. via one or more transducer array portions, etc.) of one or more beams (e.g. including containing phrase portions, etc.) of said one or more modulated acoustic ultrasonic signals (e.g. via one or more acoustic ultrasonic signals including signals having one or more frequencies above 120 kHz, etc.) from said one or more portable electronic device emitters (e.g. including one or more three-dimensional arrays, etc.) of said portable electronic device (e.g. including one or more laptop components, etc.) for demodulation (e.g. including demodulation through one or more acoustic ultrasonic signals configured to be demodulated through nonlinear apparel interaction to at least in part produce one or more acoustic audio signals, etc.) of said one or more modulated acoustic ultrasonic signals (e.g. via one or more acoustic ultrasonic signals including signals having one or more frequencies above 120 kHz, etc.) the into one or more acoustic audio signals (e.g. including one or more white noise information containing acoustic audio signals, etc.) containing said one or more information signals (e.g. including containing some portions, etc.) at a first location (e.g. inclusive to within a vicinity of one or more chosen audio receivers, etc.) spaced away from said portable electronic device (e.g. more than a distance from a portable device to a center of a group, etc.) and spaced away from a second location (e.g. exclusive to within a vicinity of one or more selected ranges, etc.) including one or more acoustic audio signals containing phase-shifting of an original speech of a target listener in near real-time to the original speech being uttered (e.g. including transmitting modulated acoustic ultrasonic signals to be down converted with phase-shifted speech of speech sensed by a tablet transmitting the acoustic ultrasonic signals, etc.).

In one or more implementations, as shown in FIG. 80, operation o12 includes an operation o1239 for electronically governing for output of one or more beams of said one or more modulated acoustic ultrasonic signals from said one or more portable electronic device emitters of said portable electronic device for demodulation of said one or more modulated acoustic ultrasonic signals the into one or more acoustic audio signals containing said one or more information signals at a first location spaced away from said portable electronic device and spaced away from a second location including one or more acoustic audio signals being emitted at greater than 150 decibels. Origination of an illustratively derived governing emitted greater component group can be accomplished through skilled in the art design choice selection of one or more of the above depicted components from one or more of the above depicted subsystems shown in FIG. 25. Components from the governing emitted greater component group can be used in implementing execution of the one or more governing emitted greater instructions i1239 of FIG. 43, can be used in performance of the governing emitted greater electrical circuitry arrangement e1239 of FIG. 36, and/or can be used in otherwise fulfillment of the operation o1239. An exemplary non-transitory signal bearing medium version of the information storage subsystem s200 is depicted in FIG. 43 as bearing the one or more governing emitted greater instructions i1239 that when executed will direct performance of the operation o1239. Furthermore, the governing emitted greater electrical circuitry arrangement ("elec circ arrange") e1239, when activated, will perform the operation o1239. Also, the governing emitted greater module m1239, when executed and/or activated, will direct performance of and/or perform the operation o1239. For instance, in one or more exemplary implementations, the one or more governing emitted greater instructions i1239, when executed, direct performance of the operation o1239 in the illustrative depiction as follows, and/or the governing emitted greater electrical circuitry arrangement e1239, when activated, performs the operation o1239 in the illustrative depiction as follows, and/or the governing emitted greater module m1239, when executed and/or activated, directs performance of and/or performs the operation o1239 in the illustrative depiction as follows, and/or the operation o1239 is otherwise carried out in the illustrative depiction as follows: electronically governing (e.g. by reception of wireless transmission, etc.) for output (e.g. by one or more membrane speaker portions, etc.) of one or more beams (e.g. including containing chapter portions, etc.) of said one or more modulated acoustic ultrasonic signals (e.g. via one or more acoustic ultrasonic signals including signals having one or more frequencies above 140 kHz, etc.) from said one or more portable electronic device emitters (e.g. including one or more scattered arrangements, etc.) of said portable electronic device (e.g. including one or more tablet computer components, etc.) for demodulation (e.g. including demodulation by one or more acoustic ultrasonic signals configured to be demodulated through nonlinear interaction with one or more solids to at least in part generate one or more acoustic audio signals, etc.) of said one or more modulated acoustic ultrasonic signals (e.g. via one or more acoustic ultrasonic signals including signals having one or more frequencies above 140 kHz, etc.) the into one or more acoustic audio signals (e.g. including varying pitch information containing acoustic audio signals, etc.) containing said one or more information signals (e.g. including containing all portions, etc.) at a first location (e.g. inclusive to within a vicinity of one or more selected microphones, etc.) spaced away from said portable electronic device (e.g. more than a distance from a display screen to a center of a group, etc.) and spaced away from a second location (e.g. exclusive to within a vicinity of one or more designated directions, etc.) including one or more acoustic audio signals being emitted at greater than 150 decibels (e.g. including transmitting modulated acoustic ultrasonic signals to be down converted into an acoustic alarm signal by a security system to be heard at a target location away from an intrusion location, etc.).

In one or more implementations, as shown in FIG. 81, operation o12 includes an operation o1240 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information designated to be transmitted to a first location of a first user without being transmitted to a second location of a second user. Origination of an illustratively derived governing information designated component group can be accomplished through skilled in the art design choice selection of one or more of the above depicted components from one or more of the above depicted subsystems shown in FIG. 25. Components from the governing information designated component group can be used in implementing execution of the one or more governing information designated instructions i1240 of FIG. 44, can be used in performance of the governing information designated electrical circuitry arrangement e1240 of FIG. 37, and/or can be used in otherwise fulfillment of the operation o1240. An exemplary non-transitory signal bearing medium version of the information storage subsystem s200 is depicted in FIG. 44 as bearing the one or more governing information designated instructions i1240 that when executed will direct performance of the operation o1240. Furthermore, the governing information designated electrical circuitry arrangement ("elec circ arrange") e1240, when activated, will perform the operation o1240. Also, the governing information designated module m1240, when executed and/or activated, will direct performance of and/or perform the operation o1240. For instance, in one or more exemplary implementations, the one or more governing information designated instructions i1240, when executed, direct performance of the operation o1240 in the illustrative depiction as follows, and/or the governing information designated electrical circuitry arrangement e1240, when activated, performs the operation o1240 in the illustrative depiction as follows, and/or the governing information designated module m1240, when executed and/or activated, directs performance of and/or performs the operation o1240 in the illustrative depiction as follows, and/or the operation o1240 is otherwise carried out in the illustrative depiction as follows: electronically governing (e.g. from memory stick access, etc.) for output (e.g. from one or more ultrasonic transducer portions, etc.) of one or more beams (e.g. including containing sectional portions, etc.) of said one or more modulated acoustic ultrasonic signals (e.g. via one or more acoustic ultrasonic signals including signals having one or more frequencies above 160 kHz, etc.) from said one or more portable electronic device emitters (e.g. including one or more staggered arrays, etc.) of said portable electronic device (e.g. including one or more mp3 player components, etc.) for demodulation (e.g. including at least in part demodulation by signal down conversion, etc.) of said one or more modulated acoustic ultrasonic signals (e.g. via one or more acoustic ultrasonic signals including signals having one or more frequencies above 160 kHz, etc.) into one or more acoustic audio signals (e.g. including one or more note sequence information containing acoustic audio signals, etc.) the containing said one or more information signals (e.g. including containing measure portions, etc.) at a first location (e.g. inclusive to within a vicinity of one or more designated surfaces, etc.) spaced away from said portable electronic device (e.g. more than a distance from a transmitter to a receiver, etc.) and spaced away from a second location (e.g. inclusive to within a vicinity of one or more designated ears, etc.) including audio output information designated to be transmitted to a first location of a first user without being transmitted to a second location of a second user (e.g. including transmitting to the first user sitting in a chair adjacent the second user, etc.).

In one or more implementations, as shown in FIG. 81, operation o12 includes an operation o1241 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information containing an entire amount of said audio output information. Origination of an illustratively derived governing information containing component group can be accomplished through skilled in the art design choice selection of one or more of the above depicted components from one or more of the above depicted subsystems shown in FIG. 25. Components from the governing information containing component group can be used in implementing execution of the one or more governing information containing instructions i1241 of FIG. 44, can be used in performance of the governing information containing electrical circuitry arrangement e1241 of FIG. 37, and/or can be used in otherwise fulfillment of the operation o1241. An exemplary non-transitory signal bearing medium version of the information storage subsystem s200 is depicted in FIG. 44 as bearing the one or more governing information containing instructions i1241 that when executed will direct performance of the operation o1241. Furthermore, the governing information containing electrical circuitry arrangement ("elec circ arrange") e1241, when activated, will perform the operation o1241. Also, the governing information containing module m1241, when executed and/or activated, will direct performance of and/or perform the operation o1241. For instance, in one or more exemplary implementations, the one or more governing information containing instructions i1241, when executed, direct performance of the operation o1241 in the illustrative depiction as follows, and/or the governing information containing electrical circuitry arrangement e1241, when activated, performs the operation o1241 in the illustrative depiction as follows, and/or the governing information containing module m1241, when executed and/or activated, directs performance of and/or performs the operation o1241 in the illustrative depiction as follows, and/or the operation o1241 is otherwise carried out in the illustrative depiction as follows: electronically governing (e.g. using flash drive stored data, etc.) for output (e.g. using one or more electrostatic transducer portions, etc.) of one or more beams (e.g. including containing whole portions, etc.) of said one or more modulated acoustic ultrasonic signals (e.g. via one or more acoustic ultrasonic signals including signals having one or more frequencies above 180 kHz, etc.) from said one or more portable electronic device emitters (e.g. including one or more linear arrangements, etc.) of said portable electronic device (e.g. including one or more mobile phone components, etc.) for demodulation (e.g. including at least in part demodulation through signal amplitude demodulation, etc.) of said one or more modulated acoustic ultrasonic signals (e.g. via one or more acoustic ultrasonic signals including signals having one or more frequencies above 180 kHz, etc.) into one or more acoustic audio signals (e.g. including one or more two-way conversation information containing acoustic audio signals, etc.) the containing said one or more information signals (e.g. including containing phrase portions, etc.) at a first location (e.g. inclusive to within a vicinity of one or more predetermined locations, etc.) spaced away from said portable electronic device (e.g. more than a distance from a first seat back to a second seat back, etc.) and spaced away from a second location (e.g. inclusive to within a vicinity of one or more identified persons, etc.) including audio output information containing an entire amount of said audio output information (e.g. including the audio output information including the entire text of an audio book, etc.).

In one or more implementations, as shown in FIG. 81, operation o12 includes an operation o1242 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information that is psychologically influential. Origination of an illustratively derived governing psychologically influential component group can be accomplished through skilled in the art design choice selection of one or more of the above depicted components from one or more of the above depicted subsystems shown in FIG. 25. Components from the governing psychologically influential component group can be used in implementing execution of the one or more governing psychologically influential instructions i1242 of FIG. 44, can be used in performance of the governing psychologically influential electrical circuitry arrangement e1242 of FIG. 37, and/or can be used in otherwise fulfillment of the operation o1242. An exemplary non-transitory signal bearing medium version of the information storage subsystem s200 is depicted in FIG. 44 as bearing the one or more governing psychologically influential instructions i1242 that when executed will direct performance of the operation o1242. Furthermore, the governing psychologically influential electrical circuitry arrangement ("elec circ arrange") e1242, when activated, will perform the operation o1242. Also, the governing psychologically influential module m1242, when executed and/or activated, will direct performance of and/or perform the operation o1242. For instance, in one or more exemplary implementations, the one or more governing psychologically influential instructions i1242, when executed, direct performance of the operation o1242 in the illustrative depiction as follows, and/or the governing psychologically influential electrical circuitry arrangement e1242, when activated, performs the operation o1242 in the illustrative depiction as follows, and/or the governing psychologically influential module m1242, when executed and/or activated, directs performance of and/or performs the operation o1242 in the illustrative depiction as follows, and/or the operation o1242 is otherwise carried out in the illustrative depiction as follows: electronically governing (e.g. through processor synthesized information, etc.) for output (e.g. through one or more piezoelectric transducer portions, etc.) of one or more beams (e.g. including containing partial portions, etc.) of said one or more modulated acoustic ultrasonic signals (e.g. via one or more acoustic ultrasonic signals including signals having one or more frequencies above 200 kHz, etc.) from said one or more portable electronic device emitters (e.g. including one or more parabolic arrangements, etc.) of said portable electronic device (e.g. including one or more two-way radio components, etc.) for demodulation (e.g. including at least in part demodulation via signal frequency demodulation portions, etc.) of said one or more modulated acoustic ultrasonic signals (e.g. via one or more acoustic ultrasonic signals including signals having one or more frequencies above 200 kHz, etc.) into one or more acoustic audio signals (e.g. including one or more confidential information containing acoustic audio signals, etc.) the containing said one or more information signals (e.g. including containing chapter portions, etc.) at a first location (e.g. inclusive to within a vicinity of one or more desired environments, etc.) spaced away from said portable electronic device (e.g. more than a distance from a seat back to a tray table, etc.) and spaced away from a second location (e.g. inclusive to within a vicinity of one or more predetermined ears, etc.) including audio output information that is psychologically influential (e.g. including audio output from a human relations motivational information, etc.).

Figure 82:
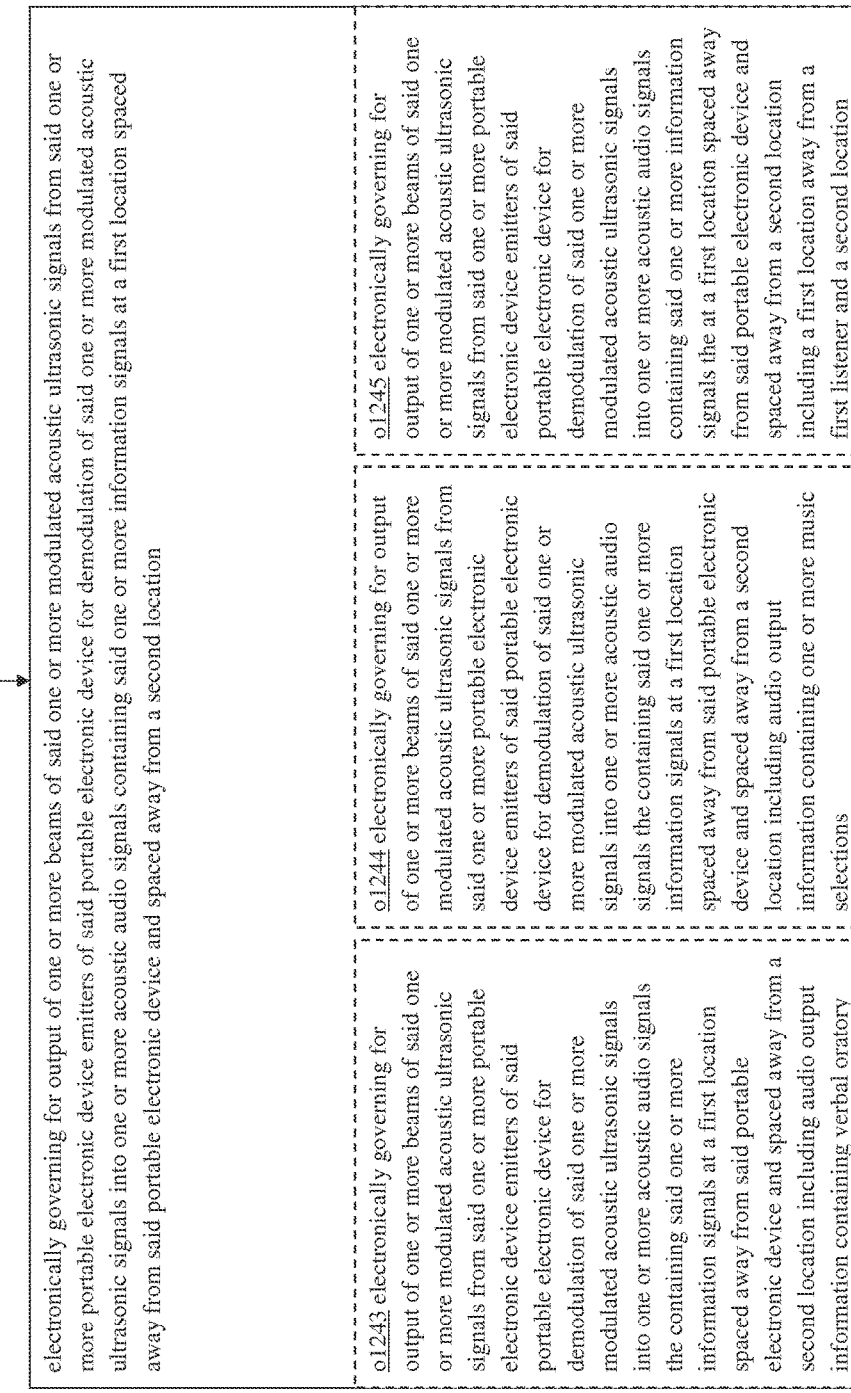
FIG. 82 is a high-level flowchart including exemplary implementations of operation o12 of FIG. 53.

In one or more implementations, as shown in FIG. 82, operation o12 includes an operation o1243 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information containing verbal oratory. Origination of an illustratively derived governing verbal oratory component group can be accomplished through skilled in the art design choice selection of one or more of the above depicted components from one or more of the above depicted subsystems shown in FIG. 25. Components from the governing verbal oratory component group can be used in implementing execution of the one or more governing verbal oratory instructions i1243 of FIG. 44, can be used in performance of the governing verbal oratory electrical circuitry arrangement e1243 of FIG. 37, and/or can be used in otherwise fulfillment of the operation o1243. An exemplary non-transitory signal bearing medium version of the information storage subsystem s200 is depicted in FIG. 44 as bearing the one or more governing verbal oratory instructions i1243 that when executed will direct performance of the operation o1243. Furthermore, the governing verbal oratory electrical circuitry arrangement ("elec circ arrange") e1243, when activated, will perform the operation o1243. Also, the governing verbal oratory module m1243, when executed and/or activated, will direct performance of and/or perform the operation o1243. For instance, in one or more exemplary implementations, the one or more governing verbal oratory instructions i1243, when executed, direct performance of the operation o1243 in the illustrative depiction as follows, and/or the governing verbal oratory electrical circuitry arrangement e1243, when activated, performs the operation o1243 in the illustrative depiction as follows, and/or the governing verbal oratory module m1243, when executed and/or activated, directs performance of and/or performs the operation o1243 in the illustrative depiction as follows, and/or the operation o1243 is otherwise carried out in the illustrative depiction as follows: electronically governing (e.g. via ROM drive reads, etc.) for output (e.g. via one or more electrostrictive transducer portions, etc.) of one or more beams (e.g. including containing transitionary portions, etc.) of said one or more modulated acoustic ultrasonic signals (e.g. via multiple acoustic ultrasonic signals configured to be demodulated through mutual interference therewith to at least in part result in one or more acoustic audio signals, etc.) from said one or more portable electronic device emitters (e.g. including one or more hyperbolic arrangements, etc.) of said portable electronic device (e.g. including one or more security network components, etc.) for demodulation (e.g. including at least in part demodulation with signal phase demodulation portions, etc.) of said one or more modulated acoustic ultrasonic signals (e.g. via multiple acoustic ultrasonic signals configured to be demodulated through mutual interference therewith to at least in part result in one or more acoustic audio signals, etc.) into one or more acoustic audio signals (e.g. including one or more eavesdropping information containing acoustic audio signals, etc.) the containing said one or more information signals (e.g. including containing sectional portions, etc.) at a first location (e.g. inclusive to within a vicinity of one or more chosen distances, etc.) spaced away from said portable electronic device (e.g. more than a distance of an aisle way, etc.) and spaced away from a second location (e.g. inclusive to within a vicinity of one or more desired groups of people, etc.) including audio output information containing verbal oratory (e.g. including audio output from political campaign speeches, etc.).

In one or more implementations, as shown in FIG. 82, operation o12 includes an operation o1244 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals the containing said one or more information signals at a first location spaced away from said portable electronic device and spaced away from a second location including audio output information containing one or more music selections. Origination of an illustratively derived governing music selections component group can be accomplished through skilled in the art design choice selection of one or more of the above depicted components from one or more of the above depicted subsystems shown in FIG. 25. Components from the governing music selections component group can be used in implementing execution of the one or more governing music selections instructions i1244 of FIG. 44, can be used in performance of the governing music selections electrical circuitry arrangement e1244 of FIG. 37, and/or can be used in otherwise fulfillment of the operation o1244. An exemplary non-transitory signal bearing medium version of the information storage subsystem s200 is depicted in FIG. 44 as bearing the one or more governing music selections instructions i1244 that when executed will direct performance of the operation o1244. Furthermore, the governing music selections electrical circuitry arrangement ("elec circ arrange") e1244, when activated, will perform the operation o1244. Also, the governing music selections module m1244, when executed and/or activated, will direct performance of and/or perform the operation o1244. For instance, in one or more exemplary implementations, the one or more governing music selections instructions i1244, when executed, direct performance of the operation o1244 in the illustrative depiction as follows, and/or the governing music selections electrical circuitry arrangement e1244, when activated, performs the operation o1244 in the illustrative depiction as follows, and/or the governing music selections module m1244, when executed and/or activated, directs performance of and/or performs the operation o1244 in the illustrative depiction as follows, and/or the operation o1244 is otherwise carried out in the illustrative depiction as follows: electronically governing (e.g. by CD-ROM playback, etc.) for output (e.g. by one or more electro-thermo-mechanical film transducer portions, etc.) of one or more beams (e.g. including containing temporary portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) said one or more portable electronic device emitters (e.g. including one or more enclosed arrangements, etc.) of said portable electronic device (e.g. including one or more netbook components, etc.) for demodulation (e.g. including at least in part demodulation using signal rectification, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) into one or more acoustic audio signals (e.g. including one or more pre-recorded information containing acoustic audio signals, etc.) the containing said one or more information signals (e.g. including containing whole portions, etc.) at a first location (e.g. inclusive to within a vicinity of one or more selected ranges, etc.) spaced away from said portable electronic device (e.g. more than a distance from a desk to a chair, etc.) and spaced away from a second location (e.g. inclusive to within a vicinity of one or more chosen audio receivers, etc.) including audio output information containing one or more music selections (e.g. including audio output of a musical concert, etc.).

In one or more implementations, as shown in FIG. 82, operation o12 includes an operation o1245 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location away from a first listener and a second location toward a second listener. Origination of an illustratively derived governing location away component group can be accomplished through skilled in the art design choice selection of one or more of the above depicted components from one or more of the above depicted subsystems shown in FIG. 25. Components from the governing location away component group can be used in implementing execution of the one or more governing location away instructions i1245 of FIG. 44, can be used in performance of the governing location away electrical circuitry arrangement e1245 of FIG. 37, and/or can be used in otherwise fulfillment of the operation o1245. An exemplary non-transitory signal bearing medium version of the information storage subsystem s200 is depicted in FIG. 44 as bearing the one or more governing location away instructions i1245 that when executed will direct performance of the operation o1245. Furthermore, the governing location away electrical circuitry arrangement ("elec circ arrange") e1245, when activated, will perform the operation o1245. Also, the governing location away module m1245, when executed and/or activated, will direct performance of and/or perform the operation o1245. For instance, in one or more exemplary implementations, the one or more governing location away instructions i1245, when executed, direct performance of the operation o1245 in the illustrative depiction as follows, and/or the governing location away electrical circuitry arrangement e1245, when activated, performs the operation o1245 in the illustrative depiction as follows, and/or the governing location away module m1245, when executed and/or activated, directs performance of and/or performs the operation o1245 in the illustrative depiction as follows, and/or the operation o1245 is otherwise carried out in the illustrative depiction as follows: electronically governing (e.g. from DVD player, etc.) for output (e.g. from one or more polyvinylidene fluoride film transducer portions, etc.) of one or more beams (e.g. including containing steady state portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) said one or more portable electronic device emitters (e.g. including one or more transducer arrangements, etc.) of said portable electronic device (e.g. including one or more ultrabook components, etc.) for demodulation (e.g. including at least in part demodulation by signal filtering, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) into one or more acoustic audio signals (e.g. including one or more processor generated information containing acoustic audio signals, etc.) containing said one or more information signals (e.g. including containing partial portions, etc.) the at a first location (e.g. inclusive to within a vicinity of one or more designated direction signals, etc.) spaced away from said portable electronic device (e.g. more than a distance from a dashboard to a headrest, etc.) and spaced away from a second location (e.g. inclusive to within a vicinity of one or more selected microphones, etc.) including a first location away from a first listener and a second location toward a second listener (e.g. where the first listener does not have a security clearance and is standing next to a second listener that has a security clearance, etc.).

In one or more implementations, as shown in FIG. 83, operation o12 includes an operation o1246 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location in a vicinity of one or more ears of a target listener. Origination of an illustratively derived governing vicinity ears component group can be accomplished through skilled in the art design choice selection of one or more of the above depicted components from one or more of the above depicted subsystems shown in FIG. 25. Components from the governing vicinity ears component group can be used in implementing execution of the one or more governing vicinity ears instructions i1246 of FIG. 44, can be used in performance of the governing vicinity ears electrical circuitry arrangement e1246 of FIG. 37, and/or can be used in otherwise fulfillment of the operation o1246. An exemplary non-transitory signal bearing medium version of the information storage subsystem s200 is depicted in FIG. 44 as bearing the one or more governing vicinity ears instructions i1246 that when executed will direct performance of the operation o1246. Furthermore, the governing vicinity ears electrical circuitry arrangement ("elec circ arrange") e1246, when activated, will perform the operation o1246. Also, the governing vicinity ears module m1246, when executed and/or activated, will direct performance of and/or perform the operation o1246. For instance, in one or more exemplary implementations, the one or more governing vicinity ears instructions i1246, when executed, direct performance of the operation o1246 in the illustrative depiction as follows, and/or the governing vicinity ears electrical circuitry arrangement e1246, when activated, performs the operation o1246 in the illustrative depiction as follows, and/or the governing vicinity ears module m1246, when executed and/or activated, directs performance of and/or performs the operation o1246 in the illustrative depiction as follows, and/or the operation o1246 is otherwise carried out in the illustrative depiction as follows: electronically governing (e.g. using mp3 media player, etc.) for output (e.g. using one or more deposition transducer portions, etc.) of one or more beams (e.g. including containing steady state portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) said one or more portable electronic device emitters (e.g. including one or more aperture arrangements, etc.) of said portable electronic device (e.g. including one or more flip-phone components, etc.) for demodulation (e.g. including at least in part demodulation through signal intelligence recovery, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) into one or more acoustic audio signals (e.g. including one or more internet based information containing acoustic audio signals, etc.) containing said one or more information signals (e.g. including containing transitionary portions, etc.) the at a first location (e.g. exclusive to within a vicinity of one or more selected ranges, etc.) spaced away from said portable electronic device (e.g. within a confines of a room, etc.) and spaced away from a second location (e.g. inclusive to within a vicinity of one or more designated surfaces, etc.) including a first location in a vicinity of one or more ears of a target listener (e.g. where the first location is near one ear of a target listener, etc.).

In one or more implementations, as shown in FIG. 83, operation o12 includes an operation o1247 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location in a vicinity of a first individual. Origination of an illustratively derived governing vicinity individual component group can be accomplished through skilled in the art design choice selection of one or more of the above depicted components from one or more of the above depicted subsystems shown in FIG. 25. Components from the governing vicinity individual component group can be used in implementing execution of the one or more governing vicinity individual instructions i1247 of FIG. 44, can be used in performance of the governing vicinity individual electrical circuitry arrangement e1247 of FIG. 37, and/or can be used in otherwise fulfillment of the operation o1247. An exemplary non-transitory signal bearing medium version of the information storage subsystem s200 is depicted in FIG. 44 as bearing the one or more governing vicinity individual instructions i1247 that when executed will direct performance of the operation o1247. Furthermore, the governing vicinity individual electrical circuitry arrangement ("elec circ arrange") e1247, when activated, will perform the operation o1247. Also, the governing vicinity individual module m1247, when executed and/or activated, will direct performance of and/or perform the operation o1247. For instance, in one or more exemplary implementations, the one or more governing vicinity individual instructions i1247, when executed, direct performance of the operation o1247 in the illustrative depiction as follows, and/or the governing vicinity individual electrical circuitry arrangement e1247, when activated, performs the operation o1247 in the illustrative depiction as follows, and/or the governing vicinity individual module m1247, when executed and/or activated, directs performance of and/or performs the operation o1247 in the illustrative depiction as follows, and/or the operation o1247 is otherwise carried out in the illustrative depiction as follows: electronically governing (e.g. through internet communication protocols, etc.) for output (e.g. via one or more dispersed transducer portions, etc.) of one or more beams (e.g. including containing integrated portions, etc.) of said one or more modulated acoustic ultrasonic signals (e.g. via one or more acoustic ultrasonic signals configured to be demodulated through nonlinear apparel interaction to at least in part produce one or more acoustic audio signals, etc.) said one or more portable electronic device emitters (e.g. including one or more transmitter arrangements, etc.) of said portable electronic device (e.g. including one or more portable computer components, etc.) for demodulation (e.g. including demodulation via mutual interference therewith multiple acoustic ultrasonic signals configured to be demodulated through to at least in part result in one or more acoustic audio signals, etc.) of said one or more modulated acoustic ultrasonic signals (e.g. via one or more acoustic ultrasonic signals configured to be demodulated through nonlinear apparel interaction to at least in part produce one or more acoustic audio signals, etc.) into one or more acoustic audio signals (e.g. including one or more digital audio information containing acoustic audio signals, etc.) containing said one or more information signals (e.g. including containing temporary portions, etc.) the at a first location (e.g. exclusive to within a vicinity of one or more designated directions, etc.) spaced away from said portable electronic device (e.g. within an arm's length, etc.) and spaced away from a second location (e.g. inclusive to within a vicinity of one or more identified objects, etc.) including a first location in a vicinity of a first individual (e.g. where the first location is a desk area of a first individual, etc.).

In one or more implementations, as shown in FIG. 83, operation o12 includes an operation o1248 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location near one or more first individuals but not a second location near one or more second individuals. Origination of an illustratively derived governing near individuals component group can be accomplished through skilled in the art design choice selection of one or more of the above depicted components from one or more of the above depicted subsystems shown in FIG. 25. Components from the governing near individuals component group can be used in implementing execution of the one or more governing near individuals instructions i1248 of FIG. 44, can be used in performance of the governing near individuals electrical circuitry arrangement e1248 of FIG. 37, and/or can be used in otherwise fulfillment of the operation o1248. An exemplary non-transitory signal bearing medium version of the information storage subsystem s200 is depicted in FIG. 44 as bearing the one or more governing near individuals instructions i1248 that when executed will direct performance of the operation o1248. Furthermore, the governing near individuals electrical circuitry arrangement ("elec circ arrange") e1248, when activated, will perform the operation o1248. Also, the governing near individuals module m1248, when executed and/or activated, will direct performance of and/or perform the operation o1248. For instance, in one or more exemplary implementations, the one or more governing near individuals instructions i1248, when executed, direct performance of the operation o1248 in the illustrative depiction as follows, and/or the governing near individuals electrical circuitry arrangement e1248, when activated, performs the operation o1248 in the illustrative depiction as follows, and/or the governing near individuals module m1248, when executed and/or activated, directs performance of and/or performs the operation o1248 in the illustrative depiction as follows, and/or the operation o1248 is otherwise carried out in the illustrative depiction as follows: electronically governing (e.g. through reception of cable communication packets, etc.) for output (e.g. by one or more monitor embedded transducer portions, etc.) of one or more beams (e.g. including containing disparate portions, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) said one or more portable electronic device emitters (e.g. including one or more air-coupled transducer arrangements, etc.) of said portable electronic device (e.g. including one or more boombox components, etc.) for demodulation (e.g. including demodulation using one or more acoustic ultrasonic signals configured to be demodulated through nonlinear atmospheric interaction to at least in part generate one or more acoustic audio signals, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) into one or more acoustic audio signals (e.g. including one or more analog audio information containing acoustic audio signals, etc.) containing said one or more information signals (e.g. including containing steady state portions, etc.) the at a first location (e.g. inclusive to within a vicinity of one or more designated ears, etc.) spaced away from said portable electronic device (e.g. within a three-foot radius, etc.) and spaced away from a second location (e.g. inclusive to within a vicinity of one or more predetermined locations, etc.) including a first location near one or more first individuals but not a second location near one or more second individuals (e.g. where the first and second locations are adjacent seats, etc.).

In one or more implementations, as shown in FIG. 84, operation o12 includes an operation o1249 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location near a passive receiver such as an ear ring. Origination of an illustratively derived governing passive receiver component group can be accomplished through skilled in the art design choice selection of one or more of the above depicted components from one or more of the above depicted subsystems shown in FIG. 25. Components from the governing passive receiver component group can be used in implementing execution of the one or more governing passive receiver instructions i1249 of FIG. 44, can be used in performance of the governing passive receiver electrical circuitry arrangement e1249 of FIG. 37, and/or can be used in otherwise fulfillment of the operation o1249. An exemplary non-transitory signal bearing medium version of the information storage subsystem s200 is depicted in FIG. 44 as bearing the one or more governing passive receiver instructions i1249 that when executed will direct performance of the operation o1249. Furthermore, the governing passive receiver electrical circuitry arrangement ("elec circ arrange") e1249, when activated, will perform the operation o1249. Also, the governing passive receiver module m1249, when executed and/or activated, will direct performance of and/or perform the operation o1249. For instance, in one or more exemplary implementations, the one or more governing passive receiver instructions i1249, when executed, direct performance of the operation o1249 in the illustrative depiction as follows, and/or the governing passive receiver electrical circuitry arrangement e1249, when activated, performs the operation o1249 in the illustrative depiction as follows, and/or the governing passive receiver module m1249, when executed and/or activated, directs performance of and/or performs the operation o1249 in the illustrative depiction as follows, and/or the operation o1249 is otherwise carried out in the illustrative depiction as follows: electronically governing (e.g. via Wi-Fi signal reception, etc.) for output (e.g. from one or more keyboard embedded transducer portions, etc.) of one or more beams (e.g. including containing beginning portions, etc.) of said one or more modulated acoustic ultrasonic signals (e.g. via one or more acoustic ultrasonic signals including signals having one or more frequencies above 60 kHz, etc.) said one or more portable electronic device emitters (e.g. including one or more thin-film membrane arrangements, etc.) of said portable electronic device (e.g. including one or more digital audio output components, etc.) for demodulation (e.g. including demodulation with one or more acoustic ultrasonic signals configured to be demodulated through nonlinear human tissue interaction to at least in part produce one or more acoustic audio signals, etc.) of said one or more modulated acoustic ultrasonic signals (e.g. via one or more acoustic ultrasonic signals including signals having one or more frequencies above 60 kHz, etc.) into one or more acoustic audio signals (e.g. including one or more high frequency audio information containing acoustic audio signals, etc.) containing said one or more information signals (e.g. including containing integrated portions, etc.) the at a first location (e.g. inclusive to within a vicinity of one or more identified persons, etc.) spaced away from said portable electronic device (e.g. within a distance from a portable device to a person, etc.) and spaced away from a second location (e.g. inclusive to within a vicinity of one or more desired environments, etc.) including a first location near a passive receiver such as an ear ring (e.g. where the ear ring is being worn by a target user, etc.).

In one or more implementations, as shown in FIG. 84, operation o12 includes an operation o1250 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location receiving said one or more acoustic ultrasonic signals from said portable electronic device being affixed to a moving member. Origination of an illustratively derived governing moving member component group can be accomplished through skilled in the art design choice selection of one or more of the above depicted components from one or more of the above depicted subsystems shown in FIG. 25. Components from the governing moving member component group can be used in implementing execution of the one or more governing moving member instructions i1250 of FIG. 44, can be used in performance of the governing moving member electrical circuitry arrangement e1250 of FIG. 37, and/or can be used in otherwise fulfillment of the operation o1250. An exemplary non-transitory signal bearing medium version of the information storage subsystem s200 is depicted in FIG. 44 as bearing the one or more governing moving member instructions i1250 that when executed will direct performance of the operation o1250. Furthermore, the governing moving member electrical circuitry arrangement ("elec circ arrange") e1250, when activated, will perform the operation o1250. Also, the governing moving member module m1250, when executed and/or activated, will direct performance of and/or perform the operation o1250. For instance, in one or more exemplary implementations, the one or more governing moving member instructions i1250, when executed, direct performance of the operation o1250 in the illustrative depiction as follows, and/or the governing moving member electrical circuitry arrangement e1250, when activated, performs the operation o1250 in the illustrative depiction as follows, and/or the governing moving member module m1250, when executed and/or activated, directs performance of and/or performs the operation o1250 in the illustrative depiction as follows, and/or the operation o1250 is otherwise carried out in the illustrative depiction as follows: electronically governing (e.g. by near-field infrared receiver, etc.) for output (e.g. using one or more device body embedded transducer portions, etc.) of one or more beams (e.g. including containing middle portions, etc.) of said one or more modulated acoustic ultrasonic signals (e.g. via one or more acoustic ultrasonic signals including signals having one or more frequencies above 80 kHz, etc.) said one or more portable electronic device emitters (e.g. including one or more resonant surface arrangements, etc.) of said portable electronic device (e.g. including one or more CD player components, etc.) for demodulation (e.g. including demodulation by one or more acoustic ultrasonic signals configured to be demodulated through nonlinear polymeric interaction to at least in part result in one or more acoustic audio signals, etc.) of said one or more modulated acoustic ultrasonic signals (e.g. via one or more acoustic ultrasonic signals including signals having one or more frequencies above 80 kHz, etc.) into one or more acoustic audio signals (e.g. including one or more low frequency audio information containing acoustic audio signals, etc.) containing said one or more information signals (e.g. including containing disparate portions, etc.) the at a first location (e.g. inclusive to within a vicinity of one or more predetermined ears, etc.) spaced away from said portable electronic device (e.g. within a distance from a display screen to a person, etc.) and spaced away from a second location (e.g. inclusive to within a vicinity of one or more chosen distances, etc.) including a first location receiving said one or more acoustic ultrasonic signals from said portable electronic device being affixed to a moving member.

In one or more implementations, as shown in FIG. 84, operation o12 includes an operation o1251 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location identified through sensor data as being a vicinity of a target listener's head. Origination of an illustratively derived governing listener's head component group can be accomplished through skilled in the art design choice selection of one or more of the above depicted components from one or more of the above depicted subsystems shown in FIG. 25. Components from the governing listener's head component group can be used in implementing execution of the one or more governing listener's head instructions i1251 of FIG. 44, can be used in performance of the governing listener's head electrical circuitry arrangement e1251 of FIG. 37, and/or can be used in otherwise fulfillment of the operation o1251. An exemplary non-transitory signal bearing medium version of the information storage subsystem s200 is depicted in FIG. 44 as bearing the one or more governing listener's head instructions i1251 that when executed will direct performance of the operation o1251. Furthermore, the governing listener's head electrical circuitry arrangement ("elec circ arrange") e1251, when activated, will perform the operation o1251. Also, the governing listener's head module m1251, when executed and/or activated, will direct performance of and/or perform the operation o1251. For instance, in one or more exemplary implementations, the one or more governing listener's head instructions i1251, when executed, direct performance of the operation o1251 in the illustrative depiction as follows, and/or the governing listener's head electrical circuitry arrangement e1251, when activated, performs the operation o1251 in the illustrative depiction as follows, and/or the governing listener's head module m1251, when executed and/or activated, directs performance of and/or performs the operation o1251 in the illustrative depiction as follows, and/or the operation o1251 is otherwise carried out in the illustrative depiction as follows: electronically governing (e.g. from hard drive access, etc.) for output (e.g. through one or more device perimeter embedded transducer portions, etc.) of one or more beams (e.g. including containing end portions, etc.) of said one or more modulated acoustic ultrasonic signals (e.g. via one or more acoustic ultrasonic signals including signals having one or more frequencies above 100 kHz, etc.) said one or more portable electronic device emitters (e.g. including one or more transmitter arrangements, etc.) of said portable electronic device (e.g. including one or more digital music player components, etc.) for demodulation (e.g. including demodulation through one or more acoustic ultrasonic signals configured to be demodulated through nonlinear apparel interaction to at least in part produce one or more acoustic audio signals, etc.) of said one or more modulated acoustic ultrasonic signals (e.g. via one or more acoustic ultrasonic signals including signals having one or more frequencies above 100 kHz, etc.) into one or more acoustic audio signals (e.g. including one or more low frequency acoustic audio signals, etc.) containing said one or more information signals (e.g. including lecture formatted information, etc.) the at a first location (e.g. inclusive to within a vicinity of one or more desired groups of people, etc.) spaced away from said portable electronic device (e.g. within a distance from a portable device to an ear, etc.) and spaced away from a second location (e.g. inclusive to within a vicinity of one or more selected ranges, etc.) including a first location identified through sensor data as being a vicinity of a target listener's head (e.g. where sensor data is visual imagery of a target listener's face, etc.).

Figure 85:
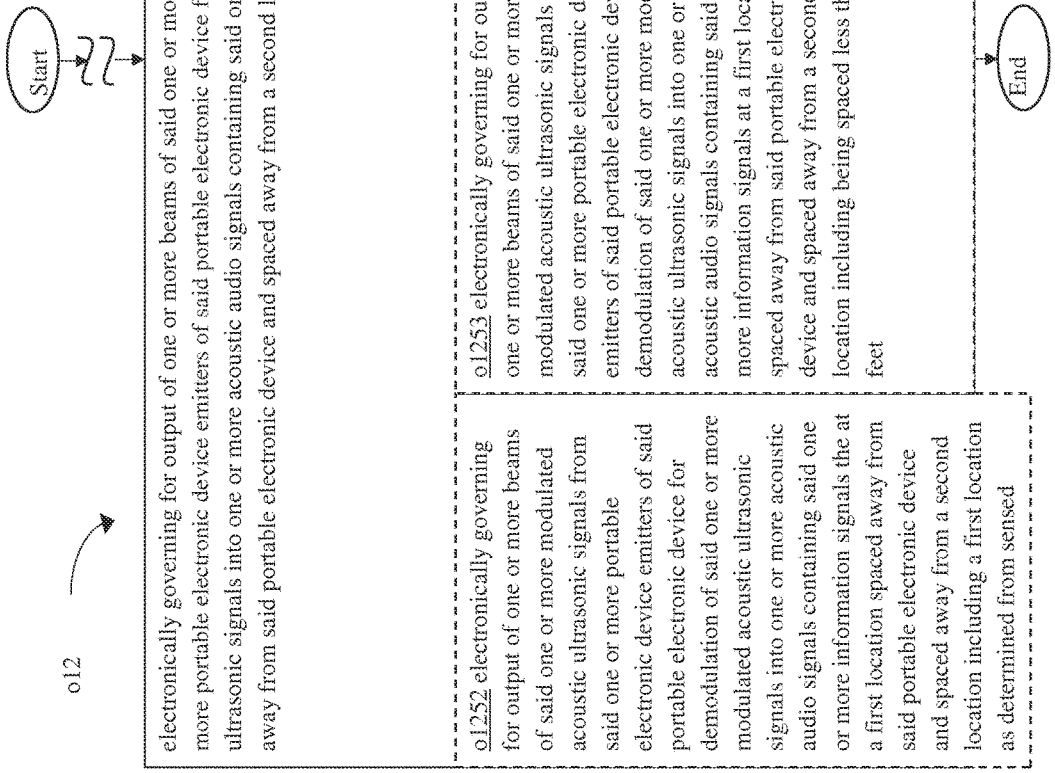
FIG. 85 is a high-level flowchart including exemplary implementations of operation o12 of FIG. 53.

In one or more implementations, as shown in FIG. 85, operation o12 includes an operation o1252 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals the at a first location spaced away from said portable electronic device and spaced away from a second location including a first location as determined from sensed accelerometer data of said portable electronic device. Origination of an illustratively derived governing sensed accelerometer component group can be accomplished through skilled in the art design choice selection of one or more of the above depicted components from one or more of the above depicted subsystems shown in FIG. 25. Components from the governing sensed accelerometer component group can be used in implementing execution of the one or more governing sensed accelerometer instructions i1252 of FIG. 44, can be used in performance of the governing sensed accelerometer electrical circuitry arrangement e1252 of FIG. 37, and/or can be used in otherwise fulfillment of the operation o1252. An exemplary non-transitory signal bearing medium version of the information storage subsystem s200 is depicted in FIG. 44 as bearing the one or more governing sensed accelerometer instructions i1252 that when executed will direct performance of the operation o1252. Furthermore, the governing sensed accelerometer electrical circuitry arrangement ("elec circ arrange") e1252, when activated, will perform the operation o1252. Also, the governing sensed accelerometer module m1252, when executed and/or activated, will direct performance of and/or perform the operation o1252. For instance, in one or more exemplary implementations, the one or more governing sensed accelerometer instructions i1252, when executed, direct performance of the operation o1252 in the illustrative depiction as follows, and/or the governing sensed accelerometer electrical circuitry arrangement e1252, when activated, performs the operation o1252 in the illustrative depiction as follows, and/or the governing sensed accelerometer module m1252, when executed and/or activated, directs performance of and/or performs the operation o1252 in the illustrative depiction as follows, and/or the operation o1252 is otherwise carried out in the illustrative depiction as follows: electronically governing (e.g. using fiber optic communication, etc.) for output (e.g. via one or more multiple emitter array portions, etc.) of one or more beams (e.g. including containing some portions, etc.) of said one or more modulated acoustic ultrasonic signals (e.g. via one or more acoustic ultrasonic signals including signals having one or more frequencies above 120 kHz, etc.) said one or more portable electronic device emitters (e.g. including one or more transducer membrane arrangements, etc.) of said portable electronic device (e.g. including one or more handheld radio components, etc.) for demodulation (e.g. including demodulation by one or more acoustic ultrasonic signals configured to be demodulated through nonlinear interaction with one or more solids to at least in part generate one or more acoustic audio signals, etc.) of said one or more modulated acoustic ultrasonic signals (e.g. via one or more acoustic ultrasonic signals including signals having one or more frequencies above 120 kHz, etc.) into one or more acoustic audio signals (e.g. including one or more high frequency acoustic audio signals, etc.) containing said one or more information signals (e.g. including foreign language speech information, etc.) the at a first location (e.g. inclusive to within a vicinity of one or more chosen audio receivers, etc.) spaced away from said portable electronic device (e.g. within a distance from a display screen to an ear, etc.) and spaced away from a second location (e.g. inclusive to within a vicinity of one or more designated directions, etc.) including a first location as determined from sensed accelerometer data of said portable electronic device (e.g. where the accelerometer is located on a smart watch worn on a wrist of a moving arm, etc.).

In one or more implementations, as shown in FIG. 85, operation o12 includes an operation o1253 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location the spaced away from said portable electronic device and spaced away from a second location including being spaced less than six feet. Origination of an illustratively derived governing six feet component group can be accomplished through skilled in the art design choice selection of one or more of the above depicted components from one or more of the above depicted subsystems shown in FIG. 25. Components from the governing six feet component group can be used in implementing execution of the one or more governing six feet instructions i1253 of FIG. 44, can be used in performance of the governing six feet electrical circuitry arrangement e1253 of FIG. 37, and/or can be used in otherwise fulfillment of the operation o1253. An exemplary non-transitory signal bearing medium version of the information storage subsystem s200 is depicted in FIG. 44 as bearing the one or more governing six feet instructions i1253 that when executed will direct performance of the operation o1253. Furthermore, the governing six feet electrical circuitry arrangement ("elec circ arrange") e1253, when activated, will perform the operation o1253. Also, the governing six feet module m1253, when executed and/or activated, will direct performance of and/or perform the operation o1253. For instance, in one or more exemplary implementations, the one or more governing six feet instructions i1253, when executed, direct performance of the operation o1253 in the illustrative depiction as follows, and/or the governing six feet electrical circuitry arrangement e1253, when activated, performs the operation o1253 in the illustrative depiction as follows, and/or the governing six feet module m1253, when executed and/or activated, directs performance of and/or performs the operation o1253 in the illustrative depiction as follows, and/or the operation o1253 is otherwise carried out in the illustrative depiction as follows: electronically governing (e.g. through sound wave reception, etc.) for output (e.g. through one or more cable interface portions, etc.) of one or more beams (e.g. including containing all portions, etc.) of said one or more modulated acoustic ultrasonic signals (e.g. via one or more acoustic ultrasonic signals including signals having one or more frequencies above 140 kHz, etc.) said one or more portable electronic device emitters (e.g. including one or more transducer array arrangements, etc.) of said portable electronic device (e.g. including one or more spread spectrum components, etc.) for demodulation (e.g. including at least in part demodulation by signal down conversion, etc.) of said one or more modulated acoustic ultrasonic signals (e.g. via one or more acoustic ultrasonic signals including signals having one or more frequencies above 140 kHz, etc.) into one or more acoustic audio signals (e.g. including one or more full spectrum acoustic audio signals, etc.) containing said one or more information signals (e.g. including classical music selection information, etc.) at a first location (e.g. inclusive to within a vicinity of one or more selected microphones, etc.) the spaced away from said portable electronic device (e.g. within a distance from a portable device to a center of a group, etc.) and spaced away from a second location (e.g. within a confines of a room, etc.) including being spaced less than six feet (e.g. where spacing depending upon seating arrangements, etc.).

In one or more implementations, as shown in FIG. 85, operation o12 includes an operation o1254 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location the spaced away from said portable electronic device and spaced away from a second location including being spaced less than twelve feet. Origination of an illustratively derived governing twelve feet component group can be accomplished through skilled in the art design choice selection of one or more of the above depicted components from one or more of the above depicted subsystems shown in FIG. 25. Components from the governing twelve feet component group can be used in implementing execution of the one or more governing twelve feet instructions i1254 of FIG. 44, can be used in performance of the governing twelve feet electrical circuitry arrangement e1254 of FIG. 37, and/or can be used in otherwise fulfillment of the operation o1254. An exemplary non-transitory signal bearing medium version of the information storage subsystem s200 is depicted in FIG. 44 as bearing the one or more governing twelve feet instructions i1254 that when executed will direct performance of the operation o1254. Furthermore, the governing twelve feet electrical circuitry arrangement ("elec circ arrange") e1254, when activated, will perform the operation o1254. Also, the governing twelve feet module m1254, when executed and/or activated, will direct performance of and/or perform the operation o1254. For instance, in one or more exemplary implementations, the one or more governing twelve feet instructions i1254, when executed, direct performance of the operation o1254 in the illustrative depiction as follows, and/or the governing twelve feet electrical circuitry arrangement e1254, when activated, performs the operation o1254 in the illustrative depiction as follows, and/or the governing twelve feet module m1254, when executed and/or activated, directs performance of and/or performs the operation o1254 in the illustrative depiction as follows, and/or the operation o1254 is otherwise carried out in the illustrative depiction as follows: electronically governing (e.g. via radio frequency antenna, etc.) for output (e.g. via one or more speaker portions, etc.) of one or more beams (e.g. including containing measure portions, etc.) of said one or more modulated acoustic ultrasonic signals (e.g. via one or more acoustic ultrasonic signals including signals having one or more frequencies above 160 kHz, etc.) said one or more portable electronic device emitters (e.g. including one or more membrane speaker arrangements, etc.) of said portable electronic device (e.g. including one or more wireless components, etc.) for demodulation (e.g. including at least in part demodulation through signal amplitude demodulation, etc.) of said one or more modulated acoustic ultrasonic signals (e.g. via one or more acoustic ultrasonic signals including signals having one or more frequencies above 160 kHz, etc.) into one or more acoustic audio signals (e.g. including one or more partial spectrum acoustic audio signals, etc.) containing said one or more information signals (e.g. including instructional lesson material information, etc.) at a first location (e.g. inclusive to within a vicinity of one or more designated surfaces, etc.) the spaced away from said portable electronic device (e.g. within a distance from a display screen to a center of a group, etc.) and spaced away from a second location (e.g. within an arm's length, etc.) including being spaced less than twelve feet (e.g. where spacing is based upon dimensions of conference furniture, etc.).

Figure 86:
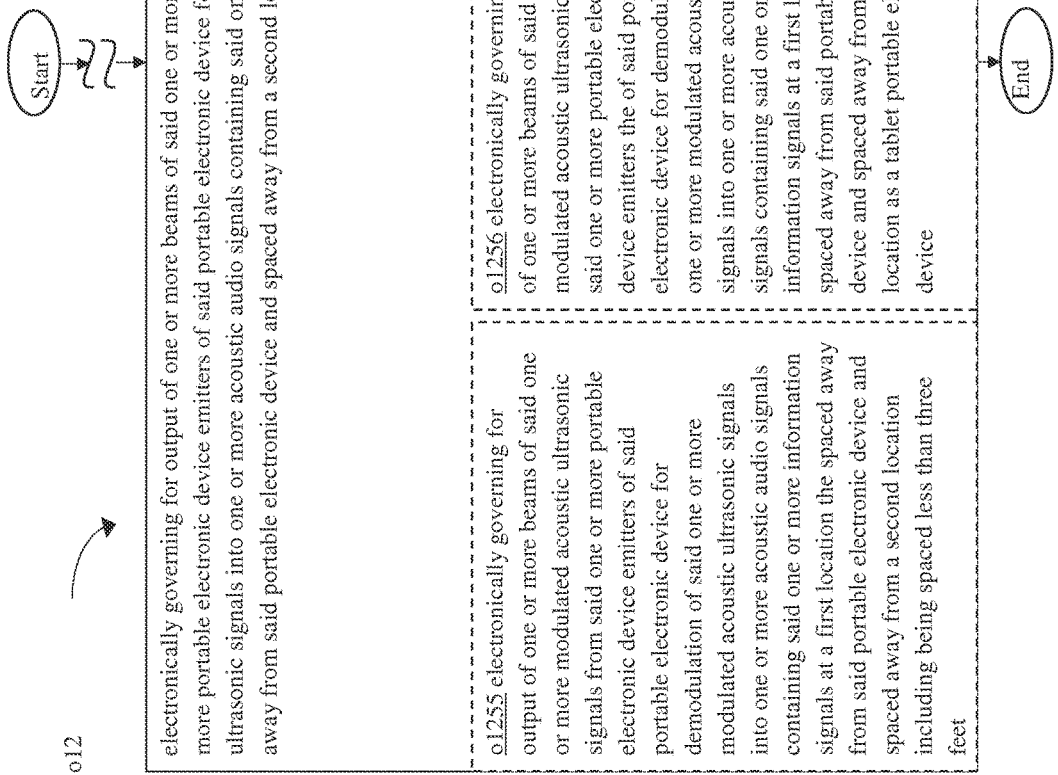
FIG. 86 is a high-level flowchart including exemplary implementations of operation o12 of FIG. 53.

In one or more implementations, as shown in FIG. 86, operation o12 includes an operation o1255 for electronically governing for output of one or more beams of said one or more modulated acoustic ultrasonic signals from said one or more portable electronic device emitters of said portable electronic device for demodulation of said one or more modulated acoustic ultrasonic signals into one or more acoustic audio signals containing said one or more information signals at a first location the spaced away from said portable electronic device and spaced away from a second location including being spaced less than three feet. Origination of an illustratively derived governing three feet component group can be accomplished through skilled in the art design choice selection of one or more of the above depicted components from one or more of the above depicted subsystems shown in FIG. 25. Components from the governing three feet component group can be used in implementing execution of the one or more governing three feet instructions i1255 of FIG. 44, can be used in performance of the governing three feet electrical circuitry arrangement e1255 of FIG. 37, and/or can be used in otherwise fulfillment of the operation o1255. An exemplary non-transitory signal bearing medium version of the information storage subsystem s200 is depicted in FIG. 44 as bearing the one or more governing three feet instructions i1255 that when executed will direct performance of the operation o1255. Furthermore, the governing three feet electrical circuitry arrangement ("elec circ arrange") e1255, when activated, will perform the operation o1255. Also, the governing three feet module m1255, when executed and/or activated, will direct performance of and/or perform the operation o1255. For instance, in one or more exemplary implementations, the one or more governing three feet instructions i1255, when executed, direct performance of the operation o1255 in the illustrative depiction as follows, and/or the governing three feet electrical circuitry arrangement e1255, when activated, performs the operation o1255 in the illustrative depiction as follows, and/or the governing three feet module m1255, when executed and/or activated, directs performance of and/or performs the operation o1255 in the illustrative depiction as follows, and/or the operation o1255 is otherwise carried out in the illustrative depiction as follows: electronically governing (e.g. by reception of wireless transmission, etc.) for output (e.g. by one or more transducer portions, etc.) of one or more beams (e.g. including containing phrase portions, etc.) of said one or more modulated acoustic ultrasonic signals (e.g. via one or more acoustic ultrasonic signals including signals having one or more frequencies above 180 kHz, etc.) said one or more portable electronic device emitters (e.g. including one or more ultrasonic transducer arrangements, etc.) of said portable electronic device (e.g. including one or more frequency division multiplexing components, etc.) for demodulation (e.g. including at least in part demodulation via signal frequency demodulation portions, etc.) of said one or more modulated acoustic ultrasonic signals (e.g. via one or more acoustic ultrasonic signals including signals having one or more frequencies above 180 kHz, etc.) into one or more acoustic audio signals (e.g. including one or more low amplitude acoustic audio signals, etc.) containing said one or more information signals (e.g. including warning tone information, etc.) at a first location (e.g. inclusive to within a vicinity of one or more identified objects, etc.) the spaced away from said portable electronic device (e.g. within a distance from a transmitter to a receiver, etc.) and spaced away from a second location (e.g. within a three-foot radius, etc.) including being spaced less than three feet (e.g. where spacing is based upon use of the portable device as a tablet computer, etc.).

In one or more implementations, as shown in FIG. 86, operation o12 includes an operation o1256 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a tablet portable electronic device. Origination of an illustratively derived governing emitter arrangements component group can be accomplished through skilled in the art design choice selection of one or more of the above depicted components from one or more of the above depicted subsystems shown in FIG. 25. Components from the governing emitter arrangements component group can be used in implementing execution of the one or more governing emitter arrangements instructions i1256 of FIG. 44, can be used in performance of the governing emitter arrangements electrical circuitry arrangement e1256 of FIG. 37, and/or can be used in otherwise fulfillment of the operation o1256. An exemplary non-transitory signal bearing medium version of the information storage subsystem s200 is depicted in FIG. 44 as bearing the one or more governing emitter arrangements instructions i1256 that when executed will direct performance of the operation o1256. Furthermore, the governing emitter arrangements electrical circuitry arrangement ("elec circ arrange") e1256, when activated, will perform the operation o1256. Also, the governing emitter arrangements module m1256, when executed and/or activated, will direct performance of and/or perform the operation o1256. For instance, in one or more exemplary implementations, the one or more governing emitter arrangements instructions i1256, when executed, direct performance of the operation o1256 in the illustrative depiction as follows, and/or the governing emitter arrangements electrical circuitry arrangement e1256, when activated, performs the operation o1256 in the illustrative depiction as follows, and/or the governing emitter arrangements module m1256, when executed and/or activated, directs performance of and/or performs the operation o1256 in the illustrative depiction as follows, and/or the operation o1256 is otherwise carried out in the illustrative depiction as follows: electronically governing (e.g. from memory stick access, etc.) for output (e.g. from one or more aperture portions, etc.) of one or more beams (e.g. including containing chapter portions, etc.) of said one or more modulated acoustic ultrasonic signals (e.g. via one or more acoustic ultrasonic signals including signals having one or more frequencies above 200 kHz, etc.) said one or more portable electronic device emitters (e.g. including one or more electrostatic transducer arrangements, etc.) the of said portable electronic device (e.g. including one or more time division multiplexing components, etc.) for demodulation (e.g. including at least in part demodulation with signal phase demodulation portions, etc.) of said one or more modulated acoustic ultrasonic signals (e.g. via one or more acoustic ultrasonic signals including signals having one or more frequencies above 200 kHz, etc.) into one or more acoustic audio signals (e.g. including one or more high amplitude acoustic audio signals, etc.) containing said one or more information signals (e.g. including white noise information, etc.) at a first location (e.g. inclusive to within a vicinity of one or more predetermined locations, etc.) spaced away from said portable electronic device (e.g. within a distance from a first seat back to a second seat back, etc.) and spaced away from a second location (e.g. within a distance from a portable device to a person, etc.) as a tablet portable electronic device (e.g. where a tablet is used as a laptop replacement, etc.).

In one or more implementations, as shown in FIG. 86, operation o12 includes an operation o1257 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a handheld mobile portable electronic device. Origination of an illustratively derived governing handheld mobile component group can be accomplished through skilled in the art design choice selection of one or more of the above depicted components from one or more of the above depicted subsystems shown in FIG. 25. Components from the governing handheld mobile component group can be used in implementing execution of the one or more governing handheld mobile instructions i1257 of FIG. 44, can be used in performance of the governing handheld mobile electrical circuitry arrangement e1257 of FIG. 37, and/or can be used in otherwise fulfillment of the operation o1257. An exemplary non-transitory signal bearing medium version of the information storage subsystem s200 is depicted in FIG. 44 as bearing the one or more governing handheld mobile instructions i1257 that when executed will direct performance of the operation o1257. Furthermore, the governing handheld mobile electrical circuitry arrangement ("elec circ arrange") e1257, when activated, will perform the operation o1257. Also, the governing handheld mobile module m1257, when executed and/or activated, will direct performance of and/or perform the operation o1257. For instance, in one or more exemplary implementations, the one or more governing handheld mobile instructions i1257, when executed, direct performance of the operation o1257 in the illustrative depiction as follows, and/or the governing handheld mobile electrical circuitry arrangement e1257, when activated, performs the operation o1257 in the illustrative depiction as follows, and/or the governing handheld mobile module m1257, when executed and/or activated, directs performance of and/or performs the operation o1257 in the illustrative depiction as follows, and/or the operation o1257 is otherwise carried out in the illustrative depiction as follows: electronically governing (e.g. using flash drive stored data, etc.) for output (e.g. using one or more transmitter portions, etc.) of one or more beams (e.g. including containing sectional portions, etc.) of said one or more modulated acoustic ultrasonic signals (e.g. via multiple acoustic ultrasonic signals configured to be demodulated through mutual interference therewith to at least in part result in one or more acoustic audio signals, etc.) said one or more portable electronic device emitters (e.g. including one or more piezoelectric transducer arrangements, etc.) the of said portable electronic device (e.g. including one or more clamshell phone components, etc.) for demodulation (e.g. including at least in part demodulation using signal rectification, etc.) of said one or more modulated acoustic ultrasonic signals (e.g.

via multiple acoustic ultrasonic signals configured to be demodulated through mutual interference therewith to at least in part result in one or more acoustic audio signals, etc.) into one or more acoustic audio signals (e.g. including one or more high frequency acoustic audio signals, etc.) containing said one or more information signals (e.g. including varying pitch information, etc.) at a first location (e.g. inclusive to within a vicinity of one or more desired environments, etc.) spaced away from said portable electronic device (e.g. within a distance from a seat back to a tray table, etc.) and spaced away from a second location (e.g. within a distance from a display screen to a person, etc.) as a handheld mobile portable electronic device (e.g. where a mobile device is used as a smart phone and tablet combination, etc.).

In one or more implementations, as shown in FIG. 87, operation o12 includes an operation o1258 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a cell phone portable electronic device. Origination of an illustratively derived governing cell phone component group can be accomplished through skilled in the art design choice selection of one or more of the above depicted components from one or more of the above depicted subsystems shown in FIG. 25. Components from the governing cell phone component group can be used in implementing execution of the one or more governing cell phone instructions i1258 of FIG. 44, can be used in performance of the governing cell phone electrical circuitry arrangement e1258 of FIG. 37, and/or can be used in otherwise fulfillment of the operation o1258. An exemplary non-transitory signal bearing medium version of the information storage subsystem s200 is depicted in FIG. 44 as bearing the one or more governing cell phone instructions i1258 that when executed will direct performance of the operation o1258. Furthermore, the governing cell phone electrical circuitry arrangement ("elec circ arrange") e1258, when activated, will perform the operation o1258. Also, the governing cell phone module m1258, when executed and/or activated, will direct performance of and/or perform the operation o1258. For instance, in one or more exemplary implementations, the one or more governing cell phone instructions i1258, when executed, direct performance of the operation o1258 in the illustrative depiction as follows, and/or the governing cell phone electrical circuitry arrangement e1258, when activated, performs the operation o1258 in the illustrative depiction as follows, and/or the governing cell phone module m1258, when executed and/or activated, directs performance of and/or performs the operation o1258 in the illustrative depiction as follows, and/or the operation o1258 is otherwise carried out in the illustrative depiction as follows: electronically governing (e.g. through processor synthesized information, etc.) for output (e.g. through one or more air-coupled transducer portions, etc.) of one or more beams (e.g. including containing whole portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) said one or more portable electronic device emitters (e.g. including one or more electrostrictive transducer arrangements, etc.) the of said portable electronic device (e.g. including one or more media player components, etc.) for demodulation (e.g. including at least in part demodulation by signal filtering, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) into one or more acoustic audio signals (e.g. including one or more lecture information containing acoustic audio signals, etc.) containing said one or more information signals (e.g. including note sequence information, etc.) at a first location (e.g. inclusive to within a vicinity of one or more chosen distances, etc.) spaced away from said portable electronic device (e.g. within a distance of an aisle way, etc.) and spaced away from a second location (e.g. within a distance from a portable device to an ear, etc.) as a cell phone portable electronic device (e.g. where a cell phone includes smart phone features, etc.).

In one or more implementations, as shown in FIG. 87, operation o12 includes an operation o1259 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a laptop computer portable electronic device. Origination of an illustratively derived governing laptop computer component group can be accomplished through skilled in the art design choice selection of one or more of the above depicted components from one or more of the above depicted subsystems shown in FIG. 25. Components from the governing laptop computer component group can be used in implementing execution of the one or more governing laptop computer instructions i1259 of FIG. 44, can be used in performance of the governing laptop computer electrical circuitry arrangement e1259 of FIG. 37, and/or can be used in otherwise fulfillment of the operation o1259. An exemplary non-transitory signal bearing medium version of the information storage subsystem s200 is depicted in FIG. 44 as bearing the one or more governing laptop computer instructions i1259 that when executed will direct performance of the operation o1259. Furthermore, the governing laptop computer electrical circuitry arrangement ("elec circ arrange") e1259, when activated, will perform the operation o1259. Also, the governing laptop computer module m1259, when executed and/or activated, will direct performance of and/or perform the operation o1259. For instance, in one or more exemplary implementations, the one or more governing laptop computer instructions i1259, when executed, direct performance of the operation o1259 in the illustrative depiction as follows, and/or the governing laptop computer electrical circuitry arrangement e1259, when activated, performs the operation o1259 in the illustrative depiction as follows, and/or the governing laptop computer module m1259, when executed and/or activated, directs performance of and/or performs the operation o1259 in the illustrative depiction as follows, and/or the operation o1259 is otherwise carried out in the illustrative depiction as follows: electronically governing (e.g. via ROM drive reads, etc.) for output (e.g. via one or more thin-film membrane portions, etc.) of one or more beams (e.g. including containing partial portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) said one or more portable electronic device emitters (e.g. including one or more electro-thermo-mechanical film transducer arrangements, etc.) the of said portable electronic device (e.g. including one or more 3G mobile components, etc.) for demodulation (e.g. including at least in part demodulation through signal intelligence recovery, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) into one or more acoustic audio signals (e.g. including one or more foreign language speech information containing acoustic audio signals, etc.) containing said one or more information signals (e.g. including two-way conversation information, etc.) at a first location (e.g. inclusive to within a vicinity of one or more selected ranges, etc.) spaced away from said portable electronic device (e.g. within a distance from a desk to a chair, etc.) and spaced away from a second location (e.g. within a distance from a display screen to an ear, etc.) as a laptop computer portable electronic device (e.g. where a laptop is used as a business desktop computer replacement, etc.).

In one or more implementations, as shown in FIG. 87, operation o12 includes an operation o1260 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a personal data assistant (PDA) portable electronic device. Origination of an illustratively derived governing PDA component group can be accomplished through skilled in the art design choice selection of one or more of the above depicted components from one or more of the above depicted subsystems shown in FIG. 25. Components from the governing PDA component group can be used in implementing execution of the one or more governing PDA instructions i1260 of FIG. 45, can be used in performance of the governing PDA electrical circuitry arrangement e1260 of FIG. 38, and/or can be used in otherwise fulfillment of the operation o1260. An exemplary non-transitory signal bearing medium version of the information storage subsystem s200 is depicted in FIG. 45 as bearing the one or more governing PDA instructions i1260 that when executed will direct performance of the operation o1260. Furthermore, the governing PDA electrical circuitry arrangement ("elec circ arrange") e1260, when activated, will perform the operation o1260. Also, the governing PDA module m1260, when executed and/or activated, will direct performance of and/or perform the operation o1260. For instance, in one or more exemplary implementations, the one or more governing PDA instructions i1260, when executed, direct performance of the operation o1260 in the illustrative depiction as follows, and/or the governing PDA electrical circuitry arrangement e1260, when activated, performs the operation o1260 in the illustrative depiction as follows, and/or the governing PDA module m1260, when executed and/or activated, directs performance of and/or performs the operation o1260 in the illustrative depiction as follows, and/or the operation o1260 is otherwise carried out in the illustrative depiction as follows: electronically governing (e.g. by CD-ROM playback, etc.) for output (e.g. by one or more resonant surface portions, etc.) of one or more beams (e.g. including containing transitionary portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) said one or more portable electronic device emitters (e.g. including one or more polyvinylidene fluoride film transducer arrangements, etc.) the of said portable electronic device (e.g. including one or more cellular components, etc.) for demodulation (e.g. including demodulation via mutual interference therewith multiple acoustic ultrasonic signals configured to be demodulated through to at least in part result in one or more acoustic audio signals, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) into one or more acoustic audio signals (e.g. including one or more classical music selection information containing acoustic audio signals, etc.) containing said one or more information signals (e.g. including confidential information, etc.) at a first location (e.g. inclusive to within a vicinity of one or more designated direction audio signals, etc.) spaced away from said portable electronic device (e.g. within a distance from a dashboard to a headrest, etc.) and spaced away from a second location (e.g. within a distance from a portable device to a center of a group, etc.) as a personal data assistant (PDA) portable electronic device (e.g. where a personal data assistant includes smart phone and tablet features, etc.).

In one or more implementations, as shown in FIG. 88, operation o12 includes an operation o1261 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a smart phone portable electronic device. Origination of an illustratively derived governing smart phone component group can be accomplished through skilled in the art design choice selection of one or more of the above depicted components from one or more of the above depicted subsystems shown in FIG. 25. Components from the governing smart phone component group can be used in implementing execution of the one or more governing smart phone instructions i1261 of FIG. 45, can be used in performance of the governing smart phone electrical circuitry arrangement e1261 of FIG. 38, and/or can be used in otherwise fulfillment of the operation o1261. An exemplary non-transitory signal bearing medium version of the information storage subsystem s200 is depicted in FIG. 45 as bearing the one or more governing smart phone instructions i1261 that when executed will direct performance of the operation o1261. Furthermore, the governing smart phone electrical circuitry arrangement ("elec circ arrange") e1261, when activated, will perform the operation o1261. Also, the governing smart phone module m1261, when executed and/or activated, will direct performance of and/or perform the operation o1261. For instance, in one or more exemplary implementations, the one or more governing smart phone instructions i1261, when executed, direct performance of the operation o1261 in the illustrative depiction as follows, and/or the governing smart phone electrical circuitry arrangement e1261, when activated, performs the operation o1261 in the illustrative depiction as follows, and/or the governing smart phone module m1261, when executed and/or activated, directs performance of and/or performs the operation o1261 in the illustrative depiction as follows, and/or the operation o1261 is otherwise carried out in the illustrative depiction as follows: electronically governing for output (e.g. from one or more signal processor portions, etc.) of one or more beams (e.g. including containing transitionary portions, etc.) of said one or more modulated acoustic ultrasonic signals (e.g. via one or more acoustic ultrasonic signals configured to be demodulated through nonlinear apparel interaction to at least in part produce one or more acoustic audio signals, etc.) said one or more portable electronic device emitters (e.g. including one or more deposition transducer arrangements, etc.) the of said portable electronic device (e.g. including one or more 4G components, etc.) for demodulation (e.g. including demodulation using one or more acoustic ultrasonic signals configured to be demodulated through nonlinear atmospheric interaction to at least in part generate one or more acoustic audio signals, etc.) of said one or more modulated acoustic ultrasonic signals (e.g. via one or more acoustic ultrasonic signals configured to be demodulated through nonlinear apparel interaction to at least in part produce one or more acoustic audio signals, etc.) into one or more acoustic audio signals (e.g. including one or more instructional lesson material information containing acoustic audio signals, etc.) containing said one or more information signals (e.g. including eavesdropping information, etc.) at a first location (e.g. exclusive to within a vicinity of one or more designated directions, etc.) spaced away from said portable electronic device (e.g. less than confines of a room, etc.) and spaced away from a second location (e.g. within a distance from a display screen to a center of a group, etc.) as a smart phone portable electronic device (e.g. where a smart phone includes tablet features, etc.).

In one or more implementations, as shown in FIG. 88, operation o12 includes an operation o1262 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a security personnel device portable electronic device. Origination of an illustratively derived governing security personnel component group can be accomplished through skilled in the art design choice selection of one or more of the above depicted components from one or more of the above depicted subsystems shown in FIG. 25. Components from the governing security personnel component group can be used in implementing execution of the one or more governing security personnel instructions i1262 of FIG. 45, can be used in performance of the governing security personnel electrical circuitry arrangement e1262 of FIG. 38, and/or can be used in otherwise fulfillment of the operation o1262. An exemplary non-transitory signal bearing medium version of the information storage subsystem s200 is depicted in FIG. 45 as bearing the one or more governing security personnel instructions i1262 that when executed will direct performance of the operation o1262. Furthermore, the governing security personnel electrical circuitry arrangement ("elec circ arrange") e1262, when activated, will perform the operation o1262. Also, the governing security personnel module m1262, when executed and/or activated, will direct performance of and/or perform the operation o1262. For instance, in one or more exemplary implementations, the one or more governing security personnel instructions i1262, when executed, direct performance of the operation o1262 in the illustrative depiction as follows, and/or the governing security personnel electrical circuitry arrangement e1262, when activated, performs the operation o1262 in the illustrative depiction as follows, and/or the governing security personnel module m1262, when executed and/or activated, directs performance of and/or performs the operation o1262 in the illustrative depiction as follows, and/or the operation o1262 is otherwise carried out in the illustrative depiction as follows: electronically governing (e.g. using mp3 media player, etc.) for output (e.g. using one or more transmitter portions, etc.) of one or more beams (e.g. including containing temporary portions, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) said one or more portable electronic device emitters (e.g. including one or more emitter array arrangements, etc.) the of said portable electronic device (e.g. including one or more WiFi components, etc.) for demodulation (e.g. including demodulation with one or more acoustic ultrasonic signals configured to be demodulated through nonlinear human tissue interaction to at least in part produce one or more acoustic audio signals, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) into one or more acoustic audio signals (e.g. including one or more warning tone information containing acoustic audio signals, etc.) containing said one or more information signals (e.g. including pre-recorded information, etc.) at a first location (e.g. inclusive to within a vicinity of one or more designated ears, etc.) spaced away from said portable electronic device (e.g. less than an arm's length, etc.) and spaced away from a second location (e.g. within a distance from a transmitter to a receiver, etc.) as a security personnel device portable electronic device (e.g. including security personnel walkie-talkies, etc.).

In one or more implementations, as shown in FIG. 88, operation o12 includes an operation o1263 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a sports equipment portable electronic device. Origination of an illustratively derived governing sports equipment component group can be accomplished through skilled in the art design choice selection of one or more of the above depicted components from one or more of the above depicted subsystems shown in FIG. 25. Components from the governing sports equipment component group can be used in implementing execution of the one or more governing sports equipment instructions i1263 of FIG. 45, can be used in performance of the governing sports equipment electrical circuitry arrangement e1263 of FIG. 38, and/or can be used in otherwise fulfillment of the operation o1263. An exemplary non-transitory signal bearing medium version of the information storage subsystem s200 is depicted in FIG. 45 as bearing the one or more governing sports equipment instructions i1263 that when executed will direct performance of the operation o1263. Furthermore, the governing sports equipment electrical circuitry arrangement ("elec circ arrange") e1263, when activated, will perform the operation o1263. Also, the governing sports equipment module m1263, when executed and/or activated, will direct performance of and/or perform the operation o1263. For instance, in one or more exemplary implementations, the one or more governing sports equipment instructions i1263, when executed, direct performance of the operation o1263 in the illustrative depiction as follows, and/or the governing sports equipment electrical circuitry arrangement e1263, when activated, performs the operation o1263 in the illustrative depiction as follows, and/or the governing sports equipment module m1263, when executed and/or activated, directs performance of and/or performs the operation o1263 in the illustrative depiction as follows, and/or the operation o1263 is otherwise carried out in the illustrative depiction as follows: electronically governing (e.g. through internet communication protocols, etc.) for output (e.g. through one or more transducer membrane portions, etc.) of one or more beams (e.g. including containing steady state portions, etc.) of said one or more modulated acoustic ultrasonic signals (e.g. via one or more acoustic ultrasonic signals including signals having one or more frequencies above 60 kHz, etc.) said one or more portable electronic device emitters (e.g. including one or more dispersed transducer arrangements, etc.) the of said portable electronic device (e.g. including one or more infrared components, etc.) for demodulation (e.g. including demodulation by one or more acoustic ultrasonic signals configured to be demodulated through nonlinear polymeric interaction to at least in part result in one or more acoustic audio signals, etc.) of said one or more modulated acoustic ultrasonic signals (e.g. via one or more acoustic ultrasonic signals including signals having one or more frequencies above 60 kHz, etc.) into one or more acoustic audio signals (e.g. including one or more white noise information containing acoustic audio signals, etc.) containing said one or more information signals (e.g. including processor generated information, etc.) at a first location (e.g. inclusive to within a vicinity of one or more identified persons, etc.) spaced away from said portable electronic device (e.g. less than a three-foot radius, etc.) and spaced away from a second location (e.g. within a distance from a first seat back to a second seat back, etc.) as a sports equipment portable electronic device (e.g. incorporated into a sports helmet such as for football or baseball, etc.).

In one or more implementations, as shown in FIG. 89, operation o12 includes an operation o1264 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a wearable media portable electronic device. Origination of an illustratively derived governing wearable media component group can be accomplished through skilled in the art design choice selection of one or more of the above depicted components from one or more of the above depicted subsystems shown in FIG. 25. Components from the governing wearable media component group can be used in implementing execution of the one or more governing wearable media instructions i1264 of FIG. 45, can be used in performance of the governing wearable media electrical circuitry arrangement e1264 of FIG. 38, and/or can be used in otherwise fulfillment of the operation o1264. An exemplary non-transitory signal bearing medium version of the information storage subsystem s200 is depicted in FIG. 45 as bearing the one or more governing wearable media instructions i1264 that when executed will direct performance of the operation o1264. Furthermore, the governing wearable media electrical circuitry arrangement ("elec circ arrange") e1264, when activated, will perform the operation o1264. Also, the governing wearable media module m1264, when executed and/or activated, will direct performance of and/or perform the operation o1264. For instance, in one or more exemplary implementations, the one or more governing wearable media instructions i1264, when executed, direct performance of the operation o1264 in the illustrative depiction as follows, and/or the governing wearable media electrical circuitry arrangement e1264, when activated, performs the operation o1264 in the illustrative depiction as follows, and/or the governing wearable media module m1264, when executed and/or activated, directs performance of and/or performs the operation o1264 in the illustrative depiction as follows, and/or the operation o1264 is otherwise carried out in the illustrative depiction as follows: electronically governing (e.g. through reception of cable communication packets, etc.) for output (e.g. via one or more transducer array portions, etc.) of one or more beams (e.g. including containing integrated portions, etc.) of said one or more modulated acoustic ultrasonic signals (e.g. via one or more acoustic ultrasonic signals including signals having one or more frequencies above 80 kHz, etc.) said one or more portable electronic device emitters (e.g. including one or more monitor embedded transducer arrangements, etc.) the of said portable electronic device (e.g. including one or more personal digital assistant components, etc.) for demodulation (e.g. including demodulation through one or more acoustic ultrasonic signals configured to be demodulated through nonlinear apparel interaction to at least in part produce one or more acoustic audio signals, etc.) of said one or more modulated acoustic ultrasonic signals (e.g. via one or more acoustic ultrasonic signals including signals having one or more frequencies above 80 kHz, etc.) into one or more acoustic audio signals (e.g. including varying pitch information containing acoustic audio signals, etc.) containing said one or more information signals (e.g. including internet based information, etc.) at a first location (e.g. inclusive to within a vicinity of one or more predetermined ears, etc.) spaced away from said portable electronic device (e.g. less than a distance from a portable device to a person, etc.) and spaced away from a second location (e.g. within a distance from a seat back to a tray table, etc.) as a wearable media portable electronic device (e.g. where a smart coat has tablet features, etc.).

In one or more implementations, as shown in FIG. 89, operation o12 includes an operation o1265 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a wristwatch portable electronic device. Origination of an illustratively derived governing wristwatch component group can be accomplished through skilled in the art design choice selection of one or more of the above depicted components from one or more of the above depicted subsystems shown in FIG. 25. Components from the governing wristwatch component group can be used in implementing execution of the one or more governing wristwatch instructions i1265 of FIG. 45, can be used in performance of the governing wristwatch electrical circuitry arrangement e1265 of FIG. 38, and/or can be used in otherwise fulfillment of the operation o1265. An exemplary non-transitory signal bearing medium version of the information storage subsystem s200 is depicted in FIG. 45 as bearing the one or more governing wristwatch instructions i1265 that when executed will direct performance of the operation o1265. Furthermore, the governing wristwatch electrical circuitry arrangement ("elec circ arrange") e1265, when activated, will perform the operation o1265. Also, the governing wristwatch module m1265, when executed and/or activated, will direct performance of and/or perform the operation o1265. For instance, in one or more exemplary implementations, the one or more governing wristwatch instructions i1265, when executed, direct performance of the operation o1265 in the illustrative depiction as follows, and/or the governing wristwatch electrical circuitry arrangement e1265, when activated, performs the operation o1265 in the illustrative depiction as follows, and/or the governing wristwatch module m1265, when executed and/or activated, directs performance of and/or performs the operation o1265 in the illustrative depiction as follows, and/or the operation o1265 is otherwise carried out in the illustrative depiction as follows: electronically governing (e.g. via Wi-Fi signal reception, etc.) for output (e.g. by one or more membrane speaker portions, etc.) of one or more beams (e.g. including containing disparate portions, etc.) of said one or more modulated acoustic ultrasonic signals (e.g. via one or more acoustic ultrasonic signals including signals having one or more frequencies above 100 kHz, etc.) said one or more portable electronic device emitters (e.g. including one or more keyboard embedded transducer arrangements, etc.) the of said portable electronic device (e.g. including one or more smart phone components, etc.) for demodulation (e.g. including demodulation by one or more acoustic ultrasonic signals configured to be demodulated through nonlinear interaction with one or more solids to at least in part generate one or more acoustic audio signals, etc.) of said one or more modulated acoustic ultrasonic signals (e.g. via one or more acoustic ultrasonic signals including signals having one or more frequencies above 100 kHz, etc.) into one or more acoustic audio signals (e.g. including one or more note sequence information containing acoustic audio signals, etc.) containing said one or more information signals (e.g. including digital audio information, etc.) at a first location (e.g. inclusive to within a vicinity of one or more desired groups of people, etc.) spaced away from said portable electronic device (e.g. less than a distance from a display screen to a person, etc.) and spaced away from a second location (e.g. within a distance of an aisle way, etc.) as a wristwatch portable electronic device (e.g. where a smart watch has tablet features, etc.).

In one or more implementations, as shown in FIG. 89, operation o12 includes an operation o1266 for electronically governing for output of one or more beams of said one or more modulated acoustic ultrasonic signals from said one or more portable electronic device emitters the of said portable electronic device for demodulation of said one or more modulated acoustic ultrasonic signals into one or more acoustic audio signals containing said one or more information signals at a first location spaced away from said portable electronic device and spaced away from a second location as a two-way radio portable electronic device. Origination of an illustratively derived governing two-way radio component group can be accomplished through skilled in the art design choice selection of one or more of the above depicted components from one or more of the above depicted subsystems shown in FIG. 25. Components from the governing two-way radio component group can be used in implementing execution of the one or more governing two-way radio instructions i1266 of FIG. 45, can be used in performance of the governing two-way radio electrical circuitry arrangement e1266 of FIG. 38, and/or can be used in otherwise fulfillment of the operation o1266. An exemplary non-transitory signal bearing medium version of the information storage subsystem s200 is depicted in FIG. 45 as bearing the one or more governing two-way radio instructions i1266 that when executed will direct performance of the operation o1266. Furthermore, the governing two-way radio electrical circuitry arrangement ("elec circ arrange") e1266, when activated, will perform the operation o1266. Also, the governing two-way radio module m1266, when executed and/or activated, will direct performance of and/or perform the operation o1266. For instance, in one or more exemplary implementations, the one or more governing two-way radio instructions i1266, when executed, direct performance of the operation o1266 in the illustrative depiction as follows, and/or the governing two-way radio electrical circuitry arrangement e1266, when activated, performs the operation o1266 in the illustrative depiction as follows, and/or the governing two-way radio module m1266, when executed and/or activated, directs performance of and/or performs the operation o1266 in the illustrative depiction as follows, and/or the operation o1266 is otherwise carried out in the illustrative depiction as follows: electronically governing (e.g. by near-field infrared receiver, etc.) for output (e.g. from one or more ultrasonic transducer portions, etc.) of one or more beams (e.g. including containing beginning portions, etc.) of said one or more modulated acoustic ultrasonic signals (e.g. via one or more acoustic ultrasonic signals including signals having one or more frequencies above 120 kHz, etc.) said one or more portable electronic device emitters (e.g. including one or more device body embedded transducer arrangements, etc.) the of said portable electronic device (e.g. including one or more cell phone components, etc.) for demodulation (e.g. including at least in part demodulation by signal down conversion, etc.) of said one or more modulated acoustic ultrasonic signals (e.g. via one or more acoustic ultrasonic signals including signals having one or more frequencies above 120 kHz, etc.) into one or more acoustic audio signals (e.g. including one or more two-way conversation information containing acoustic audio signals, etc.) containing said one or more information signals (e.g. including analog audio information, etc.) at a first location (e.g. inclusive to within a vicinity of one or more chosen audio receivers, etc.) spaced away from said portable electronic device (e.g. less than a distance from a portable device to an ear, etc.) and spaced away from a second location (e.g. within a distance from a desk to a chair, etc.) as a two-way radio portable electronic device (e.g. where a walkie-talkie has smart phone features, etc.).

In one or more implementations, as shown in FIG. 90, operation o12 includes an operation o1267 for electronically governing for output of one or more beams of said one or more modulated acoustic ultrasonic signals from said one or more portable electronic device emitters of said portable electronic device for demodulation the of said one or more modulated acoustic ultrasonic signals into one or more acoustic audio signals containing said one or more information signals at a first location spaced away from said portable electronic device and spaced away from a second location including determination of targeting area based in part on one or more frequencies of said one or more ultrasonic acoustic signals. Origination of an illustratively derived governing targeting area component group can be accomplished through skilled in the art design choice selection of one or more of the above depicted components from one or more of the above depicted subsystems shown in FIG. 25. Components from the governing targeting area component group can be used in implementing execution of the one or more governing targeting area instructions i1267 of FIG. 45, can be used in performance of the governing targeting area electrical circuitry arrangement e1267 of FIG. 38, and/or can be used in otherwise fulfillment of the operation o1267. An exemplary non-transitory signal bearing medium version of the information storage subsystem s200 is depicted in FIG. 45 as bearing the one or more governing targeting area instructions i1267 that when executed will direct performance of the operation o1267. Furthermore, the governing targeting area electrical circuitry arrangement ("elec circ arrange") e1267, when activated, will perform the operation o1267. Also, the governing targeting area module m1267, when executed and/or activated, will direct performance of and/or perform the operation o1267. For instance, in one or more exemplary implementations, the one or more governing targeting area instructions i1267, when executed, direct performance of the operation o1267 in the illustrative depiction as follows, and/or the governing targeting area electrical circuitry arrangement e1267, when activated, performs the operation o1267 in the illustrative depiction as follows, and/or the governing targeting area module m1267, when executed and/or activated, directs performance of and/or performs the operation o1267 in the illustrative depiction as follows, and/or the operation o1267 is otherwise carried out in the illustrative depiction as follows: electronically governing (e.g. from hard drive access, etc.) for output (e.g. using one or more electrostatic transducer portions, etc.) of one or more beams (e.g. including containing middle portions, etc.) of said one or more modulated acoustic ultrasonic signals (e.g. via one or more acoustic ultrasonic signals including signals having one or more frequencies above 140 kHz, etc.) said one or more portable electronic device emitters (e.g. including one or more device perimeter embedded transducer arrangements, etc.) of said portable electronic device (e.g. including one or more laptop components, etc.) for demodulation (e.g. including at least in part demodulation through signal amplitude demodulation, etc.) the of said one or more modulated acoustic ultrasonic signals (e.g. via one or more acoustic ultrasonic signals including signals having one or more frequencies above 140 kHz, etc.) into one or more acoustic audio signals (e.g. including one or more confidential information containing acoustic audio signals, etc.) containing said one or more information signals (e.g. including high frequency audio information, etc.) at a first location (e.g. inclusive to within a vicinity of one or more selected microphones, etc.) spaced away from said portable electronic device (e.g. less than a distance from a display screen to an ear, etc.) and spaced away from a second location (e.g. within a distance from a dashboard to a headrest, etc.) including determination of targeting area based in part on one or more frequencies of said one or more ultrasonic acoustic signals (e.g. where frequency determines wavelength to influence aperture dimensions and consequential targeting size, etc.).

In one or more implementations, as shown in FIG. 90, operation o12 includes an operation o1268 for electronically governing for output of one or more beams of said one or more modulated acoustic ultrasonic signals from said one or more portable electronic device emitters of said portable electronic device for demodulation the of said one or more modulated acoustic ultrasonic signals into one or more acoustic audio signals containing said one or more information signals at a first location spaced away from said portable electronic device and spaced away from a second location including transducer placement based in part on one or more frequencies to be used for said one or more acoustic ultrasonic signals. Origination of an illustratively derived governing transducer placement component group can be accomplished through skilled in the art design choice selection of one or more of the above depicted components from one or more of the above depicted subsystems shown in FIG. 25. Components from the governing transducer placement component group can be used in implementing execution of the one or more governing transducer placement instructions i1268 of FIG. 45, can be used in performance of the governing transducer placement electrical circuitry arrangement e1268 of FIG. 38, and/or can be used in otherwise fulfillment of the operation o1268. An exemplary non-transitory signal bearing medium version of the information storage subsystem s200 is depicted in FIG. 45 as bearing the one or more governing transducer placement instructions i1268 that when executed will direct performance of the operation o1268. Furthermore, the governing transducer placement electrical circuitry arrangement ("elec circ arrange") e1268, when activated, will perform the operation o1268. Also, the governing transducer placement module m1268, when executed and/or activated, will direct performance of and/or perform the operation o1268. For instance, in one or more exemplary implementations, the one or more governing transducer placement instructions i1268, when executed, direct performance of the operation o1268 in the illustrative depiction as follows, and/or the governing transducer placement electrical circuitry arrangement e1268, when activated, performs the operation o1268 in the illustrative depiction as follows, and/or the governing transducer placement module m1268, when executed and/or activated, directs performance of and/or performs the operation o1268 in the illustrative depiction as follows, and/or the operation o1268 is otherwise carried out in the illustrative depiction as follows: electronically governing (e.g. using fiber optic communication, etc.) for output (e.g. through one or more piezoelectric transducer portions, etc.) of one or more beams (e.g. including containing end portions, etc.) of said one or more modulated acoustic ultrasonic signals (e.g. via one or more acoustic ultrasonic signals including signals having one or more frequencies above 160 kHz, etc.) said one or more portable electronic device emitters (e.g. including one or more multiple emitter array arrangements, etc.) of said portable electronic device (e.g. including one or more tablet computer components, etc.) for demodulation (e.g. including at least in part demodulation via signal frequency demodulation portions, etc.) the of said one or more modulated acoustic ultrasonic signals (e.g. via one or more acoustic ultrasonic signals including signals having one or more frequencies above 160 kHz, etc.) into one or more acoustic audio signals (e.g. including one or more eavesdropping information containing acoustic audio signals, etc.) containing said one or more information signals (e.g. including low frequency audio information, etc.) at a first location (e.g. inclusive to within a vicinity of one or more designated surfaces, etc.) spaced away from said portable electronic device (e.g. less than a distance from a portable device to a center of a group, etc.) and spaced away from a second location (e.g. less than confines of a room, etc.) including transducer placement based in part on one or more frequencies to be used for said one or more acoustic ultrasonic signals (e.g. where transducer size allows for placement along bezels of the portable device, etc.).

In one or more implementations, as shown in FIG. 90, operation o12 includes an operation o1269 for electronically governing for output of one or more beams of said one or more modulated acoustic ultrasonic signals from said one or more portable electronic device emitters of said portable electronic device for demodulation the of said one or more modulated acoustic ultrasonic signals into one or more acoustic audio signals containing said one or more information signals at a first location spaced away from said portable electronic device and spaced away from a second location including amplitude to be used for said ultrasonic acoustic signals based on size of desired target area. Origination of an illustratively derived governing amplitude size component group can be accomplished through skilled in the art design choice selection of one or more of the above depicted components from one or more of the above depicted subsystems shown in FIG. 25. Components from the governing amplitude size component group can be used in implementing execution of the one or more governing amplitude size instructions i1269 of FIG. 45, can be used in performance of the governing amplitude size electrical circuitry arrangement e1269 of FIG. 38, and/or can be used in otherwise fulfillment of the operation o1269. An exemplary non-transitory signal bearing medium version of the information storage subsystem s200 is depicted in FIG. 45 as bearing the one or more governing amplitude size instructions i1269 that when executed will direct performance of the operation o1269. Furthermore, the governing amplitude size electrical circuitry arrangement ("elec circ arrange") e1269, when activated, will perform the operation o1269. Also, the governing amplitude size module m1269, when executed and/or activated, will direct performance of and/or perform the operation o1269. For instance, in one or more exemplary implementations, the one or more governing amplitude size instructions i1269, when executed, direct performance of the operation o1269 in the illustrative depiction as follows, and/or the governing amplitude size electrical circuitry arrangement e1269, when activated, performs the operation o1269 in the illustrative depiction as follows, and/or the governing amplitude size module m1269, when executed and/or activated, directs performance of and/or performs the operation o1269 in the illustrative depiction as follows, and/or the operation o1269 is otherwise carried out in the illustrative depiction as follows: electronically governing (e.g. through sound wave reception, etc.) for output (e.g. via one or more electrostrictive transducer portions, etc.) of one or more beams (e.g. including containing some portions, etc.) of said one or more modulated acoustic ultrasonic signals (e.g. via one or more acoustic ultrasonic signals including signals having one or more frequencies above 180 kHz, etc.) said one or more portable electronic device emitters (e.g. including one or more perimeter arrays, etc.) of said portable electronic device (e.g. including one or more mp3 player components, etc.) for demodulation (e.g. including at least in part demodulation with signal phase demodulation portions, etc.) the of said one or more modulated acoustic ultrasonic signals (e.g. via one or more acoustic ultrasonic signals including signals having one or more frequencies above 180 kHz, etc.) into one or more acoustic audio signals (e.g. including one or more pre-recorded information containing acoustic audio signals, etc.) containing said one or more information signals (e.g. including containing beginning portions, etc.) at a first location (e.g. inclusive to within a vicinity of one or more identified objects, etc.) spaced away from said portable electronic device (e.g. less than a distance from a display screen to a center of a group, etc.) and spaced away from a second location (e.g. less than an arm's length, etc.) including amplitude to be used for said ultrasonic acoustic signals based on size of desired target area (e.g. where target size of approximate ear size allows for low level amplitude for acoustic audio signals downcoverted from acoustic ultrasonic signals, etc.).

In one or more implementations, as shown in FIG. 91, operation o12 includes an operation o1270 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement at least partially along vicinity of said portable electronic device. Origination of an illustratively derived governing along vicinity component group can be accomplished through skilled in the art design choice selection of one or more of the above depicted components from one or more of the above depicted subsystems shown in FIG. 25. Components from the governing along vicinity component group can be used in implementing execution of the one or more governing along vicinity instructions i1270 of FIG. 45, can be used in performance of the governing along vicinity electrical circuitry arrangement e1270 of FIG. 38, and/or can be used in otherwise fulfillment of the operation o1270. An exemplary non-transitory signal bearing medium version of the information storage subsystem s200 is depicted in FIG. 45 as bearing the one or more governing along vicinity instructions i1270 that when executed will direct performance of the operation o1270. Furthermore, the governing along vicinity electrical circuitry arrangement ("elec circ arrange") e1270, when activated, will perform the operation o1270. Also, the governing along vicinity module m1270, when executed and/or activated, will direct performance of and/or perform the operation o1270. For instance, in one or more exemplary implementations, the one or more governing along vicinity instructions i1270, when executed, direct performance of the operation o1270 in the illustrative depiction as follows, and/or the governing along vicinity electrical circuitry arrangement e1270, when activated, performs the operation o1270 in the illustrative depiction as follows, and/or the governing along vicinity module m1270, when executed and/or activated, directs performance of and/or performs the operation o1270 in the illustrative depiction as follows, and/or the operation o1270 is otherwise carried out in the illustrative depiction as follows: electronically governing (e.g. via radio frequency antenna, etc.) for output (e.g. by one or more electro-thermo-mechanical film transducer portions, etc.) of one or more beams (e.g. including containing all portions, etc.) of said one or more modulated acoustic ultrasonic signals (e.g. via one or more acoustic ultrasonic signals including signals having one or more frequencies above 200 kHz, etc.) the from said one or more portable electronic device emitters (e.g. including one or more polar arrays, etc.) of said portable electronic device (e.g. including one or more mobile phone components, etc.) for demodulation (e.g. including at least in part demodulation using signal rectification, etc.) of said one or more modulated acoustic ultrasonic signals (e.g. via one or more acoustic ultrasonic signals including signals having one or more frequencies above 200 kHz, etc.) into one or more acoustic audio signals (e.g. including one or more processor generated information containing acoustic audio signals, etc.) containing said one or more information signals (e.g. including containing middle portions, etc.) at a first location (e.g. inclusive to within a vicinity of one or more predetermined locations, etc.) spaced away from said portable electronic device (e.g. less than a distance from a transmitter to a receiver, etc.) and spaced away from a second location (e.g. less than a three-foot radius, etc.) including transducer placement at least partially along vicinity of said portable electronic device (e.g. including transducer placement interspaced between keyboard keys, etc.).

In one or more implementations, as shown in FIG. 91, operation o12 includes an operation o1271 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement at least partially in display screen of said portable electronic device. Origination of an illustratively derived governing display screen component group can be accomplished through skilled in the art design choice selection of one or more of the above depicted components from one or more of the above depicted subsystems shown in FIG. 25. Components from the governing display screen component group can be used in implementing execution of the one or more governing display screen instructions i1271 of FIG. 45, can be used in performance of the governing display screen electrical circuitry arrangement e1271 of FIG. 38, and/or can be used in otherwise fulfillment of the operation o1271. An exemplary non-transitory signal bearing medium version of the information storage subsystem s200 is depicted in FIG. 45 as bearing the one or more governing display screen instructions i1271 that when executed will direct performance of the operation o1271. Furthermore, the governing display screen electrical circuitry arrangement ("elec circ arrange") e1271, when activated, will perform the operation o1271. Also, the governing display screen module m1271, when executed and/or activated, will direct performance of and/or perform the operation o1271. For instance, in one or more exemplary implementations, the one or more governing display screen instructions i1271, when executed, direct performance of the operation o1271 in the illustrative depiction as follows, and/or the governing display screen electrical circuitry arrangement e1271, when activated, performs the operation o1271 in the illustrative depiction as follows, and/or the governing display screen module m1271, when executed and/or activated, directs performance of and/or performs the operation o1271 in the illustrative depiction as follows, and/or the operation o1271 is otherwise carried out in the illustrative depiction as follows: electronically governing (e.g. by reception of wireless transmission, etc.) for output (e.g. from one or more polyvinylidene fluoride film transducer portions, etc.) of one or more beams (e.g. including containing measure portions, etc.) of said one or more modulated acoustic ultrasonic signals (e.g. via multiple acoustic ultrasonic signals configured to be demodulated through mutual interference therewith to at least in part result in one or more acoustic audio signals, etc.) the from said one or more portable electronic device emitters (e.g. including one or more orthographic arrays, etc.) of said portable electronic device (e.g. including one or more two-way radio components, etc.) for demodulation (e.g. including at least in part demodulation by signal filtering, etc.) of said one or more modulated acoustic ultrasonic signals (e.g. via multiple acoustic ultrasonic signals configured to be demodulated through mutual interference therewith to at least in part result in one or more acoustic audio signals, etc.) into one or more acoustic audio signals (e.g. including one or more internet based information containing acoustic audio signals, etc.) containing said one or more information signals (e.g. including containing end portions, etc.) at a first location (e.g. inclusive to within a vicinity of one or more desired environments, etc.) spaced away from said portable electronic device (e.g. less than a distance from a first seat back to a second seat back, etc.) and spaced away from a second location (e.g. less than a distance from a portable device to a person, etc.) including transducer placement at least partially in display screen of said portable electronic device (e.g. including transducer placement behind portions of thin displays, etc.).

In one or more implementations, as shown in FIG. 91, operation o12 includes an operation o1272 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement at least partially in keyboard area of said portable electronic device. Origination of an illustratively derived governing keyboard area component group can be accomplished through skilled in the art design choice selection of one or more of the above depicted components from one or more of the above depicted subsystems shown in FIG. 25. Components from the governing keyboard area component group can be used in implementing execution of the one or more governing keyboard area instructions i1272 of FIG. 45, can be used in performance of the governing keyboard area electrical circuitry arrangement e1272 of FIG. 38, and/or can be used in otherwise fulfillment of the operation o1272. An exemplary non-transitory signal bearing medium version of the information storage subsystem s200 is depicted in FIG. 45 as bearing the one or more governing keyboard area instructions i1272 that when executed will direct performance of the operation o1272. Furthermore, the governing keyboard area electrical circuitry arrangement ("elec circ arrange") e1272, when activated, will perform the operation o1272. Also, the governing keyboard area module m1272, when executed and/or activated, will direct performance of and/or perform the operation o1272. For instance, in one or more exemplary implementations, the one or more governing keyboard area instructions i1272, when executed, direct performance of the operation o1272 in the illustrative depiction as follows, and/or the governing keyboard area electrical circuitry arrangement e1272, when activated, performs the operation o1272 in the illustrative depiction as follows, and/or the governing keyboard area module m1272, when executed and/or activated, directs performance of and/or performs the operation o1272 in the illustrative depiction as follows, and/or the operation o1272 is otherwise carried out in the illustrative depiction as follows: electronically governing (e.g. from memory stick access, etc.) for output (e.g. using one or more deposition transducer portions, etc.) of one or more beams (e.g. including containing phrase portions, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) the from said one or more portable electronic device emitters (e.g. including one or more three-dimensional arrays, etc.) of said portable electronic device (e.g. including one or more security network components, etc.) for demodulation (e.g. including at least in part demodulation through signal intelligence recovery, etc.) of said one or more modulated acoustic ultrasonic signals (e.g. via one or more acoustic ultrasonic signals configured to be demodulated through nonlinear atmospheric interaction to at least in part generate one or more acoustic audio signals, etc.) into one or more acoustic audio signals (e.g. including one or more digital audio information containing acoustic audio signals, etc.) containing said one or more information signals (e.g. including containing some portions, etc.) at a first location (e.g. inclusive to within a vicinity of one or more chosen distances, etc.) spaced away from said portable electronic device (e.g. less than a distance from a seat back to a tray table, etc.) and spaced away from a second location (e.g. less than a distance from a display screen to a person, etc.) including transducer placement at least partially in keyboard area of said portable electronic device (e.g. including transducer placement along key spacing of keyboards, etc.).

In one or more implementations, as shown in FIG. 92, operation o12 includes an operation o1273 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducers having dimensional sizing of less than 10 millimeters. Origination of an illustratively derived governing dimensional sizing component group can be accomplished through skilled in the art design choice selection of one or more of the above depicted components from one or more of the above depicted subsystems shown in FIG. 25. Components from the governing dimensional sizing component group can be used in implementing execution of the one or more governing dimensional sizing instructions i1273 of FIG. 45, can be used in performance of the governing dimensional sizing electrical circuitry arrangement e1273 of FIG. 38, and/or can be used in otherwise fulfillment of the operation o1273. An exemplary non-transitory signal bearing medium version of the information storage subsystem s200 is depicted in FIG. 45 as bearing the one or more governing dimensional sizing instructions i1273 that when executed will direct performance of the operation o1273. Furthermore, the governing dimensional sizing electrical circuitry arrangement ("elec circ arrange") e1273, when activated, will perform the operation o1273. Also, the governing dimensional sizing module m1273, when executed and/or activated, will direct performance of and/or perform the operation o1273. For instance, in one or more exemplary implementations, the one or more governing dimensional sizing instructions i1273, when executed, direct performance of the operation o1273 in the illustrative depiction as follows, and/or the governing dimensional sizing electrical circuitry arrangement e1273, when activated, performs the operation o1273 in the illustrative depiction as follows, and/or the governing dimensional sizing module m1273, when executed and/or activated, directs performance of and/or performs the operation o1273 in the illustrative depiction as follows, and/or the operation o1273 is otherwise carried out in the illustrative depiction as follows: electronically governing (e.g. using flash drive stored data, etc.) for output (e.g. via one or more dispersed transducer portions, etc.) of one or more beams (e.g. including containing chapter portions, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) the from said one or more portable electronic device emitters (e.g. including one or more scattered arrangements, etc.) of said portable electronic device (e.g. including one or more netbook components, etc.) for demodulation (e.g. including demodulation via mutual interference therewith multiple acoustic ultrasonic signals configured to be demodulated through to at least in part result in one or more acoustic audio signals, etc.) of said one or more modulated acoustic ultrasonic signals (e.g. via one or more acoustic ultrasonic signals configured to be demodulated through nonlinear human tissue interaction to at least in part produce one or more acoustic audio signals, etc.) into one or more acoustic audio signals (e.g. including one or more analog audio information containing acoustic audio signals, etc.) containing said one or more information signals (e.g. including containing all portions, etc.) at a first location (e.g. inclusive to within a vicinity of one or more selected ranges, etc.) spaced away from said portable electronic device (e.g. less than a distance of an aisle way, etc.) and spaced away from a second location (e.g. less than a distance from a portable device to an ear, etc.) including transducers having dimensional sizing of less than 10 millimeters (e.g. including transducer sizing of approximately 1 mm, etc.).

In one or more implementations, as shown in FIG. 92, operation o12 includes an operation o1274 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducers having dimensional sizing of less than 30 wavelengths of the lowest frequency of said one or more acoustic ultrasonic signals. Origination of illustratively derived governing wavelengths of the lowest component group can be accomplished through skilled in the art design choice selection of one or more of the above depicted components from one or more of the above depicted subsystems shown in FIG. 25. Components from the governing wavelengths of the lowest component group can be used in implementing execution of the one or more governing wavelengths of the lowest instructions i1274 of FIG. 45, can be used in performance of the governing wavelengths of the lowest electrical circuitry arrangement e1274 of FIG. 38, and/or can be used in otherwise fulfillment of the operation o1274. An exemplary non-transitory signal bearing medium version of the information storage subsystem s200 is depicted in FIG. 45 as bearing the one or more governing wavelengths of the lowest instructions i1274 that when executed will direct performance of the operation o1274. Furthermore, the governing wavelengths of the lowest electrical circuitry arrangement ("elec circ arrange") e1274, when activated, will perform the operation o1274. Also, the governing wavelengths of the lowest module m1274, when executed and/or activated, will direct performance of and/or perform the operation o1274. For instance, in one or more exemplary implementations, the one or more governing wavelengths of the lowest instructions i1274, when executed, direct performance of the operation o1274 in the illustrative depiction as follows, and/or the governing wavelengths of the lowest electrical circuitry arrangement e1274, when activated, performs the operation o1274 in the illustrative depiction as follows, and/or the governing wavelengths of the lowest module m1274, when executed and/or activated, directs performance of and/or performs the operation o1274 in the illustrative depiction as follows, and/or the operation o1274 is otherwise carried out in the illustrative depiction as follows: electronically governing (e.g. through processor synthesized information, etc.) for output (e.g. by one or more monitor embedded transducer portions, etc.) of one or more beams (e.g. including containing sectional portions, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) the from said one or more portable electronic device emitters (e.g. including one or more staggered arrays, etc.) of said portable electronic device (e.g. including one or more ultrabook components, etc.) for demodulation (e.g. including demodulation using one or more acoustic ultrasonic signals configured to be demodulated through nonlinear atmospheric interaction to at least in part generate one or more acoustic audio signals, etc.) of said one or more modulated acoustic ultrasonic signals (e.g. via one or more acoustic ultrasonic signals configured to be demodulated through nonlinear polymeric interaction to at least in part result in one or more acoustic audio signals, etc.) into one or more acoustic audio signals (e.g. including one or more high frequency audio information containing acoustic audio signals, etc.) containing said one or more information signals (e.g. including containing measure portions, etc.) at a first location (e.g. inclusive to within a vicinity of one or more designated direction, etc.) spaced away from said portable electronic device (e.g. less than a distance from a desk to a chair, etc.) and spaced away from a second location (e.g. less than a distance from a display screen to an ear, etc.) including transducers having dimensional sizing of less than 30 wavelengths of the lowest frequency of said one or more acoustic ultrasonic signals (e.g. including transducer sizing of less than 1 mm, etc.).

In one or more implementations, as shown in FIG. 92, operation o12 includes an operation o1275 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement in body of said portable electronic device. Origination of an illustratively derived governing placement in body component group can be accomplished through skilled in the art design choice selection of one or more of the above depicted components from one or more of the above depicted subsystems shown in FIG. 25. Components from the governing placement in body component group can be used in implementing execution of the one or more governing placement in body instructions i1275 of FIG. 45, can be used in performance of the governing placement in body electrical circuitry arrangement e1275 of FIG. 38, and/or can be used in otherwise fulfillment of the operation o1275. An exemplary non-transitory signal bearing medium version of the information storage subsystem s200 is depicted in FIG. 45 as bearing the one or more governing placement in body instructions i1275 that when executed will direct performance of the operation o1275. Furthermore, the governing placement in body electrical circuitry arrangement ("elec circ arrange") e1275, when activated, will perform the operation o1275. Also, the governing placement in body module m1275, when executed and/or activated, will direct performance of and/or perform the operation o1275. For instance, in one or more exemplary implementations, the one or more governing placement in body instructions i1275, when executed, direct performance of the operation o1275 in the illustrative depiction as follows, and/or the governing placement in body electrical circuitry arrangement e1275, when activated, performs the operation o1275 in the illustrative depiction as follows, and/or the governing placement in body module m1275, when executed and/or activated, directs performance of and/or performs the operation o1275 in the illustrative depiction as follows, and/or the operation o1275 is otherwise carried out in the illustrative depiction as follows: electronically governing (e.g. via ROM drive reads, etc.) for output (e.g. from one or more keyboard embedded transducer portions, etc.) of one or more beams (e.g. including containing whole portions, etc.) of said one or more modulated acoustic ultrasonic signals (e.g. via one or more acoustic ultrasonic signals configured to be demodulated through nonlinear apparel interaction to at least in part produce one or more acoustic audio signals, etc.) the from said one or more portable electronic device emitters (e.g. including one or more linear arrangements, etc.) of said portable electronic device (e.g. including one or more flip-phone components, etc.) for demodulation (e.g. including demodulation with one or more acoustic ultrasonic signals configured to be demodulated through nonlinear human tissue interaction to at least in part produce one or more acoustic audio signals, etc.) of said one or more modulated acoustic ultrasonic signals (e.g. via one or more acoustic ultrasonic signals configured to be demodulated through nonlinear apparel interaction to at least in part produce one or more acoustic audio signals, etc.) into one or more acoustic audio signals (e.g. including one or more low frequency audio information containing acoustic audio signals, etc.) containing said one or more information signals (e.g. including containing phrase portions, etc.) at a first location (e.g. exclusive to within a vicinity of one or more chosen distances, etc.) spaced away from said portable electronic device (e.g. less than a distance from a dashboard to a headrest, etc.) and spaced away from a second location (e.g. less than a distance from a portable device to a center of a group, etc.) including transducer placement in body of said portable electronic device (e.g. including transducer placement within the user interface of the portable electronic device, etc.).

In one or more implementations, as shown in FIG. 93, operation o12 includes an operation o1276 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement in localized areas of said portable electronic device. Origination of an illustratively derived governing localized areas component group can be accomplished through skilled in the art design choice selection of one or more of the above depicted components from one or more of the above depicted subsystems shown in FIG. 25. Components from the governing localized areas component group can be used in implementing execution of the one or more governing localized areas instructions i1276 of FIG. 45, can be used in performance of the governing localized areas electrical circuitry arrangement e1276 of FIG. 38, and/or can be used in otherwise fulfillment of the operation o1276. An exemplary non-transitory signal bearing medium version of the information storage subsystem s200 is depicted in FIG. 45 as bearing the one or more governing localized areas instructions i1276 that when executed will direct performance of the operation o1276. Furthermore, the governing localized areas electrical circuitry arrangement ("elec circ arrange") e1276, when activated, will perform the operation o1276. Also, the governing localized areas module m1276, when executed and/or activated, will direct performance of and/or perform the operation o1276. For instance, in one or more exemplary implementations, the one or more governing localized areas instructions i1276, when executed, direct performance of the operation o1276 in the illustrative depiction as follows, and/or the governing localized areas electrical circuitry arrangement e1276, when activated, performs the operation o1276 in the illustrative depiction as follows, and/or the governing localized areas module m1276, when executed and/or activated, directs performance of and/or performs the operation o1276 in the illustrative depiction as follows, and/or the operation o1276 is otherwise carried out in the illustrative depiction as follows: electronically governing (e.g. by CD-ROM playback, etc.) for output (e.g. using one or more device body embedded transducer portions, etc.) of one or more beams (e.g. including containing partial portions, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) the from said one or more portable electronic device emitters (e.g. including one or more parabolic arrangements, etc.) of said portable electronic device (e.g. including one or more portable computer components, etc.) for demodulation (e.g. including at least in part demodulation by signal down conversion, etc.) of said one or more modulated acoustic ultrasonic signals (e.g. via one or more acoustic ultrasonic signals configured to be demodulated through nonlinear interaction with one or more solids to at least in part generate one or more acoustic audio signals, etc.) into one or more acoustic audio signals (e.g. including one or more low frequency acoustic audio signals, etc.) containing said one or more information signals (e.g. including containing chapter portions, etc.) at a first location (e.g. exclusive to within a vicinity of one or more selected ranges, etc.) spaced away from said portable electronic device (e.g. more than confines of a room, etc.) and spaced away from a second location (e.g. less than a distance from a display screen to a center of a group, etc.) including transducer placement in localized areas of said portable electronic device (e.g. including placement within speaker like shaped arrays of transducers, etc.).

In one or more implementations, as shown in FIG. 93, operation o12 includes an operation o1277 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement in regions of said portable electronic device grouped to appear as one or more collective speakers. Origination of an illustratively derived governing collective speakers component group can be accomplished through skilled in the art design choice selection of one or more of the above depicted components from one or more of the above depicted subsystems shown in FIG. 25. Components from the governing collective speakers component group can be used in implementing execution of the one or more governing collective speakers instructions i1277 of FIG. 45, can be used in performance of the governing collective speakers electrical circuitry arrangement e1277 of FIG. 38, and/or can be used in otherwise fulfillment of the operation o1277. An exemplary non-transitory signal bearing medium version of the information storage subsystem s200 is depicted in FIG. 45 as bearing the one or more governing collective speakers instructions i1277 that when executed will direct performance of the operation o1277. Furthermore, the governing collective speakers electrical circuitry arrangement ("elec circ arrange") e1277, when activated, will perform the operation o1277. Also, the governing collective speakers module m1277, when executed and/or activated, will direct performance of and/or perform the operation o1277. For instance, in one or more exemplary implementations, the one or more governing collective speakers instructions i1277, when executed, direct performance of the operation o1277 in the illustrative depiction as follows, and/or the governing collective speakers electrical circuitry arrangement e1277, when activated, performs the operation o1277 in the illustrative depiction as follows, and/or the governing collective speakers module m1277, when executed and/or activated, directs performance of and/or performs the operation o1277 in the illustrative depiction as follows, and/or the operation o1277 is otherwise carried out in the illustrative depiction as follows: electronically governing (e.g. through one or more device perimeter embedded transducer portions, etc.) of one or more beams (e.g. including containing transitionary portions, etc.) of said one or more modulated acoustic ultrasonic signals (e.g. via one or more acoustic ultrasonic signals including signals having one or more frequencies above 60 kHz, etc.) the from said one or more portable electronic device emitters (e.g. including one or more hyperbolic arrangements, etc.) of said portable electronic device (e.g. including one or more boombox components, etc.) for demodulation (e.g. including at least in part demodulation through signal amplitude demodulation, etc.) of said one or more modulated acoustic ultrasonic signals (e.g. via one or more acoustic ultrasonic signals including signals having one or more frequencies above 60 kHz, etc.) into one or more acoustic audio signals (e.g. including one or more high frequency acoustic audio signals, etc.) containing said one or more information signals (e.g. including containing sectional portions, etc.) at a first location (e.g. exclusive to within a vicinity of one or more designated directions, etc.) spaced away from said portable electronic device (e.g. more than an arm's length, etc.) and spaced away from a second location (e.g. less than a distance from a transmitter to a receiver, etc.) including transducer placement in regions of said portable electronic device grouped to appear as one or more collective speakers (e.g. including placement within arrays of transducers, etc.).

In one or more implementations, as shown in FIG. 93, operation o12 includes an operation o1278 for electronically governing for output of one or more beams of said one or more modulated acoustic ultrasonic signals the from said one or more portable electronic device emitters of said portable electronic device for demodulation of said one or more modulated acoustic ultrasonic signals into one or more acoustic audio signals containing said one or more information signals at a first location spaced away from said portable electronic device and spaced away from a second location including transducer placement of multiple individual transducer arrays. Origination of an illustratively derived governing multiple arrays component group can be accomplished through skilled in the art design choice selection of one or more of the above depicted components from one or more of the above depicted subsystems shown in FIG. 25. Components from the governing multiple arrays component group can be used in implementing execution of the one or more governing multiple arrays instructions i1278 of FIG. 45, can be used in performance of the governing multiple arrays electrical circuitry arrangement e1278 of FIG. 38, and/or can be used in otherwise fulfillment of the operation o1278. An exemplary non-transitory signal bearing medium version of the information storage subsystem s200 is depicted in FIG. 45 as bearing the one or more governing multiple arrays instructions i1278 that when executed will direct performance of the operation o1278. Furthermore, the governing multiple arrays electrical circuitry arrangement ("elec circ arrange") e1278, when activated, will perform the operation o1278. Also, the governing multiple arrays module m1278, when executed and/or activated, will direct performance of and/or perform the operation o1278. For instance, in one or more exemplary implementations, the one or more governing multiple arrays instructions i1278, when executed, direct performance of the operation o1278 in the illustrative depiction as follows, and/or the governing multiple arrays electrical circuitry arrangement e1278, when activated, performs the operation o1278 in the illustrative depiction as follows, and/or the governing multiple arrays module m1278, when executed and/or activated, directs performance of and/or performs the operation o1278 in the illustrative depiction as follows, and/or the operation o1278 is otherwise carried out in the illustrative depiction as follows: electronically governing (e.g. using mp3 media player, etc.) for output (e.g. via one or more multiple emitter array portions, etc.) of one or more beams (e.g. including containing temporary portions, etc.) of said one or more modulated acoustic ultrasonic signals (e.g. via one or more acoustic ultrasonic signals including signals having one or more frequencies above 80 kHz, etc.) the from said one or more portable electronic device emitters (e.g. including one or more enclosed arrangements, etc.) of said portable electronic device (e.g. including one or more digital audio output components, etc.) for demodulation (e.g. including at least in part demodulation via signal frequency demodulation portions, etc.) of said one or more modulated acoustic ultrasonic signals (e.g. via one or more acoustic ultrasonic signals including signals having one or more frequencies above 80 kHz, etc.) into one or more acoustic audio signals (e.g. including one or more full spectrum acoustic audio signals, etc.) containing said one or more information signals (e.g. including containing whole portions, etc.) at a first location (e.g. inclusive to within a vicinity of one or more designated ears, etc.) spaced away from said portable electronic device (e.g. more than a three-foot radius, etc.) and spaced away from a second location (e.g. less than a distance from a first seat back to a second seat back, etc.) including transducer placement of multiple individual transducer arrays (e.g. including placement in arrays regarding down conversion interaction between ultrasonic beams from more than one array, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-Mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or nonvolatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/ operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
one or more sensing devices configured to sense one or more conditions in a vicinity of a target location toward which generated ultrasound is to be transmitted, at least one sensing device of the one or more sensing devices being configured to detect at least one condition in the vicinity of the target location that includes at least other than one or more human-audible sounds in the vicinity of the target location;
a mobile device that includes at least:
circuitry for electronically modulating ultrasound based on audio related information to produce generated ultrasound; and
circuitry for electronically directing transmission of the generated ultrasound for one or more audio emissions resultant from down-conversion of the generated ultrasound at least partly toward the target location, the circuitry for electronically directing transmission further configured to adjust at least one aspect of the transmission of the generated ultrasound based at least in part on input received at least in part via the one or more sensing devices.

2. The system of claim 1, wherein the circuitry for electronically modulating ultrasound based on audio related information to produce generated ultrasound comprises:
circuitry for electronically modulating ultrasound based on audio related information to produce generated ultrasound including digital based ultrasound.

3. The system of claim 2, wherein the circuitry for electronically modulating ultrasound based on audio related information to produce generated ultrasound including digital based ultrasound comprises:
circuitry for electronically modulating ultrasound based on audio related information received via mobile device wireless communication.

4. The system of claim 3, wherein the circuitry for electronically modulating ultrasound based on audio related information received via mobile device wireless communication comprises:

circuitry for electronically modulating ultrasound based on audio related information received via mobile device microphone input.

5. The system of claim 3, wherein the circuitry for electronically modulating ultrasound based on audio related information received via mobile device wireless communication comprises:
circuitry for electronically modulating ultrasound based on audio related information obtained via mobile device audio signal processing.

6. The system of claim 3, wherein the circuitry for electronically modulating ultrasound based on audio related information received via mobile device wireless communication comprises:
circuitry for electronically modulating ultrasound based on audio related information involving one or more mobile device internet communications.

7. The system of claim 3, wherein the circuitry for electronically modulating ultrasound based on audio related information received via mobile device wireless communication comprises:
at least one of:
circuitry for electronically modulating ultrasound based on audio related information received via mobile device audio disk player input;
circuitry for electronically modulating ultrasound based on audio related information received via mobile device electronic media player input;
circuitry for electronically modulating ultrasound based on audio related information accessed via mobile device electronic data storage; or
circuitry for electronically modulating ultrasound based on audio related information received via mobile device electronic audio player input.

8. The system of claim 3, wherein the circuitry for electronically modulating ultrasound based on audio related information received via mobile device wireless communication comprises:
circuitry for electronically modulating ultrasound based on audio related information received via mobile device text recognition input.

9. The system of claim 3, wherein the circuitry for electronically modulating ultrasound based on audio related information received via mobile device wireless communication comprises:
circuitry for electronically modulating ultrasound based on audio related information received via mobile device monitor alarm system input.

10. The system of claim 1, wherein the circuitry for electronically modulating ultrasound based on audio related information to produce generated ultrasound comprises:
circuitry for electronically modulating ultrasound based on digitally formatted audio data.

11. The system of claim 10, wherein the circuitry for electronically modulating ultrasound based on digitally formatted audio data comprises:
circuitry for electronically modulating ultrasound based on at least one of voice-based or musical instrument based audio data.

12. The system of claim 1, wherein the circuitry for electronically modulating ultrasound based on audio related information to produce generated ultrasound comprises:
circuitry for electronically modulating ultrasound based on digital processing.

13. The system of claim 12, wherein the circuitry for electronically modulating ultrasound based on digital processing comprises:
circuitry for electronically modulating ultrasound based on inserting digital information into audio information.

14. The system of claim 1, wherein the circuitry for electronically modulating ultrasound based on audio related information to produce generated ultrasound comprises:
circuitry for electronically modulating ultrasound based on audio related information to be sent as generated ultrasound from one or more electronic personal communication devices.

15. The system of claim 14, wherein the circuitry for electronically modulating ultrasound based on audio related information to be sent as generated ultrasound from one or more electronic personal communication devices comprises:
circuitry for electronically modulating ultrasound based on audio related information received via one or more electronic handheld mobile device systems.

16. The system of claim 14, wherein the circuitry for electronically modulating ultrasound based on audio related information to be sent as generated ultrasound from one or more electronic personal communication devices comprises:
circuitry for electronically modulating ultrasound based on audio related information received via one or more electronic cell phone systems.

17. The system of claim 14, wherein the circuitry for electronically modulating ultrasound based on audio related information to be sent as generated ultrasound from one or more electronic personal communication devices comprises:
circuitry for electronically modulating ultrasound based on audio related information accessed via one or more electronic portable laptop systems.

18. The system of claim 1, wherein the circuitry for electronically directing transmission of the generated ultrasound for one or more audio emissions resultant from down-conversion of the generated ultrasound at least partly toward the target location, the circuitry for electronically directing transmission further configured to adjust at least one aspect of the transmission of the generated ultrasound based at least in part on input received at least in part via the one or more sensing devices comprises:
circuitry for electronically directing transmission of ultrasound according to at least in part one or more actively sensed conditions at the target location.

19. The system of claim 18, wherein the circuitry for electronically directing transmission of ultrasound according to at least in part one or more actively sensed conditions at the target location comprises:
circuitry for electronically directing transmission of ultrasound according to at least in part acoustic environment sensed adjacent to one or more target listeners.

20. The system of claim 18, wherein the circuitry for electronically directing transmission of ultrasound according to at least in part one or more actively sensed conditions at the target location comprises:
circuitry for electronically directing transmission of ultrasound according to at least in part thermally sensed presence of potential eavesdroppers in a vicinity of one or more targeted listeners.

21. The system of claim 18, wherein the circuitry for electronically directing transmission of ultrasound according to at least in part one or more actively sensed conditions at the target location comprises:
circuitry for transmitting to compensate for Doppler frequency shifting due to mobile device movement.

22. The system of claim 18, wherein the circuitry for electronically directing transmission of ultrasound according to at least in part one or more actively sensed conditions at the target location comprises:

circuitry for transmitting ultrasound for ranging one or more target listener positions.

23. The system of claim 18, wherein the circuitry for electronically directing transmission of ultrasound according to at least in part one or more actively sensed conditions at the target location comprises:
circuitry for adjusting ultrasound amplitude based on two dimensional user interface user input.

24. The system of claim 18, wherein the circuitry for electronically directing transmission of ultrasound according to at least in part one or more actively sensed conditions at the target location comprises:
circuitry for adjusting ultrasound target location based on two dimensional user interface input.

25. The system of claim 18, wherein the circuitry for electronically directing transmission of ultrasound according to at least in part one or more actively sensed conditions at the target location comprises:
circuitry for electronically directing transmission of ultrasound according to at least in part audio microphone sensing of digitally coded reference signals in acoustic audio down converted at the target location.

26. The system of claim 18, wherein the circuitry for electronically directing transmission of ultrasound according to at least in part one or more actively sensed conditions at the target location comprises:
circuitry for electronically directing transmission of ultrasound according to at least in part ultrasonic microphone sensing of ultrasound to be down converted at the target location at an ear ring.

27. The system of claim 18, wherein the circuitry for electronically directing transmission of ultrasound according to at least in part one or more actively sensed conditions at the target location comprises:
circuitry for directing location of audio emissions down converted from ultrasound based on sensing of acoustic audio received from the target location.

28. The system of claim 18, wherein the circuitry for electronically directing transmission of ultrasound according to at least in part one or more actively sensed conditions at the target location comprises:
circuitry for electronically directing transmission of ultrasound to be down converted into acoustic anti-noise signals to at least in part cancel acoustic noise signals sensed via acoustic microphone at the target location.

29. The system of claim 1, wherein the circuitry for electronically directing transmission of the generated ultrasound for one or more audio emissions resultant from down-conversion of the generated ultrasound at least partly toward a target location comprises:
circuitry for electronically directing location of audio emissions from ultrasound having frequencies with a range of between 60 to 200 kHz.

30. The system of claim 1, wherein the circuitry for electronically directing transmission of the generated ultrasound for one or more audio emissions resultant from down-conversion of the generated ultrasound at least partly toward the target location comprises:
circuitry for electronically directing location of audio emissions based at least in part on determination of at least a size of a targeting area based at least in part on one or more frequencies of the one or more ultrasonic acoustic signals to be transmitted to determined targeting area.

31. The system of claim 1, wherein the circuitry for electronically directing transmission of the generated ultrasound for one or more audio emissions resultant from down-conversion of the generated ultrasound at least partly toward the target location comprises:
circuitry for directing location of audio emissions based at least in part on one or more frequencies to be used for the one or more acoustic audio signals.

32. The system of claim 1, wherein the circuitry for electronically directing transmission of the generated ultrasound for one or more audio emissions resultant from down-conversion of the generated ultrasound at least partly toward the target location comprises:
circuitry for electronically directing location of audio emissions based at least in part on amplitude to be used for the acoustic audio at target location.

33. The system of claim 1, wherein the circuitry for electronically directing transmission of the generated ultrasound for one or more audio emissions resultant from down-conversion of the generated ultrasound at least partly toward the target location comprises:
circuitry for directing one or more mobile device ultrasonic emitter arrangements.

34. The system of claim 33, wherein the circuitry for directing one or more mobile device ultrasonic emitter arrangements comprises:
circuitry for electronically directing one or more mobile device ultrasonic emitter arrangements including one or more transducers positioned at least partially in mobile device display screen.

35. The system of claim 33, wherein the circuitry for directing one or more mobile device ultrasonic emitter arrangements comprises:
circuitry for electronically directing one or more mobile device ultrasonic emitter arrangements including one or more transducers having dimensional sizing of less than 10 millimeters.

36. The system of claim 33, wherein the circuitry for directing one or more mobile device ultrasonic emitter arrangements comprises:
circuitry for electronically directing one or more mobile device ultrasonic emitter arrangements including one or more transducers positioned in mobile device localized areas.

37. The system of claim 33, wherein the circuitry for directing one or more mobile device ultrasonic emitter arrangements comprises:
circuitry for electronically directing one or more mobile device ultrasonic emitter arrangements including one or more transducers positioned in mobile device regions grouped to appear as one or more collective speakers.

38. The system of claim 1, wherein the circuitry for electronically directing transmission of the generated ultrasound for one or more audio emissions resultant from down-conversion of the generated ultrasound at least partly toward the target location, the circuitry for electronically directing transmission further configured to adjust at least one aspect of the transmission of the generated ultrasound based at least in part on input received at least in part via the one or more sensing devices comprises:
circuitry for steering the generated ultrasound at least partly toward a position an ear of a target listener based at least in part on received input received at least in part via one or more infrared sensing devices configured to provide data that is at least indicative of the position of the ear of the target listener, wherein the one or more infrared sensing devices are integrated as a portion of the mobile device.

39. The system of claim 1, wherein the circuitry for electronically directing transmission of the generated ultrasound for one or more audio emissions resultant from down-conversion of the generated ultrasound at least partly toward the target location, the circuitry for electronically directing transmission further configured to adjust at least one aspect of the transmission of the generated ultrasound based at least in part on input received at least in part via the one or more sensing devices comprises:

circuitry for adjusting at least an amplitude associated with at least one of the generated ultrasound or the one or more audio emissions resultant from down-conversion of the generated ultrasound based at least in part on input received at least in part via the one or more sensing devices.

40. The system of claim 1, wherein the circuitry for electronically directing transmission of the generated ultrasound for one or more audio emissions resultant from down-conversion of the generated ultrasound at least partly toward the target location, the circuitry for electronically directing transmission further configured to adjust at least one aspect of the transmission of the generated ultrasound based at least in part on input received at least in part via the one or more sensing devices comprises:

circuitry for steering the generated ultrasound at least partly toward a target position associated with one or more target listeners based at least in part on input received via at least one of thermal, visual, or acoustic imaging of the one or more target listeners.

41. The system of claim 1, wherein the one or more sensing devices are integrated as a portion of the mobile device.

42. A computationally-implemented method performed with a mobile device, the method comprising:

receiving sensory input from one or more sensing devices configured to sense one or more conditions in a vicinity of a target location toward which generated ultrasound is to be transmitted, including at least receiving sensory input from at least one sensing device of the one or more sensing devices being configured to detect at least one condition in the vicinity of the target location that includes at least other than one or more human-audible sounds in the vicinity of the target location; P1 modulating ultrasound based on audio related information to produce generated ultrasound; and directing transmission of the generated ultrasound for one or more audio emissions resultant from down-conversion of the generated ultrasound at least partly toward a target location, the directing transmission including at least adjusting at least one aspect of the transmission of the generated ultrasound based at least in part on the received sensory input; and wherein at least one of the receiving sensory input, the modulating ultrasound or the directing transmission is performed at least in part with one or more processing devices of the mobile device.

43. A system comprising:

at least one mobile computing device; and one or more instructions when executed on the at least mobile computing device cause the at least one mobile computing device to at least:

receive sensory input from one or more sensing devices configured to sense one or more conditions in a vicinity of a target location toward which generated ultrasound is to be transmitted, including at least receiving sensory input from at least one sensing device of the one or more sensing devices being configured to detect at least one condition in the vicinity of the target location that includes at least other than one or more human-audible sounds in the vicinity of the target location;

modulate ultrasound based on processing audio related information to produce generated ultrasound; and direct transmission of the generated ultrasound for one or more audio emissions resultant from down-conversion of the generated ultrasound at least partly toward a target location, the direct transmission including at least adjusting at least one aspect of the transmission of the generated ultrasound based at least in part on the received sensory input.

\* \* \* \* \*

UNITED STATES PATENT AND TRADEMARK OFFICE
CERTIFICATE OF CORRECTION

PATENT NO. : 9,886,941 B2
APPLICATION NO. : 14/163546
DATED : February 6, 2018
INVENTOR(S) : Michael H. Baym et al.

It is certified that error appears in the above-identified patent and that said Letters Patent is hereby corrected as shown below:

In the Claims

Column 166, Lines 3-5:
"sounds in the vicinity of the target location; P1 modulating ultrasound based on audio related information to produce generated ultrasound; and"

Should read:
--sounds in the vicinity of the target location; modulating ultrasound based on audio related information to produce generated ultrasound; and--

Signed and Sealed this
Twenty-first Day of May, 2019

Andrei Iancu
*Director of the United States Patent and Trademark Office*